(12) United States Patent
Fukuda et al.

(10) Patent No.: US 7,876,403 B2
(45) Date of Patent: Jan. 25, 2011

(54) OPTICAL COMPENSATION FILM, POLARIZING PLATE AND LIQUID CRYSTAL DISPLAY DEVICE

(75) Inventors: Kenichi Fukuda, Minami-ashigara (JP);
Yuta Takahashi, Minami-ashigara (JP);
Hiroyuki Kawanishi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 434 days.

(21) Appl. No.: 12/093,555

(22) PCT Filed: Nov. 30, 2006

(86) PCT No.: PCT/JP2006/324391
§ 371 (c)(1),
(2), (4) Date: May 13, 2008

(87) PCT Pub. No.: WO2007/064029
PCT Pub. Date: Jun. 7, 2007

(65) Prior Publication Data
US 2009/0180059 A1 Jul. 16, 2009

(30) Foreign Application Priority Data

| Dec. 2, 2005 | (JP) | ............... | 2005-348975 |
| Dec. 20, 2005 | (JP) | ............... | 2005-366291 |
| Dec. 27, 2005 | (JP) | ............... | 2005-376503 |
| Jan. 30, 2006 | (JP) | ............... | 2006-021147 |

(51) Int. Cl.
*G02F 1/1335* (2006.01)
(52) U.S. Cl. ........................ 349/96; 349/119
(58) Field of Classification Search ............. None
See application file for complete search history.

(56) References Cited

U.S. PATENT DOCUMENTS

| 6,115,095 | A | 9/2000 | Suzuki et al. |
| 6,184,957 | B1 | 2/2001 | Mori et al. |
| 6,285,429 | B1 | 9/2001 | Nishida et al. |
| 6,285,430 | B1 | 9/2001 | Saito |
| 2008/0024703 | A1* | 1/2008 | Ichihashi .................... 349/119 |

FOREIGN PATENT DOCUMENTS

| JP | 9-080424 (A) | 3/1997 |
| JP | 9-292522 (A) | 11/1997 |
| JP | 10-054982 (A) | 2/1998 |
| JP | 10-307291 (A) | 11/1998 |
| JP | 11-133408 (A) | 5/1999 |
| JP | 11-202323 (A) | 7/1999 |
| JP | 11-305217 (A) | 11/1999 |
| JP | 2005-062671 (A) | 3/2005 |
| JP | 2005-070098 (A) | 3/2005 |
| JP | 2005-520209 (A) | 7/2005 |
| JP | 2005-255832 (A) | 9/2005 |
| JP | 2005-265889 (A) | 9/2005 |
| WO | WO 03/076985 (A1) | 9/2003 |

OTHER PUBLICATIONS

Form PCT/ISA/210 (International Search Report) dated Mar. 13, 2007.
Form PCT/ISA/237 (Written Opinion of the International Searching Authority) dated Mar. 13, 2007.
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2006/324391, Jun. 12, 2008, The International Bureau of WIPO, Geneva, CH.

* cited by examiner

*Primary Examiner*—Uyen-Chau N Le
*Assistant Examiner*—Chris H Chu
(74) *Attorney, Agent, or Firm*—Buchanan Ingersoll & Rooney PC

(57) ABSTRACT

A novel optical compensation film is disclosed. The film comprises at least a first optically anisotropic layer and a second optically anisotropic layer, the first optically anisotropic layer having an in-plane retardation of 0 to 10 nm and an in-thickness direction retardation of −400 to −80 nm, the second optically anisotropic layer having an in-plane retardation of 20 to 150 nm and an in-thickness direction retardation of 100 to 300 nm, and at least either one of the first and second optically anisotropic layer being a polymer film.

19 Claims, No Drawings

OPTICAL COMPENSATION FILM, POLARIZING PLATE AND LIQUID CRYSTAL DISPLAY DEVICE

BACKGROUND OF THE INVENTION

1. Field of the Invention

The present invention relates to a technical field of liquid crystal display device, and in particular to liquid crystal display devices employing the in-plane switching (IPS) mode and FFS mode, enabling display by applying a transverse electric field to in-plane aligned liquid crystalline molecules. The present invention also relates to an optical compensation film can contribute to improvement of contrast ratio of liquid crystal display devices employing the IPS mode or the like, and a polarizing plate using the same.

2. Related Art

As liquid crystal display device, widely used are those of so-called TN mode type, comprising a liquid crystal layer, containing a nematic liquid crystal in a twisted arrangement, placed between two orthogonal polarizing plates, and applied with an electric field in the direction normal to the substrate. This mode suffers from light leakage due to birefringence of the liquid crystalline compound when viewed at an oblique direction angle, because the liquid crystal molecules rise up from the substrate in the black state. In order to solve this problem, use of a film having a liquid crystalline compound in a hybrid alignment, aiming at optically compensating the liquid crystal cell and thereby preventing the light leakage, has been put into practical use. It has, however, been very difficult to achieve complete optical compensation of the liquid crystal cell without causing any problems, even if discotic liquid crystalline compounds are used for preparing such films, still leaving a problem of incomplete suppression of grayscale inversion in the lower portion of screen.

Aiming at solving this problem, liquid crystal display devices employing so-called IPS mode and FFS mode, applying a transverse electric field to the liquid crystal, and employing the vertical alignment (VA) mode, comprising liquid crystal of negative dielectric anisotropy vertically aligned as being partitioned by projections or slit electrodes formed in the panels, have been proposed and put into practical use. These panels have been developed not only for monitor use, but also for television use, and as a consequence, have greatly been improved in brightness. In this situation, even a small light leakage in the black state at a an oblique direction in the diagonal incident direction, which has not been a serious problem previously for these modes, has been becoming distinct as a factor of degradation in displaying quality.

As one measure for improving color tones and viewing angle characteristics in the black state, disposing a birefringent optical compensation material between the liquid crystal layer and the polarizing plate has been tried for the LCD employing the IPS or FFS mode. For example, there is a disclosure describing that coloration in the white state or the half-tone state viewed at an oblique angle can be reduced by disposing birefringent media, having optical axes normal to each other, which can compensate increase and decrease in retardation of the liquid crystal layer when liquid crystal molecules in the layer are obliquely aligned, between the substrate and each of the polarizing plates (see Japanese Laid-Open Patent Publication, occasionally referred to as "JPA", No. H9-80424). There have been also proposed a method of using an optical compensation film composed of styrene-base polymer or discotic liquid crystalline compound having negative intrinsic birefringence (see JPA Nos. H10-54982, H11-202323 and H9-292522); a method of using an optical compensation film obtained by combining a film having a positive birefringence and having an optical axis aligned in plane, and a film having a positive birefringence and having an optical axis aligned in the direction of the normal line of the film (see JPA No. H11-133408); a method of using a biaxial optical compensation film having a retardation of half wavelength (see JPA No. H11-305217); and a system of using a film having a negative retardation as a protective film of the polarizing plates, and providing on the surface thereof an optical compensation layer having a positive retardation (see JPA No. H10-307291).

In JPA No. 2005-265889, an IPS liquid crystal display device, provided with a compensation film composed of a stretched cellulose acylate film having an in-plane retardation Re and Nz of 1.5 to 7, and a rod-like liquid crystal coated and aligned thereon, is disclosed. The IPS liquid crystal display device successfully improves viewing angle characteristic, as one display quality, with a simple configuration.

SUMMARY OF THE INVENTION

With recent dissemination of liquid crystal display devices and increasing opportunities of using them under various environments with high humidity and high temperature, there is a demand on that the optical compensation film will never degrade the optical compensation functions under these environments. For example, the optical compensation film disclosed in the above-described JPA No. 2005-265889 employs a cellulose acylate film having a large Re retardation value and a large Rth retardation value, but the Re value and the Rth value are variable with temperature and humidity, possibly resulting in degradation in the optical compensation ability. Use of the film under high humidity will induce dimensional changes and degrade the optical compensation ability.

The situation therefore raises a demand on development of a film less causative of environmentally-induced changes in the optical compensation ability, and what is better, inexpensive and thin.

Investigations by the present inventors have gradually revealed that, when the film is used under various conditions such as high humidity, high temperature and so forth, it is hard to keep adhesiveness between the polymer film such as a biaxial cellulose acylate film and the rod-like liquid crystal layer.

On the other hand, the polarizing plates used for liquid crystal display devices are generally manufactured by bonding films mainly containing cellulose triacetate as protective films, on both surfaces of a polarizer obtained by allowing iodine or a dichroic dye to adsorb and align on a polyvinyl alcohol film. The cellulose acylate film, characterized by its excellence in the toughness, incombustibility, optical isotropy (low retardation value) and so forth, has widely and desirably been used as the above-described protective film for the polarizing plates, but recent needs on display performance of liquid crystal display devices having been becoming more advanced raise further demands on improvement in the hygroscopicity, moisture permeability, environmental resistance or the like of the protective films for the polarizing plates.

Cyclic polyolefin generally has lower hygroscopicity and lower moisture permeability, as compared with cellulose acylate film. The cyclic polyolefin film is also characterized by its small changes in the optical characteristics caused by temperature and humidity. This film, however, suffers from a problem in that it has only a small adhesiveness with a layer formed by curing a liquid crystal composition.

It is therefore an object of the present invention to provide an optical compensation film and a polarizing plate which are excellent in durability even under severe environments, and shows only a small fluctuation in the optical characteristics due to environmental changes such as humidity, and are therefore contributive to improvement in the viewing angle characteristics of an IPS-type liquid crystal display device; and to provide a high-quality liquid crystal display device, in particular an IPS-mode liquid crystal display device showing only a small viewing-angle-dependent degradation in contrast and changes in hue, and a small temperature/humidity dependence of the display performance.

In one aspect, the present invention provides an optical compensation film comprising at least a first optically anisotropic layer and a second optically anisotropic layer, the first optically anisotropic layer having an in-plane retardation of 0 to 10 nm and an in-thickness direction retardation of −400 to −80 nm, the second optically anisotropic layer having an in-plane retardation of 20 to 150 nm and an in-thickness direction retardation of 100 to 300 nm, and at least either one of the first and second optically anisotropic layer being a polymer film.

As an embodiment of the invention, there is provided the optical compensation film, wherein the second optically anisotropic layer is a cellulose acylate film comprising at least one cellulose acylate, wherein the cellulose acylate is a mixed fatty acid ester of cellulose obtained by substituting hydroxyl groups of cellulose with acetyl groups and with acyl groups having 3 or more carbon atoms; and the degree of substitution A by acetyl group and the degree of substitution B by acyl group having 3 or more carbon atoms satisfy the formulae (I) and (II) below:

$2.0 \leq A+B \leq 3.0$  Formula (I)

$0 < B$  Formula (II)

As another embodiment, there is provided the optical compensation film, wherein the second optically anisotropic layer is a cyclic polyolefin film. The cyclic polyolefin film may comprise at least one addition polymer comprising at least one repeating unit represented by formula (V) below, or at least one ring-opening polymer comprising at least one repeating unit represented by formula (VI) below:

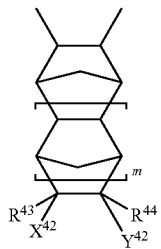

Formula (V)

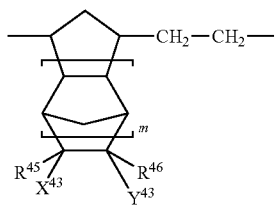

Formula (VI)

where, m is an integer of 0 to 4; $R^{43}$ to $R^{46}$ independently represents a hydrogen atom or $C_{1-10}$ hydrocarbon group; $X^{42}$, $X^{43}$, $Y^{42}$ and $Y^{43}$ independently represent a hydrogen atom, $C_{1-10}$ hydrocarbon group, halogen atom, halogen-substituted $C_{1-10}$ hydrocarbon group, $-(CH_2)_nCOOR^{51}$, $-(CH_2)_nO\text{-}COR^{52}$, $-(CH_2)_nNCO$, $-(CH_2)_nNO_2$, $-(CH_2)_nCN$, $-(CH_2)_nCONR^{53}R^{54}$, $-(CH_2)_nNR^{53}R^{54}$, $-(CH_2)_nOZ^{51}$, $-(CH_2)_nW^{51}$, or $(-CO)_2O$ or $(-CO)_2ONR^{55}$ composed of $X^{42}$ and $Y^{42}$, or of $X^{43}$ and $Y^{43}$; $R^{51}$, $R^{52}$, $R^{53}$, $R^{54}$ and $R^{55}$ independently represent a hydrogen atom or $C_{1-20}$ hydrocarbon group; $Z^{51}$ represents a hydrocarbon group or halogen-substituted hydrocarbon group; $W^{51}$ represents $SiR^{56}_p D^{51}_{3-p}$ ($R^{56}$ represents a $C_{1-10}$ hydrocarbon group, $D^{51}$ represents a halogen atom-$OCOR^{56}$ or $OR^{56}$, and p is an integer of 0 to 3); and n is an integer of 0 to 10.

The cyclic polyolefin film may comprise at least one cyclic polyolefin having an ester group in side chains thereof, obtained by polymerizing a polymerizable composition comprising at least one cyclic olefin monomer having an ester group.

According to the invention, the second optically anisotropic layer may be a film stretched by transverse monoaxial stretching, longitudinal monoaxial stretching, simultaneous biaxial stretching or sequential biaxial stretching.

According to the invention, it is preferred that at least one adhesive layer is disposed between the first and second optically anisotropic layers.

As embodiments of the invention, there are provided the optical compensation film wherein the first optically anisotropic layer is formed of a composition comprising at least one rod-like liquid crystal compound, in which molecules of the rod-like liquid crystal compound are fixed substantially in a homeotropic alignment state; the optical compensation film, wherein the first optically anisotropic layer comprises rod-like liquid crystal molecules fixed in a homeotropic alignment state, and a retardation of the first optically anisotropic layer measured in a direction rotated by 40° from a normal line of the layer plane satisfies a relationship below:

$1 \leq Re(40)_{450}/Re(40)_{550} \leq 1.07$ where, $Re(40)_{450}$ and $Re(40)_{550}$ represent retardation values measured in a direction 40° rotated from the normal line, at 450 nm and 550 nm, respectively.

In another aspect, the invention provides a polarizing plate comprising a polarizer film and the optical compensation film of the invention.

As embodiments of the invention, there are provided the polarizing plate wherein only an optically substantially isotropic adhesive layer and/or substantially isotropic protective film is disposed between the optical compensation film and the polarizer film; the polarizing plate wherein the transparent protective film is a film comprising cellulose acylate or cyclic polyolefin, and has an in-plane retardation of 0 to 10 nm, and an in-thickness direction retardation of −20 to 20 nm; the polarizing plate comprising the first optically anisotropic layer, the second optically anisotropic layer, and the polarizer film stacked therein in this order, the direction of the slow axis of the second optically anisotropic layer being substantially normal to the direction of absorption axis of the polarizer film; and the polarizing plate comprising the second optically anisotropic layer, the first optically anisotropic layer, and the polarizer film stacked therein in this order, the direction of the slow axis of the second optically anisotropic layer being substantially parallel to the direction of absorption axis of the polarizer film.

In another aspect, the invention also provides a liquid crystal display device comprising:

a liquid crystal cell comprising a pair of substrates, and, between the pair of substrates, a liquid crystal layer in which liquid crystal molecules are aligned substantially parallel to surfaces of the substrates in the black state;

a polarizing plate of the invention, the polarizing plate being disposed on an outer side of one substrate of the pair of substrates so that the first optically anisotropic layer, the second optically anisotropic layer and the polarizer film are arranged in this order as viewed from the one substrate of the pair of substrates, and so that the slow axis of the second optically anisotropic layer is substantially parallel to a mean direction of longitudinal axes of liquid crystal molecules in the black state; and a second polarizer film disposed on an outer side of the other substrate of the pair of substrates so that the absorption axes of the polarizer films are orthogonal to each other; and a liquid crystal display device comprising:

a liquid crystal cell comprising a pair of substrates, and, between the pair of substrates, a liquid crystal layer in which liquid crystal molecules are aligned substantially parallel to surfaces of the substrates in the black state;

a polarizing plate of the invention, the polarizing plate being disposed on an outer side of one substrate of the pair of substrates so that the second optically anisotropic layer, the first optically anisotropic layer and the polarizer film are arranged in this order as viewed from the one substrate of the pair of substrates, and so that the slow axis of the second optically anisotropic layer is substantially orthogonal to a mean direction of longitudinal axes of liquid crystal molecules in the black state; and a second polarizer film disposed on an outer side of the other substrate of the pair of substrates so that the absorption axes of the polarizer films are orthogonal to each other.

PREFERRED EMBODIMENT OF THE INVENTION

The present invention will be described in detail.

It is to be noted, in this description, that the term " . . . to . . . " is used as meaning a range inclusive of the lower and upper values disposed therebefore and thereafter.

It is also noted in this description, the term "(meth)acrylate" means both or either of acrylate and/or methacrylate. The term "(meth) acryl acid" means those as well as the term "(meth)acrylate".

In the description, the term "parallel" or "orthogonal" means within a range less than ±10° with respect to an exact angle. An error from the exact angle is preferably less than ±5°, and more preferably less than ±2°. The term "substantially homeotropic" means within a range less than ±20° with respect to an exact angle. An error from the exact angle is preferably less than ±15°, and more preferably less than ±10°. Also the term of "slow axis" means a direction where the refractive index becomes a maximum value. Also the refractive index is a value measured at $\lambda=550$ nm within the visible light region, unless specified otherwise.

In the description, the term "polarizing plate" is used for both a polarizing plate in a continuous web form, and a polarizing plate which is cut into a size for incorporation in a liquid crystal apparatus (in the present description, "cutting" includes "punching", "cutout" and the like), unless particularly specified. Also in the description, the terms of "polarizer film" and "polarizing plate" are used in different meanings, and a "polarizing plate" means a laminate member having, on at least a side of a "polarizer film", a transparent protective film for protecting the polarizer film.

In the description, $Re(\lambda)$ and $Rth(\lambda)$ respectively mean an in-plane retardation and a retardation in a thickness-direction at wavelength $\lambda$. The $Re(\lambda)$ is measured by using KOBRA-21ADH (manufactured by Oji Scientific Instruments) for an incoming light of a wavelength $\lambda$nm in a direction normal to a film-surface. The $Rth(\lambda)$ is calculated by using KOBRA-21ADH based on three retardation values; first one of which is the $Re(\lambda)$ obtained above, second one of which is a retardation which is measured for an incoming light of a wavelength $\lambda$nm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength $\lambda$nm in a direction rotated by −40° with respect to the normal direction of the film around an in-plane slow axis as an a inclining axis (a rotation axis); a hypothetical mean refractive index and an entered thickness value of the film. The wavelength $\lambda$ generally falls within the range from 450 to 750 nm. According to the present invention, the wavelength $\lambda$ is 589 nm. The mean refractive indexes of various materials are described in published documents such as "POLYMER HANDBOOK" (JOHN WILEY & SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to $(nx-nz)/(nx-ny)$, is calculated based on the calculated nx, ny and nz.

[Optical Compensation Film]

The present invention relates to an optical compensation film comprising a first optically anisotropic layer having an in-plane retardation of 0 to 10 nm and an in-thickness direction retardation of −400 to −80 nm, and the second optically anisotropic layer having an in-plane retardation of 20 to 150 nm and an in-thickness direction retardation of 100 to 300 nm.

Examples of the material to be used for preparing the optical compensation film of the invention, or the like will be described in detail hereinafter.

(First Optically Anisotropic Layer)

The optical compensation film of the invention comprises a first optically anisotropic layer having an in-plane retardation of 0 to 10 nm and an in-thickness direction retardation of −400 to −80 nm. The in-plane retardation of the layer is preferably from 0 to 5 nm, and more preferably from 0 to 3 nm. The in-thickness direction retardation of the layer is preferably from −360~−100 nm, and more preferably from −320 to −120 nm.

The first optically anisotropic layer is preferably made of a composition comprising at least one liquid crystal compound. The liquid crystal compound is preferably selected from rod-like liquid crystal compounds. Especially, the first optically anisotropic layer, prepared using the rod-like liquid crystal compound(s), in which molecules of the rod-like liquid crystal compound(s) are aligned in a vertical, or, in other words, homeotropic alignment state, is preferred. In the first optically anisotropic layer, liquid crystal molecules are preferably fixed in an alignment state, more preferably fixed in a homeotropic alignment state. In the description, the term "homeotropic alignment" used for any rod-like liquid crystal compound means an alignment in which molecules of the rod-like liquid crystal compound are aligned so that their directors are substantially vertical to the layer plane. According to the invention, the angle formed between the layer plane and the director of rod-like molecule in a homeotropic alignment state varies from 70° to 90°. The angle is preferably from 80° to 90°, and more preferably from 85° to 90°.

For not only exhibiting the effect of the invention but also contributing to reduction of coloration generated as viewed at an oblique angle, the first optically anisotropic layer preferably has the wavelength dispersion that the retardation measured in the direction rotated by 40° from the normal line satisfies the inequality (1) below. It is more preferable to satisfy the inequality (2) below, and it is still more preferable to satisfy the inequality (3). The axis used for rotation herein is defined as the slow axis when the slow axis can be detected in the first optically anisotropic layer, and is defined as an arbitrary axis when the slow axis cannot be detected.

$$1 \leq Re(40)_{450}/Re(40)_{550} \leq 1.07 \quad (1)$$

$$1 \leq Re(40)_{450}/Re(40)_{550} \leq 1.05 \quad (2)$$

$$1 \leq Re(40)_{450}/Re(40)_{550} \leq 1.03 \quad (3)$$

In the formulae, $Re_{450}$ and $Re_{650}$ represent retardation values measured at 450 nm and 650 nm, respectively.

Examples of the liquid crystalline compound used for forming the first optically anisotropic layer are not specifically limited to any type. The first optically anisotropic layer may be formed by aligning molecules of a low-molecular liquid crystalline compound in a nematic alignment state, and then by fixing it by photo- or thermal crosslinking reaction. The first optically anisotropic layer may be also formed by fixing polymer liquid crystalline molecules in a nematic alignment state under cooling. It is to be noted that the liquid crystal compound is not required to finally exhibit liquid crystallinity in the optically anisotropic layer since molecules of the liquid crystalline compound contained in the layer are often fixed in an alignment state by polymerization or the like in the production process and lose liquid crystallinity. The liquid crystal compound is preferably selected from polymerizable compounds. The polymerizable liquid crystalline compound may be a multi-functional polymerizable liquid crystal, or may be a mono-functional polymerizable liquid crystalline compound.

The first optically anisotropic layer may be formed on a substrate (support). A second optically anisotropic layer typically composed of a film may be used as the substrate, or the first optically anisotropic layer may be provided on a temporary substrate, and is then transferred onto a polarizer film or the second optically anisotropic layer, or an optically isotropic film may be used as the support. A polarizer film and the optical compensation film of the present invention can be stacked to form the polarizing plate, and can be incorporated typically into the liquid crystal display device.

The first optically anisotropic layer may be produced by using a composition comprising at least one liquid crystal compound such as rod-like liquid crystals, and, if necessary, a polymerization initiator, alignment controlling agent and other additives.

(Rod-Like Liquid Crystal Compound)

According to the invention, it is preferred that the optically anisotropic layer is produced using at least one rod-like liquid crystal compound. Preferred examples of the rod-like liquid crystal compound, which can be used in the retardation layer, include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include liquid-crystal polymers. In the process of forming the first optically anisotropic layer, it is preferred that molecules of the rod-like liquid crystal compound are fixed in an alignment state by polymerization. Thus, the liquid crystal compound is preferably selected from compounds having a moiety structure capable of initiating polymerization reaction or crosslinking reaction by the irradiation of light, electron beam, heat or the like. The number of such moiety structure in a rod-like molecule is preferably from 1 to 6, and more preferably from 1 to 3. Examples of polymerizable rod-like liquid crystal compound, which can be used in the invention include, but are not limited to, those disclosed in Makromol. Chem., Vol. 190, P. 2255 (1989); Advanced Materials, vol. 5, p. 107 (1993); U.S. Pat. Nos. 4,683,327, 5,622,648 and 5,770,107; WO 95/22586, WO 95/24455 WO 97/00600, WO 98/23580, WO 98/52905, and JPA Nos. hei 1-272551, hei 6-16616, hei 7-110469, hei 11-80081, 2001-328973, 2004-240188, 2005-99236, 2005-99237, 2005-121827 and 2002-30042.

(Aid for Homeotropic Alignment)

It requires controlling the alignment of liquid crystal molecules at both sides of an alignment layer-interface and an air-interface to align liquid crystal molecules in a homeotropic alignment state uniformly. For aiding homeotropic alignment at the side of an alignment layer-interface, an alignment layer and/or an optically anisotropic layer may be made of a composition comprising a compound capable of aligning liquid crystal molecules homeotropically with its excluded volume effect, electrostatic effect or surface energy effect. For adding homeotropic alignment at the side of an air-interface, an optically anisotropic layer may be made of a composition comprising a compound capable of localizing at the side of an air-interface and aligning liquid crystal molecules homeotropically with its excluded volume effect, electrostatic effect or surface energy effect. Preferred examples of the compound capable of aiding liquid crystal molecules homeotropically at the side of an alignment layer-interface, hereinafter referred to as "aid for homeotropic alignment at an alignment layer-interface side", include pyridinium derivatives. Preferred examples of the compound capable of aiding liquid crystal molecules homeotropically at the side of an air-interface, hereinafter referred to as "aid for homeotropic alignment at an air-interface side", include compounds having a fluoro-aliphatic group, promoting the localization of the compound at the air-interface side, and at least one hydrophilic group selected from the group consisting of carboxylic group (—COOH), sulfo group (—SO$_3$H), phosphonoxy group {—OP(=O)(OH)$_2$} and the salts thereof. Added to a coating fluid of the liquid crystal composition, such compounds can also contribute to improving the coating properties of the fluid and to reducing the generation of unevenness ("mura"), cissing ("hajiki") or the like.

The aid for homeotropic alignment will be described in detail hereinafter.

(Aid for Homeotropic Alignment at Alignment Layer-Interface Side)

Preferred examples of the aid for homeotropic alignment at an alignment layer-interface side, which can be employed in the present invention, include the pyridinium derivatives, pyridinium salts, represented by the formula (I) shown below. Adding at least one pyridinium derivative to a discotic liquid crystal composition, discotic liquid crystal molecules may be substantially aligned homeotropically at an alignment layer-interface side.

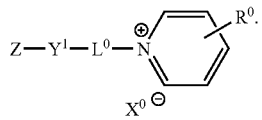

Formula (I)

In the formula (I), $L^0$ represents a divalent linking group, and preferably a $C_{1-20}$ divalent linking group selected from the group consisting of any combinations of an alkylene group and —O—, —S—, —CO—, —SO$_2$—, —NR$^a$— (where $R^a$ is a hydrogen atom or $C_{1-5}$ alkyl group), an alkenylene group, an alkynylene group or an arylene group. The alkylene group may have a linear or branched chain structure.

In the formula (I), $R^0$ represents a hydrogen atom, non-substituted amino, or substituted amino group having at least one $C_{1-20}$ substituent. Among the substituted amino group, the substituted amino group having at least one aliphatic group amino group is preferable as $R^0$. Examples of the aliphatic group include alkyl groups, substituted alkyl groups, alkenyl groups, substituted alkenyl groups, alkynyl groups and substituted alkynyl groups. When $R^0$ is a secondary amino group, two aliphatic groups may bind to each other to form a nitrogen-containing hetero-ring. Five or six-membered hetero-ring is preferred. $R^0$ preferably represents a hydrogen atom, non-substituted amino, or substituted amino group having at least one $C_{2-12}$ substituent, and more preferably represents a hydrogen atom, non-substituted amino, or substituted amino group having at least one $C_{2-8}$ substituent. When $R^0$ is an amino group, the 4-position of the pyridinium ring is preferably substituted with $R^0$.

In the formula (I), $X^0$ is an anion. Examples of the anion include halogenide ions such as fluorinate ion, chloride ion, bromide ion and iodide ion; sulfonate ions such as methane sulfonate ion, trifluoromethane sulfonate ion, methyl sulfonate ion, p-toluene sulfonate ion, p-chlorobenzene sulfonate ion, 1,3-benzene sulfonate ion, 1,5-naphthalene disulfonate ion and 2,6-naphthalene disulfonate ion; sulfate ion, carbonate ion, nitrate ion, thiocyanate ion, perchlorate ion, tetrafluoro borate ion, picrate ion, acetate ion, formate ion, trifluoro acetate ions, phosphate ions such as hexafluoro phosphate ion, and hydroxy ion. $X^0$ preferably represents a halogenide ion, sulfonate ion or hydroxy ion.

In the formula (I), $Y^1$ represents a $C_{1-30}$ divalent linking group having a five- or six-membered ring as a partial structure. Preferred examples of the cyclic partial structure embedded in $Y^1$ include a cyclohexyl ring, aryl ring and a hetero-ring. Examples of the aryl ring include a benzene ring, indene ring, naphthalene ring, fluorine ring, phenanthlene ring, anthrathene ring, biphenyl ring and pyrene ring. Benzen, biphenyl and naphthalene rings are preferred. Preferred examples of the atom embedded in the hetero ring include a nitrogen atom, oxygen atom and sulfur atom. Examples of the hetero ring include a furan ring, a thiophene ring, a pyrol ring, a pyrroline ring, a pyrrolizine ring, an oxazole ring, an isoxazole erring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyrane ring, a dioxane ring, a dithiazone ring, a thiyne ring, a pyridine ring, a piperidine ring, an oxazine ring, a morpholine ring, a thiazine ring, a pyridazine ring, a pyrimidine ring, a pyrazine ring, a piperazine ring, and a triazine ring.

The hetero ring is preferable selected from six-membered rings. In the formula, $Y^1$, a $C_{1-30}$ divalent linking group having a five- or six-membered ring as a partial structure, may have one or more substituents.

In the formula (I), Z represents a halogen-substituted phenyl, nitro-substituted phenyl, cyano-substituted phenyl, $C_{1-10}$ alkyl-substituted phenyl, $C_{2-10}$ alkoxy-substituted phenyl, $C_{1-12}$ alkyl, $C_{2-20}$ alkynyl, $C_{1-12}$ alkoxy, $C_{2-13}$ alkoxycarbonyl, $C_{7-26}$ aryloxycarbonyl or $C_{7-26}$ arylcarbonyloxy; and preferably represents a cyano-substituted phenyl, halogen-substituted phenyl, $C_{1-10}$ alkyl-substituted phenyl, $C_{2-10}$ alkoxy-substituted phenyl, $C_{7-26}$ aryloxycarbonyl or $C_{7-26}$ arylcarbonyloxy.

Z may have one or more substituents. Examples of the substituent include halogen atoms such as fluorine, chlorine, bromine and iodine atoms; cyano, nitro, $C_{1-16}$ alkyls, $C_{1-16}$ alkenyls, $C_{1-16}$ alkynyls, $C_{1-16}$ halogen-substituted alkyls, $C_{1-16}$ alkoxys, $C_{2-16}$ acyls, $C_{1-16}$ alkylthios, $C_{2-16}$ acyloxys, $C_{2-16}$ alkoxycarbonyls, carbamoyl, $C_{2-16}$ alkyl-substituted carbamoyls, and $C_{2-16}$ acylaminos.

The pyridinium compound to be used in the present invention is preferably selected from the formula (Ia) shown below.

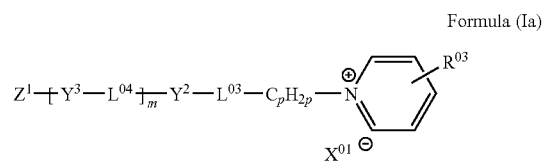

Formula (Ia)

In the formula (Ia), $L^{03}$ represents a single bond, —O—, O—CO—, —CO—O—, —C≡C—, —CH=CH—, —CH=N—, —N=CH—, —N=N—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, where AL is a $C_{1-10}$ alkylene group. $L^{03}$ preferably represents a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—; more preferably represents a single bond or —O—.

In the formula (Ia), $L^{04}$ represents a single bond, —O—, —O—CO—, —CO—O—, —C≡C—, —CH=CH—, —CH=N—, —N=CH— or —N=N—.

In the formula (Ia), $R^{03}$ represents a hydrogen atom, a non-substituted amino or a $C_{2-20}$ alkyl-substituted amino. When $R^{03}$ is a dialkyl-substituted amino, two alkyl groups may bind to each other to form a nitrogen-containing hetero ring. Five- or six-membered hetero rings are preferred. $R^{03}$ preferably represents a hydrogen atom, a non-substituted amino or a $C_{2-12}$ alkyl-substituted amino; and more preferably represents a hydrogen atom, a non-substituted amino or a $C_{2-8}$ alkyl-substituted amino. When $R^{03}$ is a non-substituted amino, the 4-position of the pyridinium ring is preferably substituted with $R^{03}$.

In the formula (Ia), $Y^2$ and $Y^3$ respectively represent an optionally-substituted divalent six-membered ring group. Examples of the six-membered ring include aliphatic rings, aryl rings such as benzene ring and hetero rings. Examples of the six-membered aliphatic ring include a cyclohexane ring, a cyclohexene ring and a cyclohexane diene ring. Examples of the six-membered hetero ring include a pyrane ring, a dioxane ring, a dithiazine ring, a thiyne ring, a pyridine ring, a piperidine ring, an oxazine ring, a morpholine ring, a thiazine ring, a pyridazine ring, a pyrimidine ring, a pyrazine ring, piperazine ring and triazine ring. The six-membered ring may be condensed with other six- or five membered ring(s).

Examples of the substituent include halogen atom, cyano, $C_{1-12}$ alkyls and $C_{1-12}$ alkoxys. The alkyl or alkoxy may have a $C_{2-12}$ acyl or a $C_{2-12}$ acyloxy as a substituent. The definitions of an acyl and an acyl oxy are explained later.

In the formula (Ia), $X^{01}$ is an anion. $X^{01}$ is preferably selected from monovalent anions. Examples of the anion include halogenide ions such as fluorine ion, chlorine ion, bromide ion and iodide ion; and sulfonate ions such as methane sulfonate ion, p-toluene sulfonate ion and benzene sulfonate ion.

In the formula (Ia), $Z^1$ represents a hydrogen atom, a cyano, $C_{1-12}$ alkyl or $C_{1-12}$ alkoxy, and the alkyl or alkoxy may have a $C_{2-12}$ acyl or $C_{2-12}$ acyloxy as a substituent.

In the formula (Ia), m is 1 or 2, and when m is 2, two $L^{04}$s and two $Y^3$s may respectively be same or different.

When m is 2, it is preferred that $Z^1$ represents cyano, $C_{1-10}$ alkyl or $C_{1-10}$ alkoxy.

When m is 1, it is preferred that $Z^1$ represents a $C_{7-12}$ alkyl, $C_{7-12}$ alkoxy, $C_{7-12}$ acyl-substituted alkyl, $C_{7-12}$ acyloxy-substituted alkyl or $C_{7-12}$ acyloxy-substituted alkoxy.

The terms "acyl" and "acyloxy" are respectively used for any groups represented by —CO—R and "acyloxy", where R represents an aliphatic group such as alkyls, substituted alkyls, alkenyls, substituted alkenyls, alkinyls and substituted alkinyls; or an aromatic group such as aryls or substituted aryls. R preferably represents an aliphatic group, and more preferably represents an alkyl or alkenyl.

In the formula (Ia), p is an integer from 1 to 10. the group $C_pH_{2p}$ means a linear or branched chain alkylene. the group $C_pH_{2p}$ is preferably a linear chain alkylene. P is preferably 1 or 2.

Examples of the formula (I) and/or formula (Ia) include, but are not limited to, those shown below. In the formulae, "Me" represents methyl.

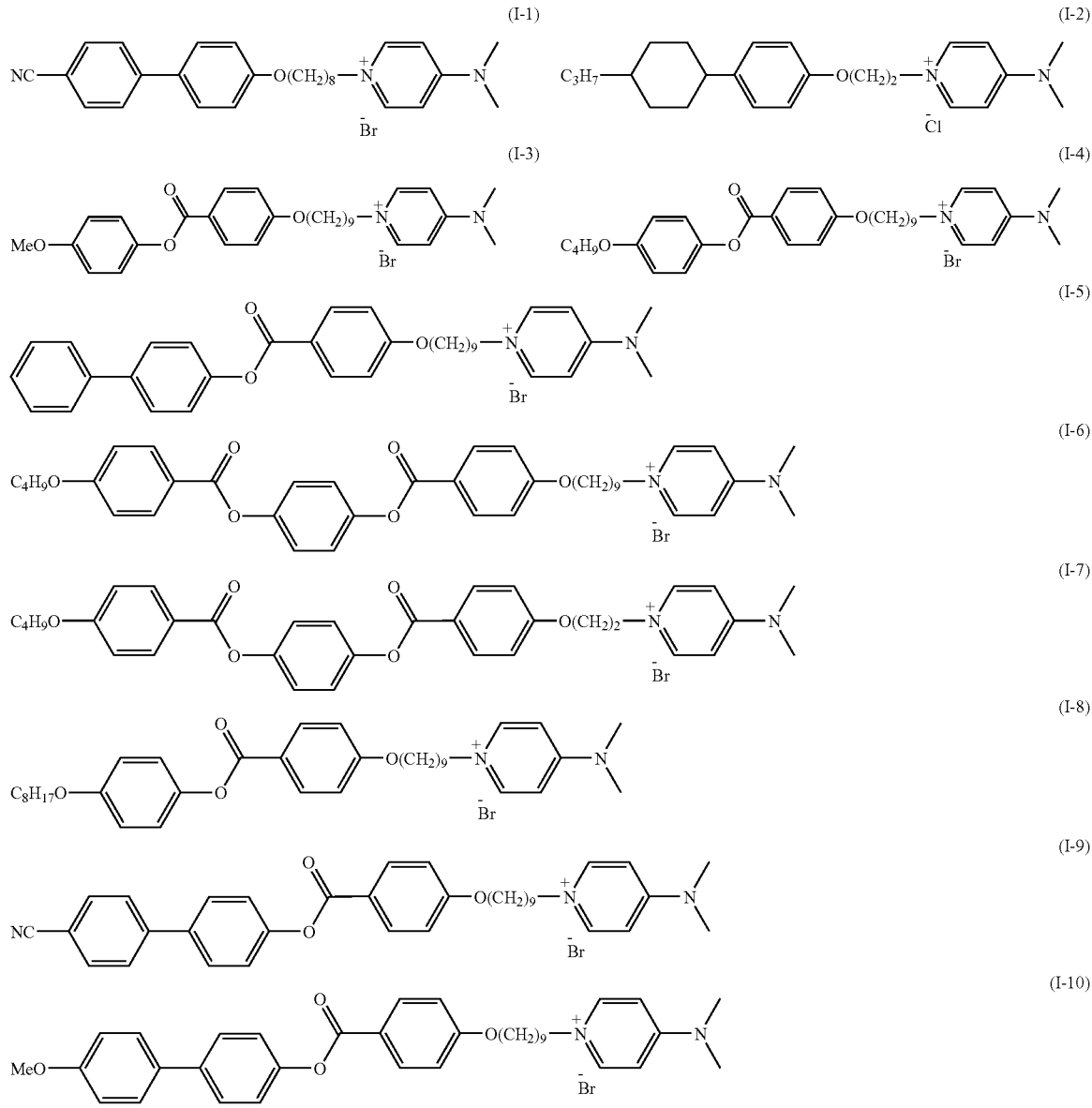

-continued
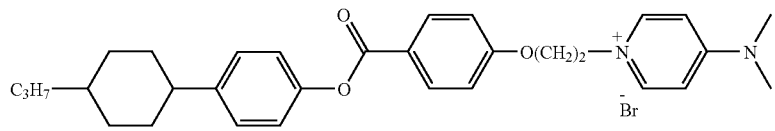 (I-11)
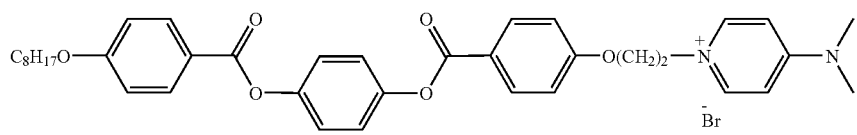 (I-12)
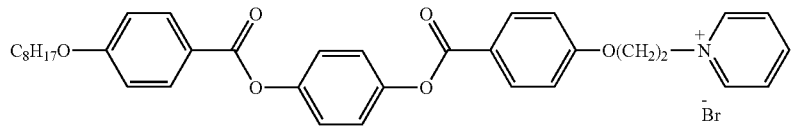 (I-13)
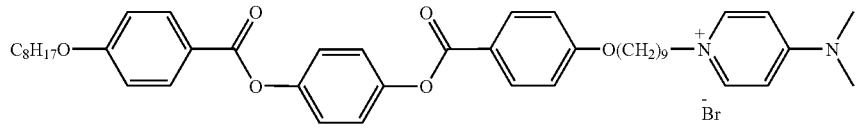 (I-14)
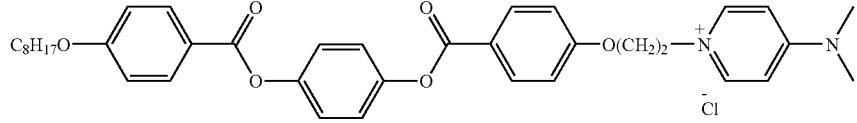 (I-15)
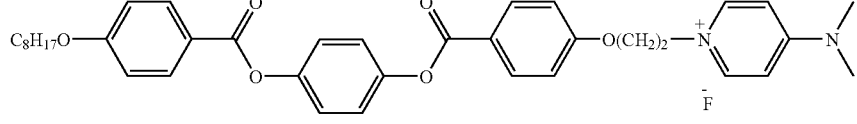 (I-16)
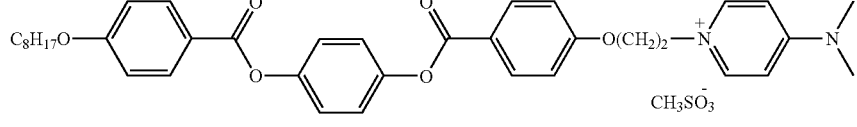 (I-17)
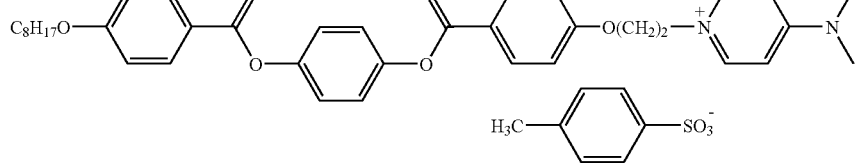 (I-18)
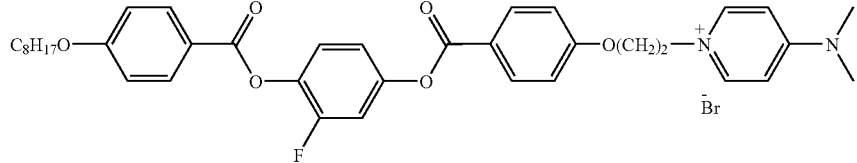 (I-19)
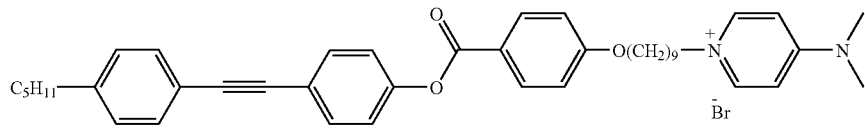 (I-20)
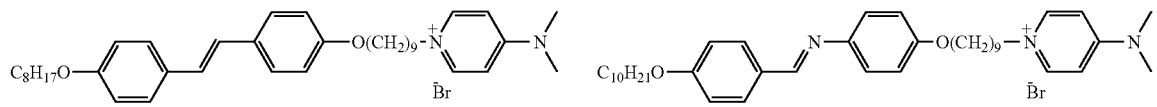
(I-21)                                                                 (I-22)

-continued
(I-23) (I-24)
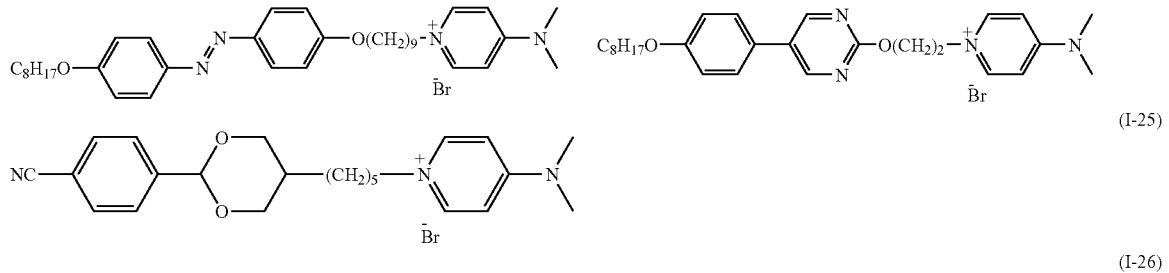
(I-25)
(I-26)
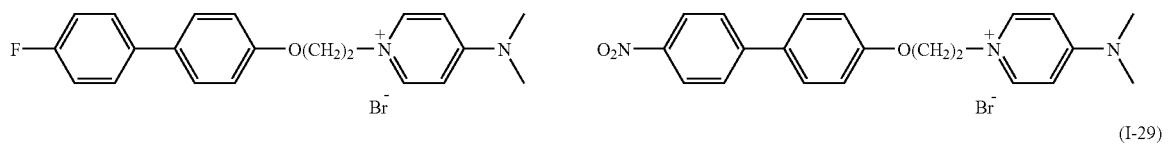
(I-27) (I-28)
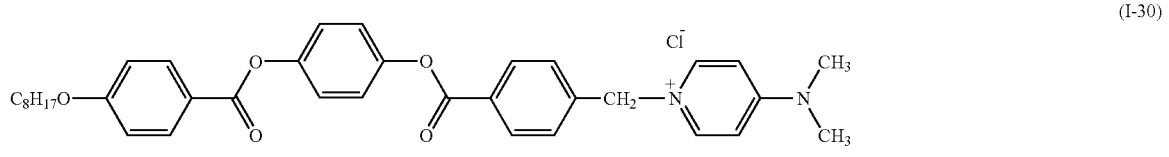
(I-29)
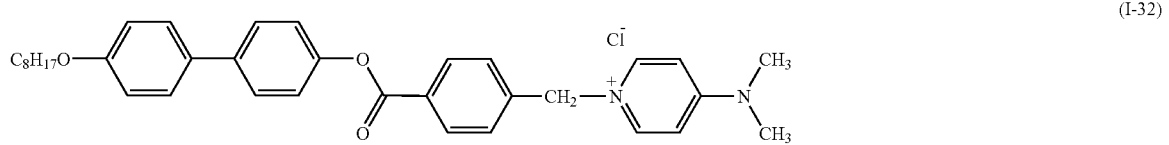
(I-30)
(I-31)
(I-32)
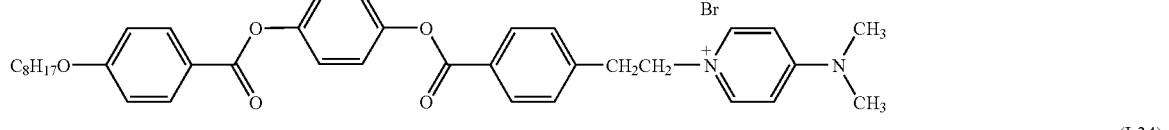
(I-33)
(I-34)
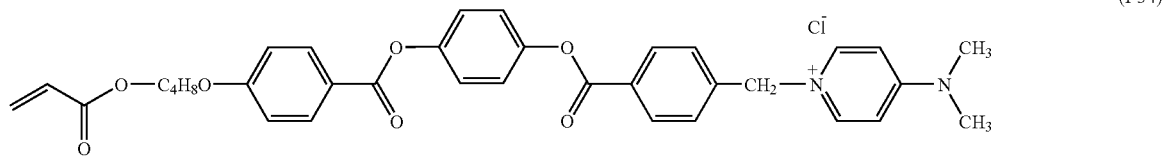

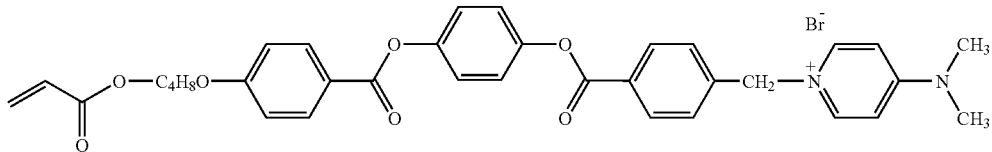
(I-35)

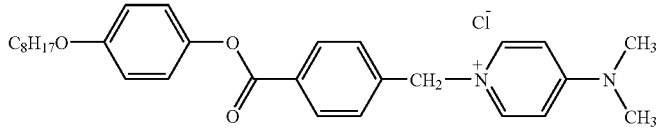
(I-36)

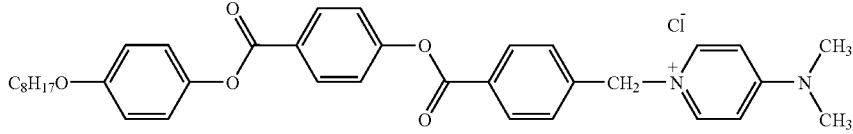
(I-37)

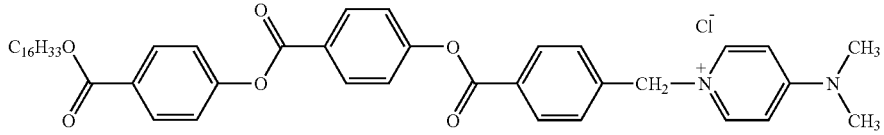
(I-38)

The pyridinium derivatives are generally produced by alkylation of a pyridine ring, Menshutkin reaction.

The amount of the pyridinium derivative in the liquid crystal composition may be decided depending on the application thereof. Generally, the preferable amount of the pyridinium derivative is from 0.005 to 8 mass %, and more preferable amount is from 0.01 to 5 mass % with respect to the total mass of the liquid crystal composition (if the composition is prepared as a coating fluid, it means a composition without any solvents).

(Aid for Homeotropic Alignment at Air-Interface Side)

Preferred examples The aid for homeotropic alignment at an air-interface side, which can be used in the invention, include fluoro aliphatic-containing polymers having a fluoro-aliphatic group and at least one hydrophilic group selected from the group consisting of carboxylic group (—COOH), sulfo group (—SO$_3$H), phosphonoxy group {—OP(=O) (OH)$_2$} and the salts thereof, occasionally referred to as "fluoride-polymer" hereinafter, and fluorine-containing compounds represented be a formula (III).

At first, the fluoride-polymer will be explained in detail.

The fluoride-polymer which can be used in the invention is selected from polymers having a fluoro-aliphatic group and at least one hydrophilic group selected from the group consisting of carboxylic group (—COOH), sulfo group (—SO$_3$H), phosphonoxy group {—OP(=O) (OH)$_2$} and the salts thereof. The fluoride-polymer may be selected from polyolefins, polyesters, polyamides, polyimides, polyurethanes, polycarbonates, polysulfones, polyethers, polyacetals, polyketones, polyphenylene oxides, polyphenylen sulfides, polyarylates, polytetrafluoroethylenes (PTFE), polyvinylidene-florides, and cellulose derivatives, which are described at pages 1-4 of "Revision Chemistry of Polymer synthesis (Kaitei Koubunshi gousei no kagaku)" written by Takayuki OHTSU and published by KAGAKU-DOJIN PUBLISHING CO., LTD. in 1968. The fluoride-polymer is preferably selected from polyolefins.

The fluoride-polymer has a fluoro-aliphatic group in side chains. The carbon atom number of the fluoro-aliphatic group preferably ranges from 1 to 12, and more preferably from 6 to 10. The aliphatic group may have a linear or branched chain structure or a cyclic structure. The substitution degree of hydrogen atoms in the aliphatic group with fluorine atoms is not limited to any range; and, in general, it is preferably greater than or equal to 50%, and more preferably greater than or equal to 60%. The fluoro-aliphatic group is embedded in side chains which bind to the main chain via an ester, amido, imido, urethane, ether or thioether bond or an aromatic ring.

The fluoro-aliphatic group in the fluoride-polymer may be derived from a fluoro-aliphatic compound prepared by a telomerization method, occasionally referred to as telomer method, or an oligomemerization, occasionally referred to as oligomer method. Examples of preparation of the fluoride-aliphatic compound are described on pages 117 to 118 in "Synthesis and Function of Fluoride Compounds (Fussoka-goubutsu no Gousei to Kinou)" overseen by ISHIKAWA NOBUO and published by CMC Publishing Co., Ltd. in 1987; and on pages 747 to 752 in "Chemistry of Organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen. One example is shown in Scheme-1.

Scheme 1

The obtained fluorine-terminated telomers are usually terminal-modified properly as shown in Scheme 2, to give fluoro-aliphatic compounds. These compounds are, if necessary, transferred to a desired monomer structure, and then used for preparing fluoride-polymers. In the Scheme 2, n represents a natural number.

Scheme 2
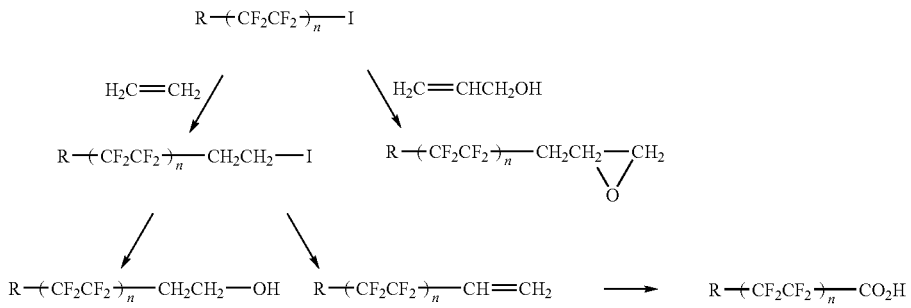
Examples of the monomer, which can be used for preparing the fluoride-polymer to be used in the invention, include, but are not to be limited to, those shown below.
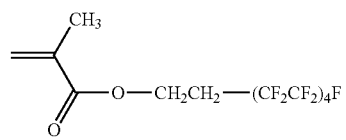  F-1
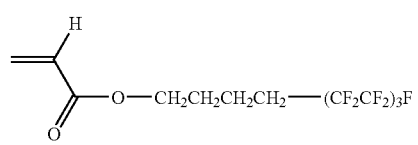  F-2
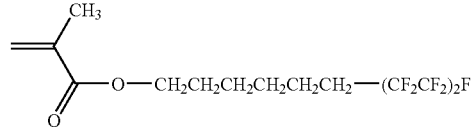  F-3
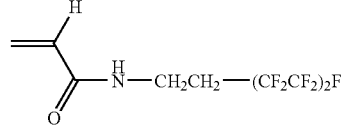  F-4
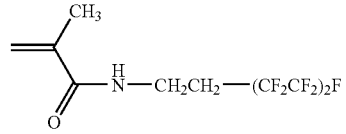  F-5
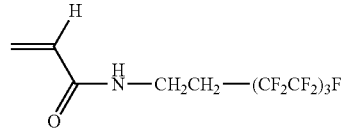  F-6
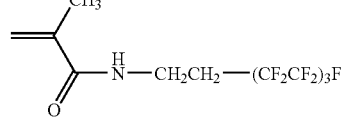  F-7
-continued
F-8
F-9
F-10
F-11
F-12
F-13
F-14
F-15

-continued
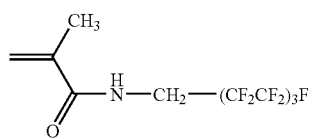
F-16
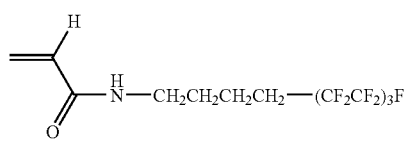
F-17
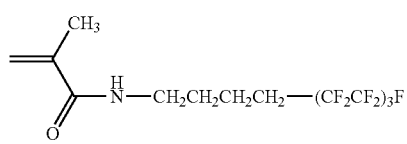
F-18
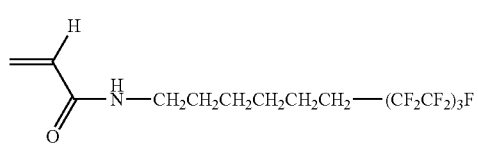
F-19
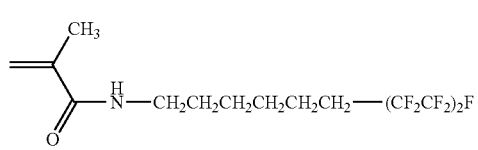
F-20
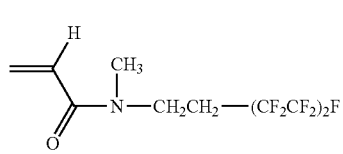
F-21
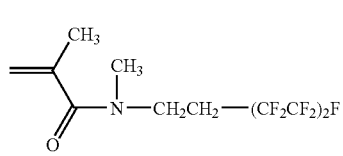
F-22
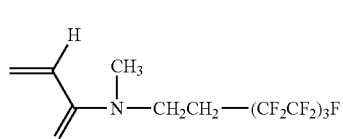
F-23
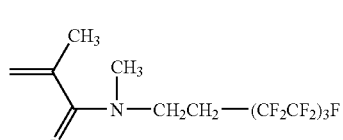
F-24
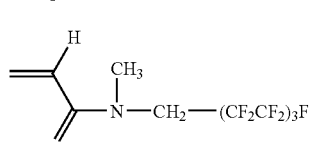
F-25
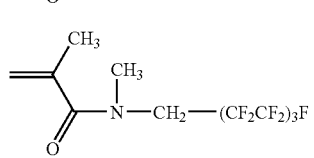
F-26
-continued
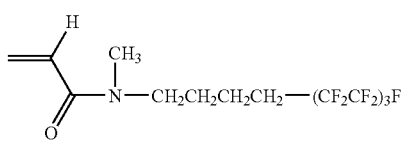
F-27
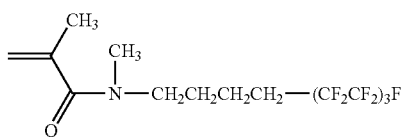
F-28
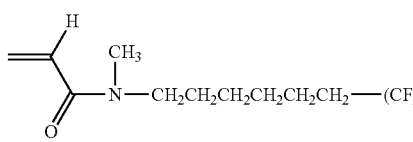
F-29
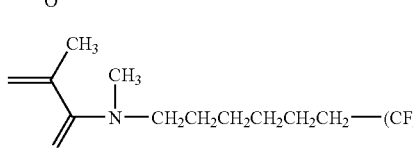
F-30
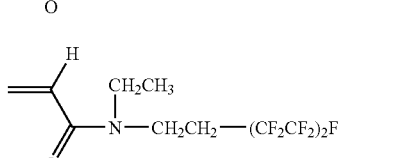
F-31
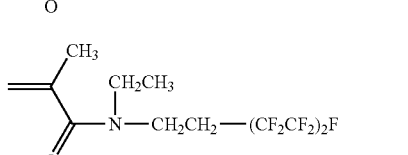
F-32
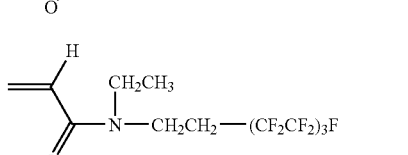
F-33
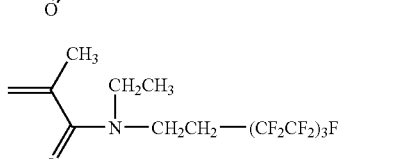
F-34
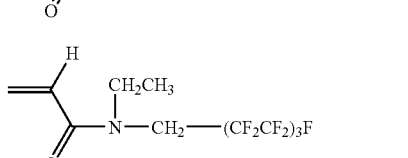
F-35
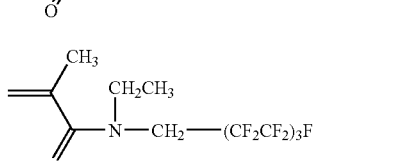
F-36
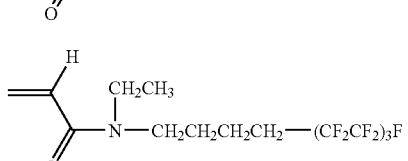
F-37

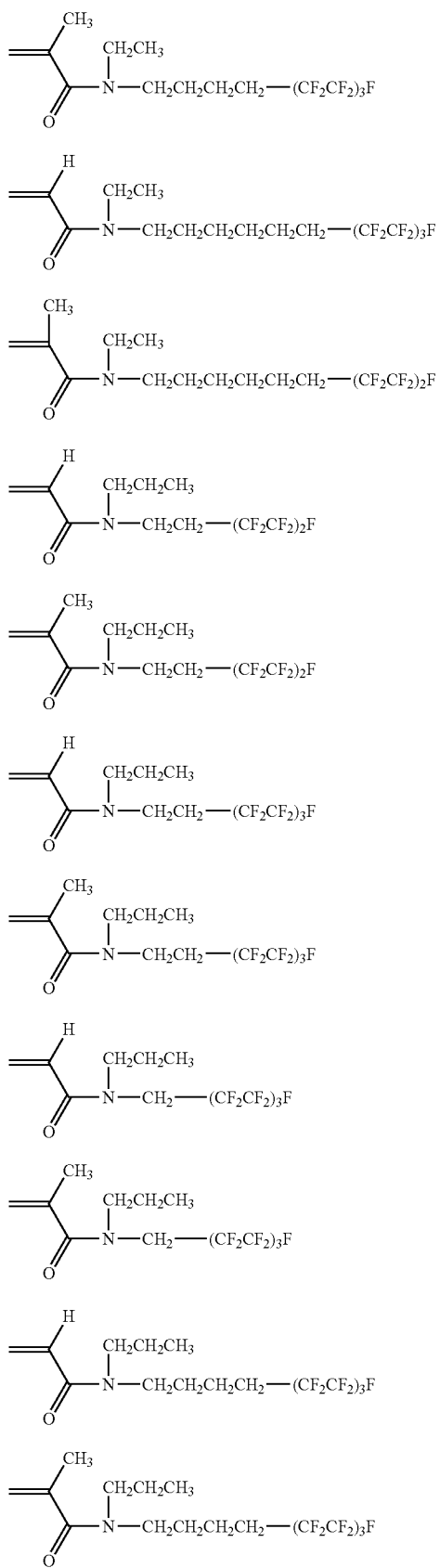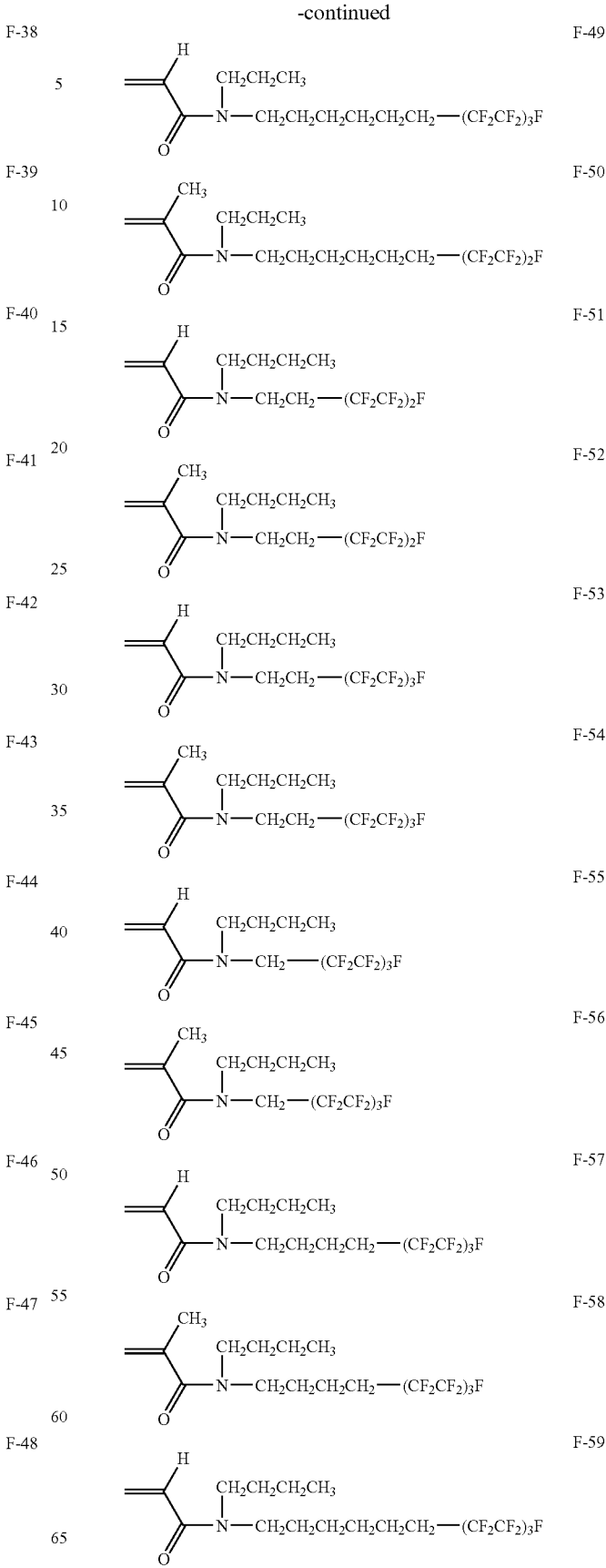

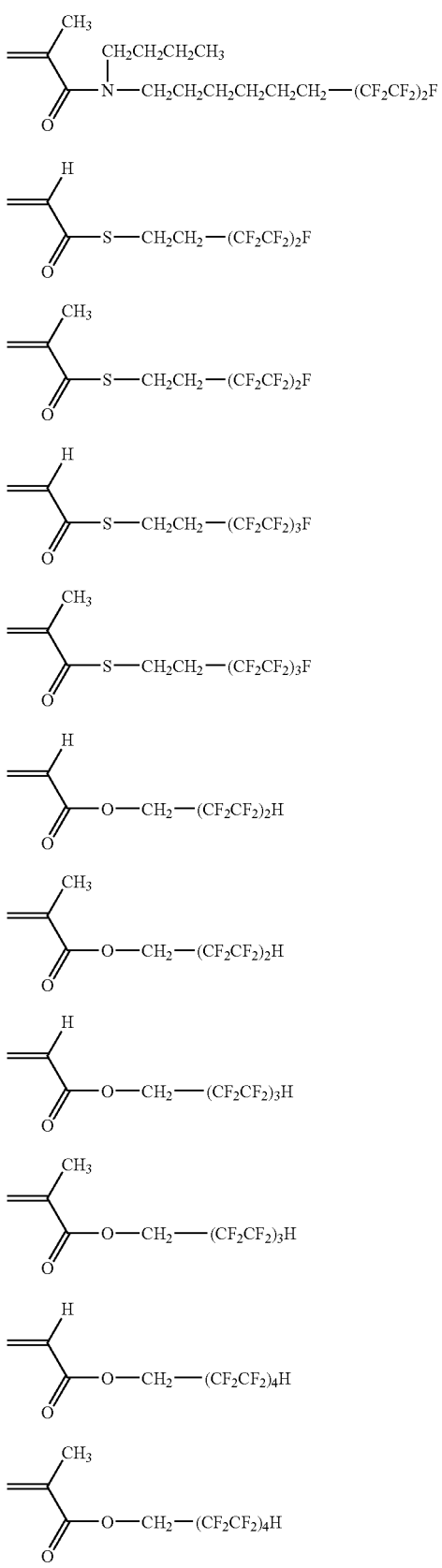

One embodiment of the fluoride-polymer is a copolymer comprising a repeating unit derived from the monomer having fluoro-aliphatic group, referred to as "fluoride-monomer" hereinafter, and a repeating unit having a hydrophilic group represented by a formula (II) shown below.

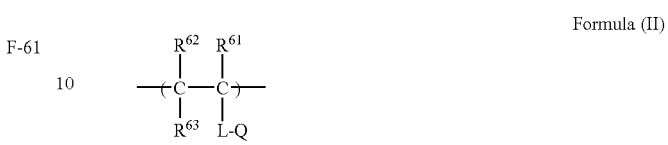

Formula (II)

In the formula (II), $R^{61}$, $R^{62}$ and $R^{63}$ respectively represent a hydrogen atom or a substituent group.

In the formula (II), Q represents a carboxyl group (—COOH) or a salt thereof, a sulfo group (—SO$_3$H) or a salt thereof, or a phosphonoxy group {—OP(=O)(OH)$_2$} or a salt thereof.

In the formula (II), L represents a divalent linking group selected from the Linking Group shown below or a divalent linking group consisting of two or more selected from the Linking Group shown below;

(Linking Group)

a single bond, —O—, —CO—, —NR$^b$— where R$^b$ represents a hydrogen atom, an alkyl group, an aryl group or an aralkyl group), —S—, —SO$_2$—, —P(=O)(OR$^f$)— where R$^f$ represents an alkyl group, an aryl group or an aralkyl group), an alkylene group and arylene group.

In the formula (II), $R^{61}$, $R^{62}$ and $R^{63}$ respectively represent a hydrogen atom or a substituent group selected from Substituent Group I shown below:

(Substituent Group I)

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino group or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C_{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl. These substituents may be substituted by at least one substituent selected from these. When two substituents are selected, they may be same or different each other. Two or more may, if possible, bond each other to form a ring.

It is preferred that $R^{61}$, $R^{62}$ and $R^{63}$ respectively represent a hydrogen atom, an alkyl group, a halogen atom (such as fluorine, chlorine, bromine or iodine) or a group represented by -L-Q described later; more preferred that $R^{61}$, $R^{62}$ and $R^{63}$ respectively represent a hydrogen atom, a $C_{1-6}$ alkyl group, chlorine or a group represented by -L-Q described later; much more preferred that $R^{61}$, $R^{62}$ and $R^{63}$ respectively represent a hydrogen atom or a $C_{1-4}$ alkyl group; and further much more preferred that $R^{61}$, $R^{62}$ and $R^{63}$ respectively represent a hydrogen atom or a $C_{1-2}$ alkyl group. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulfonyl group and a carboxyl group. It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

In the formula, L is a divalent linking group selected from the above defined group or any combination of two or more selected from the above identified group. The $R^b$ in $-NR^b-$ described above represents a hydrogen atom, an alkyl group, an aryl group or an aralkyl group, and desirably a hydrogen atom or an alkyl group. And the $R^f$ in $-PO(OR^f)-$ represents an alkyl group, an aryl group or an aralkyl group, and desirably an alkyl group. When $R^b$ or $R^f$ is an alkyl group, an aryl group or an aralkyl group, the desired carbon numbers of them are same as those described in Substituent Group I. L desirably contains a single bond, $-O-$, $-CO-$, $-NR^b-$, $-S-$, $-SO_2-$, an alkylene group or arylene group; more desirably contains a single bond, $-CO-$, $-O-$, $-NR^b-$, an alkylene group or an arylene group; and much more desirably represents a single bond. When L contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetrabutylene and hexamethylene. When L contains an arylene group, the carbon atom number of the arylene group is desirably from 6 to 24, more desirably from 6 to 18 and much more desirably from 6 to 12. Preferred examples of the arylene group include phenylene and naphthalene. When L contains a divalent linking group consisting of a combination of an alkylene group and an arylene group, or in other words an aralkyl group, the carbon atom number in the aralkyl group is desirably from 7 to 36, more desirably from 7 to 26 and much more desirably from 7 to 16. Preferred examples of the aralkyl group include phenylene methylene, phenylene ethylene and methylene phenylene. L may have any substituent. Examples of the substituent are same as those exemplified for the substituent of $R^{61}$, $R^{62}$ or $R^{63}$.

Examples of L include, however are not to be limited to, those shown below.

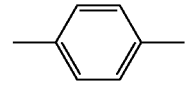

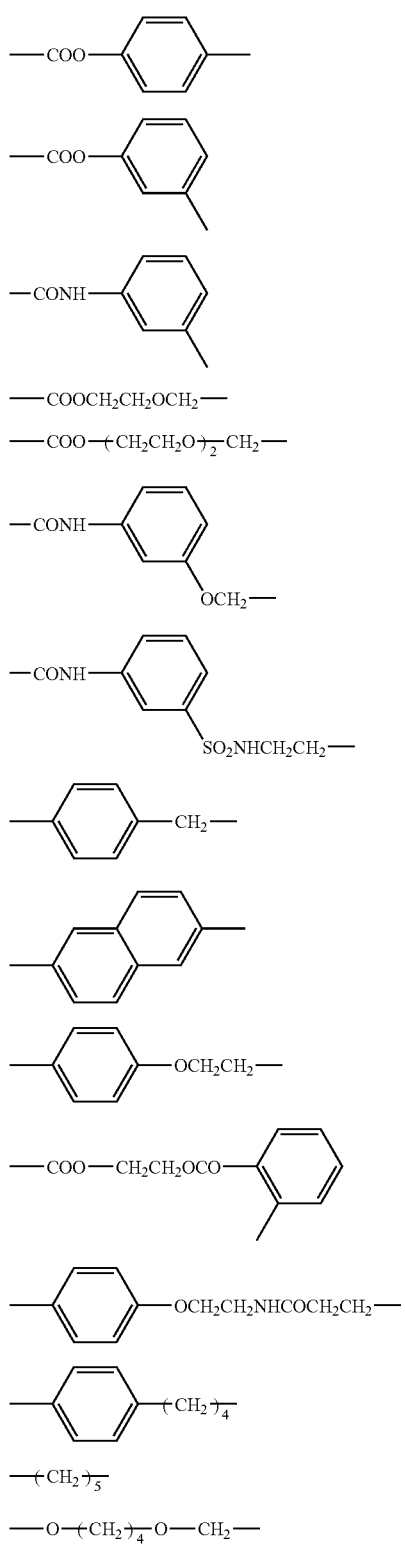

In the formula (II), Q represents a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammonium carboxylate, tetrabutylammonium carboxylate, trimethylbenzylammonium carboxylate or dimethylphanylammonium carboxylate) or pyridinium carboxylate; a sulfo group or a sulfate (examples of a counter cation are same as those exemplified for the carboxylate above); or a phosphonoxy group or a phosphonoxylate (examples of a counter cation are same as those exemplified for the carboxylate above). Carboxyl, sulfo and phosphino groups are preferred, and carboxyl and sulfo groups are more preferred.

The fluoride-polymer may comprise a single or plural repeating represented by the formula (II). The fluoride-polymer may comprise a single or plural repeating unit other than the repeating units described above. Another repeating unit is not to be limited to a specific type, and any repeating unit derived from common monomers capable of radical-polymerization is preferably used. Examples of the monomer which can give the other repeating unit include, however are not to be limited to, those shown below. The fluoride-polymer may comprise one repeating unit or plural repeating units selected from those shown below.

(Monomer Group I)
 (1) Alkenes:
 ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;
 (2) Dienes:
 1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;
 (3) α,β-unsaturated Carboxylic Acid Derivatives:
 (3a) Alkyl Acrylates:
 methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;
 (3b) Alkyl Methacrylates:
 methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimetoxysilylpropyl methacrylate, allyl methacrylate, 2-isosyanate ethyl methacrylate or the like;

(3c) Diesters of Unsaturated Polycarboxylic Acids:

dimethyl maleate, dibutyl maleate, dimethyl itaconate, dibutyl itaconate, dibutyl crotonate, dihexyl crotonate, diethyl fumarate, dimethyl fumarate or the like;

(3d) Amides of $\alpha,\beta$-Unsaturated Carboxylic Acids:

N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated Nitriles:

acrylonitrile, methacrylonitrile or the like;

(5) Styrene or Derivatives Thereof:

styrene, vinyltoluene, ethylstyrene, p-tert-butylstyrene, p-vinyl methyl benzoate, $\alpha$-methyl styrene, p-chloromethyl styrene, vinyl naphthalene, p-methoxy styrene, p-hydroxy methyl styrene, p-acetoxy styrene or the like;

(6) Vinyl Esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl Ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other Monomers N-vinyl pyrrolidone, methyl vinyl ketone, phenyl vinyl ketone, methoxy ethyl vinyl ketone, 2-vinyl oxazoline, 2-isoprppenyl oxazoline or the like.

The amount of the monomer containing a fluoro aliphatic group is desirably not less than 5 mass %, more desirably not less than 10 mass %, and much more desirably not less than 30 mass % with respect to the total amount of all monomers constituting the fluoride-polymer. The amount of the repeating unit represented by the formula (II) is desirably not less than 0.5 mass %, more desirably from 1 to 20 mass %, and much more desirably from 1 to 10 mass % with respect to the total amount of all monomers constituting the fluoride-polymer. The above preferred mass % of the repeating unit easily varies depending on the molecular weight of the monomer, and the mole amount of the function group per a unit mass of the polymer may be more accurate for representing the preferred amount of the repeating unit of the formula (II) contained in the polymer. Using the mole amount, it can be said that the mole amount of the hydrophilic group (Q in the formula (II)) in the fluoride-polymer preferably ranges from 0.1 mmol/g to 10 mmol/g, and more preferably ranges from 0.2 mmol/g to 8 mmol/g.

The weight-average molecular weight (Mw) of the fluoride-polymer to be used in the invention is desirably less than or equal to 1,000,000, more desirably less than or equal to 500,000 and much more desirably less than or equal to 100,000. The Mw can be measured as a polystyrene (PS) equivalent molecular weight with gel permeation chromatography (GPC).

Examples of the method for producing the fluoride-polymer include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkennhoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or $\gamma$-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 minutes to 30 hours. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoride-polymers having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as $\alpha$-methyl styrene or $\alpha$-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.08 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

It is to be noted that examples of the fluoride-polymer also include polymers having a polymerizable group as a substituent for fixing liquid crystal molecules in an alignment state.

Examples of the fluoride-polymer which can be used desirably in the invention include, however not to be limited to, those shown below. Numerical values in formulae shown below mean mass % of each monomer, and Mw in formulae shown below mean PEO-equivalent weight-average molecular weight measured by GPC. In the formulae, "a", "b", "c", "d" and the like mean weight ratios.

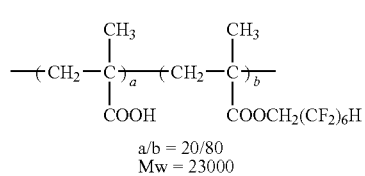

P-1

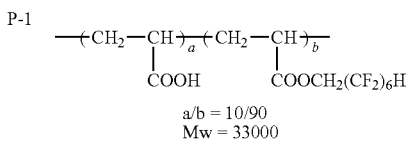

P-2

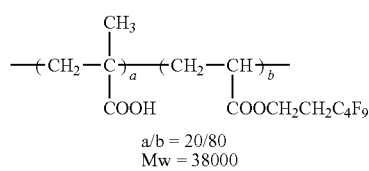

P-3

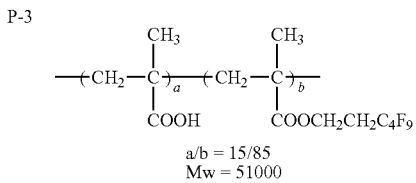

P-4

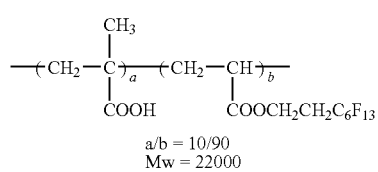

P-5

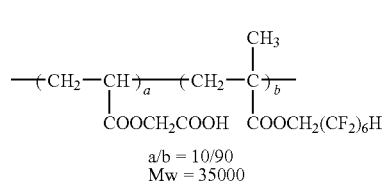

P-6

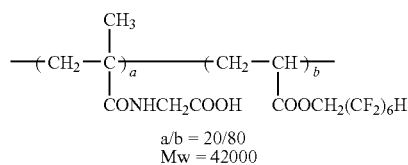

P-7

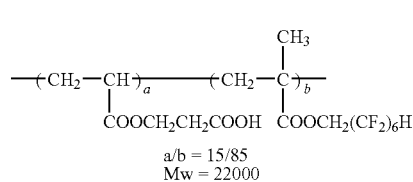

P-8

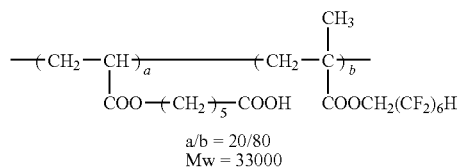

P-9

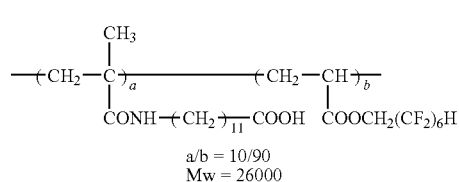

P-10

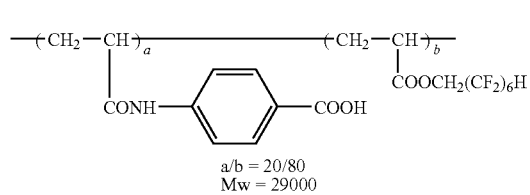

P-11

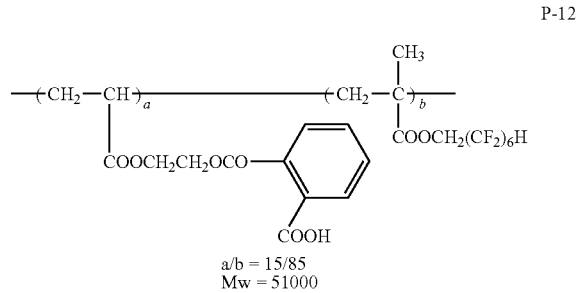

P-12

-continued
P-13
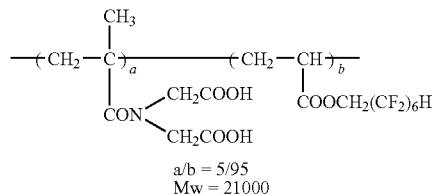
a/b = 5/95
Mw = 21000
P-14
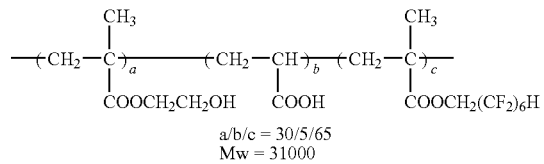
a/b/c = 30/5/65
Mw = 31000
P-15
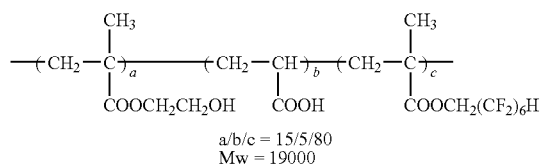
a/b/c = 15/5/80
Mw = 19000
P-16
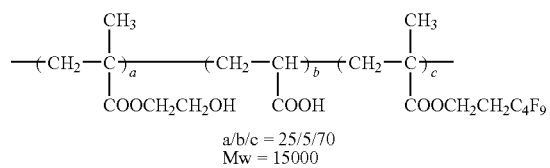
a/b/c = 25/5/70
Mw = 15000
P-17
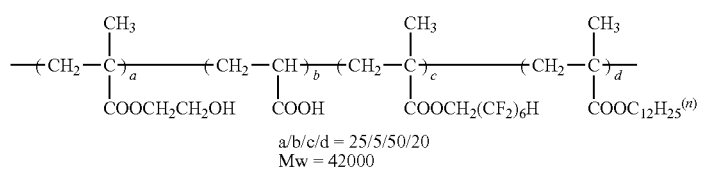
a/b/c/d = 25/5/50/20
Mw = 42000
P-18
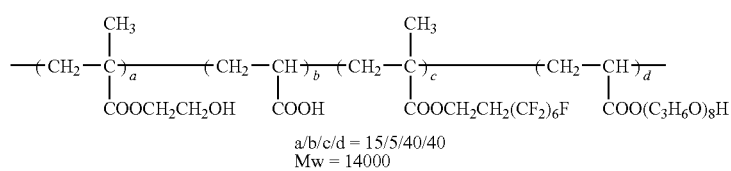
a/b/c/d = 15/5/40/40
Mw = 14000
P-19
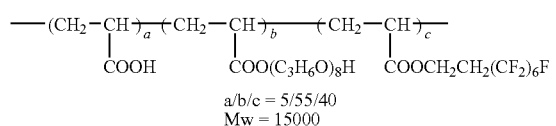
a/b/c = 5/55/40
Mw = 15000
P-20
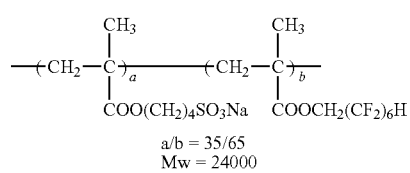
a/b = 35/65
Mw = 24000
P-21
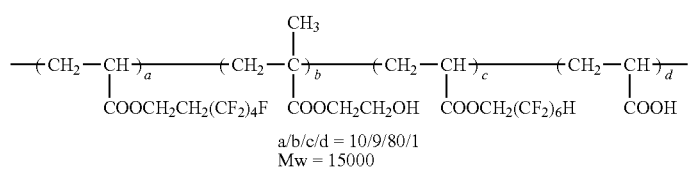
a/b/c/d = 10/9/80/1
Mw = 15000
P-22
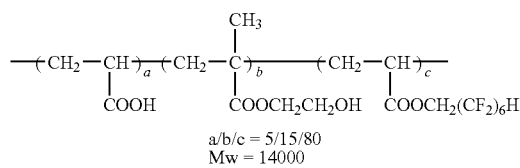
a/b/c = 5/15/80
Mw = 14000
P-23
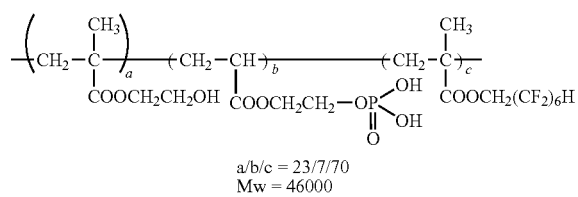
a/b/c = 23/7/70
Mw = 46000
P-24
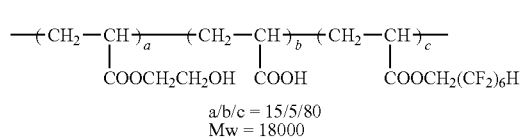
a/b/c = 15/5/80
Mw = 18000
P-25
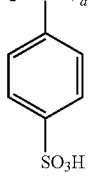
a/b = 10/90
Mw = 33000

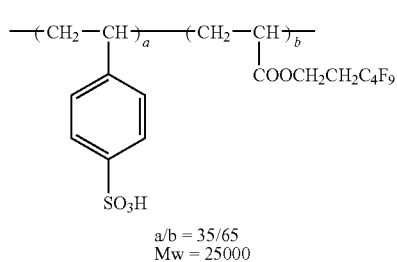

P-26 a/b = 35/65
Mw = 25000

The fluoride-polymer which can be employed in the invention may be produced according to any known process as described above. For example, the fluoride-polymer may be produced by carrying out polymerization of a monomer having a fluoro-aliphatic group and a monomer having a hydrophilic group in an organic solvent in the presence of a common radical polymerization initiator. Other addition-polymerizable compounds, if necessary, may be further added, and then, the polymerization may be carried out in the same manner. It is useful for obtaining a polymer having a uniform constitution to carry out polymerization while adding dropwise at least one monomer and at least one polymerization initiator from the view point of polymerization activity of each monomer.

The preferred range of the amount of the fluoride-polymer may vary depending on its application, and, in general, it is desirably from 0.005 to 8 mass %, more desirably from 0.01 to 5 mass % and much more desirably from 0.05 to 2.5 mass % with respect to the total mass of the liquid crystal composition (when the composition is a solution, the solvent is excluded). When the amount of the fluoride-polymer falls within the above range, substantial effects may be obtained without lowering a drying property of the coating layer, and, thus, an optical film having uniform optical properties such as retardation.

Next, the compound represented by a formula (III), which can be used as an aid for homeotropic alignment at an air-interface side, will be described in detail.

$(R^{100})_{mo}\text{-}L^{100}\text{-}(W)_{no}$   Formula (III)

In the formula, wherein $R^{100}$ denotes an alkyl group, an alkyl group having a terminal $CF_3$ group, or an alkyl group having a terminal $CHF_2$ group; mo denotes an integer greater than or equal to 1, where multiple occurrences of $R^{100}$ may be identical or different, with at least one denoting an alkyl group having a terminal $CF_3$ group or a terminal $CHF_2$ group; $L^{100}$ denotes a linking group of valence (m+n); W denotes a carboxyl group (—COOH) or a salt thereof, a sulfo group (—$SO_3H$) or a salt thereof, a sulfato group (—$OSO_3H$) or a salt thereof, or a phosphonoxy group {—OP—(=O)(OH)$_2$} or a salt thereof; and no denotes an integer greater than or equal to 1.

In the formula (III), $R^{100}$ functions as the hydrophobic group. The alkyl group denoted by $R^{100}$ is optionally substituted, may have a straight chain or branching chain, desirably has from 1 to 20 carbon atoms, preferably has from 4 to 16 carbon atoms, and more preferably has from 6 to 16 carbon atoms. Any of the substituents given as examples for substituent selected from the Substituent Group D further below may be employed as substituents therein.

The alkyl group having a terminal $CF_3$ group denoted by $R^{100}$ desirably has from 1 to 20 carbon atoms, preferably from 4 to 16 carbon atoms, and more preferably from 4 to 8 carbon atoms. The alkyl group having a terminal $CF_3$ group is an alkyl group in which part or all of the hydrogen atoms have been substituted with fluorine atoms. At least 50 percent of the hydrogen atoms in the alkyl group are desirably substituted with fluorine atoms, with at least 60 percent substitution being preferred and at least 70 percent substitution being of even greater preference. The remaining hydrogen atoms may be further substituted with the substituents given as examples of substituent selected from the Substituent Group D further below. The alkyl group having a terminal $CHF_2$ group denoted by $R^{100}$ desirably has from 1 to 20 carbon atoms, preferably from 4 to 16 carbon atoms, and more preferably from 4 to 8 carbon atoms. In the alkyl group having a terminal $CHF_2$ group denoted by $R^{100}$, at least 50 percent of the hydrogen atoms in the alkyl group are desirably substituted with fluorine atoms, with 60 percent or more substitution being preferred and 70 percent or more substitution being of even greater preference. The remaining hydrogen atoms may be further substituted with the substituents given as examples of substituent selected from the Substituent Group D further below.

Examples are given below of the alkyl group having a terminal $CF_3$ group denoted by $R^{100}$ and the alkyl group having a terminal $CHF_2$.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_2$—
R6: n-$C_4F_9$—$(CH_2)_2$—
R7: H—$(CF_2)_8$—
R8: H—$(CF_2)_6$—
R9: H—$(CF_2)_4$—
R10: H—$(CF_2)_8$—$(CH_2)$—
R11: H—$(CF_2)_6$—$(CH_2)$—
R12: H—$(CF_2)_4$—$(CH_2)$—

In the formula (III), the linking group of valence (mo+no) denoted by $L^{100}$ is desirably a combination of at least two groups selected from the group consisting of alkylene groups, alkenylene groups, (mo+no) valence aromatic groups, bivalent heterocyclic residues, —CO—, —$NR^d$— (where $R^d$ denotes an alkyl group having from 1 to 5 carbon atoms or a hydrogen group), —O—, —S—, —SO—, and —$SO_2$—.

In formula (III), W denotes a carboxyl group (—COOH) or a salt thereof, a sulfo group (—$SO_3H$) or a salt thereof, a sulfato group (—$OSO_3H$) or a salt thereof, or a phosphonoxy group {—OP(=O) (OH)$_2$} or a salt thereof. The preferred scope of W is same as that of Q in the formula (II).

Among the compounds represented by the formula (III), the compounds represented by a formula (III)-a or a formula (III)-b described below are preferred.

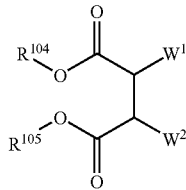

Formula (III)-a

In the formula (III)-a, $R^{104}$ and $R^{106}$ respectively denote an alkyl group, an alkyl group having a terminal $CF_3$ group or an alkyl group having a terminal $CF_2$ group, and, however, they do not simultaneously denote alkyl groups. $W^1$ and $W^2$ respectively denote hydrogen atoms, a carboxyl group (—COOH) or a salt thereof, a sulfo group (—SO$_3$H) or a salt thereof, a sulfato group (—OSO$_3$H) or a salt thereof, a phosphonoxy group {—OP(=O) (OH)$_2$} or a salt thereof, or an alkyl group, an alkoxy group or an alkylamino group having a carboxyl group, a sulfo group, a sulfato group or a phosphonoxy group. However, $W^1$ and $W^2$ do not simultaneously denote hydrogen atoms.

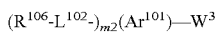

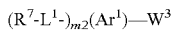 Formula (III)-b

In the formula (III)-b, $R^{106}$ denotes an alkyl group, an alkyl group having a terminal $CF_3$ group or an alkyl group having a terminal $CF_2H$ group; m2 denotes an integer greater than or equal to 1, where multiple occurrences of $R^{106}$ may be identical or different, with at least one denoting an alkyl group having a terminal $CF_3$ group or a terminal $CHF_2$ group; $L^{102}$ denotes a divalent linking group selected from the group consisting an alkylene group, an aromatic group, —CO—, —NR— (R denotes a $C_{1-5}$ alkyl group or a hydrogen atom), —O—, —S—, —SO—, —SO$_2$— and any combination thereof, where multiple occurrences of $L^{102}$ may be identical or different; $Ar^{101}$ represents an aromatic carbon ring residue or an aromatic hetero ring residue; and $W^3$ represents a carboxyl group (—COOH) or a salt thereof, a sulfo group (—SO$_3$H) or a salt thereof, a sulfato group (—OSO$_3$H) or a salt thereof, a phosphonoxy group {—OP(=O) (OH)$_2$} or a salt thereof, or an alkyl group, an alkoxy group or an alkylamino group having a carboxyl group, a sulfo group, a sulfato group or a phosphonoxy group.

At first, the formula (III)-a will be explained in detail.

$R^{104}$ and $R^{105}$ are identically defined with $R^{100}$ in the formula (III) above, and their preferred scopes are identical to those of $R^{100}$. The carboxyl group (—COOH) or the salt thereof, the sulfo group (—SO$_3$H) or the salt thereof, the sulfato group (—OSO$_3$H) or the salt thereof or the phosphonoxy group {—OP(=O) (OH)$_2$} or the salt thereof denoted by $W^1$ and $W^2$ are identically defined with the hydrophilic groups denoted by W in the formula (III) above, and their preferred scopes are identical. The alkyl groups having the hydrophilic group denoted by $W^1$ and $W^2$ may have straight or branched chains. They are desirably $C_{1-20}$ alkyl groups, preferably $C_{1-8}$ alkyl groups, and more preferably $C_{1-3}$ alkyl groups. The above-described alkyl group may have at least one hydrophilic group selected from a carboxyl group, a sulfo group, a sulfato group and a phosphonoxy group. The hydrophilic group is identically defined with the hydrophilic group denoted by W in the formula (III), and their preferred scopes are identical. The alkyl group having a hydrophilic group may be substituted with a substituent other than the hydrophilic group. Any of the substituents selected from the Substituent Group D further below may be employed as this substituent group.

The alkoxyl groups having the hydrophilic group denoted by $W^1$ and $W^2$ may have straight or branching chains. They are desirably $C_{1-20}$ alkoxyl groups, preferably $C_{1-8}$ alkoxyl groups, and more preferably $C_{1-4}$ alkoxyl groups. The above-described alkoxyl group may have at least one hydrophilic group selected from a carboxyl group, a sulfo group, a sulfato group and a phosphonoxy group. The hydrophilic group is identically defined with the hydrophilic group denoted by W in the formula (III), and their preferred scopes are identical. The alkoxyl group having a hydrophilic group may be substituted with a substituent other than the hydrophilic group. Any of the substituents selected from the Substituent Group D further below may be employed as this substituent group.

The alkylamino groups having the hydrophilic group denoted by $W^1$ and $W^2$ may have straight or branching chains. They are desirably $C_{1-20}$ alkylamino groups, preferably $C_{1-8}$ alkylamino groups, and more preferably $C_{1-4}$ alkylamino groups. The above-described alkylamino group may have at least one hydrophilic group selected from a carboxyl group, a sulfo group, a sulfato group and a phosphonoxy group. The hydrophilic group is identically defined with the hydrophilic group denoted by W in the formula (III), and their preferred scopes are identical. The alkylamino group having a hydrophilic group may be substituted with a substituent other than the hydrophilic group. Any of the substituents selected from the Substituent Group D further below may be employed as this substituent group.

It is particularly desirable for $W^1$ and $W^2$ to denote a hydrogen atom or $(CH_2)_nSO_3M$ (where n denotes 0 or 1). M denotes a cation, but when the charge in the molecule is 0, M may be absent. Examples of desirable cations denoted by M are alkali metal ions (lithium ions, sodium ions, potassium ions, and the like), alkaline earth metal ions (barium ions, calcium ions, and the like), and ammonium ions.

Next, the formula (III)-b will be described in detail.

$R^{106}$ is identically defined with $R^{100}$ in the formula (III) above, and their preferred scopes are identical.

$L^{102}$ is desirably a $C_{0-40}$ linking group selected from the group consisting of a $C_{1-12}$ alkyl group, a $C_{6-12}$ aromatic group, —CO—, —NR—, —O—, —S—, —SO—, —SO$_2$— and any combination thereof; and more desirably a $C_{0-20}$ linking group selected from the group a $C_{1-8}$ alkyl group, a phenyl group, —CO—, —NR—, —O—, —S—, —SO$_2$— and any combination thereof.

$Ar^{101}$ desirably represents a $C_{6-12}$ aromatic carbon ring residue, and more desirably a benzene ring residue or a naphthalene ring residue.

The carboxyl group (—COOH) or the salt thereof, the sulfo group (—SO$_3$H) or the salt thereof, the sulfato group (—OSO$_3$H) or the salt thereof or the phosphonoxy group {—OP(=O) (OH)$_2$} or the salt thereof denoted by $W^3$ are identically defined with the hydrophilic groups denoted by W in the formula (III) above, and their preferred scopes are identical. And the alkoxyl, alkoxy and alkylamino group having the hydrophilic group denoted by $W^3$ are identically defined with those denoted by $W^1$ or $W^2$; and their preferred scopes are identical.

$W^3$ is desirably selected from the group consisting of a carboxyl group (—COOH) and a salt thereof, a sulfo group (—SO$_3$H) and a salt thereof, an alkylamino group having a carboxyl group (—COOH) or a salt thereof and an alkylamino group having a sulfo group (—SO$_3$H) or a salt thereof;

and more desirably selected from the group consisting of SO$_3$M and CO$_2$M. M represents a cation, but when the charge in the molecule is 0, M may be absent. Examples of the cation denoted by M include a protonium ion, alkali metal ions (lithium ion, sodium ion, potassium ion and the like), alkaline earth metal ions (barium ions, calcium ions, and the like), and ammonium ions; and preferred example include a protonium ion, lithium ion, sodium ion, potassium ion and ammonium ion.

In the present description, Substituent Group D comprises alkyl groups (desirably alkyl groups having from 1 to 20 carbon atoms, preferably having from 1 to 12 carbon atoms, and more preferably having from 1 to 8 carbon atoms; examples are methyl, ethyl, isopropyl, tert-butyl, n-octyl, n-decyl, n-hexadecyl, cyclopropyl, cylopentyl, and cyclohexyl); alkenyl groups (desirably alkenyl groups having from 2 to 20 carbon atoms, preferably from 2 to 12 carbon atoms, and more preferably having from 2 to 8 carbon atoms; examples are vinyl, allyl, 2-butenyl, and 3-pentenyl); alkinyl groups (desirably alkinyl groups having from 2 to 20 carbon atoms, preferably from 2 to 12 carbon atoms, and more preferably from 2 to 8 carbon atoms; examples are propargyl and 3-pentinyl); aryl groups (desirably aryl groups having from 6 to 30 carbon atoms, preferably having from 6 to 20 carbon atoms, and more preferably having from 6 to 12 carbon atoms; examples are phenyl, p-methylphenyl, and naphthyl); optionally substituted amino groups (desirably amino groups having from 0 to 20 carbon atoms, preferably having from 0 to 10 carbon atoms, and more preferably having from 0 to 6 carbon atoms; examples are unsubstituted amino, methylamino, dimethylamino, diethylamino and dibenzylamino); alkoxy groups (desirably alkoxy groups having from 1 to 20 carbon atoms, preferably having from 1 to 12 carbon atoms, and more preferably having from 1 to 8 carbon atoms; examples are methoxy, ethoxy, and butoxy); aryloxy groups (desirably aryloxy groups having from 6 to 20 carbon atoms, preferably having from 6 to 16 carbon atoms, and more preferably having from 6 to 12 carbon atoms; examples are phenyloxy and 2-naphthyloxy), acyl groups (desirably acyl groups having from 1 to 20 carbon atoms, preferably having from 1 to 16 carbon atoms, and more preferably having from 1 to 12 carbon atoms; examples are acetyl, benzoyl, formyl, and pivaloyl); alkoxycarbonyl groups (desirably alkoxycarbonyl groups having from 2 to 20 carbon atoms, preferably having from 2 to 16 carbon atoms, and more preferably having from 2 to 12 carbon atoms; examples are methoxycarbonyl and ethoxy carbonyl); aryloxycarbonyl groups (desirably aryloxycarbonyl groups having from 7 to 20 carbon atoms, preferably having from 7 to 16 carbon atoms, and more preferably having from 7 to 10 carbon atoms; examples include phenyloxycarbonyl); acyloxy groups (desirably acyloxy groups having from 2 to 20 carbon atoms, preferably having from 2 to 16 carbon atoms, and more preferably having from 2 to 10 carbon atoms; examples are acetoxy and benzoyloxy); acylamino groups (desirably acylamino groups having from 2 to 20 carbon atoms, preferably having from 2 to 16 carbon atoms, and more preferably having from 2 to 10 carbon atoms; examples are acetylamino and benzoylamino); alkoxycarbonylamino groups (desirably alkoxycarbonylamino groups having from 2 to 20 carbon atoms, preferably having from 2 to 16 carbon atoms, and more preferably having from 2 to 12 carbon atoms; examples include methoxycarbonylamino); aryloxycarbonylamino groups (desirably aryloxycarbonylamino groups having from 7 to 20 carbon atoms, preferably having from 7 to 16 carbon atoms, and more preferably having from 7 to 12 carbon atoms; examples include phenyloxycarbonylamino); sulfonylamino groups (desirably sulfonylamino groups having from 1 to 20 carbon atoms, preferably having from 1 to 16 carbon atoms, and more preferably having from 1 to 12 carbon atoms; examples are methanesulfonylamino and benzenesulfonylamino), sulfamoyl groups (preferably sulfamoyl groups having from 0 to 20 carbon atoms, preferably having from 0 to 16 carbon atoms, and more preferably having from 0 to 12 carbon atoms; examples are sulfamoyl, methylsulfamoyl, dimethylsulfamoyl and phenylsulfamoyl); carbamoyl groups (desirably carbamoyl groups having from 1 to 20 carbon atoms, preferably having from 1 to 16 carbon atoms, and more preferably having from 1 to 12 carbon atoms; examples are unsubstituted carbamoyl, methylcarbamoyl, diethylcarbamoyl and phenylcarbamoyl); alkylthio groups (desirably alkylthio groups having from 1 to 20 carbon atoms, preferably having from 1 to 16 carbon atoms, and more preferably having from 1 to 12 carbon atoms; examples are methylthio and ethylthio), arylthio groups (desirably arylthio groups having from 6 to 20 carbon atoms, preferably having from 6 to 16 carbon atoms, and more preferably having from 6 to 12 carbon atoms; examples include phenylthio); sulfonyl groups (desirably sulfonyl groups having from 1 to 20 carbon atoms, preferably having from 1 to 16 carbon atoms, and more preferably having from 1 to 12 carbon atoms; examples are mesyl and tosyl); sulfinyl groups (desirably sulfinyl groups having from 1 to 20 carbon atoms, preferably having from 1 to 16 carbon atoms, and more preferably having from 1 to 12 carbon atoms; examples are methanesulfinyl and benzenesulfinyl); ureido groups (desirably ureido groups having from 1 to 20 carbon atoms, preferably having from 1 to 16 carbon atoms, and more preferably having from 1 to 12 carbon atoms; examples are unsubstituted ureido, methylureido and phenylureido); phosphoramide groups (desirably phosphoramide groups having from 1 to 20 carbon atoms, preferably having from 1 to 16 carbon atoms, and more preferably having from 1 to 12 carbon atoms; examples are diethyl phosphoramide and phenyl phosphoramide); hydroxy, mercapto, halogen atoms (for example, fluorine, chlorine, bromine and iodine); cyano, sulfo, carboxyl, nitro, hydroxamic acid groups, sulfino, hydrazino, imino, heterocyclic groups (desirably heterocyclic groups having from 1 to 30 carbon atoms, preferably having from 1 to 12 carbon atoms; examples are heterocyclic groups having hetero atoms such as nitrogen, oxygen, and sulfur; examples are imidazolyl, pyridyl, quinolyl, furyl, piperidyl, morpholino, benzooxazolyl, benzimidazolyl, and benzthioazolyl); and silyl groups (desirably silyl groups having from 3 to 40 carbon atoms, preferably having from 3 to 30 carbon atoms, and more preferably having from 3 to 24 carbon atoms; examples are trimethylsilyl and triphenylsilyl). These substituents may be further substituted with these substituents. Further, when there are two or more substituents, they may be identical or different. When possible, they may be bonded together to form a ring.

As described above, in order to fix alignments of molecules liquid-crystal compounds, especially discotic liquid-crystal compounds, the fluoride-compound desirably has a polymerizable group as a substituent.
Examples of the fluoride-compound denoted by the formula (II), which can be used in the invention, include, but are not limited to, those shown below.
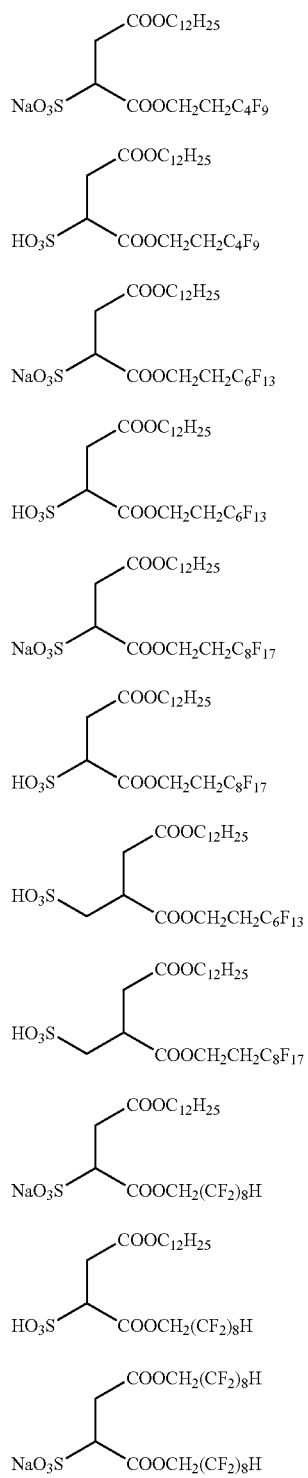
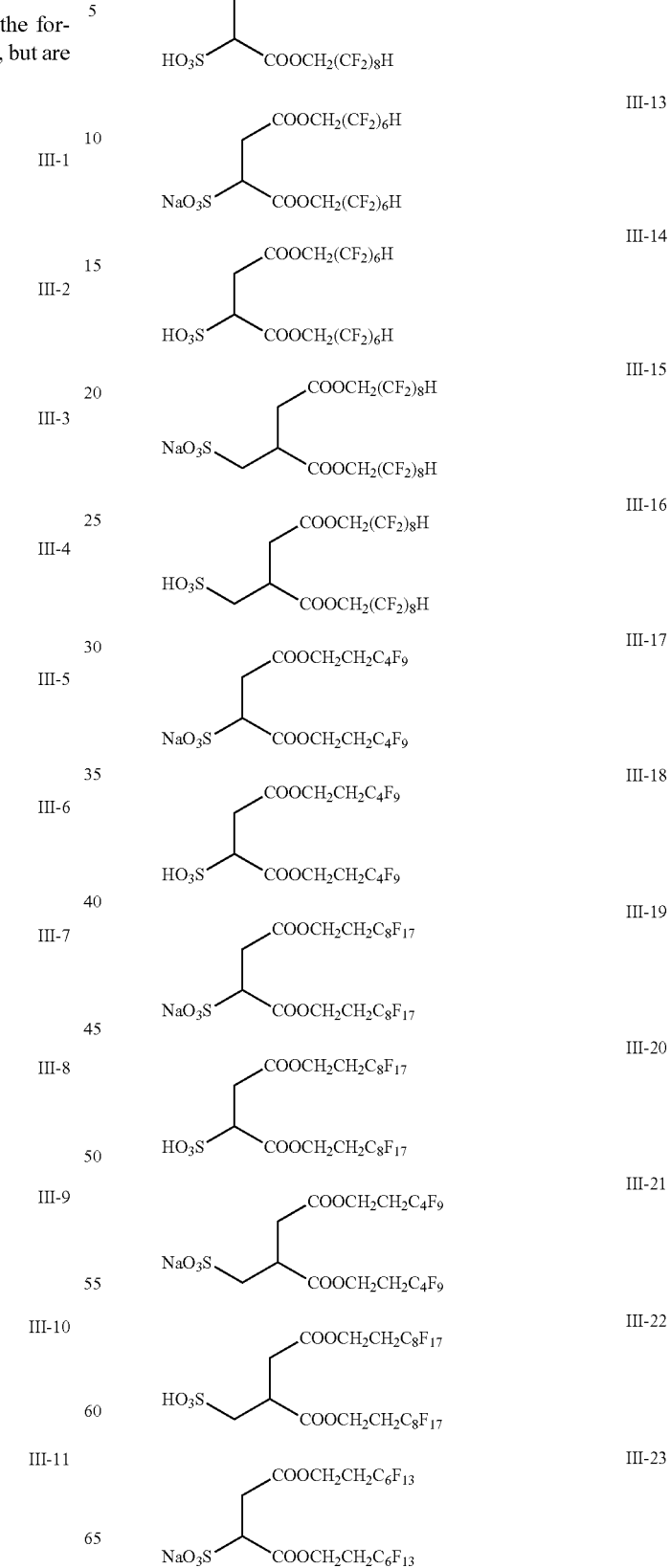

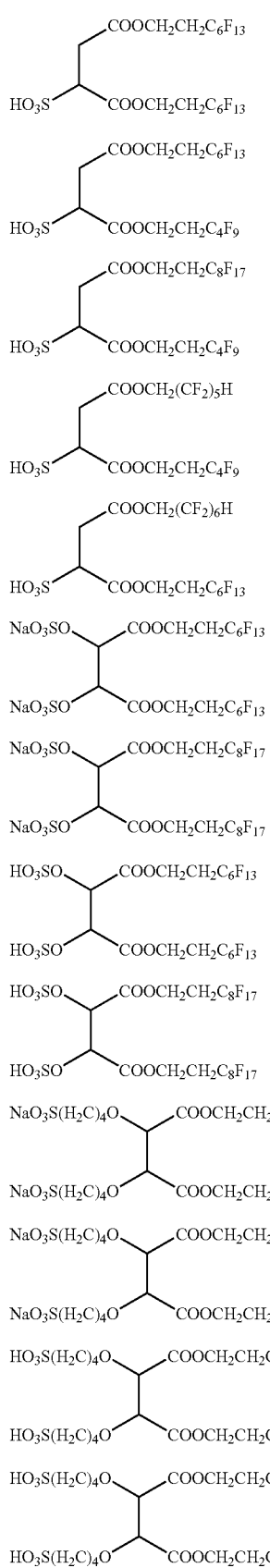
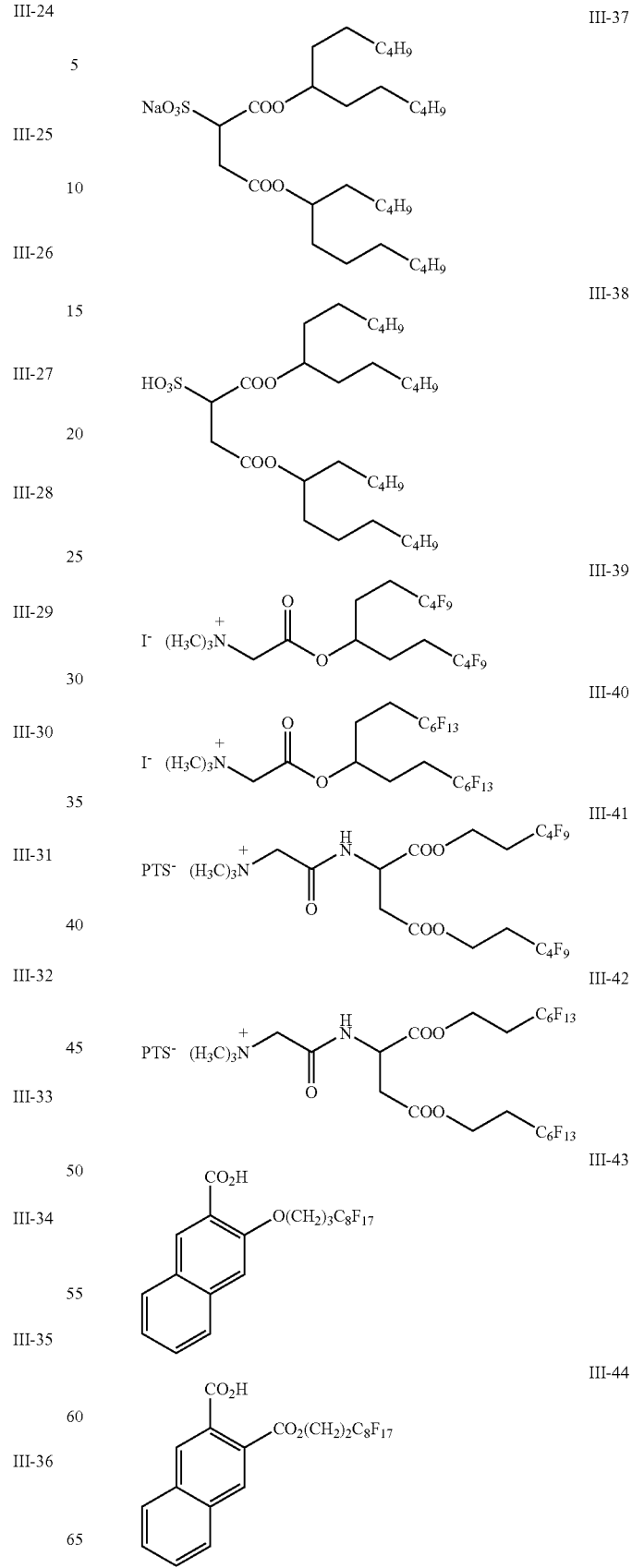

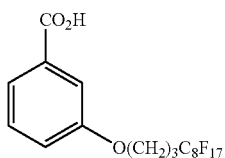 III-45
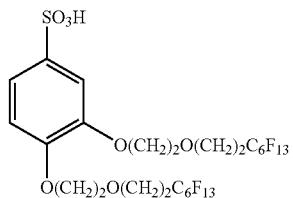 III-52
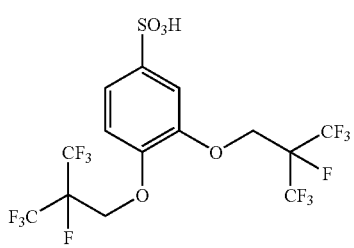 III-46
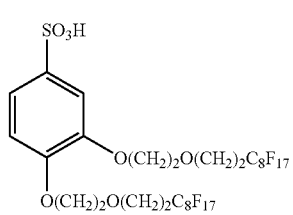 III-53
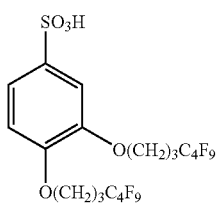 III-47
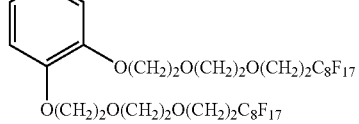 III-54
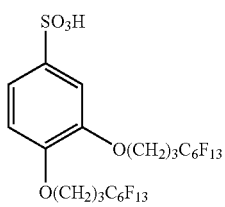 III-48
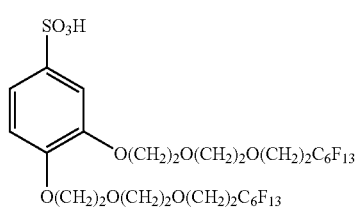 III-55
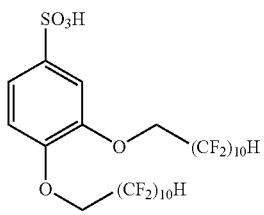 III-49
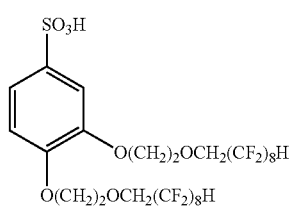 III-56
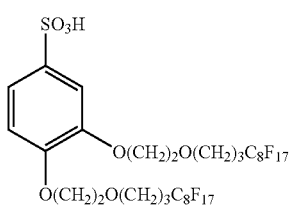 III-50
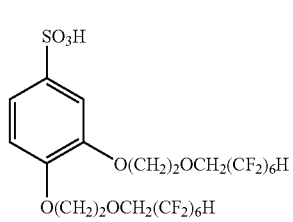 III-57
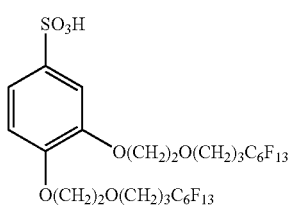 III-51
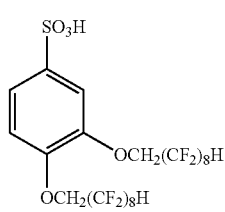 III-58

-continued

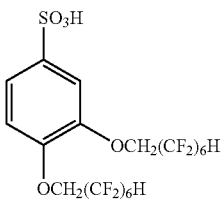
III-59

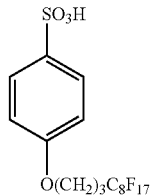
III-66

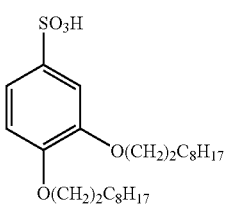
III-60

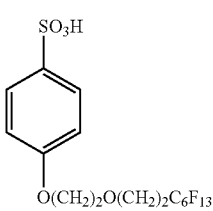
III-61

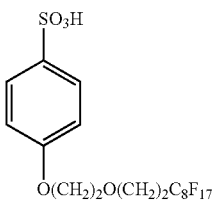
III-62

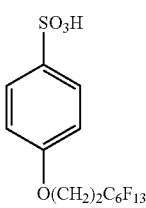
III-63

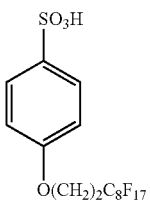
III-64

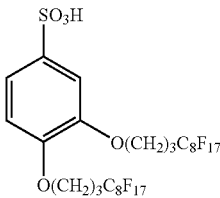
III-65

The preferred amount of the fluoride-compound in the liquid crystal composition may vary depending on its application. It is, in general, desirably from 0.005 to 8 mass %, more desirably from 0.01 to 5 mass % and much more desirably from 0.05 to 1 mass % with respect to the total mass of the composition (when the composition is a solution, the solvent is excluded).

(Polymerization Initiator)

The liquid crystal molecules are fixed in an alignment state (for example, rod-like molecules may be fixed in a heterotrophic alignment state). The liquid crystal molecules are desirably fixed by polymerization reaction of the polymerizable group (P) of the liquid crystal molecules. Examples of the polymerization reaction include thermal polymerization reactions employing a thermal polymerization initiator and photo-polymerization reactions employing a photo-polymerization initiator. A photo-polymerization reaction is preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 mass percent, preferably from 0.5 to 5 mass percent, of the solid portion of the coating liquid.

(Other Additives in First Optically Anisotropic Layer)

The liquid crystal composition may comprise other additives such as plasticizers, surfactants or polymerizable monomers, with the liquid crystal compound. Such additives may contribute to improvement in uniformity of a coating layer, strength of a coating layer, alignment ability of liquid-crystal molecules or the like. Such additives are desirably selected from materials which can be mixed with the liquid-crystal compound compatibly and don't inhibit the alignment of the liquid-crystal compound.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of [0018] to [0020] in JPA No. 2002-296423. In usual, the amount of the polymerizable monomer is desirably from 1 to 50 mass %, and more desirably from 5 to 30 mass %, with respect to the total mass of a single or plural liquid crystal compounds.

The surfactant may be selected from any known surfactants, and is desirably selected from fluoride-surfactants. More specifically, the compounds, described in the columns of [0028] to [0056] in JPA No. 2001-330725, and the compounds, described in the columns of [0069] to [0126] in JPA No. 2003-295212, are preferred.

Single or plural polymers may be used with the liquid crystal. The polymer is desirably selected from polymers which can increase a viscosity of a coating liquid. Examples of the polymer include cellulose esters. Preferred examples of cellulose ester include those described in the column [0178] in JPA No. 2000-155216. Avoiding inhibiting the alignment of the liquid-crystal compound, the amount of the polymer is desirably from 0.1 to 10 mass %, and more desirably from 0.1 to 8 mass %, with respect to the mass of the liquid-crystal compound.

The first optically anisotropic layer may be prepared by applying a coating fluid, prepared by dissolving and/or dispersing a liquid crystal compound and, if necessary, one or more additives such as a polymerization initiator and an aid for alignment in a solvent, to a surface of a substrate. The substrate may have an alignment layer thereon, and the coating fluid is preferably applied to a surface of the alignment layer. Solvents are used for preparing the coating liquid, and the solvent is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating solutions.

The coating fluid can be applied by known techniques (e.g., wire-bar coating, extrusion coating, direct gravure coating, reverse gravure coating and die coating). The coating fluid is preferably applied to the surface with the wire-bar coating technique for preparing the first optically anisotropic layer. It is preferable than the rotation frequency of the wire bar satisfy the relationship shown below.

$$0.6 < (W \times (R+2r) \times \pi)/V < 1.4$$

[W: rotation frequency of a wire-bar (rpm); R: diameter of the bar core (m); r: diameter of the wire (m); V: feeding speed of a support (m/min)]

The value of $(W \times (R+2r) \times \pi)/V$ preferably fall within the range from 0.7 to 1.3 and more preferably from 0.8 to 1.2.

The die-coating techniques are preferably employed for preparing the first optically anisotropic layer; and, especially, those with a slide coater or a slot-die coater are preferred. The methods described in JPA Nos. 2004-290775, 2004-290776, 2004-358296 and 2005-13989 are preferred.

After the coating fluid being applied to the surface of a substrate or alignment layer, liquid crystal molecules are aligned on the surface (for example, rod-like molecules are aligned homeotropically), and fixed in the alignment state to form an optically anisotropic layer. The temperature for aligning liquid crystal molecules may be decided in terms of the transition temperature of the liquid crystal or the alignment state to be employed or the like. Fixing may be carried out by polymerization or crosslinking reaction of liquid crystal molecules and/or polymerizable monomer added to the composition. Irradiation for polymerization of liquid crystal molecules is desirably conducted with ultraviolet radiation. The irradiation energy is preferably from 20 mJ/cm$^2$ to 50 J/cm$^2$, and more preferably from 100 to 800 mJ/cm$^2$. Irradiation may be conducted under heated conditions to promote the photo-polymerization reaction.

The thickness of the optically anisotropic layer is preferably from 0.1 to 10 μm, and more preferably from 1 to 5 μm.

(Alignment Layer)

For preparing the first optically anisotropic layer, the composition may be applied to a surface of an alignment layer to align liquid crystal molecules. The alignment layer can control the alignment direction of liquid crystal molecules, and is preferably employed for carrying out the preferred embodiment of the invention. However, according to the present invention, an alignment layer is not an essential element after fixing liquid-crystal molecules because the molecules fixed in an alignment state can keep the alignment without an alignment layer. Thus, after an optically anisotropic layer is formed on an alignment layer, only the optically anisotropic layer may be transferred from on the alignment layer to on another member such as a polarizing film, and in such case, the alignment layer is absent.

The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers formed by rubbing polymer layers are desirable. Examples of the polymer used for preparing an alignment layer include methacrylate copolymers described in the column [0022] in JPA No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-soluble polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred.

The saponification degree of the polyvinyl alcohol is desirably from 70 to 100%, and more desirably from 80 to 100%. The polymerization degree of the polyvinyl alcohol is desirably from 100 to 5000.

The alignment layer, which can be used for preparing the first optically anisotropic layer, is preferably selected from polymers having a main chain binding to side chains containing a crosslinkable functional group such as double bonding and polymers having side chains capable of aligning liquid-crystal molecules. Polymers capable of crosslinking not only themselves but also with crosslinking agents, or any combinations thereof may be employed for the alignment layer.

It is possible to copolymerize a polymer in an alignment layer and a multi-functional monomer in an optically anisotropic layer, when the polymer in the alignment layer has a main chain bonding to side chains containing a crosslinkable functional group, or the polymer in the alignment layer has side chain being capable of aligning liquid-crystal molecules and containing a crosslinkable functional group. In such case, not only between the multi-functional monomers but also between the polymers in the alignment layer and the multi-functional monomers and the polymers in the alignment layer, the covalent bondings are formed and the bonding strengths are improved. Thus, in such case, the strength of the optical compensatory film can be remarkably improved.

The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent. Examples of the crosslinkable agent include aldehydes, N-methylol compounds, dioxane derivatives, compounds to act when being activated their carboxyl groups, active vinyl compounds, active halogen compounds, isoxazoles and dialdehyde starches. Single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirable from 0.1 to 20 mass %, and more desirably 0.5 to 15 mass %, with respect to the mass of the polymer. The residual amount of the unreacted crosslinkable-agent in the alignment layer is desirably not greater than 1.0 mass %, and more desirably not greater than 0.5 mass %. When the residual amount falls with in the range, the alignment layer has a sufficient durability, and even if the alignment is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the crosslinkable agent, to a surface of a transparent substrate, drying under heating (crosslinking), and performing a rubbing treatment. The crosslinking reaction may be carried out any time after applying the coating liquid. When a hydrophilic polymer such as polyvinyl alcohol is used for preparation of an alignment layer, the coating liquid is desirably prepared using a mixed solvent of an organic solvent such as methanol, exhibiting a deforming function, and water. The mass ratio of water to methanol is desirably from $0/100$ to $99/1$, and more desirably from $0/100$ to $91/9$. Using such a mixed solvent can prevent bubbles from generating, and can remarkably reduce defects in the surface of the alignment layer and the optically anisotropic layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set in a range from 4.5 to 5.5, and more desirably 5.

The alignment layer may be formed on a transparent substrate. The alignment layer can be obtained by applying a rubbing treatment to the surface of the polymer layer after crosslinking the polymer layer.

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a nylon fiber, polyester fiber or the like in a direction. Usually, the rubbing treatment may be carried out by rubbing a polymer layer with a fabric in which fibers having a uniform length and line thickness are implanted averagely at several times.

The liquid crystal composition may be applied to the rubbed surface of the alignment layer; and the liquid-crystal molecules are aligned on the surface. After that, if necessary, the reaction between the polymers in the alignment layer and the multi-functional monomers in the composition may be carried out, or the crosslinking reaction of the polymers in the alignment layer with a crosslinkable agent, thereby to form an optically anisotropic layer.

The thickness of the alignment layer is desirably from 0.1 to 10 micrometers.

(Support)

The first optically anisotropic layer may be formed on a support. The second optically anisotropic layer typically composed of a polymer film may be used as a support for the first optically anisotropic layer, or the first optically anisotropic layer may be formed on a temporary support, and then transferred onto the second optically anisotropic layer. An optically isotropic film may be used as a support for the first optically anisotropic layer. For the case where the temporary support is used, there is no special requirements on the optical characteristics of the support, wherein it is preferable that the first optically anisotropic layer can readily be separated therefrom, and a polyethylene terephthalate film, for example, is preferable. For the case where the first optically anisotropic layer is formed on an optically isotropic support, the support may be removed for use in the liquid crystal display device, or may be remained unremoved. For the case where the optically isotropic support and the first optically anisotropic layer show only a small adhesivity therebetween, it is preferable to stack the both while placing an adhesive layer composed of an adhesive etc. in between, in view of improving the durability. The support can be used also as a protective film for the polarizer film. The support preferably has a light transmissivity of 80% or above.

The substantially isotropic support preferably has an in-plane retardation (Re) of 0 to 20 nm, more preferably 0 to 10 nm, and most preferably 0 to 5 nm. The thickness-wise retardation (Rth) is preferably −60 nm to 60 nm, more preferably −40 nm to 40 nm, and most preferably −20 nm to 20 nm. The wavelength dispersion, expressed by ratio of $Re_{400}/Re_{700}$, is preferably smaller than 1.2.

Examples of the polymer include cellulose ester, polycarbonate, polysulfone, polyethersulfone, polyacrylate, polymethacrylate and cyclic polyolefin. Cellulose ester is preferable, acetyl cellulose is more preferable, and triacetyl cellulose is most preferable. The cyclic polyolefin is available from polymers composed of a polymerized product obtained by subjecting a ring-opened polymer of tetracyclododecenes, or a ring-opened copolymer of tetracyclododecenes and norbornenes to hydrogen addition reaction as described in Examined Japanese Patent Publication No. H2-9619, known under trade names of Arton (from JSR Corporation), Zeonex and Zeonor (from Nippon Zeon Co., Ltd.) Series. The polymer film is preferably formed by the solvent-cast process.

The polymer film is preferably formed by the solvent-cast process. Thickness of the transparent support is preferably 20 to 500 μm, and more preferably 50 to 200 μm. For the purpose of improving adhesiveness between the transparent support (adhesive layer, vertical alignment film or retardation layer) and layers provided thereon, the transparent support may be subjected to surface treatment (for example, glow discharge treatment, corona discharge treatment, ultraviolet (UV) treatment, flame treatment). An adhesive layer (undercoat layer) may be formed on the transparent support. For a transparent support or long-web transparent support, in order to impart slipping property in the transfer process, or to prevent sticking of the back surface and the top surface in a wound-up state, it is preferable to use a substrate having a polymer layer, which contains 5% to 40%, on the solid mass basis, of inorganic particles having a mean particle size of approximately 10 to 100 nm, formed on one surface thereof by coating or by co-casting with the substrate.

Also the temporary support of the first optically anisotropic layer may be selected from the above-described polymer films, wherein in this case, the polymer film preferably contain a releasing aid. For example, many species of the additive capable of very effectively reducing the peeling resistance of cyclic polyolefin film have been discovered among surfactants. Preferable and effective examples of the releasing aid include phosphoric-ester-base surfactant, carboxylic acid or carboxylic-acid-base surfactant, sulfonic acid or sulfonic-acid-base surfactant, and sulfuric-acid-ester-base surfactant. Fluorine-containing surfactants having a part of hydrogen atoms, which bind to the hydrocarbon chains of the above-described surfactants, substituted by fluorine atoms are also effective.

Examples of the releasing aid are exemplified below.
RZ-1 $C_8H_{17}O$—$P(=O)$—$(OH)_2$
RZ-2 $C_{12}H_{25}O$—$P(=O)$—$(OK)_2$
RZ-3 $C_{12}H_{25}OCH_2CH_2O$—$P(=O)$—$(OK)_2$
RZ-4 $C_{15}H_{31}(OCH_2CH_2)_5O$—$P(=O)$—$(OK)_2$
RZ-5 $\{C_{12}H_{25}O(CH_2CH_2O)_5\}_2$—$P(=O)$—$OH$
RZ-6 $\{C_{18}H_{35}(OCH_2CH_2)_8O\}_2$—$P(=O)$—$ONH_4$
RZ-7 $(t-C_4H_9)_3$—$C_6H_2$—$OCH_2CH_2O$—$P(=O)$—$(OK)_2$
RZ-8 $(iso-C_9H_{19}$—$C_6H_4$—$O$—$(CH_2CH_2O)_5$—$P(=O)$—$(OK)(OH)$
RZ-9 $C_{12}H_{25}SO_3Na$
RZ-10 $C_{12}H_{25}OSO_3Na$
RZ-11 $C_{17}H_{33}COOH$
RZ-12 $C_{17}H_{33}COOH.N(CH_2CH_2OH)_3$
RZ-13 iso-$C_8H_{17}$—$C_6H_4$—$O$—$(CH_2CH_2O)_3$—$(CH_2)_2SO_3Na$
RZ-14 $(iso-C_9H_{19})_2$—$C_6H_3$—$O$—$(CH_2CH_2O)_3$—$(CH_2)_4SO_3Na$
RZ-15 sodium tri-isopropylnaphthalene sulfonate
RZ-16 sodium tri-t-butylnaphthalene sulfonate
RZ-17 $C_{17}H_{33}CON(CH_3)CH_2CH_2SO_3Na$
RZ-18 $C_{12}H_{25}$—$C_6H_4SO_3.NH_4$ The additional amount of the releasing aid is preferably from 0.05 to 5 mass %, more preferably from 0.1 to 2 mass %, and much more preferably from 0.1 to 0.5 mass %, with respect to the total mass of the polymer constituting the temporary substrate.

(Second Optically Anisotropic Layer)

The optical compensation film of the invention comprises a second optically anisotropic layer having an in-plane retardation varying from 20 to 150 nm and an in-thickness direction retardation varying from 100 to 300 nm. The in-plane retardation of the second optically anisotropic layer preferably varies from 30 to 130 nm, and more preferably from 40 to 110 nm. The in-thickness direction retardation of the second optically anisotropic layer preferably varies from 120 to 280 nm, and more preferably from 140 to 260 nm.

For the case where the second optically anisotropic layer is composed of a stretched polymer film, angle of the in-plane slow axis is defined by an angle formed between the slow axis and a reference line, where the reference line (0°) aligns in the direction of stretching of the polymer film. The reference line herein is defined in the width-wise direction when the roll-formed film is stretched in the width-wise direction, and in the longitudinal direction when the film is stretched in the longitudinal direction. Average value of the angle of slow axis is preferably 3° or smaller, more preferably 2° or smaller, and most preferably 1° or smaller. The direction given by the average value of slow axis is defined as the average direction of slow axis. Standard deviation of the angle of slow axis is preferably 1.5° or smaller, more preferably 0.8° or smaller, and most preferably 0.4° or smaller.

The second optically anisotropic layer may comprise the polymer film, or may be composed solely of the polymer film. As the polymer film used for the second optically anisotropic layer, those having a transmissivity of light of 80% or more are preferably used. Those less causative of birefringence under external force are preferable as the polymer film. Examples of the polymer film applicable as the second optically anisotropic layer include cellulose polymer films, cyclic-polyolefin-base films, and polymethyl methacrylate films.

For the purpose of solving the above-described object of the present invention, in other words, for the purpose of providing an optical compensation film which is excellent in durability even under severe environments, and shows only a small variation in the optical characteristics due to environmental changes such as humidity, and is therefore contributive to improvement in the viewing angle characteristics of an IPS-type liquid crystal display device, the second optically anisotropic layer is preferably a cellulose acylate film, or cyclic-polyolefin-base film described below.

(Cellulose Acylate)

In one aspect of the present invention, the second optically anisotropic layer is a cellulose acylate film containing a cellulose acylate which is a mixed aliphatic acid ester of cellulose obtained by substituting hydroxyl groups of cellulose with acetyl groups, and an acyl group having 3 or more carbon atoms, and contains a cellulose acylate (substantially composed of the cellulose acylate film) which satisfies the inequalities (I) and (II), below.

Inequality (I): $2.0 \leq A+B \leq 3.0$
Inequality (II): $0 < B$ where, A and B express degrees of substitution of acyl groups substituting the hydroxyl groups of cellulose, wherein A represents the degree of substitution by acetyl groups, and B represents the degree of substitution by acyl groups having 3 or more carbon atoms. So far as the above inequalities are satisfied, any two or more different cellulose acylates may be used in a mixed manner.

A glucose unit composing the cellulose through β-1,4 bond has a free hydroxyl group at each of the 2-, 3- and 6-positions. Cellulose acylate is a polymer obtained by esterifying a part of, or all of these hydroxyl groups with acyl groups. The degree of acyl substitution means the ratio of esterification of the cellulose for each of the 2-, 3- and 6-positions (100% esterification is expressed as a degree of esterification of 1).

In the present invention, total of the degree of substitution of the hydroxyl groups (A+B) falls in the range from 2.0 to 3.0 as shown by the inequality (I), more preferably from 2.2 to 2.9, and still more preferably from 2.40 to 2.85. The degree of substitution B has a value exceeding 0 as shown by the inequality (II), preferably has a value of 0.9 or above, and more preferably 1.3 or above.

The total A+B smaller than 2.0 makes cellulose acylate more hydrophilic, and makes it more susceptible to environmental humidity. When B=0, indicating cellulose acetate, it becomes more susceptible to environmental humidity.

It is more preferable that 28% or more of B accounts for the degree of substitution of the hydroxyl groups at the 6-position, and it is still more preferable that 30% or more accounts for the degree of substitution of the hydroxyl groups at the 6-position, still more preferably 31% or more, and particularly preferably 32% or more accounts for the degree of substitution of the hydroxyl groups at the 6-position.

It is further preferable that the total A+B of the degrees of substitution of the hydroxyl groups at the 6-position of cellulose acylate is 0.75 or above, more preferably 0.80 or above, and still more preferably 0.85 or above. Use of these cellulose acylate films allows preparation of a solution for forming the films excellent in the solubility and filterability, and allows preparation of a desirable solution even when a non-chlorine-containing organic solvent is used. It is further made possible to prepare a solution having a low viscosity and a good filterability.

The above-described acyl group having 3 or more carbon atoms is not specifically limited, allowing any of aliphatic group or aromatic hydrocarbon group. They are exemplified by alkyl carbonyl ester, alkenyl carbonyl ester or aromatic carbonyl ester, and aromatic alkylcarbonyl ester of cellulose, and may further have substitutive groups. Preferable examples of the substitutive groups include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among these, preferable examples include propionyl, butanoyl, dodecanoyl, octadecanoyl, t-butanoyl, oleoyl, benzoyl, naphthylcarbonyl and cinnamoyl groups. Particularly preferable examples include propionyl and butanoyl groups. The degree of substitution B is preferably 0.3 or above, more preferably 0.4 to 2.0, both ends inclusive, still more preferably 0.5 to 1.5, and even still more preferably 0.6 to 1.0. Adjusting the degree of substitution B in these ranges can suppress physical deformation in relation to lowered Tg during storage under high temperatures, and variation in the optical characteristics during storage under high humidity.

Cellulose acylate used for the present invention can specifically be exemplified by cellulose acetate propionate and cellulose acetate butylate.

Degrees of substitution by acetyl group, propionyl group and/or butyl group can be measured conforming to ASTM: D-817-96 (method of testing cellulose acetate and so forth) and can be determined by calculation.

(Method for Preparing Cellulose Acylate)

A basic principle of the method of synthesizing cellulose acylate is described by Migita et al., in "Mokuzai Kagaku (Wood Chemistry)", p. 180-190 (published by Kyoritsu Shuppan Co., Ltd., 1968). One representative method of synthesis is the liquid phase acetylation using a carboxylic anhydride-acetic acid-sulfuric acid catalyst.

Cellulose acylate is obtained specifically by pre-treating a cellulose source such as cotton flower, wood pulp or the like with an appropriate amount of acetic acid, put into a pre-cooled mixed solution for carboxylation to be esterified, so as to synthesis a complete cellulose acylate (degrees of acyl substitution at the 2-, 3- and 6-positions totals approximately 3.00). The mixed solution for carboxylation generally contains acetic acid as a solvent, carboxylic anhydride as an esterifying agent, and sulfuric acid as a catalyst. It is a general practice to use a stoichiometrically excessive amount of the carboxylic anhydride over the total of the cellulose to be reacted and water content in the system. After completion of the esterification, an aqueous solution of a neutralizing agent (carbonate, acetate or oxide of calcium, magnesium, iron, aluminum or zinc) is added in order to hydrolyze an excessive portion of carboxylic anhydride remaining in the system and to neutralize a part of the esterification catalyst. Next, the obtained complete cellulose acylate was kept at 50 to 90° C. under the presence of a small amount of acetylation catalyst (generally, the residual sulfuric acid) for saponification and ripening, until a cellulose acylate having a desired degree of acyl substitution and degree of polymerization is obtained. When the desired cellulose acylate is obtained, the remaining catalyst is completely neutralized using the neutralizing agent as described in the above, or remained unneutralized, and the cellulose acylate solution is poured into water or dilute sulfuric acid (or water or dilute sulfuric acid is poured into the cellulose acylate solution) to thereby separate cellulose acylate, followed by washing and stabilized, to thereby obtain the above-described specific cellulose acylate.

The cellulose acylate film is preferably such that the polymer component composing the film is substantially composed of the above-described specific cellulose acylate. "Substantially" herein means that the content accounts for 55% by mass or more (more preferably 70% by mass or more, and still more preferably 80% mass or more) of the polymer component.

Cellulose acylate is preferably used in a form of particles. It is preferable that 90% by mass or more of the particles have a grain size of 0.5 to 5 mm. It is also preferable that 50% by mass or more of the particles to be used have a particle size of 1 to 4 mm. The cellulose acylate particles preferably have nearly a spherical geometry.

Degree of polymerization of cellulose acylate preferably used in the present invention, expressed in viscosity-average degree of polymerization, is preferably 200 to 700, more preferably 250 to 550, still more preferably 250 to 400, and even more preferably 250 to 350. The average degree of polymerization can be measured according to the intrinsic viscosity method proposed by Uda et al. (Kazuo Uda and Hideo Saito, "Sen'i Gakkai Shi (Fiber)", Vol. 18, No. 1, p. 105-120, 1962). The method is detailed also in Japanese Laid-Open Patent Publication No. H9-95538.

Removal of low-molecular components raises the mean molecular weight (degree of polymerization), whereas the viscosity becomes smaller than that of general cellulose acylate, so that those having low molecular components removed therefrom are preferable as cellulose acylate. Cellulose acylate having only a small content of low molecular components can be obtained by removing the low molecular components from cellulose acylate synthesized by the general methods. The low molecular components can be removed by washing cellulose acylate with an appropriate organic solvent. When cellulose acylate having a small content of low molecular components is manufactured, it is preferable to adjust the amount of sulfuric acid catalyst in the acetylation reaction to 0.5 to 25 parts by mass per 100 parts by mass of cellulose acylate. The amount of sulfuric acid catalyst adjusted within the above-described range allows synthesis of cellulose acylate desirable in view of molecular weight distribution (uniform molecular weight distribution). Aimed at use in manufacturing of cellulose acylate, moisture content of the catalyst is preferably adjusted to 2% by mass or below, more preferably 1% by mass or below, and still more preferably 0.7% by mass or less. Cellulose acylate generally contains water, and is known to show a water content of 2.5 to 5% by mass. It is necessary to dry cellulose acylate in order to adjust the water content to the above-described range, by any methods not specifically limited.

Source cotton for cellulose acylate and methods of synthesis preferably applicable to the present invention can be found, for example, in Journal of Technical Disclosure (No. 2001-1745, p. 7-12, issued on Mar. 15, 2001 by JIII).

The cellulose acylate film relevant to the present invention can be obtained by preparing a cellulose acylate solution having the above-described specific cellulose acylate dissolved in an organic solvent together with any additives if necessary, and by forming the film using this solution.

(Additives for Second Optically Anisotropic Layer)

Additives possibly added to the cellulose acylate solution can be exemplified, for example, by plasticizer, UV absorber, anti-degradation agent, retardation (optical anisotropy) enhancer, retardation (optical anisotropy) reducer, particles, dye, releasing aid and infrared absorber. In the present invention, the retardation enhancer is used. It is preferable to use at least one of plasticizer, UV absorber, dye and releasing aid.

The additives may be solid or may be oily matter. In other words, they are not specifically limited in their melting points and boiling points. For example, UV absorbers having melting points of lower than 20° C. and not lower than 20° C. may be used in a mixed form, or plasticizers may be mixed and used in a similar manner, as typically described in Japanese Laid-Open Patent Publication No. 2001-151901.

Any arbitrary species of UV absorber is selectable depending on purposes, such as from those of salicylate ester-base, benzophenone-base, benzotriazole-base, benzoate-base, cyanoacrylate-base and nickel complex salt-base, and preferably from those of benzophenone-base, benzotriazole-base and salicylate ester-base. Examples of the benzophenone-base UV absorber include 2,4-dihydroxybenzophenone, 2-hydroxy-4-acetoxybenzophenone, 2-hydroxy-4-methoxybenzophenone, 2,2'-di-hydroxy-4-methoxybenzophenone, 2,2'-di-hydroxy-4,4'-methoxy benzophenone, 2-hydroxy-4-n-octoxybenzophenone, 2-hydroxy-4-dodecyloxy benzophenone, and 2-hydroxy-4-(2-hydroxy-3-methacryloxy) propoxybenzophenone. Examples of the benzotriazole-base UV absorber include 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, 2-(2'-hydroxy-3',5'-di-tert-butylphenyl)-5-chlorobenzotriazole, and 2-(2'-hydroxy-5'-tert-octylphenyl)benzotriazole. The salicylic ester-base ones can be exemplified by phenylsalycilate, p-octylphenylsalycilate, and p-tert-butylphenylsalycilate. Among these UV absorbers exemplified in the above, 2-hydroxy-4-methoxy benzophenone, 2,2'-di-hydroxy-4,4'-methoxy benzophenone, 2-(2'-hydroxy-3'-tert-butyl-5'-methyl phenyl)-5-chlorobenzotriazole, 2-(2'-hydroxy-5'-tert-butylphenyl) benzotriazole, 2-(2'-hydroxy-3',5'-di-tert-amylphenyl) benzotriazole, and 2-(2'-hydroxy-3',5'-di-tert-butylphenyl)-5-chlorobenzotriazole are particularly preferable.

It is preferable to use a plurality of UV absorbers differing in the absorption wavelength in combination, in view of obtaining an excellent interception effect over a broad wavelength range. The UV absorber for use in liquid crystal display device is preferably such as being excellent in absorptivity of ultraviolet radiation of 370 nm or shorter in view of preventing degradation thereof, and such as showing a small absorption of visible light of 400 nm or longer in view of display quality. Particularly preferable examples of the UV absorber include the above-described benzotriazole-base compounds, benzophenone-base compounds, and salicylic acid ester-base compounds. Among these, benzotriazole-base compounds are preferable because they are less causative of unnecessary coloring of the cellulose ester.

As the UV absorber, it is also allowable to adopt the compounds described in Japanese Laid-Open Patent Publication Nos. S60-235852, H3-199201, H5-194789, H5-271471, H6-107854, H6-118233, H6-130226, H6-148430, H7-11055, H7-11056, H8-29619, H8-239509, and 2000-204173.

Amount of addition of the UV absorber is preferably 0.001 to 5% by mass of cellulose acylate, and more preferably 0.01 to 1% by mass. The amount of addition of less than 0.001% by mass may fail in fully exhibiting effects of addition, and the amount of addition exceeding 5% by mass may cause bleeding-out of the UV absorber onto the film surface.

The UV absorber may be added while cellulose acylate is dissolved, or may be added to a dope after dissolution. A mode of embodiment wherein an UV absorber solution is added to the dope immediately before casting, using a static mixer or the like, is particularly preferable in view of readily adjusting the spectral absorption property.

The anti-degradation agent can prevent the cellulose triacetate and so forth from degrading and decomposing. Examples of the anti-degradation agent include butylamine, hindered amine compounds (Japanese Laid-Open Patent Publication No. H8-325537), guanidine compound (Japanese Laid-Open Patent Publication No. H5-271471), benzotriazole-base UV absorber (Japanese Laid-Open Patent Publication No. H6-235819), and benzophenone-base UV absorber (Japanese Laid-Open Patent Publication No. H6-118233).

The plasticizer is preferably phosphate ester and carboxylate ester. The plasticizer is more preferably selected from triphenyl phosphate (TPP), tricresyl phosphate (TCP), cresyl diphenyl phosphate, octyldiphenyl phosphate, biphenyl-diphenyl phosphate (BDP), trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), O-acetyl-triethyl citrate (OACTE), O-acetyl tributyl citrate (OACTB), acetyltriethyl citrate, acetyltributyl citrate, butyl oleate, methylacetyl ricinolate, dibutyl sebacate, triacetin, tributylin, butylphthalylbutyl glycolate, ethylphthalylethyl glycolate, methylphthalylethyl glycolate and butylphthalylbutyl glycolate. The plasticizer is still more preferably any of (di)pentaerythritol esters, glycerol esters and diglycerol esters.

The releasing aid can be exemplified by ethyl esters of citric acid. The IR absorbing agent is preferably any of those disclosed in Japanese Laid-Open Patent Publication No. 2001-194522. The infrared absorbers are those described in Japanese Laid-Open Patent Publication No. 2001-194522.

According to the invention, one or more types of dyes may be employed for controlling hue. The amount of the dye is preferably from 10 to 1000 ppm and more preferably from 50 to 500 ppm with respect to the mass of cellulose acylate. With the addition of dye, the light piping of the cellulose acylate film can be reduced and the yellow coloration of the film can be also reduced. Such compound may be added to ingredients such as cellulose acylate or solvent to prepare the cellulose acylate solution, or to the prepared cellulose acylate solution. It can be also added to a ultra-violet absorbent solution to be subjected to an in-line addition.

The dye, which can be employed in the invention, is preferably selected from a formula (1) or (2).

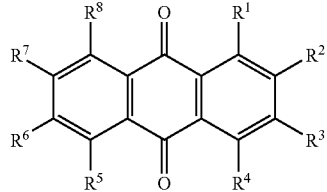

Formula (1)

In the formula (1), $R^1$, $R^2$, $R^3$, $R^4$, $R^5$, $R^6$, $R^7$ and $R^8$ respectively represent a hydrogen atom, hydroxy, aliphatic group, aromatic group, heterocyclic group, halogen atom, cyano, nitro, —$COR^9$, —$COOR^9$, —$NR^9R^{10}$, —$NR^{10}COR^{11}$, —$NR^{10}SO_2R^{11}$, —$CONR^9R^{10}$, —$SO^2NR^9R^{10}$, —$COR^{11}$, —$SO^2R^{11}$, —$OCOR^{11}$, —$NR^9CONR^{10}R^{11}$, —$CONHSO^2R^{11}$ or —$SO^2NHCOR^{11}$ where $R^9$ and $R^{10}$ respectively represent a hydrogen atom, aliphatic group, aromatic group or heterocyclic group, and $R^{11}$ represents an aliphatic, aromatic or heterocyclic group. $R^9$ and $R^{10}$ may bind to each other to from a five- or six-membered ring; and $R^1$ and $R^2$ or $R^2$ and $R^3$ may respectively bind to each other to form a ring.

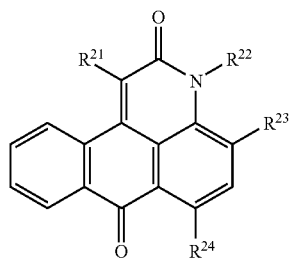

Formula (2)

In the formula (2), $R^{21}$, $R^{23}$ and $R^{24}$ respectively represent a hydrogen atom, hydroxy, nitro, cyano, aliphatic group, aromatic group —$COR^{29}$, —$COOR^{29}$, —$NR^{29}R^{30}$, —$NR^{30}COR^{31}$ or —$NR^{30}SO_2R^{31}$ where $R^{22}$ represents an aliphatic or aromatic group, each of $R^{29}$ and $R^{30}$ has a same definition of each of $R^9$ and $R^{10}$ in the formula (1), $R^{31}$ has a same definition of $R^{11}$ in the formula (1); provided that at least one of $R^{21}$, $R^{22}$, $R^{23}$ and $R^{24}$ is other than hydrogen.

At first, each group in the formula (1) will be described in detail.

Examples of the aliphatic group respectively represented by $R^1$ to $R^{11}$ include $C_{1-20}$ alkyls such as methyl, ethyl, n-butyl, isopropyl, 2-ethylhexyl, n-decyl and n-octadecyl; $C_{1-20}$ cycloalkyls such as cyclopentyl and cyclohexyl; and allyls. The aliphatic group may have at least one substituent such as a halogen atom (e.g., F, Cl, Br or I), hydroxy, cyano, nitro, carboxyl, $C_{6-10}$ aryl (e.g., phenyl or naphthyl), $C_{0-20}$ amino (e.g., $NH_2$, $NHCH_3$, $N(C_2H_5)_2$, $N(C_4H_9)_2$, $N(C_8H_{17})_2$, aniline or 4-methoxyanilino), $C_{1-20}$ amido (e.g., acetylamino, hexanoylamino, benzoylamino or octadecanoylamino), $C_{1-20}$ carbamoyl (e.g., non-substituted carbamoyl, methylcarbamoyl, ethylcarbamoyl, octylcarbamoyl or hexadecylcarbamoyl), $C_{2-20}$ ester (e.g., methoxycarbonyl, ethoxycarbonyl, phenoxycarbonyl, n-butoxycarbonyl and dodecyloxycarbonyl), $C_{1-20}$ alkoxy or aryloxy (e.g., methoxy, ethoxy, butoxy, isopropoxy, benzoyloxy, phenoxy and octadecyloxy), $C_{1-20}$ sulfonamido (e.g., methane sulfonamido, ethane sulfonamido, butane sulfonamide, benzene sulfonamide and octane sulfonamide), $C_{0-20}$ sulfamoyl (e.g., substituted sulfamoyl, methylsulfamoyl, butylsulfamoyl and decylsulfamoyl), and five- or six-membered heterocyclic group (e.g., pyridyl, pyrazolyl, morpholino, piperidino, pyrrolino and benzoxazolyl).

Examples of the aromatic group respectively represented by $R^1$ to $R^{11}$ include $C_{6-10}$ aryls such as phenyl and naphthyl. The aromatic group may have at least one substituent selected from those exemplified above as a substituent for the aliphatic group and $C_{1-20}$ alkyls (e.g., methyl, ethyl, t-butyl and octyl).

Examples of the heterocyclic group respectively represented by $R^1$ to $R^{11}$ include five- or six-membered heterocyclic groups such as pyridine, piperidine, morpholine, pyrrolizine, pyrazole, pyrazolidine, pyrazoline, pyrazolone and benzoxazole. The heterocyclic group may have at least on substituent selected from those above as a substituent for the aromatic group.

Examples of the five- or six-membered ring, which is formed by union between $R^9$ and $R^{10}$, include a morpholine ring, piperidine ring and pyrrolizine ring. Preferred examples of the ring, which is formed by union between $R^1$ and $R^2$ or $R^2$ and $R^3$, include five- or six-membered rings such as a benzene ring or a phthalimide ring.

Next, each group in the formula (2) will be described in detail.

The aliphatic group respectively represented by $R^{21}$ to $R^{24}$ has a same meaning as that of the aliphatic group respectively represented by $R^1$ to $R^{11}$ in the formula (1). The aromatic group respectively represented by $R^{21}$ to $R^{24}$ has a same meaning as that of the aromatic group respectively represented by $R^1$ to $R^{11}$ in the formula (1).

Such additives may be added to other ingredients at any times during the preparation of a dope, or may be added to those during the last step of the preparation a dope. The amount of each additive is not to be limited to any range as far as it can develop its function. When multiple-layered cellulose acylate film is produced, the amount and/or type of each additive in each layer may be same or different. The technique described in JPA No. 2001-151902 ahs been known, and can be employed in the invention. The glass transition point, Tg, of the cellulose acylate film, which is measured with a dynamic viscoelasticity measuring instrument (e.g., ハイテ゛ィスハ゛イ"DVA-225" manufacture by ITK Co.), is preferably from 70 to 150° C., and more preferably from 80 to 135° C. The cellulose acylate film having the Tg falling within the above range is suitable for processes of producing polarizing plates or liquid crystal displays.

Examples of the additive, which can be used in the invention, also include those described on some pages from 16 of JIII Journal of Technical Disclosure No. 2001-1745, published by JIII, Japan Institute of Invention and Innovation, in Mar. 15, 2001).

(Retardation Enhancing Agent)

The retardation of the cellulose acylate film may be controlled so that the film can be used as a second optically anisotropic layer. In order to exhibit a desired retardation value, the cellulose acylate film preferably comprises a retardation enhancing agent.

The "retardation enhancing agent" in the description refers to an "additive" capable of increasing Rth value of a cellulose acylate film by more than or equal to 0.11, preferably 0.2, and more preferably 0.3, per 1 micrometer thickness of the film when being added to the film in the amount of one mass part with respect to 100 mass parts of the polymer ingredient of the film.

The retardation enhancing agent to be used in the invention may be selected from rod-like or discotic compounds.

The retardation enhancing agent is preferably a compound having at least two aromatic rings. The rod-like retardation enhancing agent is preferably used in an amount ranging from 0.1 to 30 parts by mass per 100 parts of polymer, and more preferably in an amount ranging from 0.5 to 20 parts by mass.

The discotic retardation enhancing agent is preferably used in an amount ranging from 0.05 to 30 parts by mass per 100 parts of polymer, more preferably in an amount ranging from 0.2 to 15 parts by mass, and still more preferably in an amount ranging from 0.5 to 10 parts by mass.

Discotic compounds are superior to rod-like compounds in the terms of enhancing Rth retardation, and are preferably employed in preparing films required to exhibit large Rth. One or more types of retardation enhancing agents may be used in combination with another type.

The rod-like or discotic retardation enhancing agent preferably shows a maximum absorption in a wavelength region from 250 to 400 nm, but shows substantially no absorption in the visible light region.

At first, the discotic retardation enhancing agent will be explained in detail.

The discotic retardation enhancing agent may be selected from compounds having at least two aromatic rings.

In the description, the term "aromatic ring" is used for any aromatic hetero rings, in addition to the aromatic hydrocarbon rings.

The aromatic hydrocarbon ring is preferably a six-membered ring (i.e., benzene ring).

The aromatic hetero ring is generally an unsaturated hetero ring. The aromatic hetero ring is preferably a five-membered ring, six-membered ring or seven-membered ring, and more preferably five-membered ring or six-membered ring. The aromatic hetero ring generally has a possible largest number of double bonds. Hetero atom is preferably a nitrogen atom, oxygen atom or sulfur atom, and more preferably a nitrogen atom. Examples of the aromatic hetero ring include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring, 1,3,5-triazine ring.

The aromatic ring is preferably any of benzene ring, furan ring, thiophene ring, pyrrole ring, oxazole ring, thiazole ring, imidazole ring, triazole ring, pyridine ring, pyrimidine ring, pyrazine ring and 1,3,5-triazine ring, and in particular 1,3,5-triazine ring is preferably used. More specifically, the compounds disclosed, for example, in Japanese Laid-Open Patent Publication No. 2001-166144 is preferably used.

The number of aromatic rings owned by the retardation enhancing agent is preferably 2 to 20, more preferably 2 to 12, much more preferably 2 to 8, and still more preferably 2 to 6.

Relations of bonding of two aromatic rings can be classified into (a) formation of a condensed ring, (b) direct bonding via a single bond, and (c) bonding via a coupling group (aromatic rings cannot form a spiro bond). The relation may be any of the relations of bondings (a) to (c).

Examples of (a) condensed ring (condensed ring composed of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, phenoxazine ring and thianthrene ring. Preferable are naphthalene ring, azulene ring, indole ring, benzooxazole ring, benzothiazole ring, benzoimidazole ring, benzotriazole ring and quinoline ring.

The single bond for (b) is preferably a bond between carbon atoms of two aromatic rings. Two aromatic rings may bind to each other via two or more single bonds, and, in such a case, an aliphatic or non-aromatic hetero ring may be placed between the two aromatic rings.

Also the coupling group for (c) preferably binds carbon atoms of two aromatic rings. The coupling group is preferably any of alkylene group, alkenylene group, alkynylene group, —CO—, —O—, —NH—, —S—, or any combinations of them. Examples of the coupling groups based on such combinations will be shown below. The left-hand side and the right-hand side of the coupling groups below may be inverted:

c1: —CO—O—;
c2: —CO—NH—;
c3: -alkylene-O—;
c4: —NH—CO—NH—;
c5: —NH—CO—O—;
c6: —O—CO—O—;
c7: —O-alkylene-O—;
c8: —CO-alkenylene-;
c9: —CO-alkenylene-NH—;
c10: —CO-alkenylene-O—;
c11: -alkylene-CO—O-alkylene-O—CO-alkylene-;
c12: —O-alkylene-CO—O-alkylene-O—CO-alkylene-O—;
c13: —O—CO-alkylene-CO—O—;
c14: —NH—CO-alkenylene-; and
c15: —O—CO-alkenylene-.

The aromatic ring and the coupling group may have a substituent group.

Examples of the substituent group include halogen atom (F, Cl, Br, I), hydroxyl, carboxyl, cyano, amino, nitro, sulfo, carbamoyl, sulfamoyl, ureido, alkyl group, alkenyl group, alkynyl group, aliphatic acyl group, aliphatic acyloxy group, alkoxy group, alkoxycarbonyl group, alkoxycarbonylamino group, alkylthio group, alkylsulfonyl group, aliphatic amido group, aliphatic sulfonamide group, aliphatic substituted amino group, aliphatic substituted carbamoyl group, aliphatic substituted sulfamoyl group, aliphatic substituted ureido group and non-aromatic heterocyclic group.

The number of carbon atoms of the alkyl group is preferably 1 to 8. Chain-formed alkyl group is more preferable than cyclic alkyl group, and straight-chain-formed alkyl group is particularly preferable. The alkyl group may further have a substituent group (e.g., hydroxy, carboxy, alkoxy group, alkyl substituted amino group). Examples of the alkyl group (substituted alkyl group also included) include methyl, ethyl, n-butyl, n-hexyl, 2-hydroxyethyl, 4-carboxybutyl, 2-methoxyethyl and 2-diethylaminoethyl groups.

The number of carbon atoms of the alkenyl group is preferably 2 to 8. Chain-formed alkenyl group is more preferable than cyclic alkenyl group, and straight-chain-formed alkenyl group is particularly preferable. The alkenyl group may further has a substituent group. Examples of the alkenyl group include vinyl, allyl, 1-hexenyl groups.

The number of carbon atoms of the alkynyl group is preferably 2 to 8. Chain-formed alkynyl group is more preferable than cyclic alkynyl group, and straight-chain alkynyl group is particularly preferable. The alkynyl group may further have a substituent group. Examples of the alkynyl group include ethynyl, 1-butynyl and 1-hexynyl groups.

The number of carbon atoms of the aliphatic acyl group is preferably 1 to 10. Examples of the aliphatic acyl group include acetyl, propanoyl and butanoyl groups.

The number of carbon atoms of the aliphatic acyloxy group is preferably 1 to 10. Examples of the aliphatic acyloxy group include acetoxy group.

The number of carbon atoms of the alkoxy group is preferably 1 to 8. The alkoxy group may further have a substituent group (e.g., alkoxy group). Examples of the alkoxy group (including substituted alkoxy group) include methoxy, ethoxy, butoxy and methoxyethoxy groups.

The number of carbon atoms of the alkoxycarbonyl group is preferably 2 to 10. Examples of the alkoxycarbonyl group include methoxycarbonyl and ethoxycarbonyl groups.

The number of carbon atoms of the alkoxycarbonylamino group is preferably 2 to 10. Examples of the alkoxycarbonylamino group include methoxycarbonylamino and ethoxycarbonylamino groups.

The number of carbon atoms of the alkylthio group is preferably 1 to 12. Examples of the alkylthio group include methylthio, ethylthio and octylthio groups.

The number of carbon atoms of the alkylsulfonyl group is preferably 1 to 8. Examples of the alkylsulfonyl group include methane sulfonyl and ethane sulfonyl groups.

The number of carbon atoms of the aliphatic amido group is preferably 1 to 10. Examples of the aliphatic amido group include acetamido group.

The number of carbon atoms of the aliphatic sulfonamide group is preferably 1 to 8. Examples of the aliphatic sulfonamide group include methane sulfonamide, butane sulfonamide and n-octane sulfonamide groups.

The number of carbon atoms of the aliphatic substituted amino group is preferably 1 to 10. Examples of the aliphatic substituted amino group include dimethylamino, diethylamino and 2-carboxyethylamino groups.

The number of carbon atoms of the aliphatic substituted carbamoyl group is preferably 2 to 10. Examples of the aliphatic substituted carbamoyl group include methylcarbamoyl and diethylcarbamoyl groups.

The number of carbon atoms of the aliphatic substituted sulfamoyl group is preferably 1 to 8. Examples of the aliphatic substituted sulfamoyl group include methylsulfamoyl and diethylsulfamoyl groups.

The number of carbon atoms of the aliphatic substituted ureido group is preferably 2 to 10. Examples of the aliphatic substituted ureido group include methylureido group.

Examples of the non-aromatic heterocyclic group include piperidino and morpholino groups.

Molecular weight of the retardation enhancing agent preferably falls in a range from 300 to 800.

Besides the discotic compounds, any rod-like compounds having linear molecular structures can be used in the present invention. Linear molecular structure herein means that a rod-like compound has a linear molecular structure in its most stable state in a thermodynamic sense. The thermodynamically most stable structure can be obtained by crystal structure analysis or the molecular orbital calculation. For example, it is possible to carry out molecular orbital calculation using a molecular orbital calculation software (e.g., WinMOPAC2000 from FUJITSU, Japan) to thereby determine a molecular structure producible with a minimum heat of generation. Linear molecular structure means that the principal chain composing the molecular structure forms an angle of 140° or larger in its most stable thermodynamic state obtained by calculation as described in the above.

The rod-like compound having at least two aromatic rings is preferably selected from those expressed by the formula (3) shown below.

$$Ar^1-L^1-Ar^2 \qquad \text{Formula (3)}$$

In the formula (3), $Ar^1$ and $Ar^2$ respectively represent an aryl group (aromatic hydrocarbon group), substituted aryl group, aromatic heterocyclic group or substituted aromatic heterocyclic group. The substituted or non-substituted aryl group is more desirable than substituted or non-substituted aromatic heterocyclic group. Hetero rings embedded in aromatic heterocyclic groups are generally unsaturated. The aromatic hetero-ring is preferably selected from five-, six- or seven-membered rings, more preferably from five- or six-membered rings. Aromatic hetero-rings generally have a maximum number of double bonds. One or more hetero atoms embedded in the ring are preferably nitrogen, oxygen or sulfur atoms, and more preferably nitrogen or sulfur atoms.

Preferred examples of the aromatic ring embedded in the aromatic group include benzene ring, furan ring, thiophene ring, pyrrole ring, oxazole ring, thiazole ring, imidazole ring, triazole ring, pyridine ring, pyrimidine ring and pyrazine ring. Benzene ring is more preferred.

Examples of the substituent of the substituted aryl or aromatic heterocyclic group include halogen atoms (e.g., F, Cl, Br and I), hydroxyl, carboxyl, cyano, amino, alkylaminos (e.g., methylamino, ethylamino, butylamino and dimethylamino), nitro, sulfo, carbamoyl, alkylcarbamoyls (e.g., N-methylcarbamoyl, N-ethylcarbamoyl and N,N-dimethylcarbamoyl), sulfamoyl, alkylsulfamoyls (e.g., N-methylsulfamoyl, N-ethylsulfamoyl and N,N-dimethylsulfamoyl), ureido, alkylureidos (e.g., N-methylureido, N,N-dimethylureido and N,N,N'-trimethylureido), alkyls (e.g., methyl, ethyl, propyl, butyl, pentyl, heptyl, octyl, isopropyl, s-butyl, t-amyl, cyclohexyl and cyclopentyl), alkenyls (e.g., vinyl, allyl and hexenyl), alkynyls (e.g., ethynyl and butynyl), acyls (e.g., formyl, acetyl, butyryl, hexanoyl and lauryl), acyloxys (e.g., acetoxy, butyryloxy, hexanoyloxy and lauryloxy), alkoxys (e.g., methoxy, ethoxy, propoxy, butoxy, pentyloxy, heptyloxy and octyloxy), aryloxys (e.g., phenoxy), alkoxycarbonyls (e.g., methoxycarbonyl, ethoxycarbonyl, propoxycarbonyl, butoxycarbonyl, pentyloxycarbonyl and heptyloxycarbonyl), aryloxycarbonyl (e.g., phenoxycarbonyl), alkoxycarbonylaminos (e.g., butoxycarbonylamino and hexyloxycarbonylamino), alkylthio (e.g., methylthio, ethylthio, propylthio, butylthio, pentylthio, heptylthio and octylthio), arylthios (e.g., phenylthio), alkylsulfonyls (e.g., methylsulfonyl, ethylsulfonyl, propylsulfonyl, butylsulfonyl, pentylsulfonyl, heptylsulfonyl, pentylsulfonyl and octylsulfonyl), amidos (e.g., acetoamido, butylamido, hexylamido and laurylamido) and non-aromatic heterocyclic groups (e.g., molpholino and pyrazinyl).

Among those, halogen atoms, cyano, carboxyl, hydroxyl, amino, alkylaminos, acyls, acyloxys, amidos, alkoxycarbonyls, alkoxys, alkylthios and alkyls are preferred as a substituent of the substituted aryl or aromatic heterocyclic group.

The alkyl group and alkyl portion embedded in the alkylamino, alkoxycarbonyl, alkoxy or alkylthio group may have at least one substituent. Examples of the substituent of the alkyl group or the alkyl portion include halogen atoms, hydroxyl, carboxyl, cyano, amino, alkylamino, nitro, sulfo, carbamoyl, alkylcarbamoyls, sulfamoyl, alkylsulfamoyls, ureido, alkylureidos, alkenyls, alkynyls, acyls, acyloxys, acylaminos, alkoxys, aryloxys, alkoxycarbonyls, aryloxycarbonyls, alkoxycarbonylaminos, alkylthios, arylthios, alkylsulfonyls, amido and non-aromatic heterocyclic groups. Among those, halogenatoms, hydroxyl, amino, alkylaminos, acyls, acyloxys, acylaminos, alkoxycarbonyls and alkoxys are preferred as a substituent of the alkyl group or the alkyl portion.

In the formula (3), L1 represents a divalent linking group selected from alkylenes, alkenylenes, alkynylenes, —O—, —CO— or any combinations thereof.

The alkylene may have a chain structure. Cyclohexylene is preferred and 1,4-cyclohexylene is more preferred as a cyclic alkylene. Among alkylene having a chain structure, linear chain alkylenes are more desirable than branched chain alkylenes.

The number of carbon atoms of the alkylene group is preferably 1 to 20, more preferably from 1 to 15, much more preferably from 1 to 10, still more preferably from 1 to 8, and most preferably from 1 to 6.

Chain-formed alkenylene or alkynylene group is more preferable than cyclic alkenylene or alkynylene group, and straight-chain-formed alkenylene or alkynylene group is particularly preferable.

The number of carbon atoms of the alkenylene or alkynylene group is preferably 2 to 10, more preferably from 2 to 8, much more preferably from 2 to 6, still much more preferably from 2 to 4 and most preferably 2 (e.g., vinylene or ethynylene).

The number of carbon atoms of the arylene group is preferably 6 to 20, more preferably from 6 to 16 and much more preferably from 6 to 12.

In the molecular structure of the formula (3), the angle formed between $Ar^1$ and $Ar^2$ linking each other via $L^1$ is preferably greater than or equal to 140 degree.

The rod-like compounds can be prepared by the methods described in various literatures such as Mol. Cryst. Liq. Cryst., vol. 53, p. 229 (1979); ditto Vol. 89, p. 93 (1982), ditto Vol. 145, p. 111 (1987), ditto Vol. 170, p. 43 (1989), J. Am. Chem. Soc., Vol. 113, p. 1349 (1991), ditto Vol. 118, p. 5346 (1996), ditto Vol. 92, p. 1582 (1970), J. Org. Chem., Vol. 40, p. 420 (1975), and Tetrahedron, Vol. 48, No. 16, p. 3437 (1992).

It is more preferred that the rod-like compound represented by a formula (4) shown below is used as a retardation enhancing agent.

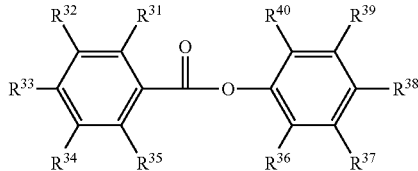

Formula (4)

In the formula (4), $R^{31}$, $R^{32}$, $R^{33}$, $R^{34}$, $R^{35}$, $R^{36}$, $R^{37}$, $R^{39}$ and $R^{40}$ respectively represent a hydrogen atom or a substituent, provided that at least one of $R^{31}$, $R^{32}$, $R^{33}$, $R^{34}$ and $R^{35}$ represents an electron-releasing substituent. $R^{38}$ represents a hydrogen atom, $C_{1-4}$ alkyl, $C_{2-6}$ alkynyl, $C_{6-12}$ aryl, $C_{1-12}$ alkoxy, $C_{6-12}$ aryloxy, $C_{2-12}$ alkoxycarbonyl, $C_{2-12}$ acylamino, cyano, or halogen atom.

The substituent respectively represented by $R^{31}$, $R^{32}$, $R^{33}$, $R^{34}$, $R^{35}$, $R^{36}$, $R^{37}$, $R^{39}$ and $R^{40}$ may be selected from the Substituent Group T described later.

At least one of $R^{31}$, $R^{32}$, $R^{33}$, $R^{34}$ and $R^{35}$ represents an electron-releasing substituent. Preferably, one of $R^{31}$, $R^{33}$ and $R^{35}$ is an electron-releasing substituent, and, more preferably, $R^{33}$ is an electron-releasing substituent.

The term "electron-releasing substituent" means a substituent showing Hammet's σp value of less than or equal to 0, and examples described in Chem. Rev., 91, 165 (1991) are preferred. The substituent showing Hammet's σp varying from −0.85 to 0 are more preferred. Examples of such a substituent include alkyls, alkoxys, aminos and hydroxy.

As an electron-releasing substituent, alkyls and alkoxys are preferred, and alkoxys (preferably $C_{1-12}$, more preferably $C_{1-8}$, much more preferably $C_{1-6}$ or still much more preferably $C_{1-4}$ alkoxys) are more preferred.

$R^{31}$ preferably represents a hydrogen atom or an electron-releasing substituent; more preferably an alkyl, alkoxy, amino or hydroxy; much more preferably a $C_{1-4}$ alkyl or $C_{1-12}$ alkoxy; still much more preferably a $C_{1-12}$ alkoxy (more preferably $C_{1-8}$, much more preferably $C_{1-6}$, still much more preferably $C_{1-6}$ and especially preferably $C_{1-4}$ alkoxy); and most preferably methoxy.

$R^{32}$ preferably represents a hydrogen atom, alkyl, alkoxy, amino or hydroxy; more preferably a hydrogen atom, alkyl or alkoxy; much more preferably a hydrogen atom, $C_{1-4}$ alkyl such as methyl or $C_{1-12}$ (more preferably $C_{1-8}$, much more preferably $C_{1-6}$ and still much more preferably $C_{1-4}$) alkoxy; and most preferably methyl or methoxy.

$R^{33}$ preferably represents a hydrogen atom or an electron-releasing substituent; more preferably a hydrogen atom, an alkyl, alkoxy, amino or hydroxy; much more preferably an alkyl or alkoxy; and still much more preferably a $C_{1-12}$ alkoxy (more preferably $C_{1-8}$, much more preferably $C_{1-6}$, still much more preferably $C_{1-6}$ and especially preferably $C_{1-4}$ alkoxy); and most preferably propoxy, ethoxy or methoxy.

$R^{34}$ preferably represents a hydrogen atom or an electron-releasing substituent; more preferably a hydrogen atom, an alkyl, alkoxy, amino or hydroxy; much more preferably a $C_{1-4}$ alkyl or $C_{1-12}$ alkoxy (more preferably $C_{1-8}$, much more preferably $C_{1-6}$, still much more preferably $C_{1-6}$ and especially preferably $C_{1-4}$ alkoxy); and most preferably a hydrogen atom, methyl or methoxy.

$R^{35}$ preferably represents a hydrogen atom, alkyl, alkoxy, amino or hydroxy; more preferably a hydrogen atom, alkyl or alkoxy; much more preferably a hydrogen atom, $C_{1-4}$ alkyl such as methyl or $C_{1-12}$ (more preferably $C_{1-8}$, much more preferably $C_{1-6}$, and still much more preferably $C_{1-4}$) alkoxy; and most preferably a hydrogen atom, methyl or methoxy.

$R^{36}$, $R^{37}$, $R^{39}$ and $R^{40}$ respectively represent a hydrogen atom, a $C_{1-12}$ alkyl, $C_{1-12}$ alkoxy or halogen atom; more preferably a hydrogen atom or halogen atom; and much more preferably a hydrogen atom.

$R^{38}$ represents a hydrogen atom, $C_{1-4}$ alkyl, $C_{2-6}$ alkynyl, $C_{6-12}$ aryl, $C_{1-12}$ alkoxy, $C_{6-12}$ aryloxy, $C_{2-12}$ alkoxycarbonyl, C2-12 acylamino, cyano or halogen atom; and, if possible, further have at least one substituent selected from the Substituent Group T described later.

$R^{38}$ preferably represents a $C_{1-4}$ alkyl, $C_{2-6}$ alkynyl, $C_{6-12}$ aryl, $C_{1-12}$ alkoxy or $C_{6-12}$ aryloxy; more preferably a $C_{6-12}$ aryl, $C_{1-12}$ alkoxy or $C_{6-12}$ aryloxy; much more preferably $C_{1-12}$ alkoxy (more preferably $C_{1-8}$, much more preferably $C_{1-6}$, still much more preferably $C_{1-6}$ and especially preferably $C_{1-4}$ alkoxy); and most preferably methoxy, ethoxy, n-propoxy, isopropoxy or n-butoxy.

Preferred embodiment of the formula (4) is a formula (4-A) shown below.

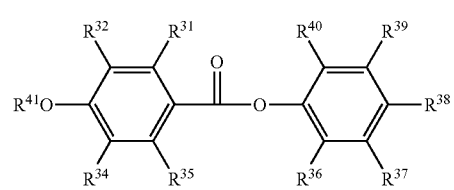

Formula (4-A)

In the formula (4-A), $R^{41}$ represents an alkyl; and $R^{31}$, $R^{32}$, $R^{34}$, $R^{35}$, $R^{36}$, $R^{37}$, $R^{39}$ and $R^{40}$ respectively represent a hydrogen atom or substituent. $R^{38}$ represents a hydrogen atom, $C_{1-4}$ alkyl, $C_{2-6}$ alkynyl, $C_{6-12}$ aryl, $C_{1-12}$ alkoxy, $C_{6-12}$ aryloxy, $C_{2-12}$ alkoxycarbonyl, $C_{2-12}$ acylamino, cyano or halogen atom.

In the formula (4-A), $R^{31}$, $R^{32}$, $R^{34}$, $R^{35}$, $R^{36}$, $R^{37}$, $R^{39}$ and $R^{40}$ are same as those in the formula (4), and their preferred examples are also same as those in the formula (4).

In the formula (4-A), $R^{41}$ represents a $C_{1-12}$ alkyl. The alkyl may be selected from linear or branched chain alkyls, and have at least one substituent. $R^{41}$ preferably represents a $C_{1-8}$, more preferably $C_{1-6}$, and much more preferably $C_{1-4}$ alkyl such as methyl, ethyl, n-propyl, iso-propyl, n-butyl, iso-butyl and tert-butyl.

Another preferred embodiment of the formula (4) is a formula (4-B) shown below.

Formula (4-B)

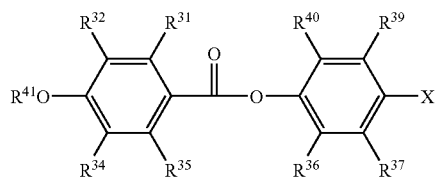

In the formula (4-B), $R^{31}$, $R^{32}$, $R^{34}$, $R^{35}$, $R^{36}$, $R^{37}$, $R^{39}$ and $R^{40}$ respectively represent a hydrogen atom or substituent. $R_{41}$ represents a $C_{1-12}$ alkyl. X represents a $C_{1-4}$ alkyl, $C_{2-6}$ alkynyl, $C_{6-12}$ aryl, $C_{1-12}$ alkoxy, $C_{6-12}$ aryloxy, $C_{2-12}$ alkoxycarbonyl, $C_{2-12}$ acylamino, cyano or halogen atom.

In the formula (4-B), $R^{31}$, $R^{32}$, $R^{34}$, $R^{35}$, $R^{36}$, $R^{37}$, $R^{39}$ and $R^{40}$ are same as those in the formula (4), and their preferred examples are also same as those in the formula (4).

In the formula (4-B), $R^{41}$ is same as that in the formula (4-A), and its preferred examples are also same as those in the formula (4-A).

In the formula (4-B), X represents a $C_{1-4}$ alkyl, $C_{2-6}$ alkynyl, $C_{6-12}$ aryl, $C_{1-12}$ alkoxy, $C_{6-12}$ aryloxy, $C_{2-12}$ alkoxycarbonyl, $C_{2-12}$ acylamino, cyano or halogen atom.

When all of $R^{31}$, $R^{32}$, $R^{34}$ and $R^{35}$ are hydrogen atoms, X preferably represents a $C_{1-4}$ alkyl, $C_{2-6}$ alkynyl, $C_{6-12}$ aryl, $C_{1-12}$ alkoxy or $C_{6-12}$ aryloxy; more preferably a $C_{1-12}$ aryl, $C_{1-12}$ alkoxy or $C_{6-12}$ aryloxy; much more preferably a $C_{1-12}$ (more preferably $C_{1-8}$, much more preferably $C_{1-6}$ and still much more preferably $C_{1-4}$) alkoxy; still much more preferably methoxy, ethoxy, n-propoxy, iso-propoxy or n-butoxy.

When at least one of $R^{31}$, $R^{32}$, $R^{34}$ and $R^{35}$ is a substituent, X preferably represents a $C_{2-6}$ alkynyl, $C_{6-12}$ aryl, $C_{2-12}$ alkoxycarbonyl or cyano; more preferably a $C_{6-12}$ aryl such as phenyl, p-cyano phenyl and p-methoxy phenyl, a $C_{2-12}$ (more preferably $C_{2-6}$ or much more preferably $C_{2-4}$) alkoxycarbonyl such as methoxycarbonyl, ethoxycarbonyl and n-propoxycarbonyl or cyano; and much more preferably phenyl, methoxycarbonyl, ethoxycarbonyl, n-propoxycarbonyl or cyano.

Another preferred embodiment of the formula (4) is a formula (4-C).

Formula (4-C)

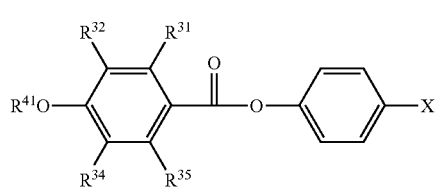

In the formula (4-C), $R^{31}$, $R^{32}$, $R^{34}$, $R^{35}$, $R^{41}$ and X are same as those in the formula (4-B), and their preferred examples are also same as those in the formula (4-B).

Another preferred embodiment of the formula (4) is a formula (4-D).

Formula (4-D)

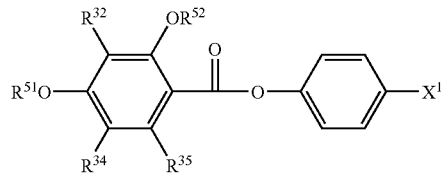

In the formula (4-D), $R^{32}$, $R^{34}$ and $R^{35}$ are same as those in the formula (4-C), and their preferred examples are also same as those in the formula (4-C). $R^{51}$ and $R^{52}$ respectively represent a $C_{1-4}$ alkyl. $X^1$ represents a $C_{6-12}$ aryl, a $C_{2-12}$ alkoxycarbonyl or cyano.

$R^{51}$ preferably represents a $C_{1-3}$ alkyl such as ethyl or methyl.

$R^{51}$ preferably represents a $C_{1-3}$ alkyl such as ethyl or methyl, and more preferably methyl.

$X^1$ preferably represents a $C_{6-10}$ aryl, a $C_{2-6}$ alkoxycarbonyl or cyano; more preferably phenyl, p-cyano phenyl, p-methoxy phenyl, methoxycarbonyl, ethoxycarbonyl, n-propoxycarbonyl or cyano; much more preferably phenyl, methoxycarbonyl, ethoxycarbonyl, n-propoxycarbonyl or cyano.

The most preferred embodiment of the formula (4) is a formula (4-E).

Formula (4-E)

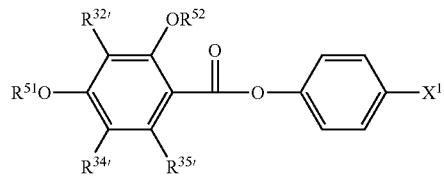

In the formula (4-E), $R^{32'}$, $R^{34'}$ and $R^{35'}$ respectively represent a hydrogen atom or substituent, provided that at least one represents —$OR^{43}$ where $R^{43}$ represents a $C_{1-4}$ alkyl. The scope of the substituent represented by $R^{32'}$, $R^{34'}$ or $R^{35'}$ and preferred examples of those are same as those described above. $R^{51}$, $R^{52}$ and $X^1$ are respectively same as those in the formula (4-D), and preferred examples of those are also same as those in the formula (4-D).

In the formula (4-E), at least one represents of $R^{32'}$, $R^{34'}$ and $R^{35'}$ represents —$OR^{43}$ where $R^{43}$ represents a $C_{1-4}$ alkyl; more preferably $R^{34'}$ or $R^{35'}$ is —$OR^{43}$; and much more preferably $R^{34'}$ is —$OR^{43}$.

$R^{43}$ preferably represents a $C_{1-3}$ alkyl, more preferably methyl or ethyl, and much more preferably methyl.

Substituent Group T includes alkyls (preferably $C_{1-20}$, more preferably $C_{1-12}$ or much more preferably $C_{1-8}$ alkyls) such as methyl, ethyl, iso-propyl, tert-butyl, n-octyl, n-decyl, n-hexadecyl, cyclopropyl, cyclopentyl and cyclohexyl; alkenyls (preferably $C_{2-20}$, more preferably $C_{2-12}$ or much more preferably $C_{2-8}$ alkenyls) such as vinyl, allyl, 2-buthenyl and 3-pentenyl; alkynyls (preferably $C_{2-20}$, more preferably $C_{2-12}$ or much more preferably $C_{2-8}$ alkynyls) such as propargyl and 3-pentenyl; aryls (preferably $C_{6-30}$, more preferably $C_{6-20}$ or much more preferably $C_{6-12}$ aryls) such as phenyl, p-methylphenyl and naphthyl; substituted or non-substituted aminos (preferably $C_{0-20}$, more preferably $C_{0-10}$ or much more preferably $C_{0-6}$ aminos) such as amino, methylamino, dimethylamino, diethylamino and benzylamino; alkoxys (preferably $C_{1-20}$, more preferably $C_{1-12}$ or much more preferably $C_{1-8}$ alkoxys) such as methoxy, ethoxy and butoxy; aryloxys (preferably $C_{6-20}$, more preferably $C_{6-16}$ or much more preferably $C_{6-12}$ aryloxys) such as phenyloxy and 2-naphthyloxy; acyls (preferably $C_{1-20}$, more preferably $C_{1-16}$ or much more preferably $C_{1-12}$ acyls) such as acetyl, benzoyl, formyl and pivaloyl; alkoxycarbonyls (preferably $C_{2-20}$, more preferably $C_{2-16}$ or much more preferably $C_{2-12}$ alkoxycarbonyls) such as methoxycarbonyl and ethoxycarbonyl; aryloxycarbonyls (preferably $C_{7-20}$, more preferably $C_{7-16}$ or much more preferably $C_{7-10}$ aryloxycarbonyls) such as phenyloxycarbonyl; acyloxys (preferably $C_{2-20}$, more preferably $C_{2-16}$ or much more preferably $C_{2-10}$ acyloxys) such as acetoxy and benzoyloxy; acylaminos (preferably $C_{2-20}$, more preferably $C_{1-16}$ and much more preferably $C_{2-10}$ acylaminos) such as acetylamino and benzoylamino; alkoxycarbonylaminos (preferably $C_{2-20}$, more preferably $C_{2-16}$ or much more preferably $C_{2-12}$ alkoxycarbonylaminos) such as methoxycarbonylamino; aryloxycarbonylaminos (preferably $C_{7-20}$, more preferably $C_{7-16}$ and much more preferably $C_{7-12}$ aryloxycarbonylaminos) such as phenyloxycarbonylamino; sulfonylaminos (preferably $C_{1-20}$, more preferably $C_{1-16}$ or much more preferably $C_{1-12}$ sulfonylaminos) such as methane sulfonylamino and benzene sulfonylamino; sulfamoyls (preferably $C_{0-20}$, more preferably $C_{0-16}$ or much more preferably $C_{0-12}$ sulfamoyls) such as sulfamoyl, methylsulfamoyl, dimethylsulfamoyl and phenylsulfamoyl; carbamoyls (preferably $C_{1-20}$, more preferably $C_{1-16}$ or much more preferably $C_{1-12}$ carbamoyls) such as carbamoyl, methylcarbamoyl, diethylcarbamoyl and phenylcarbamoyl; alkylthios (preferably $C_{1-20}$, more preferably $C_{1-16}$ and much more preferably $C_{1-12}$ alkylthios) such as methylthio and ethylthio; arylthios (preferably $C_{6-20}$, more preferably $C_{6-16}$ and much more preferably $C_{6-12}$ arylthios) such as phenylthio; sulfonyls (preferably $C_{1-20}$, more preferably $C_{1-16}$ and much more preferably $C_{1-12}$ sulfonyls) mesyl and tosyl; sulfinyls (preferably C1-20, more preferably C1-16 and much more preferably C1-12 sulfinyls) such as methanesulfinyl and benzene sulfinyl; ureidos (preferably $C_{1-20}$, more preferably $C_{1-16}$ and much more preferably $C_{1-12}$ ureidos) such as ureido, methylureido and phenylureido; amide phosphates (preferably $C_{1-20}$, more preferably $C_{1-16}$ and much more preferably $C_{1-12}$ amide phosphates) such as amide diethylphosphate and amide phenylphosphate; hydroxy, mercapto, halogen atoms such as fluorine, chlorine, bromine and Iodine atoms; cyano, sulfo, carboxyl, nitro, hydroxamic acid, sulfino, hydrazino, imino, heterocyclic groups (preferably $C_{1-30}$ and more preferably $C_{1-12}$ heterocyclic groups) such as imidazolyl, pyridyl, quinolyl, furyl, piperidyl, morpholino, benzoxazolyl, benzimidazolyl or benzthiazolyl; and silyl groups (desirably $C_{3-40}$, more desirably $C_{3-30}$ and much more desirably $C_{3-24}$ silyl groups) such as trimethylsilyl or triphenylsilyl. These substituents may be substituted by at least one substitutent selected from these. When two substituents are selected, they may be same or different each other. Two or more may, if possible, bond each other to form a ring.

Examples of the compound represented by the formula (4) include, but are not limited to, those shown below.

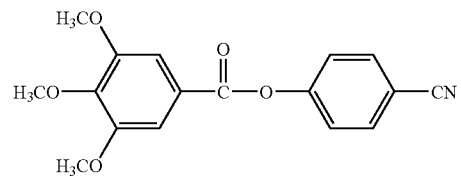

A-1

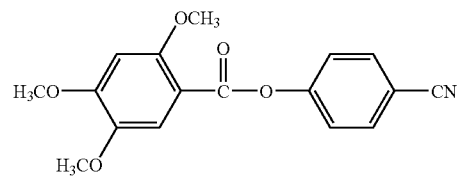

A-2

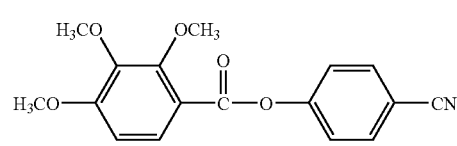

A-3

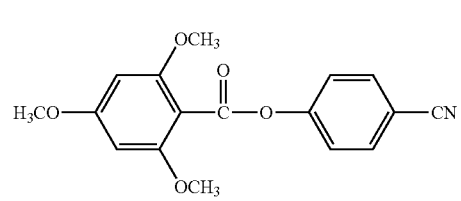

A-4

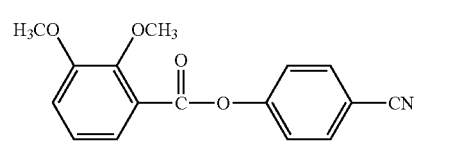

A-5

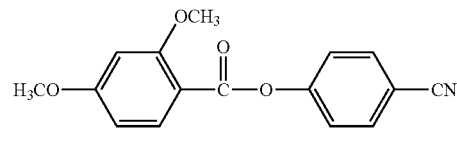

A-6

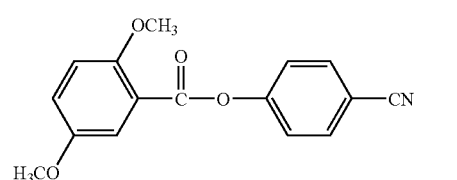

A-7

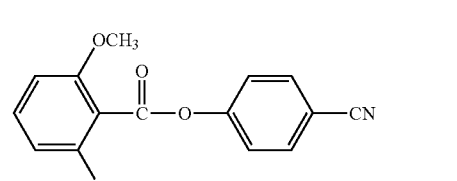

A-8

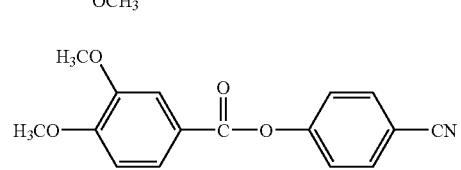

A-9

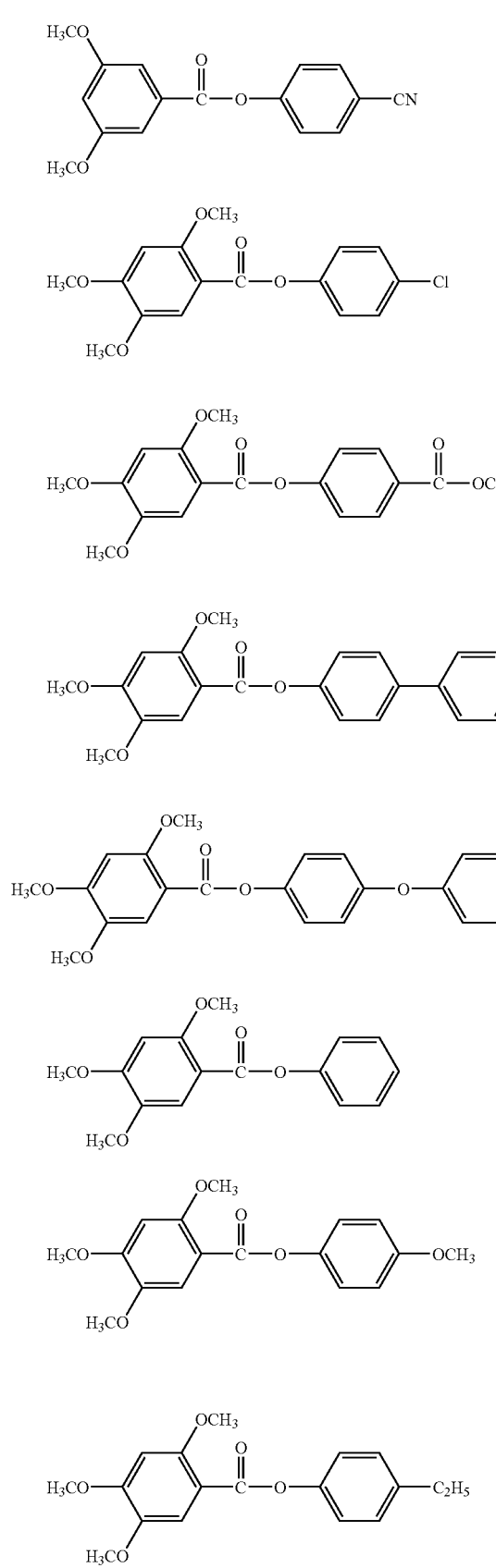
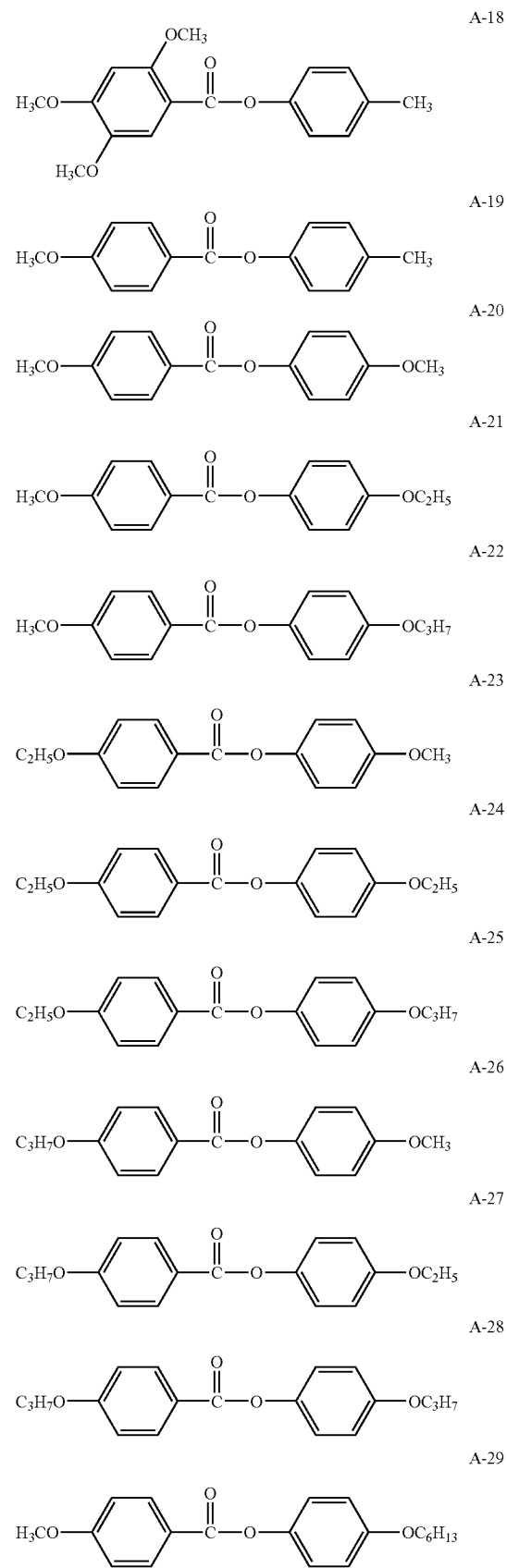

-continued
A-30
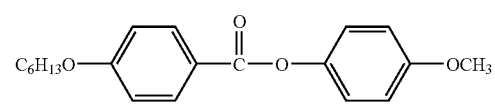
A-31
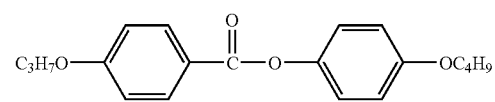
A-32
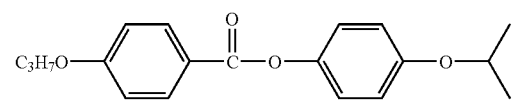
A-33
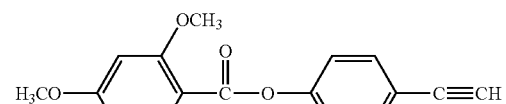
A-34
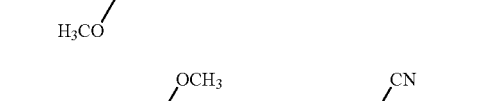
A-35
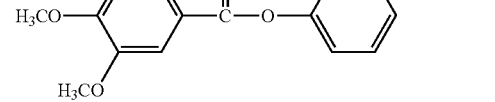
A-36
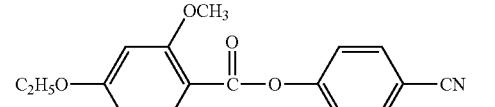
A-37
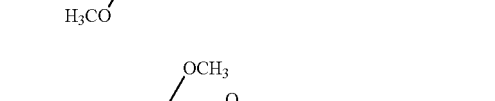
A-38
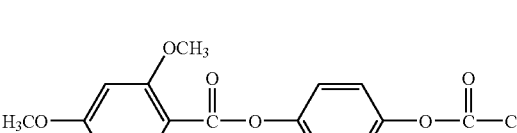
-continued
A-39
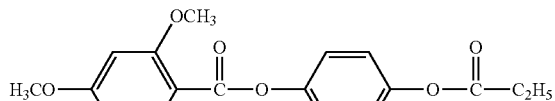
A-40
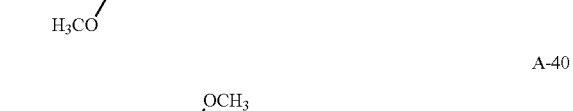
A-41
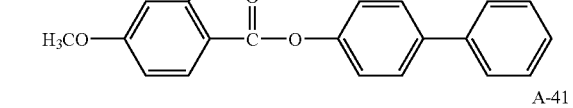
A-42
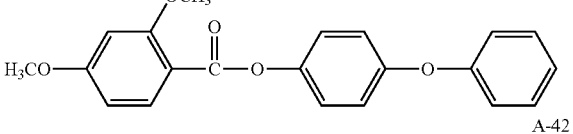
A-43
A-45
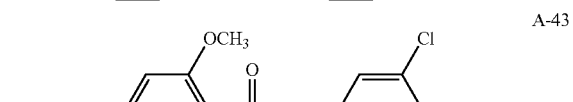
A-46
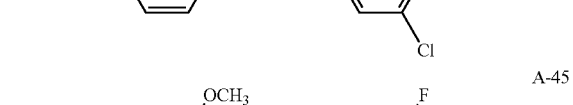
A-47
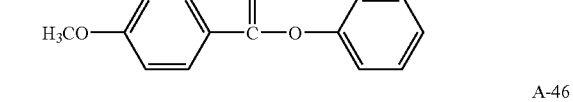
A-48
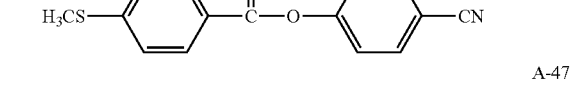
A-49
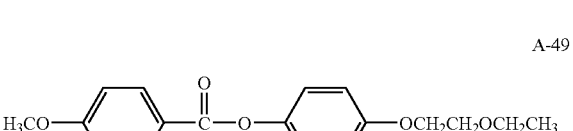

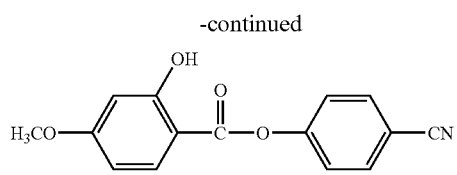

A-50

The compounds represented by the formula (4) can be prepared by any common ester reactions of substituted benzoic acids and phenols. For example, the compounds can be prepared by condensation reactions of acid halides of substituted benzoic acid with phenols; or dehydrated condensation reactions of substituted benzoic acids with phenols in the presence of any condensation agent or catalyst. The former process is preferred in the terms of productivity.

Examples of the solvent, which can be used in the reaction systems, include hydrocarbon solvents such as toluene and xylene; ether solvents such as dimethylether, tetrahydrofuran and dioxane; ketone solvents, ester solvents, acetonitrile, dimethylformamide and dimethylacetamide. One or more selected from the examples may be used in the reaction systems. Toluene, acetonitrile, dimethylformamide and dimethylacetamide are preferred.

The reaction is preferably carried out at a temperature ranging from 0 to 150° C., more preferably from 0 to 100° C., much ore preferably from 0 to 90° C., and still much more preferably from 20 to 90° C.

The reaction may be carried out with base or without base, and the latter is preferred. Examples of the base include both of organic and inorganic bases, and preferred examples include pyridine and tertiary amines such as triethylamine and ethyl diisopropyl amine.

Two or more type of rod-like compounds, whose maximum absorption is at a wavelength of shorter or equal to 250 nm in a solution, may be used in combination with each other.

(Matting Agent Particles)

The cellulose acylate film relevant to the present invention is preferably added with matting agent particles. Particles applicable to the present invention include silicon dioxide, titanium dioxide, aluminum oxide, zirconium oxide, calcium carbonate, talc, clay, calcinated kaolin, calcinated calcium silicate, hydrated calcium silicate, aluminum silicate, magnesium silicate and calcium phosphate. Those containing silicon are preferable as the particles in view of lowering the turbidity, wherein silicon dioxide is particularly preferable. Particle of silicon dioxide preferably has a primary mean particle size of 20 nm or smaller, and an apparent specific gravity of 70 g/liter or above. Those having a mean primary particle size of as small as 5 to 16 nm are more preferable in view of lowering haze of the film. The apparent specific gravity is preferably 90 to 200 g/liter or above, and more preferably 100 to 200 g/liter or above. Larger apparent specific gravity allows preparation of a dispersion of higher concentration, and is preferable in view of improving the haze and aggregate.

For the case where the silicon dioxide particles are used, the amount of use thereof is preferably adjusted to 0.01 to 0.3 parts by mass per 100 parts by mass of the polymer component containing cellulose acylate.

These particles generally exist in a form secondary particle having a mean particle size of 0.1 to 3.0 μm, and these particles reside in the film as aggregates of the primary particles, forming irregularity of 0.1 to 3.0 μm on the film surface. The mean particle size of the secondary particles is preferably 0.2 μm to 1.5 μm, more preferably 0.4 μm to 1.2 μm, and most preferably 0.6 μm to 1.1 μm, both ends inclusive. The particle size of larger than 1.5 μm intensifies the haze, and that of smaller than 0.2 μm results in only a small effect of preventing creaking.

The particle size of the primary/secondary particles was determined by observing the particles in the film under a scanning electron microscope, and by finding the diameter of a circle circumscribing the particles. The mean particle size was determined by observing 200 particles in different fields of view, and averaging the diameters.

Particles of silicon dioxide applicable herein are commercially available under the trade names, for example, of Aerosil R972, R972V, R974, R812, 200, 200V, 300, R202, OX50 and TT600 (all from Nippon Aerosil Co., Ltd.). Particles of zirconium oxide applicable herein is commercially available under the trade names, for example, of Aerosil R976 and R811 (all from Nippon Aerosil Co., Ltd.).

Among these, Aerosil 200V and Aerosil R972V, which are silicon dioxide particles having a primary mean particle size of 20 nm or below and an apparent specific gravity of 70 g/liter or above, are particularly preferable by virtue of their large effects of lowering the friction coefficient while keeping the turbidity of the optical film at a low level.

For the purpose of obtaining the cellulose acylate film containing the particles having a small secondary mean particle size, there are several possible techniques of preparing a dispersion of the particles. For example, there is known a method such that a particle dispersion is preliminarily prepared by mixing and stirring the solvent and particles, the particle dispersion is then added to a small volume of cellulose acylate solution separately prepared and stirred for dissolution, and is further mixed with a main cellulose acylate dope. This method is advantageous in terms of excellence in dispersibility of the silicon dioxide particles, and is preferable because the silicon dioxide particles are less likely to re-aggregate. Another known method is such that a solvent is added with a small amount of cellulose ester so as to dissolve it under stirring, further added with particles, dispersed using a dispersion machine to thereby prepare a particle addition solution, and the particle addition solution is thoroughly mixed with a dope using an in-line mixer. The present invention is by no means limited to these methods, wherein concentration of silicon dioxide in the process of mixing and dispersing the silicon dioxide particles with a solvent and so forth is preferably 5 to 30% by mass, more preferably 10 to 25% by mass, and still more preferably 15 to 20% by mass. Higher dispersion concentration can lower turbidity of the solution relative to the amount of addition, and is preferable in view of improving haze and aggregation. The final amount of addition of the matting agent in the dope of cellulose acylate is preferably 0.01 to 1.0 g per 1 $m^2$, more preferably 0.03 to 0.3 g, and most preferably 0.08 to 0.16 g.

The solvent adopted herein are preferably lower alcohols such as methanol, ethanol, propanol, isopropanol and butanol. There are no special limitations on the solvent other than the lower alcohols, but it is preferable to use solvents used for film formation of the cellulose ester.

Paragraphs below will describe the organic solvent into which cellulose acylate relevant to the present invention is dissolved.

In the present invention, both of chlorine-containing solvent using chlorine-containing organic solvent as a major solvent, and non-chlorine-containing solvent containing no chlorine-containing organic solvent can be used as the organic solvent.

(Chlorine-Containing Solvent)

When a solution of cellulose acylate relevant to the present invention is prepared, chlorine-containing organic solvent is preferably used as the main solvent. In the present invention, there is no specific limitation on species of the chlorine-containing organic solvent, so far as cellulose acylate can be dissolved therein, cast, and formed into films, and thereby the objects thereof can be achieved. The chlorine-containing organic solvent is preferably dichloromethane or chloroform. Dichloromethane is particularly preferable. Any organic solvent other than chlorine-containing organic solvent can be mixed without problem. In this case, it is necessary to use dichloromethane as much as at least 50% by mass of the total mass of the organic solvents. Other organic solvent possibly used in combination with the chlorine-containing organic solvent in the present invention will be described below. That is, other preferable organic solvent is preferably a solvent selected from ester, ketone, ether, alcohol, hydrocarbon and so forth, having 3 to 12 carbon atoms. The ester, ketone, ether and alcohol may have a cyclic structure. Any compound having two or more functional groups of selected from ester, ketone and ether (that is, —O—, —CO— and COO—) can be used as the solvent, and such compound may have other functional group such as alcoholic hydroxyl group in one molecule. For those solvents having two or more functional groups, the number of carbon atoms of which may be adjusted to the specified ranges for the compound having any of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methyl cyclohexanone. Examples of the ethers having 3 to 12 carbon atoms include diisopropyl ether, dimethoxy methane, dimethoxy ethane, 1,4-dioxane, 1,3-dioxolane, tetrahydrofuran, anisole and phenetol. Examples of the organic solvents having two or more functional groups include 2-ethoxy ethyl acetate, 2-methoxyethanol and 2-butoxyethanol.

The alcohol possibly used in combination with the chlorine-containing organic solvent may be any of straight chain, branched and cyclic, and among others, those of saturated aliphatic hydrocarbon are preferable. Hydroxyl groups of the alcohol may be any of primary to tertiary ones. Examples of the alcohol include methanol, ethanol, 1-propanol, 2-propanol, 1-butanol, 2-butanol, t-butanol, 1-pentanol, 2-methyl-2-butanol and cyclohexanol. Also fluorine-containing alcohol can be used as the alcohol. Examples fluorine-containing alcohol include 2-fluoroethanol, 2,2,2-trifluoroethanol and 2,2,3,3-tetrafluoro-1-propanol. The hydrocarbon may be any of straight chain, branched and cyclic. Any of both of aromatic hydrocarbon and aliphatic hydrocarbon may be used. The aliphatic hydrocarbon may be saturated or may be unsaturated. Examples of the hydrocarbon include cyclohexane, hexane, benzene, toluene and xylene.

Examples of the combination of chlorine-base organic solvent and other organic solvent include, but are not limited to, those shown below.

dichloromethane/methanol/ethanol/butanol (mass parts: 80/10/5/5),
dichloromethane/acetone/methanol/propanol (mass parts: 80/10/5/5),
dichloromethane/methanol/butanol/cyclohexane (mass parts: 80/10/5/5),
dichloromethane/methylethylketone/methanol/butanol (mass parts: 80/10/5/5),
dichloromethane/acetone/methylethylketone/ethanol/isopropanol (mass parts: 75/8/5/5/7),
dichloromethane/cyclopentanone/methanol/isopropanol (mass parts: 80/7/5/8),
dichloromethane/methyl acetate/butanol (mass parts: 80/10/10), dichloromethane/cyclohexane/methanol/hexane (mass parts: 70/20/5/5),
dichloromethane/methylethylketone/acetone/methanol/ethanol (mass parts: 50/20/20/5/5),
dichloromethane/1,3-dioxalane/methanol/ethanol (mass parts: 70/20/5/5),
dichloromethane/dioxane/acetone/methanol/ethanol (mass parts: 60/20/10/5/5),
dichloromethane/acetone/cyclopentanone/ethanol/isobutanol/cyclohexane (mass parts: 65/10/10/5/5/5),
dichloromethane/methylethylketone/acetone/methanol/ethanol (mass parts: 70/10/10/5/5),
dichloromethane/acetone/ethyl acetate/ethanol/butanol/hexane (mass parts: 65/10/10/5/5/5),
dichloromethane/methyl acetoacetate/methanol/ethanol (mass parts: 65/20/10/5), and
dichloromethane/cyclopentanone/ethanol/butanol (mass parts: 65/20/10/5).

(Non-Chlorine-Containing Solvent)

The non-chlorine-containing organic solvent preferably used when solution of cellulose acylate relevant to the present invention is prepared will be described in the next. In the present invention, the non-chlorine-containing organic solvent is not specifically limited, so far as cellulose acylate can be dissolved therein, cast, and formed into films, and thereby the objects thereof can be achieved. The non-chlorine-containing organic solvent used in the present invention is preferably a solvent selected from ester, ketone and ether having 3 to 12 carbon atoms. The ester, ketone and ether may have a cyclic structure. Any compound having two or more functional groups selected from ester, ketone and ether (that is, —O—, —CO— and COO—) can be used as the main solvent, and such compound may have other functional group such as alcoholic hydroxyl group in one molecule. For those main solvents having two or more functional groups, the number of carbon atoms of which may be adjusted to the specified ranges for the compound having any of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methyl cyclohexanone. Examples of the ethers having 3 to 12 carbon atoms include diisopropyl ether, dimethoxy methane, dimethoxy ethane, 1,4-dioxane, 1,3-dioxolane, tetrahydrofuran, anisole and phenetol. Examples of the organic solvent having two or more functional groups include 2-ethoxy ethyl acetate, 2-methoxy ethanol and 2-butoxyethanol.

The non-chlorine-containing organic solvent used for the above-described cellulose acylate can be selected from various points of view described in the above, and preferably selected as described below. That is, the non-chlorine-containing solvent is preferably a mixed solvent containing the above-described, non-chlorine-containing organic solvent as the main solvent, and more specifically a mixed solvent of three or more different solvents, wherein a first solvent is any one of, or mixture of methyl acetate, ethyl acetate, methyl formate, ethyl formate, acetone, dioxolane and dioxane, a second solvent is selected from ketones or acetoacetate esters having 4 to 7 carbon atoms, and a third solvent is selected from alcohols of hydrocarbons having 1 to 10 carbon atoms, and more preferably from alcohols having 1 to 8-carbon atoms. The second solvent is omissible when the first solvent is a mixed solution of two or more solvents. The first solvent is more preferably methyl acetate, acetone, methyl formate, ethyl formate or mixture of them, and the second solvent is preferably methyl ethyl ketone, cyclopentanone, cyclohexanone or methyl acetylacetate, and may be mixture of them.

The alcohol as the third solvent may be straight chain, branched, or cyclic, and among others, those of saturated aliphatic hydrocarbon are preferable. Hydroxyl group of the alcohol may be any of primary to tertiary ones. Examples of the alcohol include methanol, ethanol, 1-propanol, 2-propanol, 1-butanol, 2-butanol, t-butanol, 1-pentanol, 2-methyl-2-butanol and cyclohexanol. Also fluorine-containing alcohol may be used as the alcohol. Examples of which include 2-fluoroethanol, 2,2,2-trifluoroethanol and 2,2,3,3-tetrafluoro-1-propanol. The hydrocarbon may be straight chain, branched or cyclic. Both of aromatic hydrocarbon and aliphatic hydrocarbon may be used. The aliphatic hydrocarbon may be saturated or unsaturated. Examples of the hydrocarbon include cyclohexanone, hexane, benzene, toluene and xylene. These alcohol and hydrocarbon as the third solvent may be a simple substance of a mixture of two or more species, without special limitation. Preferable specific compounds as the third solvent are alcohols such as methanol, ethanol, 1-propanol, 2-propanol, 1-butanol, 2-butanol, and cyclohexanol, cyclohexane and hexane, and more specifically methanol, ethanol, 1-propanol, 2-propanol and 1-butanol.

Ratio of mixing of three above-described solvents is preferably defined so that the first solvent contained therein accounts for 20 to 95% by mass of the total amount of the mixed solvent, the second solvent for 2 to 60% by mass, and the third solvent for 2 to 30% by mass, and it is still more preferable that the first solvent contained therein accounts for 30 to 90% by mass, the second solvent for 3 to 50% by mass, and the third solvent for 3 to 25% by mass. In particular, it is preferable that the first solvent contained therein accounts for 30 to 90% by mass, the second solvent for 3 to 30% by mass, and the third solvent is an alcohol and accounts for 3 to 15% by mass. The non-chlorine-containing organic solvents used in the present invention are further detailed in Journal of Technical Disclosure (No. 2001-1745, p. 12-16, issued on Mar. 15, 2001 by JIII).

Examples of the preferred combination of non-chlorine-base organic solvents include, but are not limited to, those shown below.

methylacetate/acetone/methanol/ethanol/butanol (mass parts: 75/10/5/5/5),
methylacetate/acetone/methanol/ethanol/propanol (mass parts: 75/10/5/5/5),
methylacetate/acetone/methanol/butanol/cyclohexane (mass parts: 75/10/5/5/5),
methylacetate/acetone/ethanol/butanol (mass parts: 81/8/7/4)
methylacetate/acetone/ethanol/butanol (mass parts: 82/10/4/4)
methylacetate/acetone/ethanol/butanol (mass parts: 80/10/4/6)
methylacetate/methylethylketone/methanol/butanol (mass parts: 80/10/5/5),
methylacetate/acetone/methylethylketone/ethanol/isopropanol (mass parts: 75/8/5/5/7),
methylacetate/cyclopentanone/methanol/isopropanol (mass parts: 80/7/5/8),
methylacetate/acetone/butanol (mass parts: 85/10/5),
methylacetate/cyclopentanone/acetone/methanol/butanol (mass parts: 60/15/14/5/6),
methylacetate/cyclohexanone/methanol/hexane (mass parts: 70/20/5/5),
methylacetate/methylethylketone/acetone/methanol/ethanol (mass parts: 50/20/20/5/5),
methylacetate/1,3-dioxalane/methanol/ethanol (mass parts: 70/20/5/5),
methylacetate/dioxane/acetone/methanol/ethanol (mass parts: 60/20/10/5/5),
methylacetate/acetone/cyclopentanone/ethanol/isobutanol/cyclohexane (mass parts: 65/10/10/5/5/5),
methylformate/methylethylketone/acetone/methanol/ethanol (mass parts: 50/20/20/5/5),
methylformate/acetone/ethylacetate/ethanol/butanol/hexane (mass parts: 65/10/10/5/5/5),
acetone/methyl acetoacetate/methanol/ethanol (mass parts: 65/20/10/5),
acetone/cyclopentanone/ethanol/butanol (mass parts: 65/20/10/5),
acetone/1,3-dioxalane/ethanol/butanol (mass parts: 65/20/10/5), and
1,3-dioxalane/cyclohanone/methylethylketone/methanol/butanol (mass parts: 55/20/10/5/5/5).

The cellulose acylate solutions, which are prepared according to the processes shown below, can be also employed in the invention.

a process comprising preparing a cellulose acylate solution with a formulation of methylacetate/acetone/ethanol/butanol (mass parts: 81/8/7/4); and adding 2 mass parts of butanol to 100 mass parts of the cellulose acylate solution following filtration and condensation of the solution;

a process comprising preparing a cellulose acylate solution with a formulation of methylacetate/acetone/ethanol/butanol (mass parts: 84/10/4/2); and adding 4 mass parts of butanol to 100 mass parts of the cellulose acylate solution following filtration and condensation of the solution; and a process comprising preparing a cellulose acylate solution with a formulation of methylacetate/acetone/ethanol (mass parts: 84/10/6); and adding 5 mass parts of butanol to 100 mass parts of the cellulose acylate solution following filtration and condensation of the solution.

The dope which can be used in the invention may comprise dichloromethane with at least one non-chlorine organic solvent selected from the above examples in an amount of not greater than 10 mass % with respect to the total mass of the all organic solvents.

(Characteristics of Cellulose Acylate Solution)

When the cellulose acylate film is manufactured by the casting film formation process, cellulose acylate used therefor is preferably a solution prepared by dissolving cellulose acylate into the organic solvent so as to adjust the concentration to 10 to 30% by mass, more preferably to 13 to 27% by mass, and still more preferably to 15 to 25% by mass. The cellulose acylate solution having a concentration of these ranges may be prepared by dissolving cellulose acylate so as to adjust the concentration thereof to a predetermined value, or by preliminarily preparing a low concentration solution (9 to 14% by mass, for example) and then condensing it to a predetermined high concentration solution, by a condensation process described later. It is still also allowable to preliminarily prepare a high concentration cellulose acylate solution, and then various additives are added, to thereby prepare a low concentration cellulose acylate solution.

For the case where the cellulose acylate film is manufacture by the casting film formation process, it is preferable, in view of improving the peel-off characteristics, to adjust the associate molecular weight of cellulose acylate to 150,000 to 15,000,000, in a dilute solution prepared by dissolving cellulose acylate to a concentration of 0.1 to 5% by mass in an organic solvent having a composition identical to that of the cellulose acylate solution. The associate molecular weight is more preferably 180,000 to 9,000,000. The associate molecular weight can be determined by the static light scattering method. Cellulose acylate is preferably dissolved so as to attain an inertia squared radius, obtainable at the same time therewith, of 10 to 200 nm. The inertia squared radius is more preferably 20 to 200 nm. Cellulose acylate is also preferably dissolved so as to adjust the second virial coefficient to $-2 \times 10^{-4}$ to $+4 \times 10^{-4}$, wherein more preferable second virial coefficient is $-2 \times 10^{-4}$ to $+2 \times 10^{-4}$.

Now definitions of the associative molecular weight, the inertia squared radius and the second virial coefficient will be explained below. These parameters are measured by the static light scattering method, according to the method described below. Although the measurement is made in a dilute region on the convenience of the device, the measured values of these parameters are projection of behavior of the dope in the high concentration region.

First, cellulose acylate is dissolved into a solvent for preparing the dope, so as to adjust the concentration to 0.1% by mass, 0.2% by mass, 0.3% by mass, and 0.4% by mass. Cellulose acylate used herein is dried at 120° C. for 2 hours so as to avoid moistening, before being weighed at 25° C., 10% RH. Method of dissolution follows the method adopted in the dope dissolution process (normal temperature dissolution process, cooled dissolution process, high temperature dissolution process). These solutions and solvents are then filtered through a 0.2-μm Teflon filter. The filtrate is then subjected to measurement of static light scattering using a light scattering measurement device (DLS-700 from Otsuka Electronics Co., Ltd.), at 25° C. over the range from 30° to 140° at 10° intervals. The obtained data is analyzed by the BERRY plotting method. Refractive index necessary for the analysis is obtained as a value for the solvent found by using an Abbe's refractometer, and concentration gradient of the refractive index (dn/dc) is measured using a parallax refractometer (DRM-1021 from Otsuka Electronics Co., Ltd., Model), and using a solvent and a solution used for measurement of light scattering.

(Dope Preparation)

Preparation of the Cellulose Acylate Solution (Dope) Will be described in the next. Methods of dissolving cellulose acylate are not specifically limited, may be carried out at room temperature, or by the cooled dissolution process, high temperature dissolution process, and even by combination of these processes. In this relation, methods of preparing the cellulose acylate solution are described in publications such as Japanese Laid-Open Patent Publication Nos. H5-163301, S61-106628, S58-127737, H9-95544, H10-95854, H10-45950, 2000-53784 and H11-322946, and also in Japanese Laid-Open Patent Publication Nos. H11-322947, H12-276830, 2000-273239, H11-71463, H04-259511, 2000-273184, H11-323017 and H11-302388. The above-described methods of dissolving cellulose acylate into organic solvents are adoptable also to the present invention without departing from the technical scope of the present invention. In particular for the case using non-chlorine-containing solvent, the preparation is carried out by the method detailed in Journal of Technical Disclosure No. 2001-1745, p. 22-25 (issued on Mar. 15, 2001 by JIII). The cellulose acylate dope relevant to the present invention generally undergoes condensation and filtration, procedures of which being detailed in Journal of Technical Disclosure No. 2001-1745, p. 25 (issued on Mar. 15, 2001 by JIII). When cellulose acylate is dissolved at high temperatures, the temperature in most cases resides at or above the boiling point of a solvent to be used, and in this case used under pressure.

The cellulose acylate solution is preferably adjusted in its viscosity and dynamic storage modulus to the ranges described below, in view of readiness of casting. One milliliter of a sample solution was measured using a rheometer (CLS 500) and a steel cone having a diameter of 4 cm/2° (both from TA Instruments). The measurement was carried out while setting the conditions to the oscillation step/temperature ramp mode, with the temperature range from 40° C. to $-10$° C. variable at 2° C./min, and thereby static non-Newton viscosity n*(Pa·s) at 40° C., and elastic modulus under storage G' (Pa) at 5° C. are determined. The sample solution herein was preliminarily heated and kept at a constant temperature from which the measurement is started, before the measurement. In the present invention, the cellulose acylate solution preferably has a viscosity at 40° C. of 1 to 400 Pa·s, and a dynamic storage modulus at 15° C. of 500 Pa or above, and more preferably has a viscosity at 40° C. of 10 to 200 Pa·s, and a dynamic storage modulus at 15° C. of 100 to 1,000,000. In addition, larger dynamic storage modulus at low temperatures is more preferable. For an exemplary case where the casting support is kept at $-5$° C., the dynamic storage modulus is preferably adjusted to 10,000 to 1,000,000 at $-5$° C., and for another exemplary case where the casting support is kept at $-50$° C., the dynamic storage modulus is preferably adjusted to 10,000 to 5,000,000.

The present invention is characterized in that a high concentration dope can be obtained by using the above-described specific cellulose acylate, and in that a high concentration cellulose acylate solution excellent in stability can be obtained without relying upon a technique such as condensation. Aiming at further facilitating the dissolution, it is also allowable to dissolve it to a low concentration, and then condensing the product using a condensing means. Method of condensing is not specifically limited, wherein possible methods include a method of introducing a low concentration solution into a space formed between a cylinder and a locus of outer circumference of a rotor blade rotating in the cylinder in the circumferential direction, and allowing the solvent to vaporize while keeping temperature difference with respect to the solution, to thereby obtain a high concentration solution (for example, Japanese Laid-Open Patent Publication No. H4-259511, etc.), and a method of blowing a heated low concentration solution through a nozzle into a container, so as to cause flash vaporization of the solvent on a path ranging from the nozzle to the inner wall of the chamber onto which the solvent collides, and drawing the solvent vapor out from the chamber, and drawing the resultant high concentration solution out from the bottom of the chamber (for example, methods described in the individual patent specifications of U.S. Pat. Nos. 2,541,012, 2,858,229, 4,414,341 and 4,504,355).

Prior to the casting, the solution is preferably freed from unsolubilized components or foreign matters such as dusts and impurities, using an appropriate filter material such as metal mesh, flannel and the like. Filtration of the cellulose acylate solution is carried out preferably by using a filter having an absolute filtration accuracy of 0.1 to 100 μm, and more preferably 0.5 to 25 μm. Thickness of the filter is preferably 0.1 to 10 mm, and more preferably 0.2 to 2 mm. In this case, filtering pressure is preferably adjusted to 1.6 MPa or below, more preferably 1.2 MPa or below, still more preferably 1.0 MPa and particularly 0.2 MPa or below. The filter material preferably applicable herein is any of publicly known materials such as glass fiber, cellulose fiber, filter paper, and fluorine-containing resin such as tetrafluoroethylene resin, and so forth. In particular, ceramics and metals are preferably used. Viscosity of the cellulose acylate solution immediately before the casting desirably falls in a range allowing casting for film formation, and is preferably adjusted in the range generally from 10 Pa·s to 2,000 Pa·s, more preferably 30 Pa·s to 1000 Pa·s, and still more preferably 40 Pa·s to 500 Pa·s. The temperature herein is not specifically limited so far as it falls at around the casting temperature, preferably falls in the range from −5 to +70° C., and more preferably −5 to +55° C.

(Film Forming)

The cellulose acylate film relevant to the present invention can be obtained by forming the film using the above-described cellulose acylate solution. Methods of forming the and facilities therefor may be any solvent-cast film forming methods and solvent-cast film forming apparatuses having conventionally been used for manufacturing of cellulose triacetate film.

The prepared dope is taken out from a dissolving machine (solution tank), temporarily stored in a storage tank, and degassed for final conditioning. The dope is then discharged out through a dope discharge port, fed typically through a boost volumetric gear pump, capable of precisely feeding a constant volume of liquid depending on number of rotation, to a pressure die, cast from a nozzle (slit) of the pressure die uniformly over a metal base as a cast portion under endless running, and is separated in the state of a half-dried film (also referred to as a "web") from the metal base at a separation point where the metal base finishes about one cycle of travel. The obtained web is then pinched by clips on both edges thereof, dried under conveyance by a tenter while keeping the width unchanged, the resultant film is mechanically conveyed using a roll group of a drying apparatus to thereby complete the drying, and taken up by a winder to produce rolls with a predetermined length. Combination of the tenter and the drier having the roll group varies depending on purposes. In the solvent-cast film forming method applied to manufacturing of a functional protective film for electronic devices, the general solvent-cast film forming apparatus is often combined with a coating apparatus, for the purpose of subjecting the film to surface treatment, such as formation of an underlying layer, antistatic layer, anti-halation layer, protective layer and the like. Paragraphs below will brief the individual manufacturing processes, without limiting the present invention.

When the cellulose acylate film is formed by the solvent-cast process, first the prepared cellulose acylate solution (dope) is cast on a drum or a band, and the solvent is allowed to vaporize to thereby form the film. The dope before casting is preferably adjusted in the concentration so that the solid content falls in the range from 5 to 40% by mass. The surface of the drum or the band is preferably finished to have a mirror surface. The dope is preferably cast onto the drum or the band having surface temperature of 30° C. or below, wherein it is particularly preferable to use a metal support conditioned at −10 to 20° C. Other methods applicable to the present invention are described in Japanese Laid-Open Patent Publication Nos. 2000-301555, 2000-301558, H07-032391, H03-193316, H05-086212, S62-037113, H02-276607, S55-014201, H02-111511 and H02-208650.

(Layered Casting)

The cellulose acylate solution may singly be cast over the smooth band or drum as the metal support so as to form a single layer, or may multiply be cast so as to form two or more cellulose acylate layers. When the cellulose acylate solution is multiply cast, it is allowable to cast solution containing cellulose acylate respectively through a plurality of casting ports disposed at intervals in the direction of travel of the metal support, so as to stack the individual layers, wherein applicable methods are described, for example, in Japanese Laid-Open Patent Publication Nos. S61-158414, H11-122419 and H11-198285. It is also allowable to form the film by casting the cellulose acylate solution through two casting ports, which can be embodied by the methods described in Japanese Examined Patent Publication No. S60-27562, Japanese Laid-Open Patent Publication Nos. S61-94724, S61-947245, S61-104813, S61-158413, and H6-134933. It is also allowable to adopt the casting method of cellulose acylate film described in Japanese Laid-Open Patent Publication No. S56-162617, by which a stream of a high-viscosity cellulose acylate solution is wrapped by a low-viscosity cellulose acylate solution, to thereby co-extrude the high- and low-viscosity cellulose acylate solutions at the same time. It is still also allowable to adopt the methods described in Japanese Laid-Open Patent Publication Nos. S61-94724 and S61-94725, in which the inner solution contains a larger amount of alcoholic component, which is a poor solvent, than in the outer solution. It is even also allowable to form a film by using two casting ports, wherein a film formed onto a metal base through a first casting port is peeled off, and a second casting is given onto the film on the side thereof once brought in contact with the metal base, as described for example in Japanese Examined Patent Publication No. S44-20235. The same species of, or different species of the cellulose acylate solution(s) may be cast, without special limitations. For the purpose of providing functions to a plurality of cellulose acylate layers, the cellulose acylate solutions corresponding to the functions may be cast through the individual casting ports. Furthermore, the cellulose acylate solution may be cast together with any solutions forming other functional layers (for example, adhesive layer, dye layer, anti-static layer, anti-halation, UV absorbing layer, polarizer film, etc.).

It has been necessary for the conventional cellulose acylate solution for forming a single layer to have a high concentration and a high viscosity so as to obtain a necessary thickness by extrusion, and this has often raised problems in that the cellulose acylate solution has only a poor stability and likely to produce therein solid matters, which were causative of grain forming failure and degraded planarity. As one countermeasure for this problem, casting of a plurality of streams of cellulose acylate solution through the casting ports makes it possible to extrude a high-viscosity solution over the metal base at the same time, resulting not only in improving the planarity and to form the film having a desirable surface texture, but also in reducing drying load and in raising production speed of the film, by virtue of use of such high-viscosity cellulose acylate solution.

For the case of co-extrusion, there is no special limitation on thickness of the inner and outer layers, wherein the thickness of the outer layer preferably accounts for 1 to 50% of the total thickness, and more preferably 2 to 30%. For the case of co-extrusion forming three or more layers, the thickness of the outer layer is defined as the total thickness of the layer brought into contact with the metal base, and of the layer brought into contact with the air side. For the case of co-extrusion, it is also allowable to fabricate a layered cellulose acylate film, by co-extruding the cellulose acylate solutions differing in contents of additives such as the above-described plasticizer, UV absorber, matting agent and so forth. For example, a cellulose acylate film having a configuration of skin layer/core layer/skin layer can be fabricated. For example, the matting agent may be added to a larger amount, or only in the skin layer. The plasticizer and the UV absorber may be added with smaller amounts in the core layer than in the skin layer, or may be added only to the core layer. It is also allowable to vary species of the plasticizer and the UV absorber between the core layer and the skin layer, wherein for example, the skin layer may contain at least either of a less-volatile plasticizer and a UV absorber, and the core layer may contain a plasticizer excellent in plasticity, or a UV absorber excellent in UV absorbing property. Also an embodiment in which a releasing aid is contained only in the skin layer on the metal base side is preferable. In order to gellate the solution by cooling the metal base based on the cooled drum process, it is also preferable to add a larger amount of alcohol, which is a poor solvent, to the skin layer, than to the core layer. The skin layer and the core layer may have different Tg, wherein it is preferable that the core layer has Tg lower than that of the skin layer. Viscosity of the solution containing the cellulose acylate in the process of casting may differ between the skin layer and the core layer, wherein it is more preferable that the skin layer has a viscosity smaller than that of the core layer, but the core layer may have viscosity smaller than the core layer has.

(Casting)

Known methods of casting the solution include a method of uniformly extruding a prepared dope from a pressure die onto the metal base; a method of using a doctor blade by which the dope once cast on the metal base is adjusted in the thickness using the blade; and a method of using a reverse roll coater by which the thickness is adjusted using a reverse-rotating roll, among these the method of using a pressure die is preferable. Both pressure dies of the coat-hanger-type and the T-type are preferably used. The casting may be carried out also by various publicly known methods of casting the cellulose triacetate solution, besides the methods described in the above, wherein by setting the individual conditions taking difference in boiling point and so forth of the solvent to be adopted into consideration, the effects similar to those described in the individual patent publications can be obtained. The endless-running metal base used for fabricating the cellulose acylate film relevant to the present invention is configured by using a drum mirror-finished by chromium plating, or a stainless steel belt (also referred to as a band) mirror-finished by surface polishing. The pressure die used for manufacturing the cellulose acylate film relevant to the present invention may be disposed over the metal base in a single unit configuration, or two or more unit configuration, wherein a single unit or two units are preferably used. For the case where two or more pressure dies are disposed, the amount of dope cast into the individual dies may be graded, and the dope may be fed through a plurality of precision volumetric gear pumps according to the individual ratio. Temperature of the cellulose acylate solution to be cast is preferably −10 to 55° C., and more preferably 25 to 50° C. In this case, the temperature may be adjusted equally over the entire process, or may vary in the individual process steps. For the case where the temperature differs, it is good enough that the temperature is adjusted to a desired value immediately before casting.

(Drying)

Drying of the dope on the metal base involved in manufacturing of the cellulose acylate film is generally accomplished by a method of blowing hot air from the top surface side of the metal base (drum or belt), that is, from the surface of the web placed on the metal base; a method of blowing hot air from the back side of the drum or the belt; and the liquid heat conduction method by which a temperature-controlled liquid is brought into contact with the belt or the drum from the back surface thereof, which resides on the opposite side of the surface on which the dope is cast, so as to heat the drum or the belt by heat conduction, to thereby control the surface temperature, among which the back surface liquid heat conduction method is preferable. The surface temperature of the metal base before casting may be arbitrary so far as it is not higher than the boiling point of the solvent used for the dope. However, in view of accelerating the drying, and taking away the fluidity on the metal base, it is preferably set to a temperature 1 to 10° C. lower than the boiling point of the solvent having the lowest boiling point among those used therefor. This, however, does not apply for the case where the film is peeled off without cooling and drying the cast dope.

(Stretching)

The cellulose acylate film relevant to the present invention may be adjusted in retardation by stretching. Moreover, there are also methods of intentionally stretching the film in the width-wise direction, as described for example in Japanese Laid-Open Patent Publication Nos. S62-115035, H4-152125, H4-284211, H4-298310, and H11-48271.

The manufactured film is stretched for the purpose of raising the in-plane retardation value of the cellulose acylate film.

The stretching of the film is carried out at normal temperature or under heating conditions. Temperature of heating is preferably lower than the glass transition point of the film. The stretching of the film may be uniaxial stretching only in the longitudinal or in the transverse direction, or may be simultaneous or sequential biaxial stretching. Stretching factor falls in the range from 1 to 200%, preferably 1 to 100%, and particularly preferably 1 to 50%. Birefringence of the optical film is preferably expressed by refractive index larger in the width-wise direction than in the longitudinal direction. Therefore, it is preferable to stretch the film to a larger degree in the width-wise direction. The film may be stretched in midway of the production process, or the fabricated and wound up web may be stretched. For the former case, the film may be stretched in a state of containing any residual solvent, preferably in a state of containing 2 to 30% of the residual solvent.

Thickness of the cellulose acylate film relevant to the present invention, obtained after drying, varies depending on the purpose of use, and preferably falls in the range generally from 5 to 500 μm, more preferably from 20 to 300 μm, and particularly preferably from 20 to 180 μm. For those intended for optical use, in particular for use in VA liquid crystal display devices, the thickness preferably falls within the range from 40 to 110 μm. The thickness of the film may be adjusted to a desired value, by controlling solid content of the dope, slit width of a die, extrusion pressure from the die, and travel speed of a metal support. Thus-obtained cellulose acylate film preferably has a width of 0.5 μm to 3 m, more preferably 0.6 μm to 2.5 m, and still more preferably 0.8 μm to 2.2 m. Length of winding up per one roll is preferably 100 m to 10,000 m, more preferably 500 m to 7,000 m, and still more preferably 1,000 m to 6,000 m. In the process of winding-up, it is preferable to knurl the film on at least one edge thereof, preferably with a knurling width of 3 mm to 50 mm, more preferably 5 mm to 30 mm, and with a knurling height of 0.5 to 500 μm, and more preferably 1 to 200 μm. The knurling may be effected from one side or from both sides.

Variation in the Re(590) value of the film over the full width is preferably ±5 nm, and more preferably ±3 nm. Variation in the Rth(590) value is preferably ±10 nm, and more preferably 5 nm. Also variations in the Re value and the Rth value in the longitudinal direction are preferably suppressed within the same range with the width-wise variation.

(Optical Characteristics of Cellulose Acylate Film)

The cellulose acylate film used for the second optically anisotropic layer is aimed at making contribution in widening the angle of viewing of liquid crystal display devices, in particular IPS-mode liquid crystal displays, as being combined with the first optically anisotropic layer, and satisfies the inequalities (III) and (IV) below:

inequality (III): 20 nm≦Re(590)≦150 nm, and inequality (IV): 100 nm≦Rth(590)≦300 nm.

Re(590) of the above-described second optically anisotropic layer preferably falls in the range from 30 to 130 nm, and more preferably from 40 to 110 nm. On the other hand, Rth(590) of the second optically anisotropic layer preferably falls in the rance from 120 to 280 nm, and more preferably from 140 to 260 nm.

In the present invention, Nz=Re/Rth+0.5 is preferably adjusted to 1.5 to 7.0, and more preferably 2.0 to 5.5, and particularly preferably 2.5 to 4.5. These adjustments may be effected through selection of species of the additives, amount of addition, and stretching factor.

Variation in the angle of the in-plane slow axis of the cellulose acylate film relevant to the present invention preferably falls within the range from −2° to +2° away from the reference direction of the roll film, more preferably from −1° to +10, and most preferably from 0.5° to +0.5°. The reference direction herein aligns in the longitudinal direction of the roll film when the cellulose acylate film is stretched in the longitudinal direction, and in the width-wise direction of the roll film when stretched in the transverse direction.

In view of suppressing time-dependent changes in the hue of liquid crystal display devices, the cellulose acylate film relevant to the present invention preferably shows a difference ΔRe(=Re10% RH−Re80% RH) between the Re value measured at 25° C., 10% RH and the Re value measured at 25° C., 80% RH of 0 to 10 nm, and a difference ΔRth (=Rth10% RH−Rth80% RH) between the Rth value measured at 25° C., 10% RH and the Rth value measured at 25° C. 80% Rh of 0 to 30 nm.

In view of suppressing time-dependent changes in the hue of liquid crystal display devices, the cellulose acylate film relevant to the present invention preferably has an equilibrium water content at 25° C., 80% RH of 3.2% or below.

Ratio of moisture content of the cellulose acylate film relevant to the present invention is measured by the Karl-Fischer's method with respect to a 7 mm×35 mm sample film using a moisture meter and a sample drier (CA-03, VA-05, both from Mitsubishi Chemical Corporation). The ratio is calculated by dividing moisture content (g) by mass of the sample (g).

The cellulose acylate film relevant to the present invention preferably has a moisture permeability measured under conditions of 60° C., 95% RH, 24 hr of 400 g/m$^2$·24 hr to 1,800 g/m$^2$·24 hr, both ends inclusive (on the 80-μm-thick basis), in view of minimizing time-dependent changes in hue of liquid crystal display devices.

Smaller thickness of the cellulose acylate film makes the moisture permeability smaller, and larger thickness makes the moisture permeability larger. It is therefore necessary to convert any values obtained for samples of various thicknesses on the 80-μm-thick basis. Conversion of the film thickness can be given by (moisture permeability on the 80-μm-thick basis=moisture permeability actually measured×actually measured thickness of the film μm/80 μm).

As a method of measuring moisture permeability, the method described in "Kobunshi no Bussei (Physical Properties of Polymers) II" (Kobunshi Jikkenn Kagaku Koza 4 (Course of Experimental Chemistry for Polymers 4), Kyoritsu Shuppan Co., Ltd.), p. 285-294: Measurement of Vapor Permeability (mass process, thermometer method, vapor pressure method, adsorbed mass method) is applicable.

Glass transition point of the cellulose acylate film relevant to the present invention is measured with respect to a 5 mm×30 mm sample film (unstretched) conditioned under 25° C., 60% RH for 2 hours or more, using a dynamic visco-elasticity measurement device (Vibron DVA-225 from ITK Co.) under conditions of a grip distance of 20 mm, a temperature elevation speed of 2° C./min, a temperature range of measurement of 30° C. to 200° C., and a frequency of 1 Hz. In a graph plotting storage modulus on the logarithmic ordinate and plotting temperature (° C.) on the linear abscissa, a sharp decrease in the storage modulus observed during transition from the solid region to the glass transition region was expressed by line 1 in the solid region and line 2 in the glass transition region, and the glass transition point Tg (dynamic visco-elasticity) was determined by the intersection of these lines 1 and 2, because this point indicates a temperature at which the storage modulus sharply decreases during temperature elevation, the film starts to be softened, and the film is going to transit into the glass transition region.

The cellulose acylate film relevant to the present invention preferably has a haze of 0.01 to 2%. The haze herein can be measured as described below.

The haze is measured with respect to a 40 mm×80 mm sample of the cellulose acylate film relevant to the present invention, at 25° C., 60% RH using a haze meter (HGM-2DP from Suga Test Instruments Co., Ltd.) conforming to JIS K-6714.

The cellulose acylate film relevant to the present invention preferably shows a mass change of 0 to 5%, after being allowed to stand at 80° C., 90% RH for 48 hours.

The cellulose acylate film relevant to the present invention preferably shows dimensional change of 0 to 5%, in both cases where the film is allowed to stand at 60° C., 95% RH for 24 hours, and at 90° C., 5% RH for 24 hours.

Photoelasticity coefficient of the film is preferably not larger than $50 \times 10^{-13}$ cm$^2$/dyne, in view of minimizing time-dependent changes in hue of liquid crystal display devices.

A specific method of the measurement is such as applying tensile stress to a 10 mm×100 mm sample of the cellulose acylate film in the longitudinal direction thereof, retardation in this process is measured using an ellipsometer (M150 from JASCO Corporation), and photoelasticity coefficient is calculated based on amount of change in retardation with respect to the stress.

(Cyclic Polyolefin Film)

In one aspect of the present invention, the second optically anisotropic layer is composed of a film containing a cyclic polyolefin polymer. The term "cyclic polyolefin" (also referred to as cyclic polyolefin or cyclic polyolefin-base polymer) means a polymer having a cyclic olefin structure.

Examples of the polymer having the cyclic olefin structure which can be used for the present invention include (1) norbornene-base polymer, (2) monocyclic olefin polymer, (3) polymer of cyclic conjugated dienes, (4) vinyl alicyclic hydrocarbon polymer, and hydrides of (1) to (4). Preferable cyclic polyolefin used for production of the second optically anisotropic layer is an addition-(co)polymerized cyclic polyolefin containing at least one repeating unit represented by the formula (V) below, and as requested, an addition-(co) polymerized cyclic polyolefin further containing at least one repeating units represents by the formula (VI) below. A ring-opened-(co)polymer containing at least one repeating unit represented by the formula (VI) may also preferably be used.

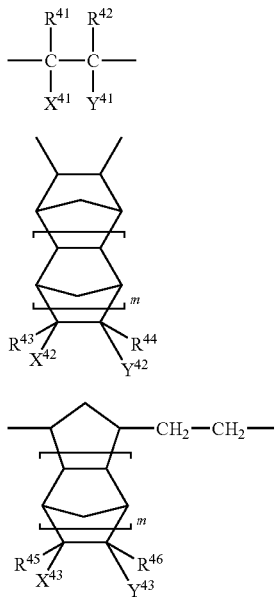

Formula (IV)

Formula (V)

Formula (VI)

In the formulae, m is an integer from 0 to 4. $R^{41}$ to $R^{46}$ independently represent hydrogen atom or $C_{1-10}$hydrocarbon group; $X^{41}$ to $X^{43}$ and $Y^{41}$ to $Y^{43}$ independently represent hydrogen atom or $C_{1-10}$ hydrocarbon group, halogen atom, halogen-substituted $C_{1-10}$ hydrocarbon group, $-(CH_2)_n COOR^{51}$, $-(CH_2)_n OCOR^{52}$, $-(CH_2)_n NCO$, $-(CH_2)_n NO_2$, $-(CH_2)_n CN$, $-(CH_2)_n CONR^{53}R^{54}$, $-(CH_2)_n NR^{53}R^{54}$, $-(CH_2)_n OZ^{51}$, $-(CH_2)_n W^{51}$, or $(-CO)_2 O$ and $(-CO)_2 NR^{55}$ formed by $X^{41}$ and $Y^{41}$, or $X^{42}$ and $Y^{42}$, or $X^{43}$ and $Y^{33}$ Now, $R^{51}$, $R^{52}R^{53}$, $R^{54}$, and $R^{55}$ independently represent hydrogen atom or $C_{1-20}$ hydrocarbon group $Z^{51}$ represents hydrocarbon group or halogen-substituted hydrocarbon group, $W^{51}$ represents $SiR^{56}_p D^{51}_{3-p}$ ($R^{56}$ represents hydrocarbon group having 1 to 10 carbon atoms, and $D^{51}$ represents halogen atom-$OCOR^{56}$ or $OR^{56}$, and p is an integer from 0 to 3), and n represents an integer from 0 to 10.

Introduction of a functional group having a large polarization into the substitutive groups in $X^{41}$ to $X^{43}$, and $Y^{41}$ to $Y^{43}$ makes the thickness-wise retardation (Rth) of the optical film large, and can consequently enhance expression performance of the in-plane retardation (Re). The film having a large Re expression performance can be increased in the Re value, by stretching in the film production process.

The cyclic polyolefin is preferably a cyclic polyolefin having ester group(s) in side chains thereof, such as obtained by polymerizing a polymerizable composition comprising at least one cyclic olefin monomer having such an ester group. More specifically, at least either of $X^{52}$ and $Y^{52}$ in the formula (V) below preferably containing an ester bond, wherein any constituent having a substitutive group other than the ester bond may be contained as requested. In addition, it is also preferable to use, as requested, an addition-(co)polymerized cyclic polyolefin further containing at least one repeating unit represented by formula (IV). At least either of $X^{53}$ and $Y^{53}$ in the formula (VI) preferably contains an ester bond, wherein any constituent having a substitutive group other than the ester bond may be contained as requested.

Content of the constituents containing the ester bond is preferably 100 mol % to 10 mol % of the (co)polymer, and more preferably 100 mol % to 20 mol %. Content of the component having the ester bond smaller than the above range results in poor hydrophilicity after saponification, and fails in obtaining an effect of improving the adhesiveness with respect to a water-soluble resin.

The norbornene-base polymer hydride is prepared, by subjecting polycyclic unsaturated compound to addition polymerization or metathesis ring-opening polymerization and the to hydrogen addition, as disclosed in Japanese Laid-Open Patent Publication Nos. H1-240517, H7-196736, S60-26024, S62-19801, 2003-1159767 and 2004-309979 and so forth.

In the norbornene-base polymer used for the present invention, $R^{45}$ and $R^{46}$ are preferably hydrogen atom or $-CH_3$, respectively, $X^{43}$ and $Y^{43}$ are preferably hydrogen atom, Cl or $-COOCH_3$, and other groups may appropriately be selected. The norbornene-base resin is commercially available from JSR Corporation under the trade names of Arton G and Arton F, or from Zeon Corporation under the trade names of Zeonor ZF14, ZF16, Zeonex 250 and Zeonex 280, all of which are applicable.

The norbornene-base addition (co)polymer are disclosed in Japanese Laid-Open Patent Publication No. H10-7732, Published Japanese Translations of PCT International Publication for Patent Application No. 2002-504184, US2004229157A1, WO2004/070463A1 and so forth. It can be obtained by addition polymerization of norbornene-base polycyclic unsaturated compounds with each other. It is also allowable, as requested, to put the norbornene-base polycyclic unsaturated compound into addition polymerization together with ethylene, propylene, butene; conjugated diene such as butadiene and isoprene; non-conjugated diene such as ethylidene norbornen; linear diene compounds such as acrylonitrile, acrylic acid, methacrylic acid, maleic anhydride, acrylate ester, methacrylate ester, maleimide, vinyl acetate and vinyl chloride. The norbornene-base addition (co)polymer is commercially available from Mitsui Chemicals, Inc. under the trade name of Apel, typically including grades of APL8008T (Tg70° C.), APL6013T (Tg125° C.) and APL6015T (Tg145° C.) differed in the glass transition point (Tg). It is also commercially available from Polyplastics Co., Ltd. under the trade names of TOPAS8007, ditto 6013 and ditto 6015 in pellet form. Appear 3000 is also available from Ferrania.

There is no limitation on the glass transition point (Tg) of cyclic polyolefin in the present invention, wherein even cyclic polyolefin having Tg of as high as 200 to 400° C., for example, is applicable.

(Fine Particles)

In the present invention, a composition comprising the above-described cyclic polyolefin and fine particles may be used for formation of the second optically anisotropic layer. Addition of the fine particles can lower dynamic friction coefficient of the film surface, and can thereby reduce stress possibly applied to the film during handling. Examples of the fine particles applicable to the present invention include organic and inorganic compound fine particles.

Preferable examples of the inorganic compound include silicon-containing compound, silicon dioxide, titanium oxide, zinc oxide, aluminum oxide, barium oxide, zirconium oxide, strontium oxide, antimony oxide, tin oxide, tin-antimony oxide, calcium carbonate, talc, clay, calcined kaolin, calcined caldium silicate, hydrated calcium silicate, aluminum silicate, magnesium silicate and calcium phosphate and so forth, more preferably silicon-containing inorganic compound and metal oxides, wherein silicon dioxide is particularly preferably used because of its ability of reducing turbidity. Particles of silicon dioxide are commercially available typically under the trade names of Aerosil R972, R974, RP12, 200, 300, R202, OX50, TT600 (all from Nippon Aerosil Co., Ltd.). Particles of zirconium oxide are commercially available typically under the trade names of Aerosil R976 and R811 (both from Nippon Aerosil Co., Ltd.).

Examples of the organic compound include polytetrafluoroethylene, cellulose acetate, polystyrene, polymethyl methacrylate, polypropyl methacrylate, polymethyl acrylate, polyethylene cabonate, starch and so forth, and ground and classified products of them. Also polymer compound synthesized by suspension polymerization, and polymer compound formed into spheres by the spray-drying process or the dispersion process can be used.

Primary mean particle size of these particles is preferably 1 to 20,000 nm in view of suppressing the haze to a low level, more preferably 1 to 10,000 nm, still more preferably 2 to 1,000 nm, and especially preferably 5 to 500 nm. The primary mean particle size is obtained by observing the particles under a transmission electron microscope, and by calculating a mean value of their particle size. Particles as purchased often coagulate, so that it is preferable to disperse them by a publicly known method before use. It is preferable to attain, by dispersion, the secondary particle size to 200 to 1,500 nm, and more preferably 300 to 1,000 nm. Amount of addition of the particles is preferably 0.01 to 0.3 parts by mass per 100 parts by mass of the cyclic polyolefin, more preferably 0.05 to 0.2 parts by mass, and most preferably 0.08 to 0.12 parts by mass.

Preferable range of haze of the cyclic polyolefin film added with the particles falls on 2.0% or below, more preferably 1.2% or below, and particularly preferably 0.5% or below. Preferable dynamic friction coefficient of the cyclic polyolefin film added with the particles falls on 0.8 or below, and particularly preferably 0.5 or below. The dynamic friction coefficient can be measured using a steel ball conforming to the method specified by JIS or ASTM. The haze can be measured using a haze meter Model 1001DP from Nippon Denshoku Industries, Ltd.

The second optically anisotropic layer may be fabricated also from a solution containing the cyclic polyolefin dissolved in a predetermined solvent. It is preferable to cast the cyclic polyolefin solution for film formation.

(Solvent)

Solvent used for preparing the above-described solution is not specifically limited so far as it can dissolve the cyclic polyolefin, so far as it can be cast to form the film, and thereby the objects can be achieved. The solvent adoptable in the present invention is preferably selected typically from chlorine-containing solvent such as dichloromethane and chloroform, chain-like hydrocarbon cyclic hydrocarbon, aromatic hydrocarbon, ester, ketone, ether, having 3 to 12 carbon atoms. The ester, ketone and ether may have a cyclic structure. Examples of the chain-like hydrocarbon containing 3 to 12 carbon atoms include hexane, octane, isooctane and decane. Examples of cyclic hydrocarbon having 3 to 12 carbon atoms include cyclopentane, cyclohexane and derivatives thereof. Examples of the aromatic hydrocarbon having 3 to 12 carbon atoms include benzene, toluene and xylene. Examples of the ester having 3 to 12 carbon atoms include ethyl formate, propyl formate, pentyl formate, methyl acetate, ethyl acetate and pentyl acetate. Examples of the ketone having 3 to 12 carbon atoms include acetone, methyl ethyl ketone, diethyl ketone, diisobutyl ketone, cyclopentanone, cyclohexanone and methyl cyclohexanone. Examples of the ether having 3 to 12 carbon atoms include diisopropyl ether, dimethoxy methane, dimethoxy ethane, 1,4-dioxane, 1,3-dioxolane, tetrahydrofuran, anisole and phenetol. Examples of the organic solvent having two or more functional groups include 2-ethoxy ethyl acetate, 2-methoxy ethanol and 2-butoxyethanol. The organic solvent preferably has a boiling point of 35° C. to 150° C., both ends inclusive For the purpose of adjusting physical properties of the solution, such as driability, viscosity and the like, two or more solvent may be used in a mixed form, and even a poor solvent may be added so far as the cyclic polyolefin can dissolve in the resultant mixed solvent.

Preferable poor solvent can appropriately be selected depending on species of the polymer to be adopted. When the chlorine-containing organic solvent is used as a good solvent, alcohols can desirably be used. The alcohols may be any of chain-formed, branched and cyclic, and are particularly preferably saturated aliphatic hydrocarbon. Hydroxyl group of the alcohols may be any one of primary to tertiary ones. Examples of the alcohol include methanol, ethanol, 1-propanol, 2-propanol, 1-butanol, 2-butanol, t-butanol, 1-pentanol, 2-methyl-2-butanol and cyclohexanol. Also fluorine-containing alcohol can be used as the alcohol. Examples of which include 2-fluoroethanol, 2,2,2-trifluoroethanol and 2,2,3,3-tetrafluoro-1-propanol. Among poor solvents, monovalent alcohol can preferably be used in expectation of its effect of reducing peeling resistance. Particularly preferable alcohols may vary depending on the good solvent to be selected, wherein those having a boiling point of 120° C. or below are preferably used, monovalent alcohols having 1 to 6 carbon atoms are more preferably used, and alcohols having carbon atoms of 1 to 4 are particularly preferably used. Mixed solvent particularly preferably used for preparing the cyclic polyolefin solution is such as those using dichloromethane as a main solvent, combined with one or more alcohols selected from methanol, ethanol, propanol, isopropanol and butanol as poor solvent(s).

(Additives)

The cyclic polyolefin solution may be added with various additives (for example, anti-degradation agent, UV absorber, verer, retardation (optical anisotropy) adjusting agent, releasing aid, plasticizer, infrared absorber and the like, in the individual preparation processes, depending on applications, wherein they may be solid or may be oily matter. In other words, they are not specifically limited in their melting points and boiling points. For example, UV absorbers having melting points of lower than 20° C. and not lower than 20° C. may be used in a mixed form, or anti-degradation agents may be mixed and used in a similar manner. Furthermore, the infrared absorption dye is described, for example, in Japanese Laid-Open Patent Publication No. H2001-194522. Timing of the addition may be arbitral in the preparation process of the cyclic polyolefin solution (dope), or it is also allowable to add a process step of adding the additives after the final process step of preparing the dope. Furthermore, amount of addition of the individual additives is not specifically limited, so far as their function can be expressed. For the case where the cyclic polyolefin film has a multi-layered structure, species and amounts of addition of the additives in the individual layers may differ from each other.

(Anti-degradation Agent)

The above-described cyclic polyolefin solution may be added with a publicly-known, phenol-base or hydroquinone-base anti-degradation agent (antioxidant) such as 2,6-di-t-butyl-4-methyl phenol, 4,4'-thiobis(6-t-butyl-3-methyl phenol), 1,1'-bis(4-hydroxyphenyl)cyclohexan, 2,2'-methylenebis(4-ethyl-6-t-butylphenol), 2,5-di-t-butylhydroquinone, and pentaerythrityl tetrakis[3-(3,5-di-t-butyl-4-hydroxyphenyl) propionate. It is also preferable to add phosphorus-containing antioxidant such as tris(4-methoxy-3,5-diphenyl)phosphite, tris(nonylphenyl)phosphite, tris(2,4-di-t-butylphenyl) phosphite, bis(2,6-di-t-butyl-4-methyl phenyl)pentaerythritol diphosphite, and bis(2,4-di-t-butylphenyl)pentaerythritol diphosphite. Amount of addition of the antioxidant falls in the range from 0.05 to 5.0 parts by mass per 100 parts by mass of cyclic polyolefin.

(UV Absorber)

The above-described cyclic polyolefin solution may preferably be added with UV absorber, in view of preventing degradation of the polarizing plate, liquid crystal and so forth. From the viewpoint of ensuring excellent absorption ability of ultraviolet radiation of 370 nm or shorter, and desirable performance of liquid crystal display, the UV absorber preferably used herein is such as showing only a small absorption of the visible light longer than 400 nm. Specific examples of the UV absorber preferably used in the present invention include hindered phenol-base compound, oxybenzophenone-base compound, benzotriazole-base compound, salyclate ester-base compound, benzophenone-base compound, cyanoacrylate-base compound and nickel complex salt-base compound. Examples of the hindered phenol-base compound include 2,6-di-tert-butyl-p-cresol, pentaerythrityltetrakis[3-(3,5-di-tert-butyl-4-hydroxyphenyl) propionate], N,N'-hexamethylenebis(3,5-di-tert-butyl-4-hydroxy-hydrocinnamic), 1,3,5-trimethyl-2,4,6-tris(3,5-di-tert-butyl-4-hydroxybenzyl)benzene and tris(3,5-di-tert-butyl-4-hydroxybenzyl)-isocyanurate. Examples of the benzotriazole-base compound include 2-(2'-hydroxy-5'-methyl phenyl)benzotriazole, 2,2-methylenebis(4-(1,1,3,3-tetramethyl butyl)-6-(2H-benzotriazole-2-yl)phenol), (2,4-bis (n-octylthio)-6-(4-hydroxy-3,5-di-tert-butylanilino)-1,3,5-triazine, triethylene glycolbis[3-(3-tert-butyl-5-methyl-4-hydroxyphenyl)propionate], N,N'-hexamethylenebis(3,5-di-tert-butyl-4-hydroxy-hydrocynnamiode), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol and pentaerythrityl tetrakis[3-(3,5-di-tert-butyl-4-hydroxyphenyl)propionate]. Amount of addition of these UV absorbers preferably falls in the range from 1 ppm to 1.0% relative to cyclic polyolefin, and more preferably from 10 to 1000 ppm.

(Retardation Enhancer)

In the present invention, a compound having at least two aromatic rings can be used as the retardation enhancer, in expectation of expressing retardation value. Preferable range of amount of addition and preferable examples of the retardation enhancer are same as those for the retardation promoters used for the cellulose acylate film.

(Releasing Aid)

As an additive for reducing peeling resistance of the film, many of those having a potent effect have been found among surfactants. Examples of preferable releasing aid include phosphate ester-base surfactant, carboxylic acid- or carboxylate salt-base surfactant, sulfonic acid- or sulfonate salt-base surfactant and sulfuric acid- or sulfate ester-base surfactant. It is also allowable to use a fluorine-containing surfactant having a part of hydrogen atoms, bount to the hydrocarbon chain of the surfactant substituted by fluorine atoms. Releasing aids are listed below.

RZ-1 $C_8H_{17}O—P(=O)—(OH)_2$
RZ-2 $C_{12}H_{25}O—P(=O)—(OK)_2$
RZ-3 $C_{12}H_{25}OCH_2CH_2O—P(=O)—(OK)_2$
RZ-4 $C_{15}H_{31}(OCH_2CH_2)_5O—P(=O)—(OK)_2$
RZ-5 $\{C_{12}H_{25}O(CH_2CH_2O)_5\}_2—P(=O)—OH$
RZ-6 $\{C_{18}H_{35}(OCH_2CH_2)O\}_2—P(=O)—ONH_4$
RZ-7 $(t-C_4H_9)_3—C_6H_2—OCH_2CH_2O—P(=O)—(OK)_2$
RZ-8 $(iso-C_9H_{19}—C_6H_4—O—(CH_2CH_2O)_5—P(=O)—(OK)(OH)$
RZ-9 $C_{12}H_{25}SO_3Na$
RZ-10 $C_{12}H_{25}OSO_3Na$
RZ-11 $C_{17}H_{33}COOH$
RZ-12 $C_{17}H_{33}COOH \cdot N(CH_2CH_2OH)_3$
RZ-13 $iso-C_8H_{17}—C_6H_4—O—(CH_2CH_2O)_3—(CH_2)_2SO_3Na$
RZ-14 $(iso-C_9H_{19})_2—C_6H_3—O—(CH_2CH_2O)_3—(CH_2)_4SO_3Na$
RZ-15 sodium triisopropyl naphthalene sulfonate
RZ-16 sodium tri-t-butylnaphthalene sulfonate
RZ-17 $C_{17}H_{33}CON(CH_3)CH_2CH_2SO_3Na$
RZ-18 $C_{12}H_{25}—C_6H_4SO_3 \cdot NH_4$ Amount of addition of the releasing aid is preferably 0.05 to 5% by mass relative to the cyclic polyolefin, preferably 0.1 to 2% by mass, and most preferably 0.1 to 0.5% by mass.

(Plasticizer)

The cyclic polyolefin-base resin is generally poorer in flexibility as compared with the cellulose acetate, and is likely to cause cracking of the film if bending stress or shearing stress is applied to the film. It is also likely to induce cracks in cut portion when processed to produce optical films, and likely to generate chips by cutting. The generated chips has been causative of pollution of the optical films, and of inducing optical defects. In order to improve the problems, plasticizer may be added. More specifically, phthalate ester-base, trimellitate ester-base, aliphatic dibasic acid ester-base, orthophosphate ester-base, acetate ester-base, polyester-epoxized ester-base, ricinolate ester-base, polyolefin-base and polyethylene glycol-base compounds.

The plasticizer applicable herein is preferably selected from compounds which exist in a liquid form at normal temperature and under normal pressure, and have a boiling point of 200° C. or above. Specific names of compounds can be exemplified as follows. Examples of the aliphatic dibasic ester-base compounds include dioctyl adipate (230° C./760 mmHg), dibutyl adipate (145° C./4 mmHg), di-2-ethylhexyl adipate (335° C./760 mmHg), dibutyldiglycol adipate (230 to 240° C./2 mmHg), di-2-ethylhexyl azelate (220 to 245° C./4 mmHg) and di-2-ethylhexyl sebacate (377° C./760 mmHg); phthalate ester-base compounds such as diethyl phthalate (298° C./760 mmHg), diheptyl phthalate (235 to 245° C./10 mmHg), di-n-octyl phthalate (210° C./760 mmHg) and diisodecyl phthalate (420° C./760 mmHg); polyolefin-base compounds such as paraffin waxes (mean molecular weight 330 to 600, melting point 45 to 80° C.) including normal paraffin, isoparaffin and cycloparaffin, liquid paraffins (JIS K2231, ISO VG8, ditto VG15, ditto VG32, ditto VG68, ditto VG100, etc.), paraffin pellet (those having melting points of 56 to 58° C., 58 to 60° C., 60 to 62° C., etc.), paraffin chloride, low-molecular-weight polyethylene, low-molecular-weight polypropylene, low-molecular-weight polyisobutene, hydrogenated polybutadiene, hydrogenated polyisoprene, and squalane.

Amount of addition of the plasticizer is adjusted to 0.5 to 40.0% by mass relative to the cyclic polyolefin-base resin, preferably 1.0% by mass to 30.0% by mass, and more preferably 3.0% to 20.0% by mass. The amount of addition of the plasticizer smaller than the above-described range may result in only an insufficient plasticizing effect, and consequently cannot improve the workability. The amount exceeding the above-described range may result in releasing and elution of the plasticizer after a long elapse of time, and may undesirably result in optical non-uniformity and pollution to other components.

(Dope Preparation)

Methods of preparing the above-described cyclic polyolefin solution (dope) include a method of dissolution by stirring under room temperature; the cooled solubilization method by which the polymer is allowed to swell under stirring at room temperature, then cooled to −20° C. to −100° C., and again heated so as to dissolve it; the high-temperature solubilization method by which the polymer is dissolved by heating the solution to a temperature at and above the boiling point of the main solvent in a closed container; and a method by which the polymer is dissolved by raising temperature and pressure to the critical point of the solvent. Readily solubilizable polymer may preferably be dissolved at room temperature, whereas poorly solubilizable polymer may dissolved under heating and pressure in a tightly closed container. When dichloromethane is selected as the main solvent, most of cyclic polyolefins can be dissolved under heating at 20° C. to 100° C.

Viscosity of the above-described cyclic polyolefin solution preferably falls in the range from 1 Pa·s to 500 Pa·s at 25° C., and more preferably from 5 Pa·s to 200 Pa·s. The viscosity was measured as described below. One milliliter of a sample solution was measured using a rheometer (CLS 500) and a steel cone having a diameter of 4 cm/2° (both from TA Instruments) The sample solution herein was preliminarily heated and kept at a constant temperature from which the measurement is started, before the measurement.

Aiming at further facilitating the dissolution, it is also allowable to dissolve it to a low concentration, and then condensing the product using a condensing means. Method of condensing is not specifically limited, wherein possible methods include a method of introducing a low concentration solution into a space formed between a cylinder and a locus of outer circumference of a rotor blade rotating in the cylinder in the circumferential direction, and allowing the solvent to vaporize while keeping temperature difference with respect to the solution, to thereby obtain a high concentration solution (for example, Japanese Laid-Open Patent Publication No. H4-259511, etc.), and a method of blowing a heated low concentration solution through a nozzle into a container, so as to cause flash vaporization of the solvent on a path ranging from the nozzle to the inner wall of the chamber onto which the solvent collides, and drawing the solvent vapor out from the chamber, and drawing the resultant high concentration solution out from the bottom of the chamber (for example, methods described in the individual patent specifications of U.S. Pat. Nos. 2,541,012, 2,858,229, 4,414,341 and No. 4,504,355).

Prior to the casting, the solution is preferably freed from with unsolubilized components or foreign matters such as dusts and impurities, using an appropriate filter material such as metal mesh, flannel and the like. Filtration of the cyclic polyolefin solution is carried out preferably by using a filter having an absolute filtration accuracy of 0.1 to 100 µm, and more preferably 0.5 to 25 µm. Thickness of the filter is preferably 0.1 to 10 mm, and more preferably 0.2 to 2 mm. In this case, filtering pressure is preferably adjusted to 1.6 MPa or below, more preferably 1.3 MPa or below, still more preferably 1.0 MPa and particularly 0.6 MPa or below. The filter material preferably applicable herein is any of publicly known materials such as glass fiber, cellulose fiber, filter paper, and fluorine-containing resin such as tetrafluoroethylene resin, and so forth, wherein ceramics and metals are also preferably used. Viscosity of the cyclic polyolefin solution immediately before the casting desirably falls in a range allowing casting for film formation, and is preferably adjusted in the range generally from 5 Pa·s to 1,000 Pa·s, more preferably 15 Pa·s to 500 Pa·s, and still more preferably 30 Pa·s to 200 Pa·s. The temperature herein is not specifically limited so far as it falls at around the casting temperature, preferably falls in the range from −5 to +70° C., and more preferably −5 to +35° C.

(Thickness of Cyclic Polyolefin Film)

Thickness of the cyclic polyolefin film after drying may vary depending of the purpose of use, wherein it generally falls in the range from 5 µm to 500 µm, more preferably from 30 µm to 150 µm, and in particular for use in liquid crystal display devices, it preferably falls in the range from 40 µm to 110 µm.

The film may be adjusted to a desired thickness and thickness distribution suitable for the present invention, by controlling solid content of the dope, slit width of a die, extrusion pressure from the die, and travel speed of a metal support. Thus-obtained cyclic polyolefin film preferably has a width of 0.5 µm to 3 m, more preferably 0.6 µm to 2.5 m, and still more preferably 0.8 µm to 2.2 m. Length of winding up per one roll is preferably 100 m to 10,000 m, more preferably 500 m to 7,000 m, and still more preferably 1,000 m to 6,000 m. Variation of the Re value over the full width is preferably falls in ±5 nm, and more preferably ±3 nm. Variation in the Rth value preferably falls in ±10 nm, and more preferably ±5 nm. Also variations in the Re value and Rth values in the longitudinal direction preferably fall in the range of variation in the width-wise direction.

(Development of Optical Anisotropy)

The cyclic polyolefin film used as the second optically anisotropic layer can be adjusted in the in-plane retardation and thickness-wise retardation thereof to predetermined ranges, by appropriately selecting structure of the polymer to be adopted, species and amount of addition of the additives, stretching factor, residual volatile components during the peeling off and so forth. For example, by adjusting the residual volatile component during the peeling off to 40 to 85 mass %, Rth can be controlled in the range as widely enough as 180 to 300 nm. In general, a larger content of the residual volatile content during peeling off makes Rth smaller, and a smaller content of the residual volatile content during peeling off makes Rth larger. For example, by shortening the drying time on the metal base and by increasing the content of the residual volatile content during peeling off, it is made possible to relax the surface alignment, and thereby the Rth can arbitrarily be lowered, allowing various types of retardation to exhibit suitable for the various purposes of use, through adjustment of the process conditions.

The second optically anisotropic layer is characterized in containing the cyclic polyolefin, and being a film stretched by the transverse stretching method, longitudinal stretching method, simultaneous biaxial stretching method or sequential biaxial stretching method. The stretching is preferably carried out immediately after the film, obtained by the film formation by casting, is peeled off from the support, while leaving an enough amount of solvent unremoved. Stretching can make (1) the film free from wrinkle and deformation, and excellent in planarity, and (2) the film adjusted in the in-plane retardation within a desired range. When the stretching is aimed at (1), the film is stretched at relatively high temperatures, while setting a factor of stretching as small as 1% up to 10%, wherein stretching by 2% to 5% is particularly preferable. When the stretching is aimed at both of (1) and (2), or only at (2), the film is stretched at relatively low temperatures, while setting a factor stretching as large as 5% to 150%. The stretching of the film may be uniaxial stretching only in the longitudinal or in the transverse direction, of may be simultaneous or sequential biaxial stretching.

It is preferable that the cyclic polyolefin film after the stretching is further dried, and then wound up while keeping the residual volatile component not higher than 2%. The film is preferably knurled on both edges thereof before being wound up. The knurling may be effected from one side or from both sides.

(Saponification)

The cyclic polyolefin-base film may be saponified aiming at improving adhesiveness with other layers (first optically anisotropic layer and polarizing film, for example). The saponification may be carried out at any timing after the casting process, wherein saponification before or after the stretching process, and after drying of the film is preferable. Either of the methods such as immersing the film into an alkali solution, and such as spraying or coating an alkali solution onto the surface of the film are adoptable to the saponification. Only one surface of the film can uniformly be saponified without causing irregularity. Saponification based on coating is more preferable. On the other hand, saponification based on dipping can make the process speed extremely higher in particular in alkali saponification involving an organic solvent, in comparison with the process using no organic solvent.

The saponification is preferably carried out within a temperature range not exceeding 120° C., and not causative of deformation of the film to be processed, denaturation of the process solution, and so forth, and more preferably in the temperature range from 10 to 100° C., and still more preferably from 20 to 60° C.

Process time for the saponification may be determined by appropriately adjusting the alkali solution and process temperature, and is preferably set within the range from 1 to 60 seconds.

(Alkali Solution)

The alkali solution used for the saponification in the present invention is preferably those having a pH value of 11 or above, and more preferably 12 to 14.

Examples of alkali agents used for the alkali solution include inorganic alkali agents such as sodium hydroxide, potassium hydroxide and lithium hydroxide; and organic alkali agents such as diethanolamine, triethanolamine, DBU (1,8-diazabicyclo[5,4,0]-7-undecene), DBN (1,5-diazabicyclo[4,3,0]-5-nonene), tetramethylammonium hydroxide, tetraethylammonium hydroxide, tetrapropylammonium hydroxide, tetrabutylammonium hydroxide and triethylbutylammonium hydroxide. These alkali agents may independently be used or may be used in combination of two or more species, allowing a part of which added in a salt form typically such as being halogenated.

Among these alkali agents, use of sodium hydroxide or potassium hydroxide is preferable in view of enabling pH adjustment over a wider range, by adjusting the amount of use thereof.

Concentration of the alkali solution is determined depending on species of the alkali agent to be used, reaction temperature and reaction time, wherein content of the alkali agent in the alkali solution is preferably 0.1 to 3 mol/kg, and more preferably 0.5 to 2 mol/kg.

Solvent of the alkali solution is preferably a mixed solution of water and a water-soluble organic solvent. The organic solvent may be any of those miscible with water, and may preferably be those having a boiling point of 120° C. or below, in particular 60 to 120° C., and still in particular 100° C. or below. The solvent is preferably such as having an inorganicity/organicity value (I/O value) of 0.5 or above, and a solubility parameter ranging from 16 to 40 $[mJ/m^3]^{1/2}$. More preferably, the solvent has an I/O value of 0.6 to 10, and a solubility parameter ranging from 18 to 31 $[mJ/m^3]^{1/2}$. The solvent having an I/O value not larger than the upper limit value (inorganicity is not too strong), and having a solubility parameter not smaller than the lower limit value is preferable, in view of avoiding non-conformities such as lowering in the alkali saponification speed, and unsatisfactory in-plane uniformity of the degree of saponification. On the other hand, the solvent having an I/O value not smaller than the lower limit value (organicity is not too strong), and having a solubility parameter not larger than the upper limit value is preferable, because it is high in the saponification speed, not causative of nonconformity such that haze becomes more likely to occur, and excellent also in the in-plane uniformity.

Use of the organic solvent, in particular those having organicity and solubility within the above described ranges, in combination with the surfactants, solubilizing agent and so forth, can successfully keep a high saponification speed, and can improve uniformity in saponification over the entire surface. That is, the alkali solution for the alkali saponification is preferably such as containing a water-soluble organic solvent having a boiling point of 60 to 120° C., and at least either of surfactant and solubilizing agent.

Organic solvents having preferable characteristic values are typically those described in "Shin-pan Yozai Poketto Bukku (New Edition of Pocket Book of Solvents)", edited by the Society of Synthetic Organic Chemistry, Japan, published by Ohmsha, Ltd., 1994, for example. Inorganicity/organicity values (I/O value) of organic solvents are explained, for example, in "Yuki Gainen-Zu (Organic Conceptual Diagram)", written by Yoshio Tanaka, published by Sankyo Shuppan, 1983), p. 1 to 31.

More specifically, examples of the organic solvent include monovalent aliphatic alcohols (for example, methanol, ethanol, propanol, butanol, pentanol, hexanol, etc.); alicyclic alkanols (for example, cyclohexanol, methyl cyclohexanol, methoxy cyclohexanol, cyclohexyl methanol, cyclohexyl ethanol, cyclohexyl propanol, etc.); phenyl alkanols (for example benzyl alcohol, phenyl ethanol, phenyl propanol, phenoxy ethanol, methoxy benzyl alcohol, benzyloxy ethanol, etc.); heterocyclic alkanols (for example, furfuryl alcohol, tetrahydrofurfuryl alcohol, etc.); monoethers of glycol compounds (for example, methyl cellosolve, ethyl cellosolve, propyl cellosolve, methoxy methoxy ethanol, butyl cellosolve, hexyl cellosolve, methyl carbitol, ethyl carbitol, propyl carbitol, butylcarbitol, ethoxy triglycol, propylene glycol monomethyl ether, propylene glycol monoethyl ether, propylene glycol monopropyl ether, etc.); ketones (for example, acetone, methyl ethyl ketone, methyl isobutyl ketone, etc.); amides (for example, N,N-dimethyl formamide, dimethyl formamide, N-methyl-2-pyrrolidone, 1,3-dimethyl imidazlolidinone, etc.); sulfoxides (for example, dimethyl sulfoxide) and ethers (for example, tetrahydrofuran, pyran, dioxane, trioxane, dimethyl cellosolve, diethyl cellosolve, dipropyl cellosolve, methyl ethyl cellosolve, dimethyl carbitol, dimethyl carbitol, methyl ethyl carbitol, etc.). The organic solvent may independently be used, or may be used in combination of two or more species.

For the case where the organic solvent is used independently or by mixing two or more species thereof, at least one organic solvent is preferably large in water solubility. Water solubility of the organic solvent is preferably 50% by mass or above, and those freely miscible with water are more preferable. By this adjustment, it is made possible to prepare the alkali solution showing a sufficient solubility with respect to alkali agent, salt of aliphatic acid by-produced in the saponification, carbonate salt ascribable to carbon dioxide in the air absorbed by the solution and so forth.

Ratio of use of the organic solvent relative to the solvent is determined depending on species of the solvent, miscibility with water (solubility), reaction temperature, and reaction time.

Ratio of mixing of water and organic solvent is preferably 3/97 to 85/15 on the mass basis, more preferably 5/95 to 60/40, and still more preferably 15/85 to 40/60. In these ranges, the acylate film can readily and uniformly saponified over the entry surface thereof, without impairing the optical characteristics of the film.

As the organic solvent contained in the alkali solution used for the present invention, any other organic solvents different from those having the above-described desirable I/O values (for example, fluorinated alcohol, etc.) may be used in combination as a dissolution aid for the surfactants and solubilizing agent described later. The content thereof is preferably 0.1 to 5% relative to the total mass of liquid used for the alkali saponification.

The alkali solution used for the present invention preferably contains a surfactant. Addition of the surfactant is advantageous, for example, in reducing the surface tention and thereby facilitating the coating, in improving uniformity of the coated film and thereby preventing cissing, in suppressing haze which tends to occur under the presence of the organic solvent, and in allowing the saponification to uniformly proceed. These effects become particularly distinctive under coexistence of the solubilizing agent described later. There is no special limitation on the surfactant adopted herein, allowing use of any of anionic surfactant, cationic surfactant, amphoteric surfactant, nonionic surfactant and fluorine-containing surfactant.

More specifically, the surfactant can be exemplified by those described, for example, in "Kaimen Kassei-zai Hando Bukku (Handbook of Surfactant (new edition))", written by Tokiyuki Yosida, published by Kougakutosho, Ltd. 1987, and in "Kaimen Kassei-zai no Kinou Sousei, Sozai Kaihatsu, O-yo Gijutsu (Function Creation, Material Development and Application Technologies of Surfactants)", Series 1, published by Gijutsu Kyoiku Shuppan, 2000.

Among these surfactants, quaternary ammonium salts as cationic surfactants, various polyalkylene glycol derivatives as nonionic surfactants, polyethylene oxide derivatives such as various polyethylene oxide adducts, and betaine-type compounds as amphoteric surfactants are preferable.

Use of the nonionic surfactant and the anionic surfactant in combination, or the nonionic surfactant and the cationic surfactant in combination in the alkali solution is also preferable in view of enhancing the effects of the present invention. Amount of addition of these surfactants into the alkali solution preferably resides in the range from 0.001 to 10% by mass of the total solution, and more preferably in the range from 0.01 to 5% by mass.

The alkali solution used for the present invention is preferably added also with the solubilizing agent. "Solubilizing agent" referred to in the present invention means a hydrophilic compound such as 100 g of which allows 50 g of water to dissolve therein at 25° C. Solubility of water into the solubilizing agent is preferably 80 g of water into 100 g of the solubilizing agent, and more preferably 100 g or more. When the solubilizing agent is a liquid compound, the boiling point thereof is preferably 100° C. or above, and more preferably 120° C. or above.

The solubilizing agent has a function of preventing drying up of the alkali solution adhered on the wall surface of a tank or the like storing the alkali solution, suppressing the solidification, and keeping the alkali solution stable. It also functions as avoiding a problem in that, after the alkali solution is coated on the surface of an optical film, and allowed to stand for a predetermined duration of time, and before the saponification is terminated, a thin film of coated alkali solution dries up, causing deposition of solid matters, and making it difficult to wash out the solid matters in the water cleaning step. It also prevents phase separation between water as a solvent, and an organic solvent. In particular, the optical film treated under coexistence of the surfactant, the organic solvent and the above-described solubilizing agent has only a small haze, and achieves a uniform degree of saponification stably over the entire surface thereof, even if the saponification is continuous carried out for the long web.

The solubilizing agent is not specifically limited so far as it can satisfy the above-described conditions, wherein preferable examples include water-soluble polymers containing repetitive unit each having hydroxyl group and/or amide group, such as polyol compound and saccharides.

The polyol compound used herein may be any of low-molecular-weight compound, oligomer compound and high-molecular-weight compound.

Examples of the aliphatic polyols include alkane diols having 2 to 8 carbon atoms (for example, ethylene glycol, propylene glycol, butane diol, pentane diol, hexane diol, glycerin monomethyl ether, glycerin monoethyl ether, cyclohexane diol, cyclohexane dimethanol, diethylene glycol, dipropylene glycol, etc.); and alkanes having 3 to 18 carbon atoms having three or more hydroxyl groups (for example, glycerin, trimethylolethane, trimethylolpropane, trimethylolbutane, hexane triol, pentaerythritol, diglycerin, dipentaerythritol, inositol, etc.).

The polyalkylene oxypolyols may be composed of the same alkylene diols described in the above bound with each other, or may be composed of different alkylene diols bound with each other, wherein the polyalkylene polyol composed of the same alkylene diols bound with each other is more preferable. In both cases, the number of bond is preferably 3 to 100, and more preferably 3 to 50. Specific examples thereof include polyethylene glycol, polypropylene glycol and poly (oxyethylene-oxypropylene).

The saccharide is exemplified by water-soluble compound described, for example, in "Tennen Kobunshi (Natural Polymers)", edited by editing committee of polymer experiments, The Society of Polymer Science, Japan, Chapter 2 (published by Kyoritsu Shuppan Co., Ltd., 1984), and "Kindai Kogyo Kagaku 22, Tennenbutsu Kogyo Kagaku II (Modern Industrial Chemistry 22, Industrial Chemistry of Natural Products)", edited by Ryohei Oda et al., (published by Asakura Publishing Co., Ltd., 1967). Among others, saccharides such as having no free aldehyde group and ketone group, and consequently showing no reducing property are preferable.

Saccharide is generally classified into trehalose-type oligosaccharide having glucose, sucrose and reductive groups bound with each other, glycoside having reductive group of saccharide and non-saccharide bound with each other, and sugar alcohol obtained by reducing saccharide by hydrogen addition, all of which preferably used for the present invention.

Examples of which include saccharose, trehalose, alkyl glycoside, phenol glycoside, mustard oil glycoside, D,L-arabitol, ribitol, xylitol, D,L-sorbit, D,L-mannitol, D,L-iditol, D,L-talitol, dulcitol, allodulcitol and reductive starch syrup. These saccharides may independently be used, or may be used in combination of two or more species.

Examples of the water-soluble polymer having repetitive units each having hydroxyl group and/or amide group include natural gums (for example, gum arabic, guar gum, tragacanth gum, etc.), polyvinyl pyrrolidone, dihydroxypropyl acrylate polymer, and adduct of celluloses or chitosans with epoxy compound (ethylene oxide or propylene oxide).

Among others, polyol compounds such as alkylene polyol, polyalkylene oxypolyol, sugar alcohol are preferable.

Content of the solubilizing agent is preferably 0.5 to 25% by mass of the total of the alkali solution, more preferably 1 to 20% by mass.

The alkali solution used in the present invention may contain other additives. Examples of other additives include defoaming agent, alkali solution stabilizer, pH buffer agent, antiseptics and antibacterial agent.

Content of other additives is preferably 0.001 to 30% by mass of the total of the alkali solution, more preferably 0.005 to 25% by mass.

(Coating Saponification Process with Alkali Solution)

Methods of surface treatment of the film using the above-descried alkali solution are preferably those capable of treating only one surface of the film. Examples of coating method including, dip coating, curtain coating, bar coating, rod coating (using a rod wound with a thin metal wire), roll coating (forward roll coater, reverse roll coater, gravure coater), curtain coating, die coating (extrusion coater (slot coater), slide coater, slit die coater). Coating systems are described in various literatures (for example, "Modern Coating and Drying Technology", edited by E. Cohen and E. B. Gutoff, published by VCH Publishers, Inc., 1992). Amount of coating of the alkali solution is preferably suppressed to a low level as possible, considering waste liquid treatment necessary thereafter for removal by cleaning with water, preferably 1 ml/m$^2$ to 100 ml/m$^2$, and more preferably 1 ml/m$^2$ to 50 ml/m$^2$. A coating means which can stably be operated even in a region of small amount of coating, such as rod coater, gravure coater, blade coater, die coater, is preferably used. In particular, die coater, which can ensure rapid coating even in a region of small amount of coating, without causing non-uniform coating streak, while keeping the coating machine section uncontact with the surface to be coated with the coating liquid.

Saponification of the film using the alkali solution at a predetermined temperature typically includes a step of preliminarily adjusting the surface temperature to a predetermined temperature before coating, a step of preliminarily conditioning the alkali solution at a predetermined temperature, and a step based on combinations of these steps. It is preferable to combine a step of preliminary adjustment to a predetermined temperature before the coating.

After saponification, it is preferable to clean and remove the alkali solution and reaction products of the saponification from the surface by rinsing, post-neutralization rinsing and the like. More specifically, the description for example of International Publication Pamphlet No. 02/46809 can be exemplified.

[Production of Optical Compensation Film]

The first and second optically anisotropic layers respectively fabricated by the methods described in the above are stacked by an adhesion means. The adhesion means is such as improving adhesiveness between the first and second optically anisotropic layers, and can be configured by an adhesive layer, a tacky layer or the like formed between the layers. The adhesive layer (tacky layer) applicable herein will be detailed in the following paragraphs later. In the present invention, it is particularly preferable to use photo-curing-type adhesive, from the viewpoint of productivity. For example, in a mode where the first optically anisotropic layer is composed of a liquid crystalline composition, and the second optically anisotropic layer is composed of a polymer film, it is preferable to fabricate an optical compensation film in such a way that, rather than using the second optically anisotropic layer as a support of the first optically anisotropic layer, the first optically anisotropic layer is formed on any other support capable of aligning liquid crystal, an adhesive is coated and dried on the surface of thus-formed first optically anisotropic layer, a polymer film destined for the second optically anisotropic layer is then bonded to the surface of the dried adhesive layer, and the dried adhesive layer is cured.

(Adhesive)

Adhesive used for bonding between the first and second optically anisotropic layers, or for bonding between the first optically anisotropic layer and the support is not specifically limited so far as it can exhibit sufficient adhesive force both to the layer composed of a liquid crystalline composition and the polymer film, and it does not impair optical characteristics of the layer composed of a liquid crystalline composition. Examples of which include those of acrylic resin-base, methacrylic resin-base, epoxy resin-base, ethylene-vinyl acetate copolymer-base, rubber-base, urethane-base, polyvinyl ether-base, mixtures of them, and also those having various reactivity such as thermosetting type and/or photo-curing type, and electron beam curing type. The layer composed of any of these adhesives may have a function of a transparent protective layer protecting the layer composed of a liquid crystalline composition. Tacky agent can also be used as the adhesive.

Reaction (curing) conditions of the above-described reactive adhesive and tacky agent vary depending on conditions such as components composing the adhesive and so forth, viscosity, and reaction temperature, so that the conditions may be selected as being matched best to the individual cases. For an exemplary case of using a photo-curing-type adhesive, the reaction can be proceeded by irradiating light from a metal halide lamp, high-pressure mercury lamp, xenon lamp, arc lamp, laser, synchrotron radiation source, preferably under the presence of various publicly-known photo-polymerization initiator added thereto. Energy of irradiation per unit area (1 cm$^2$) is preferably 1 to 2,000 mJ in general on the integral dose basis, and is more preferably 10 to 1,000 mJ. However it does not apply for the case where absorption region of the photo-initiator and spectral range of the light source largely differ, or for the case where the reaction compound per se has an absorption in the wavelength range of the light source. In these cases, it is also allowable to adopt a method such as mixing an appropriate photo-sensitizer, or such as using two or more photo-initiators differing in absorption wavelength from each other in a mixed manner. Acceleration voltage for the electron beam curing type adhesive preferably falls in the range from 10 kV to 200 kV in general, and more preferably from 50 kV to 100 kV.

Thickness of the adhesive layer differs depending on components composing the adhesive, strength of the adhesive and environment of use as described in the above, and preferably falls in the range from 1 to 50 μm in general, more preferably 2 to 30 μm, and still more preferably 3 to 10 μm. The thickness out of these ranges undesirably results in only an insufficient adhesion strength, or bleeding out from the edges.

For the purpose of controlling optical characteristics or controlling peeling-off property from the substrate or intrusion property, the adhesive may be added with various particles and surface modifying agent, so far as the properties will not be impaired.

The above-described particles can be exemplified by those having a refractive index different from that of the compound composing the adhesive, electro-conductive particles capable of improving antistatic property without lowering the transparency, and particles capable of improving anti-friction property, and more specifically exemplified by fine silica, fine alumina, ITO (indium tin oxide) particles, silver particles, and various synthetic resin particles.

The above-described surface modifying agent is not specifically limited so far as they have good compatibility with the adhesive, and they never adversely affect the curing property or post-curing optical characteristics of the adhesive, wherein applicable examples thereof include ionic and non-ionic water-soluble surfactant, oil-soluble surfactant, polymer surfactant, fluorine-containing surfactant, organometallic surfactant such as silicone, and reactive surfactant. Among others, fluorine-containing surfactant such as perfluoroalkyl compound and perfluoropolyether compound, or organometallic surfactant such as silicone are particularly preferable, by virtue of their large surface modification effects. Amount of addition of the surface modifying agent preferably falls within the range from 0.01 to 10% by mass of the adhesive, more preferably 0.05 to 5% by mass, and still more preferably 0.1 to 3% by mass. Amount of addition smaller than these ranges results in only an insufficient effect of addition, and larger than these ranges may undesirably degrade the adhesion strength. The surface modifying agent may independently be used, or may be in combination of two or more species.

Various additives such as antioxidant and UV absorber may be added to the adhesive, so far as the effects of the present invention will not be lowered.

[Polarizing Plate]

The polarizing plate of the present invention includes a polarizer film and the optical compensation film of the present invention.

Iodine-containing polarizer film, dye-containing polarizer film using dichroic dye, and polyene-base polarizer film are applicable to the polarizer film. The iodine-containing polarizer film and the dye-containing polarizer film are fabricated generally by using a polyvinyl alcohol-base film. Absorption axis of the polarizer film corresponds to the direction of stretching of the film. Therefore, the polarizer film stretched in the longitudinal direction (direction of travel) has the absorption axis aligned in parallel with the longitudinal direction thereof, and the polarizer film stretched in the width-wise direction (normal to the direction of travel) has the absorption axis aligned normal to the longitudinal direction.

A preferable method of fabricating the polarizing plate of the present invention includes a step of continuously stacking the polarizer film and the optical compensation film while keeping a long web form of the both. The web-form polarizing plate is cut to size of the screen of the liquid crystal display device to which the polarizing plate is adopted.

The polarizer film generally has protective films respectively on both surfaces thereof. The cellulose acylate film, the cyclic polyolefin film or the like contained in the optical compensation film of the present invention can be made function as the protective films for the polarizer film, wherein in this case, there is no need of bonding a protective film separately obtained elsewhere on the surface of the polarizer film on the optical compensation film side. In the polarizing plate of the present invention, it is preferable that only an isotropic adhesive layer, and/or a substantially isotropic transparent protective film resides between the polarizer film and the first or the second optically anisotropic layer. More specifically, the substantially isotropic transparent protective film is such as preferably having an in-plane retardation of 0 to 10 nm, and a thickness-wise retardation of −20 to 20 nm. Films containing cellulose acylate or cyclic polyolefin are preferable.

A first mode of the polarizing plate of the present invention relates to a polarizing plate having the first optically anisotropic layer, the second optically anisotropic layer and the polarizer film stacked in this order, wherein the direction of the slow axis of the second optically anisotropic layer crosses substantially normal to the direction of the absorption axis of the polarizer film, and a second mode of the polarizing plate of the present invention relates to a polarizing plate having the second optically anisotropic layer, the first optically anisotropic layer and the polarizer film stacked in this order, wherein the direction of the slow axis of the second optically anisotropic layer is substantially in parallel with the direction of the absorption axis of the polarizer film. For the case where the second optically anisotropic layer is composed of the stretched polymer film, the direction of the slow axis is adjustable by the direction of stretching and so forth.

[Liquid Crystal Display Device]

The liquid crystal display device of the present invention includes at least the polarizing plate of the present invention. The liquid crystal display device of the present invention may be any of those of reflection type, semi-transparent type and transparent type. The liquid crystal display device is generally composed of components such as polarizing plate(s), a liquid crystal cell, and as requested, retardation plate(s), a reflection layer, a light diffuser plate, a back light, a front light, a light control film, a light guide plate, a prism sheet, a color filter and so forth, without limiting the present invention except that the polarizing plate of the present invention is essentially used. There is no special limitation on the liquid crystal cell, allowing use of any general liquid crystal cell having a liquid crystal layer held between a pair of transparent substrates having electrodes formed thereon. The transparent substrates composing the liquid crystal cell are not specifically limited, so far as they can align a material expressing liquid crystallinity composing the liquid crystal layer to a specific direction. More specifically, any of the transparent substrate intrinsically having a property of allowing liquid crystal to align thereon, and the transparent substrate intrinsically having no ability of alignment, but having as formed thereon an alignment film capable of allowing liquid crystal to align thereon may be used. Electrodes of the liquid crystal cell applicable herein are any of those publicly known. In general, they can be provided on the surface of the transparent substrate with which the liquid crystal layer is brought into contact, wherein for the case where the substrate having the alignment film formed thereon is used, they can be provided between the substrate and the alignment film. The material expressing liquid crystallinity composing the liquid crystal layer is not specifically limited, allowing use of various low-molecular-weight liquid crystalline compound, high-molecular-weight liquid crystalline compound and mixture of them capable of composing various liquid crystal cells. It is also allowable to add dye, chiral reagent, non-liquid crystalline compound and so forth, so far as the liquid crystallinity will not be impaired.

The liquid crystal cell may be provided with various constituents necessary for composing liquid crystal cell based on various systems described later, besides the electrode substrates and the liquid crystal layer. Systems of the liquid crystal cell include TN (Twisted Nematic) system, STN (Super Twisted Nematic) system, ECB (Electrically Controlled Birefringence) system, IPS (In-Plane Switching) system, VA (Vertical Alignment) system, MVA (Multi-domain Vertical Alignment) system, PVA (Patterned Vertical Alignment) system, OCB (Optically Compensated Birefringence) system, HAN (Hybrid Aligned Nematic) system, ASM (Axially Symmetric Aligned Microcell) system, halftone gray scale system, multi-domain system, or display systems using ferroelectric liquid crystal or anti-ferroelectric liquid crystal. There is no specific limitation also on drive system of the liquid crystal cell, allowing use of any of passive matrix system used for STN-LCD and so forth, and also active matrix system or plasma addressing system using active electrodes such as TFT (thin film transistor) electrodes, TFD (thin film diode) electrodes and so forth. A field sequential system using no color filter is also applicable.

The polarizing plate of the present invention is preferably used for reflection-type, semi-transmission-type and transmission-type liquid crystal display devices. The reflection-type liquid crystal display device generally has a stacked structure having a reflection plate, a liquid crystal cell and a polarizing plate stacked therein in this order. The retardation plate is disposed between the reflection plate and the polarizer film (between the reflection plate and the liquid crystal cell, or between the liquid crystal cell and the polarizer film). The reflection plate may be shared by the liquid crystal cell and the substrate. The polarizing plate of the present invention is applicable as the polarizing plate described in the above, allowing in this case omission of any other retardation plate.

The semi-transmission-reflection liquid crystal display device has at least a liquid crystal cell, a polarizing plate disposed more closer to the observer than the liquid crystal cell, at least one retardation plate disposed between the polarizing plate and the liquid crystal cell, and a semi-transmission-reflection layer placed more further from the observer than the liquid crystal layer, and additionally has at least one retardation plate and a polarizing plate behind the semi-transmission-reflection layer as viewed from the observer. In this type of liquid crystal display device, provision of a back light makes the device operable both in the reflection mode and the transmission mode. Both of, or either one of the polarizing plates may be the polarizing plate(s) of the present invention. When the polarizing plate of the present invention is disposed, it is no more necessary to additionally dispose a retardation plate between the liquid crystal cell and the polarizing plate.

Mode of the liquid crystal cell is not specifically limited, but is preferably the IPS mode or the FFS mode.

The liquid crystal cell of the IPS mode has rod-like liquid crystal molecules aligned substantially in parallel with the substrates, allowing the liquid crystal molecules to respond in plane to an electric field applied in parallel with the surfaces of the substrates. The IPS mode cell turns into the black state in the absence of applied electric field, wherein a transmission axes of a pair of upper and lower polarizing plates cross normal to each other. Methods of reducing the leakage light in the black state in oblique views by using the optical compensation film, to thereby improve the viewing angle characteristics are disclosed typically in Japanese Laid-Open Patent Publication Nos. H10-54982, H11-202323, H9-292522, H11-133408, H11-305217 and H10-307291.

For an exemplary case where the polarizing plate of the first mode of the present invention is used for a liquid crystal display device comprising a liquid crystal cell (for example, an IPS-mode liquid crystal cell), which comprises a pair of substrates, and a liquid crystal layer held between the pair of substrates, in which liquid crystal molecules are in-plane aligned substantially in the black state, the polarizing plate is disposed outside one substrate of the pair of substrate, so that the first optically anisotropic layer, the second optically anisotropic layer and the polarizer film are arranged in this order as viewed from the substrate side, and so that the slow axis of the second optically anisotropic layer is substantially parallel to the mean longitudinal direction of liquid crystal molecules in the black display. And the second polarizer film may be disposed outside the other substrate so that the absorption axes of the polarizer films are normal to each other.

For an exemplary case where the polarizing plate of the second mode of the present invention is used for a liquid crystal display device having a liquid crystal cell (for example, an IPS-mode liquid crystal cell), which has a pair of substrates, and a liquid crystal layer held between the pair of substrates, in which liquid crystal molecules are in-plane aligned substantially in the black state, the polarizing plate is disposed outside one substrate of the pair of substrate, so that the second optically anisotropic layer, the first optically anisotropic layer and the polarizer film are arranged in this order as viewed from the substrate side, and so that the slow axis of the second optically anisotropic layer is substantially normal to the mean longitudinal direction of liquid crystal molecules in the black state. And the second polarizer film may be disposed outside the other substrate so that the absorption axes of the polarizer films are normal to each other.

In any of the above-described modes, it is preferable that only an isotropic adhesive layer, and/or a substantially isotropic transparent protective film resides between the second polarizer film and the substrate. More specifically, the substantially isotropic transparent protective film is such as preferably having an in-plane retardation of 0 to 10 nm, and a thickness-wise retardation of –20 to 20 nm, and is preferably a film containing cellulose acylate or cyclic polyolefin having these optical characteristics.

EXAMPLES

Paragraphs below will more specifically describe the features of the present invention, referring to Examples and Comparative Examples. Any materials, amount of use, ratio, details of processing, procedures of processing and the like may appropriately be modified, without departing from the spirit of the present invention. Therefore, the present invention should not limitedly be understood by the specific examples described below.

Example 1-1

<Production of Second Optically Anisotropic Layers (C1-1) to (C1-2)>

(Second Optically Anisotropic Layer (C1-1))

A cellulose triacetate propionate film corresponded to the second optically anisotropic layer (C1-1) was fabricated as described below.

First, a dope (cellulose acetate solution) having the formulation below was prepared.

Cellulose Acetate Solution Formulation

| | |
|---|---|
| Cellulose triacetate propionate (acetyl group degree of substitution (A)1.95, propionyl group degree of substitution (B)0.7) | 100 parts by mass |
| Triphenylphosphate | 10 parts by mass |
| Ethyl phthalyl ethyl glycolate | 2 parts by mass |
| TINUVIN 326 (from Ciba Specialty Chemicals) | 1 part by mass |
| AEROSIL 200V (from Nippon Aerosil Co., Ltd.) | 0.1 parts by mass |
| Methylenechloride | 300 parts by mass |
| Ethanol | 40 parts by mass |
| Cellulose acetate with degree of acetylation of 60.9% (degree of polymerization 300, Mn/Mw = 1.5) | 100 parts by mass |
| Triphenylphosphate (plasticizer) | 7.8 parts by mass |
| Biphenyldiphenyl phosphate(plasticizer) | 3.9 parts by mass |
| Methylenechloride (first solvent) | 300 parts by mass |
| Methanol (second solvent) | 54 parts by mass |
| 1-Butanol (third solvent) | 11 parts by mass |

The ingredients listed in the above were sequentially put into an air-tight container, and, after the inner atmosphere of the container was heated from 20° C. to 80° C., was stirred for 3 hours while keeping the temperature at 80° C., to thereby thoroughly dissolve cellulose triacetate propionate. After quitting stirring and cooling to 43° C., the solution was filtered through a filter paper (Azumi Roshi No. 244 from Azumi Filter paper Co., Ltd.) to obtain a dope.

Thus-prepared dope was cast through a casting die kept at 30° C., onto a support of a stainless steel endless belt again kept at 30° C., to thereby form a web (dope film), the web was then dried on the support so as to attain a final content of residual solvent in the web of 80%, and was then freed from the support using a separation roll.

Next, the web was dried by a drying air at 120° C. in a roll conveyance drying step using rolls disposed in a staggered arrangement, then introduced into a tenter, pinched using clips at both edges thereof, monoaxially stretched substantially in the transverse direction (TD) under the presence of the residual solvent, and dried by blowing a drying air.

In this process, the film (web) was stretched in the TD direction (transverse direction) by a factor of TD stretching of 20%, while varying ratio of shrinkage in the MD direction (longitudinal direction), so as to attain relaxation shrinkage of within the range from TD stretching ratio (%)×0.1 to TD stretching ratio (%)×0.3.

Also the amount of residual solvent during the film stretching was varied, by varying an ambient temperature in a drying section ranging from the site of peeling-off to the tenter. The amount of residual solvent during stretching was measured by sampling a portion of the film (base) in the tenter.

The web (film) was further dried using a 100° C. hot air in the roll conveyance drying step using rolls disposed in a staggered arrangement, then wound up by a winder, and thereby the cellulose triacetate propionate film having a final thickness of 60 μm.

Thus-obtained cellulose triacetate propionate film (C1-1) was adjusted in the amount of residual solvent during the film stretching to 5%. The relaxation shrinkage in the MD direction of the film was set to −3%.

As for the cellulose triacetate propionate film (C1-1), length of holding by each of the clips on both edges of the film during the TD stretching was set to 100 mm (10% of the film width).

(Second Optically Anisotropic Layer (C1-2))

An optical film of 60 μm thick after the dried was fabricated, similarly to as described for (C1-1), except for using, as the cellulose ester, 100 parts by mass of cellulose acetate having a degree of substitution by acyl group of 2.66.

<Production of Second Optically Anisotropic Layers (C1-1) to (C1-24)>

Cellulose acylates differed in types of acyl groups and in the degree of substitution as shown in Table 1-1 were prepared. For these, acylation was carried out at 40° C., by adding sulfuric acid as a catalyst (7.8 parts by mass per 100 parts by mass of cellulose), and by adding a carboxylic acid as a source of an acyl substitutive group. The types of acyl group and the degree of substitution herein were adjusted by selecting types and amount of addition of the carboxylic acid. The products were ripened at 40° C. after the acylation. Low-molecular-weight components in each of the cellulose acylates were removed by washing using acetone. It is to be noted that "CAB" given in the table is an abbreviation for cellulose acetate butylate (cellulose ester derivative having acetate and butylyl groups as the acyl group), "CAP" is an abbreviation for cellulose acetate propionate (cellulose ester derivative having acetate group and propionyl group as the acyl group), and "CTA" is an means cellulose triacetate (cellulose ester derivative having only acetate group as the acyl group).

(Dissolution (Preparation of Dope))

Each of cellulose acylate listed in Table 1-1 was put into a mixed solvent of dichloromethane/methanol (87/13 parts by mass) under stirring, so as to adjust a mass concentration of cotton to 15% by mass, and stirred under heating. In this process, 7.8 parts by mass of triphenylphosphate (TPP) and 3.9 parts by mass of biphenyldiphenyl phosphate (BDP), both as plasticizers; 5 parts by mass of the retardation adjusting agent shown below; 0.05 parts by mass of matting agent particles (silicon dioxide (primary particle size=20 nm), Moh's hardness 7); 0.375 parts by mass of an UV absorber B (TINUVIN 327 from Ciba Specialty Chemicals); and 0.75 parts by mass of UV absorber C (TINUVIN 328 from Ciba Specialty Chemicals) were concomitantly added per 100 parts by mass of cellulose acylate, the mixture was stirred under heating, and thereby a dope was prepared.

Retardation Adjusting Agent

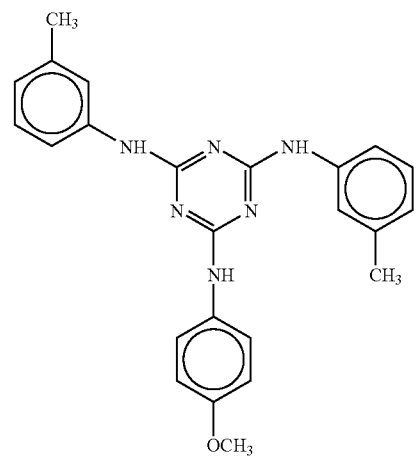

(Casting)

The above-described dope was cast using a band casting machine. The film was freed from the band, while keeping a content of residual solvent of 25 to 35% by mass, was stretched using a tenter by a stretching ratio of 0% to 30% in the transverse direction (TD), at a stretching temperature ranging from approximately Tg (see Table 1-1)−5 to Tg (see Table 1-1)+5° C., to thereby fabricate a cellulose acylate film (92 μm thick). Stretching ratios by a tenter were shown in Table 1-1.

Thus-fabricated film was then allowed to pass through an induction heating rolls kept at 60° C. so as to raise the surface temperature of the film up to 40° C., thereon an alkali solution having the composition below was coated using a bar coater to an amount of 14 ml/m², allowed to stand for 10 seconds under a steam-type far infrared heater (from Noritake Co., Ltd.) heated to 110° C., and thereon pure water was coated to an amount of 3 ml/m² again using a bar coater. The film temperature herein was kept at 40° C. Next, a cycle of washing with water using a fountain coater and dewatering using an air knife was repeated three times, and the film was then allowed to stand for 2 seconds in a drying zone conditioned at 70° C.

| <Formulation of Alkali solution> | |
| --- | --- |
| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$ (surfactant) | 1.0 part by mass |

Optical characteristics of thus-fabricated cellulose acylate films were measured using an automatic birefringence meter (KOBRA-21ADH from Oji Scientific Instruments). Results were shown in Table 1-1. The films were named second optically anisotropic layers C1-11 to C1-24.

<Production of First Optically Anisotropic Layer>

On the saponified surface of the long-web cellulose acylate film (C1-1) fabricated in the above, an alignment film coating fluid having the composition below was continuously coated using a #14 wire bar. The coated surface was dried by a 60° C. hot air for 60 seconds, and further dried by a 100° C. hot air for 120 seconds, to thereby obtain an alignment film.

| Formulation of Coating fluid for Alignment layer | |
| --- | --- |
| Modified polyvinyl alcohol shown below | 10 parts by mass |
| Water | 371 parts by mass |
| Methanol | 119 parts by mass |
| Glutaraldehyde | 0.5 parts by mass |

Modified polyvinyl alcohol

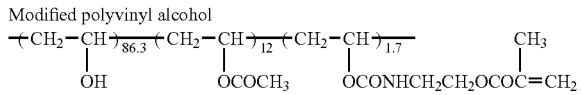

A coating fluid containing a rod-like liquid crystal compound and having the composition shown below was continuously coated on the alignment film fabricated in the above, using a #5.0 wire bar. Travel speed of the film was set to 20 m/min. The solvent was allowed to dry in the process of continuous heating from room temperature up to 80° C., the coating was then heated in a drying zone at 80° C. for 90 seconds, so as to align the rod-like liquid crystalline compound. The film was then kept at 60° C., alignment of the liquid crystal compound was fixed by UV irradiation, to thereby form the first optically anisotropic layer B1-1. Next, thus-fabricated film was immersed into a 1.5 mol/L sodium hydroxide solution at 55° C. for 2 minutes, and then immersed into water so as to thoroughly remove sodium hydroxide. The film was immersed into a 5 mmol/L aqueous sulfuric acid solution at 35° C. for one minute, and then into water so as to thoroughly remove the dilute aqueous sulfuric acid solution. Finally, the sample was fully dried at 120° C. In this way, the optical compensation film F1-1 having the first and second optically anisotropic layers stacked thereon was fabricated.

Similarly, optical compensation films F1-2, and F1-11 to F1-20 were fabricated by replacing the cellulose acylate film (C1-1) with cellulose acylate film (C1-2, and C1-11 to C1-20), respectively.

Similarly to F1-1, optical compensation films F1-21 to F1-24 were fabricated by replacing the cellulose acylate film (C1-1) with cellulose acylate films (C1-21 to C1-24) respectively, without carrying out immersion into the aqueous sodium hydroxide solution (saponification) after the first optically anisotropic layer B1-1 was formed.

| Formulation of Coating fluid Containing Rod-Like Liquid Crystal Compound (S1) | |
| --- | --- |
| Rod-like liquid crystalline compound (I) shown below | 100 parts by mass |
| Photo-polymerization initiator (Irgacure 907 from Ciba Geigy) | 3 parts by mass |
| Sensitizer (Kayacure DETX from Nippon Kayaku Co., Ltd.) | 1 part by mass |
| Fluorine-Containing Polymer shown below | 0.4 parts by mass |
| Pyridinium salt shown below | 1 part by mass |
| Methyl ethyl ketone | 172 parts by mass |

Rod-Like Liquid Crystal Compound (I)

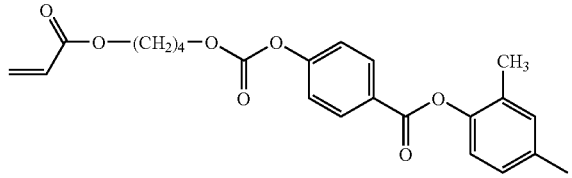

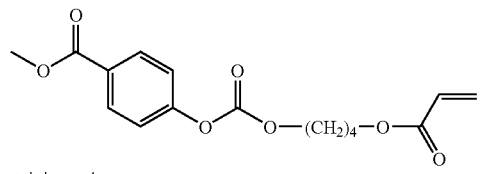

Fluorine-containing polymer

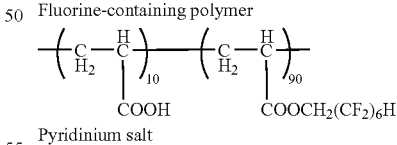

Pyridinium salt

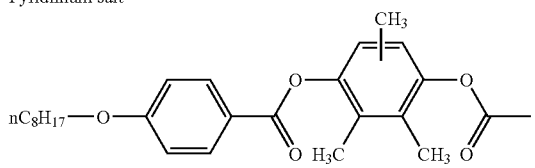

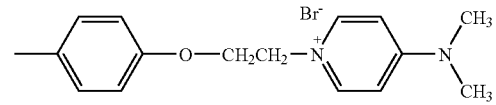

From thus-fabricated optical compensation film F1-1, only the optically anisotropic layer containing the rod-like liquid crystalline compound was peeled off, and optical characteristics thereof were measured using an automatic birefringence meter (KOBRA-21ADH from Oji Scientific Instruments). The optically anisotropic layer alone was found to show an Rth value of −260 nm and an Re value of 0 nm measured at 590 nm. It was also confirmed that the optically anisotropic layer in which rod-like liquid crystal molecules were aligned substantially homeotropically to the film surface was formed.

Example 1-2

<Production of Polarizing Plates (P1-1, P1-2, P1-11 to 20)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the surface of the above-fabricated optical compensation film F1-1 having no first optically anisotropic layer formed thereon, and on the other surface thereof, with a cellulose triacetate film (Fujitack TD80UL from FUJIFILM Corporation) having the saponified surface, using a polyvinyl alcohol-base adhesive, to thereby fabricate a long-web polarizing plate P1-1. The absorption axis of the polarizer film herein was in parallel with the longitudinal direction thereof, and the absorption axis of the polarizer film was found to cross the slow axis of the second optically anisotropic layer (cellulose acylate film) at right angles.

Long-web polarizing plates P1-2 and P1-11 to P1-20 were similarly fabricated by replacing the optical compensation film F1-1 with the optical compensation films F1-2 and F1-11 to FI-20, respectively.

Example 1-3

<Production of Cellulose Acetate Film (T1-0)>

(Preparation of Cellulose Acetate Solution)

The composition shown below was put into a mixing tank, and stirred to solubilize the individual components, to thereby prepare a cellulose acetate solution "A".

| Formulation of Cellulose acetate solution "A" | |
| --- | --- |
| Cellulose acetate having a degree of acetyl substitution of 2.94 | 100.0 parts by mass |
| Methylene chloride (first solvent) | 402.0 parts by mass |
| Methanol (second solvent) | 60.0 parts by mass |

(Preparation of Matting Agent Solution)

Twenty parts by mass of silica particles having a mean particle size of 16 nm (AEROSIL R972 from Nippon Aerosil Co., Ltd.) and 80 parts by mass of methanol were thoroughly mixed under stirring for 30 minutes, to thereby prepare a silica particle dispersion. The dispersion was then put into a dispersion machine together with the composition shown below, and further stirred for 30 minutes or longer so as to dissolve the individual components, to thereby prepare a matting agent solution.

| Composition of Matting Agent Solution | |
| --- | --- |
| Dispersion of silica particles having a mean particle size of 16 nm | 10.0 parts by mass |
| Methylene chloride (first solvent) | 76.3 parts by mass |
| Methanol (second solvent) | 3.4 parts by mass |
| Cellulose acetate solution "A" | 10.3 parts by mass |

(Preparation of Additive Solution)

The composition shown below was put into a mixing tank, stirred under heating so as to dissolve the individual components, to thereby prepare a cellulose acetate solution.

| Formulation of Additive solution | |
| --- | --- |
| Optical anisotropy reducing agent shown below | 49.3 parts by mass |
| Wavelength dispersion adjusting agent | 4.9 parts by mass |
| Methylene chloride (first solvent) | 58.4 parts by mass |
| Methanol (second solvent) | 8.7 parts by mass |
| Cellulose acetate solution "A" | 12.8 parts by mass |

Optical Anisotropy Reducing Agent

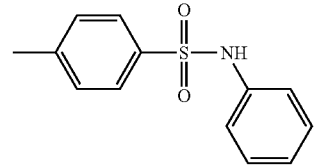

Wavelength Dispersion Adjusting Agent

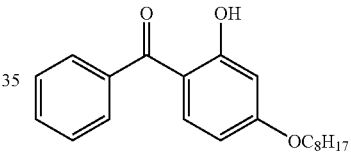

(Production of Cellulose Acetate Film)

Mixed were 94.6 parts by mass of the above-described cellulose acetate solution "A", 1.3 parts by mass of the matting agent solution, and 4.1 parts by mass of the additive solution, each of which having preliminarily been filtered, and the mixture was cast using a band casting machine. In this composition, ratios by mass of the optical anisotropy reducing agent and of the wavelength dispersion adjusting agent relative to the cellulose acetate were 12% and 1.2%, respectively. The film was freed from the band, while keeping a content of residual solvent of 30%, dried at 14° C. for 40 minutes, to thereby fabricate fa long-web cellulose acetate film T1-0 of 80 μm thick. The obtained film was found to have an in-plane retardation (Re) of 1 nm (slow axis aligns normal to the longitudinal direction), and a thickness-wise retardation (Rth) of −1 nm.

<Production of Polarizing Plate (P1-0)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the saponified cellulose acetate film T1-0 fabricated in the above, and on the other surface thereof, with a saponified commercially-available cellulose triacetate film (Fujitack TD80UL from FUJIFILM Corporation), using a polyvinyl alcohol-base adhesive, to thereby fabricate a long-web polarizing plate P1-0.

<Production of Polarizing Plates (P1-21 to 24)>

The polarizing plate P1-0 fabricated in the above was continuously bonded, on the T1-0-side surface thereof, with the optical compensation film F1-21 on the surface thereof having the first optically anisotropic layer formed thereon, using an optically isotropic acrylic tacky agent, to thereby fabricate a long-web polarizing plate P1-21. The absorption axis of the polarizer film herein was found to be in parallel with the longitudinal direction thereof, and the absorption axis of the polarizer film was found to be at an angle of 0° with respect to the slow axis of the second optically anisotropic layer.

Similarly, long-web polarizing plates P1-22 to P1-24 were fabricated by replacing the optical compensation film F1-21 with the optical compensation films F1-22 to F1-24, respectively.

Example 1-4

<Formation of First Optically Anisotropic Layer>

Using a long-web polyethylene terephthalate film (100 μm thick) as a temporary support, an alignment film was formed thereon similarly to as in Example 1-1, and further applied with a coating fluid S1 to form the first optically anisotropic layer B1-1.

Production of Polarizing Plate (P1-31)

A long-web polarizer film was obtained similarly to as in Example 1-1. The polarizer film was continuously bonded, on one surface thereof, with the saponified surface of the cellulose acylate film C1-1 fabricated similarly to as in Example 1-1, and on the other surface thereof, with a cellulose triacetate film (Fujitack TD80UL, from FUJIFILM Corporation) having the saponified surfaces, using a polyvinyl alcohol-base adhesive. Next, on the surface of the cellulose acylate film C1-1 of the polarizing plate, the first optically anisotropic layer B1-1 formed on the polyethylene terephthalate film (temporary support) was continuously bonded using an optically isotropic acrylic tacky agent, and the polyethylene terephthalate film was then peeled off. In this way, a long-web polarizing plate P1-31 having the polarizer film, the second optically anisotropic layer and the first optically anisotropic layer stacked in this order was fabricated. The absorption axis of the polarizer film was found to be in parallel with the longitudinal direction thereof, and the absorption axis of the polarizer film was found to cross normal to the slow axis of the second optically anisotropic layer.

Example 1-5

<Formation of First Optically Anisotropic Layer>

A long-web cellulose acetate film T1-0 was fabricated similarly to as in Example 1-3. The surface of the film is then saponified similarly to as in Example 1-1, an alignment film was formed thereon, and further applied with a coating fluid SI to form the first optically anisotropic layer B1-1. The film was then saponified by immersing it into an aqueous sodium hydroxide solution similarly to as in Example 1-1. In this way, an optical compensation film F1-32, having a first optically anisotropic layer formed on the substantially isotropic support, was fabricated.

<Formation of Second Optically Anisotropic Layer>

A long-web cellulose acylate film C1-23 was fabricated similarly to as in Example 1-1, to thereby provide the second optically anisotropic layer.

<Production of Polarizing Plate (P1-32)>

A long-web polarizer film was obtained similarly to as in Example 1-1. The polarizer film was bonded, on one surface thereof, with the surface of the above-fabricated optical compensation film F1-32 having no first optically anisotropic layer formed thereon, and on the other surface thereof, with a cellulose triacetate film (Fujitack TD80UL from FUJIFILM Corporation) having the saponified surface, using a polyvinyl alcohol-base adhesive. The optical compensation film F1-32 was further bonded, on the surface thereof having the first optically anisotropic layer formed thereon, with the cellulose acylate film C1-23 fabricated in the above, using an isotropic acrylic tacky agent. In this way, a long-web polarizing plate, having the polarizer film, the first optically anisotropic layer and the second optically anisotropic layer stacked therein in this order, was fabricated. The absorption axis of the polarizer film herein was found to be in parallel with the longitudinal direction thereof, and the absorption axis of the polarizer film was found to be at an angle of 0° with respect to the slow axis of the second optically anisotropic layer.

Example 1-6

<Production of Cyclic Polyolefin Film (C1-33)>

The composition shown below was put into a mixing tank, stirred under heating so as to dissolve the individual components, and filtered through a filter paper having a mean pore size of 34 μm or through a sintered metal filter having a mean pore size of 10 μm.

| Cyclic Polyolefin Solution D3 | |
| --- | --- |
| Cyclic polyolefin: TOPAS5013 | 100 parts by mass |
| Paraffin wax 135 (Nippon Seiro Co., Ltd.) | 15 parts by mass |
| Cyclohexane | 380 parts by mass |
| Dichloromethane | 70 parts by mass |

Next, the composition shown below, containing the cyclic polyolefin solution prepared by the method described in the above, was put into a dispersion machine, to thereby prepare a particle dispersion.

| Particle Dispersion M3 | |
| --- | --- |
| Silica Particles having a primary mean particle size of 16 nm (Aerosil R972 from Nippon Aerosil Co., Ltd.) | 2 parts by mass |
| Cyclohexane | 73 parts by mass |
| Dichloromethane | 10 parts by mass |
| Cyclic polyolefin solution D3 | 10 parts by mass |

One hundred parts by mass of the above-described cyclic polyolefin solution D3 and 1.35 parts by mass of the particle dispersion M1 were mixed to thereby prepare a film forming dope. The above-described dope was cast using a band casting machine. The film was freed from the band, with the residual solvent content kept at approximately 35% by mass, was then held so as to prevent wrinkling, dried at 120° C. to 140° C., and wound up. The film was found to have an Rth of 1 nm and an Re of 0.5 nm measured at 590 nm. In this way, a cyclic polyolefin film C1-33 was fabricated.

<Production of Polarizing Plate (P1-33)>

A long-web polarizer film was obtained similarly to as in Example 1-1. The polarizer film was bonded, on one surface thereof, with the cyclic polyolefin film C1-33 as fabricated in the above, and on the other surface thereof, with a cellulose triacetate film (Fujitack TD80UL from FUJIFILM Corporation) having the saponified surfaces. The polarizer film and the cellulose triacetate film herein were bonded using a polyvinyl alcohol-base adhesive, and the polarizer film and the cyclic polyolefin film C1-33 were bonded as described below.

Ten parts of a polyester-base urethane (Takelac XW-74-C154 from Mitsui Takeda Chemicals, Inc.) and one part of isocyanate-base crosslinking agent (Takenate WD-725 from Mitsui Takeda Chemicals, Inc.) were dissolved in water, to thereby prepare a solution having the solid content adjusted to 20%. The polarizer film and the cyclic polyolefin film C1-33 were bonded using this solution as an adhesive, dried and cured in an oven at 40° C. for 72 hours, to thereby fabricate a polarizing plate.

The polarizing plate fabricated in the above was bonded, on the surface of the cyclic polyolefin film C1-33 formed thereon, with the optical compensation film F1-23 on the surface thereof having the first optically anisotropic layer formed thereon, using an isotropic acrylic tacky agent. In this way, a long-web polarizing plate P1-33, having the polarizer film, the first optically anisotropic layer, and the second optically anisotropic layer stacked in this order, was fabricated. The absorption axis of the polarizer film was found to be in parallel with the longitudinal direction thereof, and the absorption axis of the polarizer film was found to be at an angle of 0° with respect to the slow axis of the second optically anisotropic layer.

Example 1-7

<Production of Liquid Crystal Display (L1-1) to (L1-2), (L1-11)>to (L1-20), and (L1-31) to (L1-32)

A liquid crystal cell was taken from a liquid crystal television set TH-32LX500 (from Matsushita Electric Industrial Co., Ltd.), and the polarizing plate and the optical film bonded to the observer's side and the back light side were peeled off. The liquid crystal cell was found that the liquid crystal molecules are aligned substantially in plane between the glass substrates in under no applied voltage and in the black state, was found to have the slow axis in a horizontal direction with respect to the screen.

On the upper and lower glass substrates of the above-described in-plane alignment cell, the polarizing plates (P1-1 and P1-0) fabricated in the above were bonded using a tacky agent. In this case, P1-1 was disposed on the polarizing plate on the back light side, P1-0 was disposed on the observer's side, and were bonded so that the first optically anisotropic layer contained in the polarizing plate P1-1 is brought into contact with the glass substrate on the back light side, and so that the cellulose acetate film T1-0 contained in the polarizing plate P1-0 is brought into contact with the glass substrate on the observer's side. The absorption axis of the polarizing plate P1-1 was aligned normal to the slow axis of the liquid crystal cell, and the absorption axes of the polarizing plate P1-1 and the polarizing plate P1-0 were arranged as being normal to each other. The liquid crystal cell bonded with the polarizing plates as described in the above was again assembled into the liquid crystal television set TH-32LX500. A liquid crystal display device L1-1 was fabricated in this way.

Liquid crystal display devices L1-0, L1-2, L1-11 to L1-20, L1-31, L1-32 were fabricated by replacing the polarizing plate P1-1 with polarizing plates P1-0, P1-2, P1-11 to P1-20, P1-31 and P1-32, respectively.

In the above-described liquid crystal display devices L1-2, L1-11 to L1-20 and L1-31, the liquid crystal cell, the first optically anisotropic layer, the second optically anisotropic layer and the polarizing plate layer were stacked in this order, wherein the slow axis of the second optically anisotropic layer and the longitudinal direction of the liquid crystal molecules in the black state were substantially in parallel with each other.

On the other hand, in the liquid crystal display device L1-32, the liquid crystal cell, the second optically anisotropic layer, the first optically anisotropic layer, and the polarizing plate layer were stacked in this order, wherein the slow axis of the second optically anisotropic layer and the longitudinal direction of the liquid crystal molecules in the black state were substantially normal to each other.

Example 1-8

<Production of Liquid Crystal Displays (L1-25), (L1-21) to (L1-24), (L1-33)>

The in-plane alignment cell was obtained similarly to as in Example 1-7. On the upper and lower glass substrates of the above-described in-plane alignment cell, the polarizing plates (P1-1 and P1-0) fabricated in the above were bonded using a tacky agent. In this case, P1-0 was disposed on the polarizing plate on the back light side, P1-1 was disposed on the observer's side, and were bonded so that the first optically anisotropic layer contained in the polarizing plate P1-1 is brought into contact with the glass substrate on the observer's side, and so that the cellulose acetate film T1-0 contained in the polarizing plate P1-0 is brought into contact with the glass substrate on the back light side. The absorption axis of the polarizing plate P1-1 was aligned normal to the slow axis of the liquid crystal cell, and the absorption axes of the polarizing plate P1-0 and the polarizing plate P1-1 were arranged as being normal to each other. The liquid crystal cell bonded with the polarizing plates as described in the above was again assembled into the liquid crystal television set TH-32LX500. A liquid crystal display device L1-25 was fabricated in this way.

Liquid crystal display devices L1-21 to L1-24 and L1-33 were fabricated by replacing the polarizing plate P1-1 with the polarizing plates P1-21 to P1-24 and P1-33, respectively.

In the above-described liquid crystal display device L1-25, the liquid crystal cell, the first optically anisotropic layer, the second optically anisotropic layer and the polarizing plate layer were stacked in this order, wherein the slow axis of the second optically anisotropic layer and the longitudinal direction of the liquid crystal molecules in the black state were substantially in parallel with each other.

On the other hand, in the liquid crystal display devices L1-21 to L1-24, and L1-33, the liquid crystal cell, the second optically anisotropic layer, the first optically anisotropic layer, and the polarizing plate layer were stacked in this order, wherein the slow axis of the second optically anisotropic layer and the longitudinal direction of the liquid crystal molecules in the black state were substantially normal to each other.

(Evaluation of Light Leakage)

The liquid crystal panels bonded with the polarizing plates fabricated in the above were illuminated with the back lights, for which light leakage was observed from the direction inclined 60° leftward, and rated in two steps below. Results are shown in Table 1-2.

○: light leakage not readily observable
  x: apparent light leakage (Evaluation of Durability)

The liquid crystal panels bonded with the polarizing plates fabricated in the above were stored in an environment conditioned at 60° C., 90% RH for 150 hours, and then allowed to stand at 25° C., 60% RH for 24 hours, illuminated by the back lights, and evaluated in terms of size of areas on four corners where light leakage is observable, and ratios of the size to the total area were calculated. A 20-inch liquid crystal was used for the evaluation. Results are shown in Table 1-2.

The liquid crystal display devices of the present invention showed only less degrees of light leakage in the oblique view, higher contrasts, and lesser degrees of light leakage on four corners even after the storage under high temperature and high humidity.

| Formulation of Cyclic polyolefin solution D1 | |
|---|---|
| Cyclic polyolefin (J1) | 150 parts by mass |
| Dichloromethane | 414 parts by mass |
| Methanol | 36 parts by mass |

Next, the composition shown below, containing the cyclic polyolefin prepared by the method described in the above, was put into a dispersion machine, to thereby prepare a matting agent dispersion.

TABLE 1-1

| Second OA Layer*[1] | Cotton Type | Ac group Type | Ac group Degree A | Bu/Pr group Type | Bu/Pr group Degree B | Total Degree A + B | Stretching Ratio MD*[2] | Stretching Ratio TD*[3] | Tg (° C.) | Thickness (μm)*[4] | Optical Property Re (nm) | Optical Property Rth (nm) | Nz | Note |
|---|---|---|---|---|---|---|---|---|---|---|---|---|---|---|
| C1-1 | CAP | Ac | 1.95 | Pr | 0.70 | 2.65 | Fixed | 20% | 124 | 60 | 66 | 170 | 3.1 | Invention |
| C1-2 | CTA | Ac | 2.66 | — | 0.00 | 2.66 | " | " | 140 | 60 | 68 | 166 | 2.9 | Comparison |
| C1-11 | CAB | Ac | 1.40 | Bu | 0.80 | 2.20 | 10% | 30% | 123 | 92 | 65 | 196 | 3.5 | Invention |
| C1-12 | " | " | 1.10 | " | 1.60 | 2.70 | " | " | 97 | 92 | 68 | 200 | 3.4 | " |
| C1-13 | " | " | 0.90 | " | 1.80 | 2.70 | " | " | 96 | 92 | 72 | 205 | 3.3 | " |
| C1-14 | " | " | 0.20 | " | 2.30 | 2.50 | " | " | 96 | 92 | 70 | 202 | 3.4 | " |
| C1-15 | " | " | 0.30 | " | 2.50 | 2.80 | " | " | 93 | 92 | 70 | 202 | 3.4 | " |
| C1-16 | CAP | Ac | 0.18 | Pr | 2.47 | 2.65 | 固定 | 20% | 94 | 92 | 50 | 130 | 3.1 | Invention |
| C1-17 | " | " | " | " | " | " | " | 30% | " | 92 | 74 | 169 | 2.8 | " |
| C1-18 | " | " | " | " | " | " | " | 40% | " | 92 | 92 | 201 | 2.7 | " |
| C1-19 | CAP | Ac | 1.90 | Pr | 0.80 | 2.70 | 10% | 30% | 124 | 92 | 61 | 190 | 3.6 | Invention |
| C1-20 | CTA | Ac | 2.87 | — | 0.00 | 2.87 | 固定 | 40% | 140 | 92 | 47 | 181 | 4.4 | Comparison |
| C1-21 | CAP | Ac | 0.18 | Pr | 2.47 | 2.65 | 30% | | " | 92 | 72 | 172 | 2.9 | Invention |
| C1-22 | " | " | " | " | " | " | 40% | | " | 92 | 90 | 198 | 2.7 | " |
| C1-23 | CAP | Ac | 1.9 | Pr | 0.80 | 2.70 | 30% | 10% | " | 92 | 63 | 187 | 3.5 | Invention |
| C1-24 | CTA | Ac | 2.87 | — | 0.00 | 2.87 | 40% | — | " | 92 | 50 | 175 | 4.0 | Comparison |

*[1]Second optically anisotropic layer
*[2]in the longitudinal direction
*[3]in the transverse direction
*[4]Thickness after drying Example 2-1

<Synthesis of Cyclic Olefin Polymer>

One hundred parts by mass of purified toluene and 100 parts by mass of methyl norbornene carboxylate were put in a reaction tank. Next, 25 mmol % (relative to mass of monomer) of ethyl hexanoate Ni dissolved in toluene, 0.225 mol % (relative to mass of monomer) of tri(pentafluorophenyl) boron, and 0.25 mol % (relative to mass of monomer) of triethyl aluminum dissolved in toluene were put into the reaction tank. The mixture was allowed to react at room temperature under stirring for 18 hours. After the reaction completed, the reaction mixture was poured into an excessive amount of ethanol, to thereby produce a polymer precipitate. The precipitate was purified, and the obtained polymer (J1) was dried by vacuum drying at 65° C. for 24 hours.

<Formation of Second Optically Anisotropic Layer (C2-1)>

The composition shown below was put into a mixing tank, stirred under heating so as to dissolve the individual components, and filtered through a filter paper having a mean pore size of 34 μm or through a sintered metal filter having a mean pore size of 10 μm.

| Matting Agent Dispersion M1 | |
|---|---|
| Silica particle having a mean particle size of 16 nm (Aerosil R972 from Nippon Aerosil Co., Ltd.) | 2 parts by mass |
| Dichloromethane | 81 parts by mass |
| Methanol | 7 parts by mass |
| Cyclic polyolefin solution (D1) | 10 parts by mass |

One hundred parts by mass of the above-described cyclic polyolefin solution D1 and 1.35 parts by mass of the matting agent dispersion M1 were mixed to thereby prepare a film forming dope.

The above-described dope was cast using a band casting machine to a width of 1,400 mm. The film was freed from the band, with the residual solvent content kept at approximately 25% by mass, was then held so as to prevent wrinkling, and stretched by a stretching ratio of 10% using a tenter in the transverse direction (TD), while being blown with a hot air of 140° C. Thereafter the film was transferred from tenter conveyance to roll conveyance, further dried at 120° C. to 140° C., and wound up.

Thus-fabricated film was then allowed to pass through an induction heating rolls kept at 60° C. so as to raise the surface temperature of the film up to 40° C., thereon an alkali solution having the composition below was coated using a bar coater to an amount of 14 ml/m², allowed to stand for 10 seconds under a steam-type far infrared heater (from Noritake Co., Ltd.) heated to 110° C., and thereon pure water was coated to an amount of 3 ml/m² again using a bar coater. The film temperature herein was kept at 40° C. Next, a cycle of washing with water using a fountain coater and dewatering using an air knife was repeated three times, and the film was then allowed to stand for 2 seconds in a drying zone conditioned at 70° C.

| <Formulation of Alkali solution> | |
|---|---|
| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$(surfactant) | 1.0 parts by mass |

Optical characteristics of thus-fabricated cyclic polyolefin film were measured using an automatic birefringence meter (KOBRA-21ADH from Oji Scientific Instruments). The Re and the Rth measured at 590 nm were respectively 60 nm and 190 nm. The slow axis of the optically anisotropic layer was found to cross normal to the longitudinal direction of the film. The film was named second optically anisotropic layer C2-1.

<Production of First Optically Anisotropic Layer>

On the saponified surface of the long-web cyclic polyolefin film (C2-1) fabricated in the above, an alignment film coating fluid having the composition below was continuously coated using a #14 wire bar. The coated surface was dried by a 60° C. hot air for 60 seconds, and further dried by a 100° C. hot air for 120 seconds, to thereby obtain an alignment film.

| Formulation of Coating fluid of Alignment layer | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

Modified Polyvinyl Alcohol

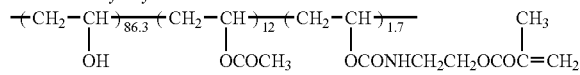

A coating fluid containing a rod-like liquid crystal compound and having the composition shown below was continuously coated on the alignment film fabricated in the above, using a #5.0 wire bar. Travel speed of the film was set to 20 m/min. The solvent was allowed to dry in the process of continuous heating from room temperature up to 80° C., the coating was then heated in a drying zone at 80° C. for 90 seconds, so as to align the rod-like liquid crystalline compound. The film was then kept at 60° C., alignment of the liquid crystal compound was fixed by UV irradiation, to thereby form the first optically anisotropic layer B2-1. Next, thus-fabricated film was immersed into a 1.5 mol/L sodium hydroxide solution at 55° C. for 2 minutes, and then immersed into water so as to thoroughly remove sodium hydroxide. The film was immersed into a 5 mmol/L aqueous sulfuric acid solution at 35° C. for one minute, and then into water so as to thoroughly remove the dilute aqueous sulfuric acid solution. Finally, the sample was fully dried at 120° C. In this way, the optical compensation film F2-1 having the first and second optically anisotropic layers stacked thereon was fabricated.

| Formulation of Coating fluid containing Rod-like liquid crystal compound (S1) | |
|---|---|
| Rod-like liquid crystalline compound (I) shown below | 100 parts by mass |
| Photo-polymerization initiator (Irgacure 907 from Ciba Geigy) | 3 parts by mass |
| Sensitizer (Kayacure DETX, from Nippon Kayaku Co., Ltd) | 1 part by mass |
| Fluorine-containing polymer shown below | 0.4 parts by mass |
| Pyridinium salt shown below | 1 part by mass |
| Methyl ethyl ketone | 172 parts by mass |

Rod-Like Liquid Crystal Compound (I)

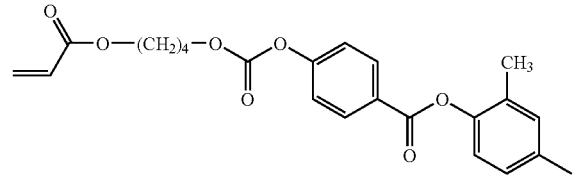

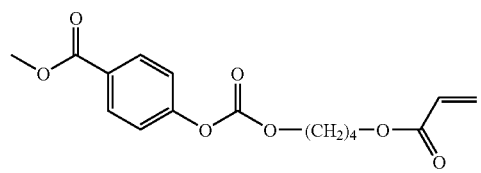

Fluorine-Containing Polymer

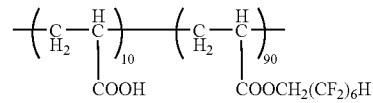

Pyridinium Salt

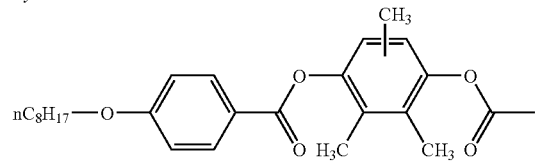

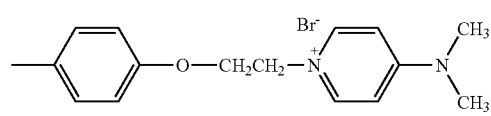

From thus-fabricated optical compensation film F2-1, only the optically anisotropic layer containing the rod-like liquid crystalline compound was peeled off, and optical characteristics thereof were measured using an automatic birefringence meter (KOBRA-21ADH from Oji Scientific Instruments). The optically anisotropic layer alone was found to show an Rth value of −260 nm and an Re value of 0 nm measured at 590 nm. It was also confirmed that the optically anisotropic layer having the rod-like liquid crystal molecules aligned substantially normal to the film surface was formed.

<Production of Polarizing Plate (P2-1)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the surface of the above-fabricated optical compensation film F2-1 having no first optically anisotropic layer formed thereon (that is, the back surface of the cyclic polyolefin film C2-1), and on the other surface thereof, with a cellulose triacetate film (Fujitack TD80UL from FUJIFILM Corporation) having the saponified surface, using a polyvinyl alcohol-base adhesive, to thereby fabricate a long-web polarizing plate P2-1. The absorption axis of the polarizer film herein was found to be in parallel with the longitudinal direction thereof, and the absorption axis of the polarizer film was found to cross the slow axis of the second optically anisotropic layer (cellulose acylate film) at right angles.

Example 2-2

<Production of Cellulose Acetate Film (T2-0)>

(Preparation of Cellulose Acetate Solution)

The composition below was put into a mixing tank, and stirred to solubilize the individual components, to thereby prepare a cellulose acetate solution "A".

| Formulation of Cellulose Acetate Solution "A" | |
|---|---|
| Cellulose acetate having a degree of acetyl substitution of 2.94 | 100.0 parts by mass |
| Methylenechloride (first solvent) | 402.0 parts by mass |
| Methanol (second solvent) | 60.0 parts by mass |

(Preparation of Matting Agent Solution)

Twenty parts by mass of silica particles having a mean particle size of 16 nm (AEROSIL R972 from Nippon Aerosil Co., Ltd.) and 80 parts by mass of methanol were thoroughly mixed under stirring for 30 minutes, to thereby prepare a silica particle dispersion. The dispersion was then put into a dispersion machine together with the composition shown below, and further stirred for 30 minutes or longer so as to dissolve the individual components, to thereby prepare a matting agent solution.

| Formulation of Matting agent solution | |
|---|---|
| Dispersion of silica particles having a mean particle size of 16 nm | 10.0 parts by mass |
| Methylene chloride (first solvent) | 76.3 parts by mass |
| Methanol (second solvent) | 3.4 parts by mass |
| Cellulose acetate solution "A" | 10.3 parts by mass |

(Preparation of Additive Solution)

The composition shown below was put into a mixing tank, stirred under heating so as to dissolve the individual components, to thereby prepare a cellulose acetate solution.

| Formulation of Additive solution | |
|---|---|
| Optical anisotropy reducing agent shown below | 49.3 parts by mass |
| Wavelength dispersion adjusting agent | 4.9 parts by mass |
| Methylene chloride (first solvent) | 58.4 parts by mass |
| Methanol (second solvent) | 8.7 parts by mass |
| Cellulose acetate solution "A" | 12.8 parts by mass |

Optical Anisotropy Reducing Agent

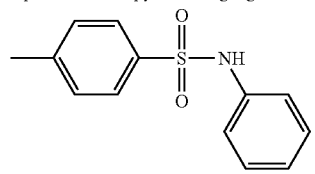

Wavelength Dispersion Adjusting Agent

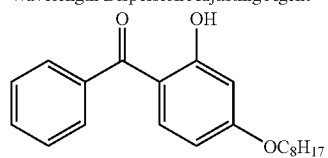

(Production of Cellulose Acetate Film)

Mixed were 94.6 parts by mass of the above-described cellulose acetate solution "A", 1.3 parts by mass of the matting agent solution, and 4.1 parts by mass of the additive solution, each of which having preliminarily been filtered, and the mixture was cast using a band casting machine. In this composition, ratios by mass of the optical anisotropy reducing agent and of the wavelength dispersion adjusting agent relative to the cellulose acetate were 12% and 1.2%, respectively. The film was freed from the band, while keeping a content of residual solvent of 30%, dried at 14° C. for 40 minutes, to thereby fabricate a long-web cellulose acetate film T2-0 of 80 μm thick. The obtained film was found to have an in-plane retardation (Re) of 1 nm (slow axis aligns normal to the longitudinal direction), and a thickness-wise retardation (Rth) of −1 nm.

<Production of Polarizing Plate (P2-0)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the saponified above-described cellulose acetate film T2-0, and on the other surface thereof, with a saponified commercial cellulose triacetate film (Eujitack TD80UL from FUJIFILM Corporation), using a polyvinyl alcohol-base adhesive, to thereby fabricate a long-web polarizing plate P2-0.

<Production of Polarizing Plate (P2-2)>

An optical compensation film F2-1 was fabricated similarly to as in Example 2-1. The above-fabricated polarizing plate P2-0 was continuously bonded, on the cellulose acetate film T2-O-side surface thereof, with the optical compensation film F2-1 on the surface thereof having no first optically anisotropic layer formed thereon (that is, the back surface of the cyclic polyolefin film C2-1), using an optically isotropic acrylic tacky agent, to thereby fabricate a long-web polarizing plate P2-2. The absorption axis of the polarizer film herein was found to be in parallel with the longitudinal direction thereof, and the absorption axis of the polarizer film was found to cross normal to the slow axis of the second optically anisotropic layer.

Example 2-3

<Formation of First Optically Anisotropic Layer>

Using a long-web polyethylene terephthalate film (100 μm thick) as a temporary support, an alignment film was formed thereon similarly to as in Example 2-1, and further applied with a coating fluid S1 to form the first optically anisotropic layer B2-1.

<Production of Polarizing Plate (P2-3)>

A long-web polarizer film was obtained similarly to as in Example 2-1. The polarizer film was continuously bonded, on one surface thereof, with the saponified surface of the cyclic polyolefin film C2-1 fabricated similarly to as in Example 2-1, and on the other surface thereof, with a cellulose triacetate film (Fujitack TD80UL, from FUJIFILM Corporation) having the saponified surfaces, using a polyvinyl alcohol-base adhesive. Next, on the surface of the cyclic polyolefin film C2-1 of the polarizing plate, the first optically anisotropic layer B2-1 formed on the polyethylene terephthalate film (temporary support) was continuously bonded using an optically isotropic acrylic tacky agent, and the polyethylene terephthalate film was then peeled off. In this way, a long-web polarizing plate P2-3 having the polarizer film, the second optically anisotropic layer and the first optically anisotropic layer stacked in this order was fabricated. The absorption axis of the polarizer film was found to be in parallel with the longitudinal direction thereof, and the absorption axis of the polarizer film was found to cross normal to the slow axis of the second optically anisotropic layer.

Example 2-4

<Formation of Second Optically Anisotropic Layer (C2-2)>

A film forming dope containing cyclic polyolefin was prepared similarly to as in Example 2-1. The above-described dope was cast using a band casting machine to a width of 1,400 mm. The film was freed from the band, with the residual solvent content kept at approximately 25% by mass, was then held so as to prevent wrinkling, and stretched by a stretching ratio of 5% using a tenter in the transverse direction (TD), while being blown with a hot air of 140° C. Thereafter the film was transferred from tenter conveyance to roll conveyance, further dried at 120° C. to 140° C., and wound up. An alkali solution was then coated on the surface of the film, similarly to as in Example 2-1, so as to effect saponification.

Optical characteristics of thus-fabricated cyclic polyolefin film were measured. The Re and the Rth measured at 590 nm were respectively 70 nm and 210 nm. The slow axis of the optically anisotropic layer was in parallel with the longitudinal direction of the film. The film was named a second optically anisotropic layer C2-2.

<Formation of First Optically Anisotropic Layer>

On the saponified surface of the long-web cyclic polyolefin film (C2-2) fabricated in the above, the optically anisotropic layer B2-1 containing the rod-like liquid crystalline compound was formed similarly to as in Example 2-1. The film was further saponified by immersing it into an aqueous sodium hydroxide solution similarly to as in Example 2-1. In this way, an optical compensation film F2-2 having the first and second optically anisotropic layers stacked therein was fabricated.

<Production of Polarizing Plate (P2-4)>

A long-web polarizer film was obtained similarly to as in Example 2-1. The polarizer film was bonded, on one surface thereof, with the surface of the above-fabricated optical compensation film F2-2 having the first optically anisotropic layer formed thereon, and on the other surface thereof, with a cellulose triacetate film (Fujitack TD80UL from FUJIFILM Corporation) having the saponified surfaces, to thereby fabricate a long-web polarizing plate P2-4. In this process, an optically isotropic acrylic tacky agent was used between the polarizer film and the optical compensation film F2-2, and a polyvinyl alcohol-base adhesive was used between the polarizer film and the cellulose triacetate film. The absorption axis of the polarizer film was found to be in parallel with the longitudinal direction thereof, and the absorption axis of the polarizer film was found to be at an angle of 0° with respect to the slow axis of the second optically anisotropic layer.

Example 2-5

<Production of First Optically Anisotropic Layer>

The long-web cellulose acetate film T2-0 was fabricated similarly to as in Example 2-1. The film was saponified on the surface thereof, an alignment film was formed thereon, and further applied with a coating fluid S1 to form the first optically anisotropic layer B2-1. The film was then saponified by immersing it into an aqueous sodium hydroxide solution similarly to as in Example 2-1. In this way, an optical compensation film F2-3, having a first optically anisotropic layer formed on the substantially isotropic support, was fabricated.

<Formation of Second Optically Anisotropic Layer>

A long-web cyclic polyolefin film C2-2 was fabricated similarly to as in Example 2-3, to be provided as the second optically anisotropic layer.

<Production of Polarizing Plate (P2-5)>

A long-web polarizer film was obtained similarly to as in Example 2-1. The polarizer film was bonded, on one surface thereof, with the surface of the above-fabricated optical compensation film F2-3 having no first optically anisotropic layer formed thereon (that is, the back surface of the cellulose acetate film T2-0), and on the other surface thereof, with a cellulose triacetate film (Fujitack TD80UL from FUJIFILM Corporation) having the saponified surfaces, using a polyvinyl alcohol-base adhesive. The optical compensation film F2-3 was further bonded, on the surface having the first optically anisotropic layer formed thereon, with the above-fabricated cyclic polyolefin film C2-2, using an isotropic acrylic tacky agent. In this way, a long-web polarizing plate P2-5, having the polarizer film, the first optically anisotropic layer and the second optically anisotropic layer stacked therein in this order, was fabricated. The absorption axis of the polarizer film was found to be in parallel with the longitudinal direction thereof, and the absorption axis of the polarizer film was found to be at an angle of 0° with respect to the slow axis of the second optically anisotropic layer.

Example 2-6

<Production of Cyclic Polyolefin Film (C2-3)>

The composition shown below was put into a mixing tank, stirred under heating so as to dissolve the individual components, and filtered through a filter paper having a mean pore size of 34 μm or through a sintered metal filter having a mean pore size of 10 μm.

| Cyclic Polyolefin Solution D3 | |
| --- | --- |
| Cyclic polyolefin: TOPAS5013 | 100 parts by mass |
| Paraffin wax 135 (Nippon Seiro Co., Ltd.) | 15 parts by mass |
| Cyclohexane | 380 parts by mass |
| Dichloromethane | 70 parts by mass |

Next, the composition shown below, containing the cyclic polyolefin solution prepared by the method described in the above, was put into a dispersion machine, to thereby prepare a particle dispersion.

| Particle Dispersion M3 | |
| --- | --- |
| Silica Particles having a primary mean particle size of 16 nm (Aerosil R972 from Nippon Aerosil Co., Ltd.) | 2 parts by mass |
| Cyclohexane | 73 parts by mass |
| Dichloromethane | 10 parts by mass |
| Cyclic polyolefin solution D3 | 10 parts by mass |

One hundred parts by mass of the above-described cyclic polyolefin solution D3 and 1.35 parts by mass of the matting agent dispersion M3 were mixed to thereby prepare a film forming dope. The above-described dope was cast using a band casting machine. The film was freed from the band, with the residual solvent content kept at approximately 35% by mass, was then held so as to prevent wrinkling, dried at 120° C. to 140° C., and wound up. The Re and the Rth measured at 590 nm were respectively 0.5 nm and 1 nm. In this way, the cyclic polyolefin film C2-3 was fabricated.

<Production of Polarizing Plate (P2-6)>

A long-web polarizer film was obtained similarly to as in Example 2-1. The polarizer film was bonded, on one surface thereof, with the cyclic polyolefin film C2-3 as fabricated in the above, and on the other surface thereof, with a cellulose triacetate film (Fujitack TD80UL from FUJIFILM Corporation) having the saponified surfaces. The polarizer film and the cellulose triacetate film herein were bonded using a polyvinyl alcohol-base adhesive, and the polarizer film and the cyclic polyolefin film C2-3 were bonded as described below.

Ten parts of a polyester-base urethane (Takelac XW-74-C154 from Mitsui Takeda Chemicals, Inc.) and one part of isocyanate-base crosslinking agent (Takenate WD-725 from Mitsui Takeda Chemicals, Inc.) were dissolved in water, to thereby prepare a solution having the solid content adjusted to 20%. The polarizer film and the cyclic polyolefin film C2-3 were bonded using this solution as an adhesive, dried and cured in an oven at 40° C. for 72 hours, to thereby fabricate a polarizing plate.

The polarizing plate fabricated in the above was bonded, on the surface of the cyclic polyolefin film C2-3 formed thereon, with the optical compensation film F2-2 on the surface thereof having the first optically anisotropic layer formed thereon, using an isotropic acrylic tacky agent. In this way, a long-web polarizing plate P2-6, having the polarizer film, the first optically anisotropic layer, and the second optically anisotropic layer stacked in this order, was fabricated. The absorption axis of the polarizer film was found to be in parallel with the longitudinal direction thereof, and the absorption axis of the polarizer film was found to be at an angle of 0° with respect to the slow axis of the second optically anisotropic layer.

Referential Example 1

Production of Polarizing Plate P2-H1)

<Production of Second Optically Anisotropic Layer (Th1)>

The composition below was put into a mixing tank, stirred under heating so as to dissolve the individual components, to thereby prepare a cellulose acetate solution.

| Formulation of Cellulose Acetate Solution | |
|---|---|
| Cellulose acetate having a degree of acetylation of 60.9% (degree of polymerization 300, Mn/Mw = 1.5) | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In another mixing tank, 16 parts by mass of the above-described retardation enhancer A, 8 parts by mass of retardation enhancer B, 0.28 parts by mass or silicon dioxide particles (mean particle size: 0.1 μm), 80 parts by mass of methylene chloride, and 20 parts by mass of methanol were put, stirred under heating, to thereby prepare a retardation enhancer solution (and also is a particle dispersion). The cellulose acetate solution in an amount of 474 parts by mass was mixed with 45 parts by mass of the retardation enhancer, and thoroughly mixed to prepare a dope.

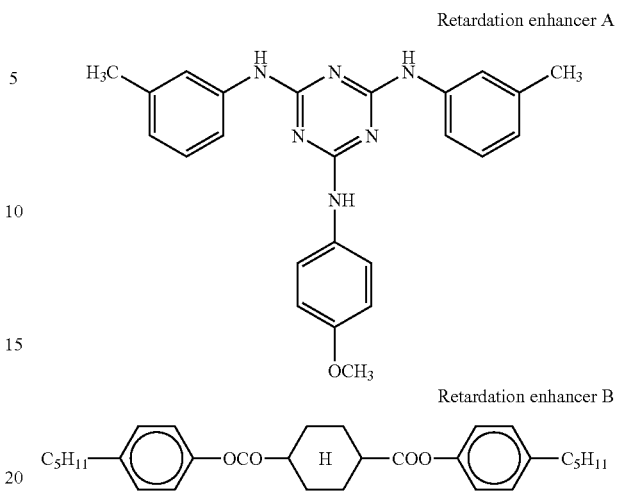

The obtained dope was cast using a casting machine having a band of 2 m wide and 65 m long. The film having the residual solvent content of 15% by mass was monoaxially stretched in the transverse direction by a stretching ratio of 20% using a tenter at 130° C., kept at 50° C. for 30 seconds while keeping the width after the stretching unchanged, released from the clips, to thereby fabricate a cellulose acetate film. The residual solvent content upon completion of the stretching was 5% by mass, and was further lowered by drying to as low as less than 0.1% by mass, and thereby a cellulose acetate film (TH1) was fabricated. The cellulose acylate used herein had a Tg of 140° C.

The obtained cellulose acetate film TH1 was 1,340 mm wide and 88 μm thick. The in-plane retardation (Re) was 60 nm, and the thickness-wise retardation (Rth) was 190 nm.

<Formation of First Optically Anisotropic Layer (B2-1)>

On the long-web cellulose acetate film (TH1) fabricated in the above, the optically anisotropic layer B2-1 containing the rod-like liquid crystalline compound was formed, and saponified, similarly to as in Example 2-1.

In this way, an optical compensation film F2-H1 composed of the cellulose acetate film, and having the second optically anisotropic layer and the first optically anisotropic layer stacked therein was fabricated.

<Production of Polarizing Plate (P2-H1)>

A long-web polarizer film was obtained similarly to as in Example 2-1. The polarizer film was continuously bonded, on one surface thereof, with the surface of the above-fabricated optical compensation film F2-H1 having no first optically anisotropic layer formed thereon, and on the other surface thereof, with a cellulose triacetate film (Fujitack TD80UL from FUJIFILM Corporation) having the saponified surfaces, using a polyvinyl alcohol-base adhesive, to thereby fabricate the long-web polarizing plate P2-H1. The absorption axis of the polarizer film herein was found to be in parallel with the longitudinal direction thereof, and the absorption axis of the polarizer film was found to cross normal to the slow axis of the second optically anisotropic layer.

Example 2-7

<Production of Liquid Crystal Display Device (L2-11)>

A liquid crystal cell was taken from a liquid crystal television set TH-32LX500 (from Matsushita Electric Industrial Co., Ltd.), and the polarizing plate and the optical film bonded to the observer's side and the back light side were freed. The liquid crystal cell was found that the liquid crystal molecules are aligned substantially in plane between the glass substrates in under no applied voltage and in the black state, was found to have the slow axis in a horizontal direction with respect to the screen.

On the upper and lower glass substrates of the above-described in-plane alignment cell, the polarizing plates (P2-1 and P2-0) fabricated in the above were bonded using a tacky agent. In this case, P2-1 was disposed on the polarizing plate on the back light side, P2-0 was disposed on the observer's side, and were bonded so that the first optically anisotropic layer contained in the polarizing plate P2-1 is brought into contact with the glass substrate on the back light side, and so that the cellulose acetate film T2-0 contained in the polarizing plate P2-0 is brought into contact with the glass substrate on the observer's side. The absorption axis of the polarizing plate P2-1 was aligned normal to the slow axis of the liquid crystal cell, and the absorption axes of the polarizing plate P2-1 and the polarizing plate P2-0 were arranged as being normal to each other. The liquid crystal cell bonded with the polarizing plates as described in the above was again assembled into the liquid crystal television set TH-32LX500. A liquid crystal display device L2-11 was fabricated in this way.

Example 2-8

<Production of Liquid Crystal Display Device (L2-12)>

The in-plane alignment cell was obtained similarly to as in Example 2-7. On the upper and lower glass substrates of the above-described in-plane alignment cell, the polarizing plates (P2-1 and P2-0) fabricated in the above were bonded using a tacky agent. In this case, P2-0 was disposed on the polarizing plate on the back light side, P2-1 was disposed on the observer's side, and were bonded so that the first optically anisotropic layer contained in the polarizing plate P2-1 is brought into contact with the glass substrate on the observer's side, and so that the cellulose acetate film T2-0 contained in the polarizing plate P2-0 is brought into contact with the glass substrate on the back light side. The absorption axis of the polarizing plate P2-0 was aligned in parallel with the slow axis of the liquid crystal cell, and the absorption axes of the polarizing plate P2-0 and the polarizing plate P2-1 were arranged as being normal to each other. The liquid crystal cell bonded with the polarizing plates as described in the above was again assembled into the liquid crystal television set TH-32LX500. A liquid crystal display device L2-12 was fabricated in this way.

Example 2-9

In the production of the liquid crystal display device L2-11 in Example 2-7 in the above, the liquid crystal display devices were fabricated using the polarizing plates P2-2, P2-3, P2-4, P2-5, P2-6 and the comparative polarizing plates P2-H1, in place of the polarizing plate P2-1, and the devices were named L2-21, L2-31, L2-41, L2-51, L2-61 and L2-H11, respectively.

In the above-described liquid crystal display devices L2-21 and L2-31, the liquid crystal cell, the first optically anisotropic layer, the second optically anisotropic layer and the polarizer film were stacked in this order, wherein the slow axis of the second optically anisotropic layer was substantially in parallel with the longitudinal direction of the liquid crystal molecules in the black state.

In the liquid crystal display devices L2-41 to L2-61, and L2-H11, the liquid crystal cell, the second optically anisotropic layer, the first optically anisotropic layer and the polarizer film are stacked in this order, wherein the slow axis of the second optically anisotropic layer was substantially normal to the longitudinal direction of the liquid crystal molecules in the black state.

Example 2-10

In the production of the liquid crystal display device L2-12 in Example 2-8 in the above, the liquid crystal display devices were fabricated by using the polarizing plates P2-2, P2-3, P2-4, P2-5, P2-6 and comparative polarizing plate P2-H1, in place of the polarizing plate P2-1, and the devices were named L2-22, L2-32, L2-42, L2-52, L2-62 and L2-H12, respectively.

In the above-described liquid crystal display devices L2-22 and L2-32, the liquid crystal cell, the first optically anisotropic layer, the second optically anisotropic layer and the polarizer film were stacked in this order, wherein the slow axis of the second optically anisotropic layer was substantially in parallel with the longitudinal direction of liquid crystal molecules in the black state.

In the liquid crystal display devices L2-42 to L2-62, and L2-H12, the liquid crystal cell, the second optically anisotropic layer, the first optically anisotropic layer, and the polarizer film were stacked in this order, wherein the slow axis of the second optically anisotropic layer was substantially normal to the longitudinal direction of the liquid crystal molecules in the black state.

Thus-fabricated liquid crystal display devices were illuminated, and black was displayed over the entire screen. Display quality was compared in an environment of 30° C., 80% RH, between the devices immediately after the illumination and those after 500 hours of illumination. All liquid crystal display devices fabricated in the above were almost equally observed immediately after the illumination, whereas after 500 hours, L2-H11 and L2-H12 showed portions of light leakage on four corners of the screen, but all other liquid crystal displays according to Examples showed almost no light leakage on four corners.

Example 3-1

<Formation of First Optically Anisotropic Layer>

A coating fluid having a formulation shown below was continuously applied with a #14 wire bar to a surface of a long polyethylene terephthalate film (thickness 100 μm) to be used as a temporary support, and dried with warm air of 60° C. for 60 seconds and further with warm air of 100° C. for 120 seconds to form an alignment layer.

| Formulation of an alignment layer | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

Modified polyvinyl alcohol

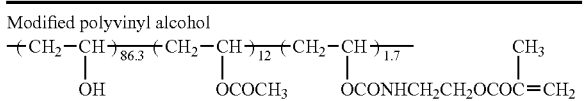

A coating fluid containing a rod-like liquid crystal compound and having the formulation shown below was continuously applied to a surface of the alignment layer prepared in the above, using a #5.0 wire bar. Travel speed of the film was set to 20 m/min. The solvent was allowed to dry in the process of continuous heating from room temperature up to 80° C., the coating was then heated in a drying zone at 80° C. for 90 seconds, so as to align the rod-like liquid crystalline molecules. The film was then kept at 60° C., alignment of the liquid crystal molecules was fixed by UV irradiation, to thereby form the first optically anisotropic layer B3-1.

| Formulation of Coating fluid Containing Rod-Like Liquid Crystal Compound (S1) | |
|---|---|
| Rod-like liquid crystalline compound (I) shown below | 100 parts by mass |
| Photo-polymerization initiator (Irgacure 907 from Ciba Geigy) | 3 parts by mass |
| Sensitizer (Kayacure DETX from Nippon Kayaku Co., Ltd.) | 1 part by mass |
| Fluoride-polymer shown below | 0.4 parts by mass |
| Pyridinium salt shown below | 1 part by mass |
| Methyl ethyl ketone | 172 parts by mass |

Rod-like liquid crystal compound (I)

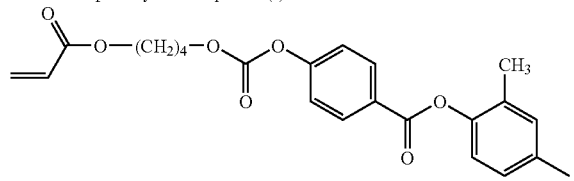

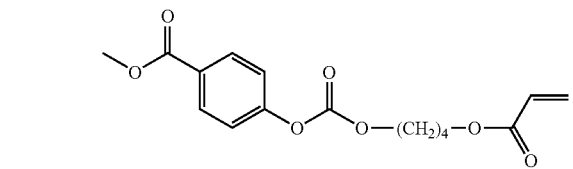

Fluoride-polymer

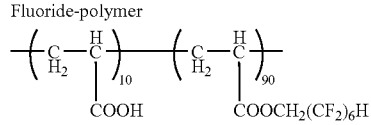

Pridinium salt

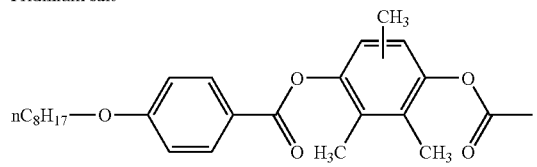

From thus-produced film, only the optically anisotropic layer B3-1 containing the rod-like liquid crystalline compound was peeled off, and optical characteristics thereof were measured using an automatic birefringence meter (KOBRA-21ADH from Oji Scientific Instruments) The optically anisotropic layer alone was found to show an Re value of 0 nm and an Rth value of −260 nm measured at 590 nm. It was also confirmed that the optically anisotropic layer in which rod-like liquid crystal molecules were aligned substantially homeotropically to the film surface was formed.

<Formation of First Optically Anisotropic Layer>

A commercially available UV curable adhesive ("UV-3400" manufactured by TOAGOSEI Co., Ltd.) was applied to a surface, opposite to the polyethylene terephthalate side, of the optically anisotropic layer B3-1 to form an adhesive layer 1 of 5 μm thickness. An optically isotropic ZEONOR film of 100 μm thickness, "ZE16" manufactured by ZEON CORPORATION, was laminated on the adhesive layer 1, and irradiated with UV light of about 600 mJ from the ZEONOR film side to harden the adhesive layer. After that, the polyethyleneterephthalate film was freed from the laminated body, the ZEONOR film/the adhesive layer 1/the first optically anisotropic layer (B3-1)/the polyethylene terephthalate film, thereby to transfer the first optically anisotropic layer (B3-1) onto the ZEONOR film and form a laminated body (Al), the ZEONOR film/the adhesive layer 1/the first optically anisotropic layer (B3-1).

<Formation of Second Optically Anisotropic Layer (C3-1)>

The ingredients shown below were put into a mixing tank, stirred under heating and dissolved in the solvents to prepare a cellulose acetate solution.

| Cellulose Acetate Solution (D1) Formulation | |
|---|---|
| Cellulose acetate with degree of acetylation of 60.9% (degree of polymerization 300, Mn/Mw = 1.5) | 100 parts by mass |
| Triphenylphosphate(plasticizer) | 7.8 parts by mass |
| Biphenyldipehnylphosphate (plasticizer) | 3.9 parts by mass |
| Methylenechloride (first solvent) | 300 parts by mass |
| Methanol (second solvent) | 54 parts by mass |
| 1-butanol (third solvent) | 11 parts by mass |

On the other hand, 16 mass parts of retardation enhancing agent (A), 8 mass parts of retardation enhancing agent (B), 0.28 mass parts of silica dioxide (mean particle size: 0.1 μm), 80 mass parts of methylene chloride and 20 mass parts of methanol were put into another mixing tank, and stirred under heating to prepare a retardation enhancing agent solution (or a fine particle dispersion). After that, 45 mass parts of the retardation enhancing agent solution was mixed with 474 mass parts of the cellulose acetate solution, and stirred sufficiently to prepare a dope.

Retardation enhancing agent (A)

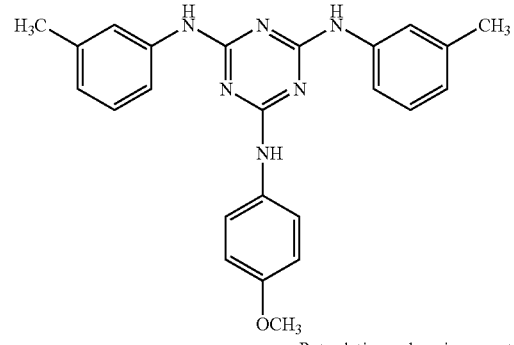

Retardation enhancing agent (B)

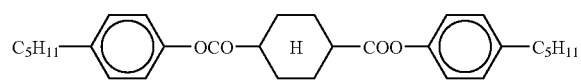

The dope was cast using a band casting machine provided with a band having a width of 2 m and a length of 65 m. The film having the residual solvent content of 15% by mass was stretched in the length-wise direction by a stretching ratio of 20% using a tenter at 130° C., kept at 50° C. for 30 seconds while keeping the width after the stretching unchanged, released from the clips, to thereby form a cellulose acetate film. The residual solvent content upon completion of the stretching was 5% by mass, and was further lowered by drying to as low as less than 0.1% by mass, and thereby a cellulose acetate film (C3-1) to be used as a second optically anisotropic layer. The cellulose acylate used herein had a Tg of 140° C.

The obtained cellulose acetate film (C3-1) was 1,340 mm wide and 88 μm thick. The in-plane retardation (Re) was 60 nm, and the thickness-wise retardation (Rth) was 190 nm. Thus, it was found that the obtained cellulose acetate film C3-1 exhibited the optical properties required for a second optically anisotropic layer.

<Production of Optical Compensation Film (F3-1)>

A commercially available UV curable adhesive ("UV-3400" manufactured by TOAGOSEI Co., Ltd.) was applied to a surface, opposite to the ZEONOR film side, of the optically anisotropic layer B3-1 to form an adhesive layer 2 of 5 μm thickness. A cellulose acetate film C3-1 was laminated on the adhesive layer 2, and irradiated with UV light of about 600 mJ from the C3-1 side to harden the adhesive layer 2 to form an optical compensatory film (F3-1), the ZEONOR film/the adhesive layer 1/the first optically anisotropic layer (B3-1)/the adhesive layer 2/the second optically anisotropic layer (C3-1).

<Production of Polarizing Plate (P3-1)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with a cellulose triacetate film (Fujitack TD80UL from FUJIFILM Corporation) having the saponified surface, using a polyvinyl alcohol-base adhesive. On the other hand, 10 mass parts of polyester-base urethane ("TAKELAC XW-74-C154" manufactured by Mitsui Takeda Chemicals Inc.) and 1 mass part of isocyanate-base crosslinking agent ("TAKENATE WD-725" manufactured by Mitsui Takeda Chemicals Inc.) were dissolved in water to form a solution whose solid content was adjusted to 20%. The polarizer film was continuously bonded, on another surface thereof, with the ZEONOR side surface of the optical compensation film F3-1, using the obtained solution as an adhesive, hardened in an oven at 40° C. and dried for 72 hours to form a polarizing plate. The absorption axis of the polarizer film herein was in parallel with the longitudinal direction thereof, and the angle formed between the absorption axis of the polarizer film and the slow axis of the second optically anisotropic layer (C3-1) was found 0°.

Example 3-2

<Production of Polarizing Plate (P3-2)>

A dope, which was same as that used for preparing the film C-1, was cast using a band casting machine provided with a band having a width of 2 m and a length of 65 m. The film having the residual solvent content of 15% by mass was monoaxially stretched in the transverse direction (TD) by a stretching ratio of 20% using a tenter at 130° C., kept at 50° C. for 30 seconds while keeping the width after the stretching unchanged, released from the clips, to thereby form a cellulose acetate film. The residual solvent content upon completion of the stretching was 5% by mass, and was further lowered by drying to as low as less than 0.1% by mass, and thereby a cellulose acetate film. The cellulose acylate used herein had a Tg of 140° C.

A surface of the obtained film was saponified, and the saponified cellulose acetate film was used as a second optically anisotropic layer (C3-2).

An optical compensation film (F3-2) was produced in the same manner as the optical compensation film (F3-1), except that the cellulose acetate film C3-1 was replaced with the cellulose acetate film C3-2. The non-saponified surface of the film C3-2 was laminated.

<Production of Polarizing Plate (P3-2)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the surface of the above-produced optical compensation film F3-2 having no first optically anisotropic layer formed thereon, and on the other surface thereof, with a cellulose triacetate film (Fujitack TD80UL from FUJIFILM Corporation) having the saponified surface, using a polyvinyl alcohol-base adhesive, to thereby fabricate a long-web polarizer plate P3-1. The absorption axis of the polarizer film herein was in parallel with the longitudinal direction thereof, and the absorption axis of the polarizer film was found to cross the slow axis of the second optically anisotropic layer (cellulose acylate film) at right angles.

Example 3-3

<Production of Cyclic Olefin Polymer>

In a reaction tank, 100 parts mass of purified toluene and 100 parts mass of methyl norbornene carbonate were placed. Subsequently, a solution prepared by dissolving 25 mmol % (with respect to monomer mass) of ethylhaxanoate-Ni and 0.225 mol % (with respect to monomer mass) of tri(pentafluorophenyl) boron in toluene, and a solution prepared by dissolving 0.25 mol % (with respect to monomer mass) of triethyl aluminum in toluene were poured into the tank. The mixture was reacted with stirring at room temperature for 18 hours. After the end of the reaction, the reaction mixture was poured into excess ethanol so that polymer was precipitated in ethanol. The precipitation was purified and dried in a vacuum at 65° C. for 24 hours. Then, Polymer J1 was obtained.

<Formation of Second Optically Anisotropic Layers (C3-3) and (C3-4)>

The ingredients shown below were put into a mixing tank, stirred and dissolved in the solvent. The obtained solution was filtrated through a paper filter of 34 μm mean pore size and a sintered metal filter of 10 μm mean pore seize.

| Formulation of Cyclic polyolefin solution (D2) | |
|---|---|
| cyclic polyolefin (J1) | 150 mass parts |
| dichloromethane | 414 mass parts |
| methanol | 36 mass parts |

The ingredients including the cyclic polyolefin solution were put into a dispersing machine to give a matting agent dispersion.

| Matting agent dispersion M1 | |
|---|---|
| silica particles of 16 nm mean particle size ("AEROSIL R972" manufactured by Aerosil Co., Ltd.) | 2 mass parts |
| dichloromethane | 81 mass parts |
| methanol | 7 mass parts |
| cyclic polyolefin solution (D2) | 10 mass parts |

Mixed were 100 mass parts of cyclic polyolefin solution D2 and 1.35 mass parts of matting dispersion Ml. Then, a dope for forming films was prepared.

The above-described dope was cast using a band casting machine to a width of 1,400 mm. The film was freed from the band, with the residual solvent content kept at approximately 25% by mass, was then held so as to prevent wrinkling, and stretched by a stretching ratio of 10% using a tenter in the transverse direction (TD), while being blown with a hot air of 140° C. Thereafter the film was transferred from tenter conveyance to roll conveyance, further dried at 120° C. to 140° C., and wound up.

Thus-produced film was then allowed to pass through an induction heating rolls kept at 60° C. so as to raise the surface temperature of the film up to 40° C., thereon an alkali solution having the composition below was coated using a bar coater to an amount of 14 ml/m², allowed to stand for 10 seconds under a steam-type far infrared heater (from Noritake Co., Ltd.) heated to 110° C., and thereon pure water was coated to an amount of 3 ml/m² again using a bar coater. The film temperature herein was kept at 40° C. Next, a cycle of washing with water using a fountain coater and dewatering using an air knife was repeated three times, and the film was then allowed to stand for 2 seconds in a drying zone conditioned at 70° C.

| <Formulation of Alkali solution> | |
|---|---|
| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$ (surfactant) | 1.0 parts by mass |

Optical characteristics of thus-fabricated cyclic polyolefin film were measured using an automatic birefringence meter (KOBRA-21ADH from Oji Scientific Instruments). The Re and the Rth measured at 590 nm were respectively 60 nm and 190 nm. The slow axis of the optically anisotropic layer was found to cross normal to the longitudinal direction of the film. The film was named second optically anisotropic layer C3-3.

<Production of Optical Compensation Film (F3-3)>

An optical compensation film (F3-3) was produced in the same manner as the optical compensation film (F3-1), except that the ZEONOR film "ZF16" was replaced with the second optically anisotropic layer C3-3. As same as the manner for preparing the film F3-1, UV curable adhesive agent "UV-3400" was applied to the non-saponified surface of the film C3-3 and hardened by UV irradiation to form an adhesive layer of 5 μm thickness. The saponified surface of the film C3-3 was bonded to the first optically anisotropic layer through the adhesive layer. Then, an optical compensation film F3-3 was produced.

<Production of Polarizing Plate (P3-3)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the surface of the above-produced optical compensation film F3-3 having no first optically anisotropic layer formed thereon, and on the other surface thereof, with a cellulose triacetate film (Fujitack TD80UL from FUJIFILM Corporation) having the saponified surface, using a polyvinyl alcohol-base adhesive, to thereby fabricate a long-web polarizer plate P3-1. The absorption axis of the polarizer film herein was in parallel with the longitudinal direction thereof, and the absorption axis of the polarizer film was found to cross the slow axis of the second optically anisotropic layer (cellulose acylate film) at right angles.

Example 3-4

<Production of Optical Compensation Film (F3-4)>

A dope, which was same as that used for preparing the second optically anisotropic layer (C3-3), was cast using a band casting machine to a width of 1,400 mm. The film was freed from the hand, with the residual solvent content kept at approximately 25% by mass, was then held so as to prevent wrinkling, and stretched by a stretching ratio of 10% using a tenter in the transverse direction (TD), while being blown with a hot air of 140° C. Thereafter the film was transferred from tenter conveyance to roll conveyance, further dried at 120° C. to 140° C., and wound up. Then, a second optically anisotropic layer (C3-4) was produced.

The optical properties of the layer (C3-4) were measured in the same manner as the second optically anisotropic layer (C3-3)

It was found that the layer exhibited an Re value of 60 nm and an Rth value of 190 nm measured at 590 nm. It was also confirmed that the slow axis of the optically anisotropic layer was parallel to the long axis of the film.

An optical compensation film (F3-4) was produced in the same manner as the optical compensation film (F3-3), except that the saponified second optically anisotropic layer (C3-3) was replaced with non-saponified layer (C3-4).

<Production of Cellulose acetate film (T3-0)>

(Preparation of Cellulose Acetate Solution)

The ingredients below were put into a mixing tank, and stirred and dissolved in the solvent, to thereby prepare a cellulose acetate solution "A".

| Formulation of Cellulose Acetate Solution "A" | |
|---|---|
| Cellulose acetate having a degree of acetyl substitution of 2.94 | 100.0 parts by mass |
| Methylenechloride (first solvent) | 402.0 parts by mass |
| Methanol (second solvent) | 60.0 parts by mass |

(Preparation of Matting Agent Solution)

Twenty parts by mass of silica particles having a mean particle size of 16 nm (AEROSIL R972 from Nippon Aerosil Co., Ltd.) and 80 parts by mass of methanol were thoroughly mixed under stirring for 30 minutes, to thereby prepare a silica particle dispersion. The dispersion was then put into a dispersion machine together with the composition shown below, and further stirred for 30 minutes or longer so as to dissolve the individual components, to thereby prepare a matting agent solution.

| Formulation of Matting Agent solution | |
|---|---|
| Dispersion of silica particles having a mean particle size of 16 nm | 10.0 parts by mass |
| Methylene chloride (first solvent) | 76.3 parts by mass |
| Methanol (second solvent) | 3.4 parts by mass |
| Cellulose acetate solution "A" | 10.3 parts by mass |

(Preparation of Additive Solution)

The composition shown below was put into a mixing tank, stirred under heating so as to dissolve the individual components, to thereby prepare a cellulose acetate solution.

| Formulation of Additive solution | |
|---|---|
| Optical anisotropy reducing agent shown below | 49.3 parts by mass |
| Wavelength dispersion adjusting agent | 4.9 parts by mass |
| Methylene chloride (first solvent) | 58.4 parts by mass |
| Methanol (second solvent) | 8.7 parts by mass |
| Cellulose acetate solution "A" | 12.8 parts by mass |

Optical Anisotropy Reducing Agent

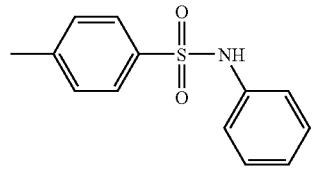

Wavelength Dispersion Adjusting Agent

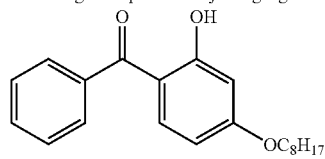

(Production of Cellulose Acetate Film)

Mixed were 94.6 parts by mass of the above-described cellulose acetate solution "A", 1.3 parts by mass of the matting agent solution, and 4.1 parts by mass of the additive solution, each of which having preliminarily been filtered, and the mixture was cast using a band casting machine. In this composition, ratios by mass of the optical anisotropy reducing agent and of the wavelength dispersion adjusting agent relative to the cellulose acetate were 12% and 1.2%, respectively. The film was freed from the band, while keeping a content of residual solvent of 30%, dried at 140° C. for 40 minutes, to thereby fabricate a long-web cellulose acetate film T2-0 of 80 μm thick. The obtained film was found to have an in-plane retardation (Re) of 1 nm (slow axis was normal to the longitudinal direction), and a thickness-wise retardation (Rth) of −1 nm.

<Production of Polarizer Plate (P3-0)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the saponified above-described cellulose acetate film T3-0, and on the other surface thereof, with a saponified commercial cellulose triacetate film (Fujitack TD80UL from FUJIFILM Corporation), using a polyvinyl alcohol-base adhesive, to thereby fabricate a long-web polarizer plate P3-0.

<Production of Polarizer Plate (P3-4)>

The polarizing plate (P3-0) was continuously bonded, on one surface thereof, with the surface of the above-produced optical compensation film F3-4 having a first optically anisotropic layer formed thereon, using an isotropic acryl-base adhesive agent, to thereby produce a long-web polarizer plate P3-4. The absorption axis of the polarizer film herein was in parallel with the longitudinal direction thereof, and the angle between the absorption axis of the polarizer film and the slow axis of the second optically anisotropic layer was found 0°.

Example 3-5

<Polarizing plate (P3-5)>

A polarizing plate (P3-0) was produced in the same manner as Example 3-4. The polarizing plate was continuously bonded, on a cellulose acetate film (T3-0) side surface thereof, with the surface of the above-produced optical compensation film F3-4 having no first optically anisotropic layer formed thereon, using an isotropic acryl-base adhesive agent, to thereby produce a long-web polarizer plate P3-5. The absorption axis of the polarizer film herein was in parallel with the longitudinal direction thereof, and the absorption axis of the polarizer film was found to cross the slow axis of the second optically anisotropic layer (cellulose acylate film) at right angles.

Example 3-6

<Synthesis of Cyclic Olefin-Base Polymer>

In a reaction vessel subjected to nitrogen gas replacement, 250 mass parts of 8-methyl-8-carboxymethyltetracyclo[4.4.0.12,5.17,10]-3-dodecene, 18 mass parts of 1-hexene (molecular weight controlling agent) and 750 mass parts of toluene were replaced, heated at 60° C. Subsequently, 0.62 mass parts of toluene solution (1.5 mol/l) of triethyl aluminum as polymerization catalyst and 3.7 mass parts of toluene solution (0.05 mol/l) of tungsten hexachloride modified by t-butanol and methanol (t-butanol:methanol:tungsten=0.35 mol:0.3 mol:1 mol) were added to the reaction mixture in the vessel, and stirred under heating at 80° C. for three hours to carry out open-ring copolymerization and to give a solution of an open-ring copolymer. The obtained copolymer was found to have the polymerization inversion rate of 97% and the intrinsic viscosity (ηinh) measured at 30° C. in chloroform of 0.75 dl/g.

In an autoclave, 4000 mass parts of the obtained open-ring copolymer solution was placed, added with 0.48 mass parts of RuHCl(CO) [P(C$_6$H$_5$)$_3$]$_3$; and the hydrogen addition reaction of the solution was carried out under hydrogen gas pressure of 100 kg/cm$^2$ at a reaction temperature of 165° C. for three hours.

After cooling the obtained reaction solution (hydrogen addition polymer solution) was cooled, the hydrogen gas pressure was discharged. The reaction solution was poured into excess ethanol so that polymer was precipitated in ethanol. The precipitation was separated from the solution, and dried. Then, hydrogen addition polymer, cyclic polyolefin, was obtained.

The hydrogen inversion rate of the hydrogen addition polymer, referred to as Polymer (a-1) hereinafter, was measured with 400 MHz $^1$H-NMR, and was found 99.9%.

The Tg of Polymer (a-1) was measured according to a DSC method, and was found 170° C. The number-average molecular weight (Mn) and weight-average molecular weight (Mw) based on polystyrene standards were measured by a GPC method (solvent: tetrahydrofuran, column: "TSK-GEL H COLUMN" manufactured by TOSHO CORPORATION), and it was found that Mn was 39,000, Mw was 137,000 and Mw/Mn was 3.5.

The polymer (a-1) was found to have water saturation absorption at 23° C. of 0.45% and the SP value of 19 ($MPa^{1/2}$).

<Formation of Second Optically Anisotropic Layer (C3-6)>

The polymer (a-1) was dissolved in toluene to give a 30% toluene solution having a solution viscosity of 30,000 mPa·s at room temperature. With respect to 100 mass parts of the polymer, 0.28 mass parts of silica dioxide fine particles (mean particle size: 0.1 μm) and 0.1 mass parts of pentaerythrityltetrakis [3-(3,5-di-t-butyl-4-hydroxyphenyl) propionate] as an antioxidation agent were added to the toluene solution of the polymer. The obtained fluid was filtrated through a sintered metal filter of 2.5 μm mean pore seize from Japan Pall Corporation while the flow rate was controlled so as to adjust a differential pressure falling within 1 MPa. After that, using "INVEX labocoater" from INOKIN place in a class 100 clean room, the filtrate was applied to a surface of a 100 μm-thickness PET film ("LUMIRROR U94" from Toray industries Inc.) subjected to hydrophilic surface treatment with acrylic acid-base surface treatment agent, dried primarily at 50° C. and secondary at 90° C. to form a dried film of 150 μm thickness. The PET film was freed from the obtained dried film, and, then, Film (a1) was obtained. The obtained optical film was found to contain residue solvent in an amount of 5.0%. The total light transmittance of the film was greater than or equal to 90%.

After the removal of the foreign substances attached to the surface of the film (a1) with an adhesive roll, the film was stretched in the longitudinal direction (MD) by 1.20 times and in the transverse direction (TD) by 1.25 times, using a tenter, placed in a class 100 clean room, under heating at 180° C. (Tg+10° C.) with a stretching speed of 300%/min. After that, the held film was cooled under an atmosphere of 150° C. (Tg−20° C.) for a minute, further cooled by room temperature and ejected from the tenter. Then, a cyclic polyolefin film of 90 μm thickness was obtained.

Optical characteristics of thus-fabricated cyclic polyolefin film were measured using an automatic birefringence meter (KOBRA-21ADH from Oji Scientific Instruments). The Re and Rth measured at 590 nm were respectively 60 nm and 180 nm. The slow axis of the cyclic polyolefin was found to cross normal to the longitudinal direction of the film. The film was named second optically anisotropic layer C3-6.

<Production of Optical Compensation Film (F3-6)>

An optical compensation film (F3-6) was produced in the same manner as the optical compensation film (F3-3) in Example 3-3, except that the second optically anisotropic layer (C3-6) was used.

<Production of Polarizing plate (P3-6)>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with a cellulose triacetate film (Fujitack TD80 μL from FUJIFILM Corporation) having the saponified surface, using a polyvinyl alcohol-base adhesive. On the other hand, 10 mass parts of polyester-base urethane ("TAKELAC XW-74-C154" manufactured by Mitsui Takeda Chemicals Inc.) and 1 mass part of isocyanate-base crosslinking agent ("TAKENATE WD-725" manufactured by Mitsui Takeda Chemicals Inc.) were dissolved in water to form a solution whose solid content was adjusted to 20%. The polarizer film was continuously bonded, on another surface thereof, with the cyclic polyolefin ($C_{3-6}$) side surface of the optical compensation film (F3-6), using the obtained solution as an adhesive, hardened in an oven at 40° C. and dried for 72 hours to form a polarizing plate. The absorption axis of the polarizer film herein was in parallel with the longitudinal direction thereof, and the angle formed between the absorption axis of the polarizer film and the slow axis of the second optically anisotropic layer was 90°.

Referential Example 3-1

Production of Polarizing Plate P3-7)

<Production of Optical Compensation Film (F3-7)>

An optical compensation film (F3-7) was produced in the same manner as Example 3-1, except that a cyclic polyolefin film (C3-6), produced in the same manner as Example 3-6, was used as a support in the place of the temporary support of the PET film, and the optically anisotropic layer (B3-1) was laminated on the support to produce a laminated body. Or, in other words, between the second optically anisotropic layer, the cyclic polyolefin film (B3-1), and the first optically anisotropic layer (B3-1), there wasn't any adhesive layer capable of improving the adhesiveness thereof.

<Production of Polarizing Plate (P3-7)>

A polarizing plate (P3-7) was produced in the same manner as the polarizing plate (P3-6) in Example 3-6, except that the optical compensation film (F3-7) was used. The absorption axis of the polarizer film herein was in parallel with the longitudinal direction thereof, and the angle formed between the absorption axis of the polarizer film and the slow axis of the second optically anisotropic layer was 90°.

Example 3-7

<Production of Liquid Crystal Display LCD (L3-0)-(L3-7)>

A liquid crystal cell was taken from a liquid crystal television set TH-32LX500 (from Matsushita Electric Industrial Co., Ltd.), and the polarizer plate and the optical film bonded to the observer's side and the back light side were freed. The liquid crystal cell was found that the liquid crystal molecules are aligned substantially in plane between the glass substrates under no applied voltage and in the black state, and was found to have the slow axis in a horizontal direction with respect to the screen.

On the upper and lower glass substrates of the above-described in-plane alignment cell, the polarizer plates (P3-1 and P3-0) fabricated in the above were bonded using a tacky agent. In this case, P3-1 was disposed on the polarizer plate on the back light side, P3-0 was disposed on the observer's side, and were bonded so that the first optically anisotropic layer contained in the polarizer plate P3-1 is brought into contact with the glass substrate on the back light side, and so that the cellulose acetate film T3-0 contained in the polarizer plate P3-0 is brought into contact with the glass substrate on the observer's side. Boning was performed so that the absorption axis of the polarizer plate P3-1 was normal to the slow axis of the liquid crystal cell, and the absorption axes of the polarizer plate P3-1 and the polarizer plate P3-0 were normal to each other. The liquid crystal cell bonded with the polarizer plates as described in the above was again assembled into the liquid crystal television set TH-32LX500. A liquid crystal display device L3-1 was fabricated in this way.

Liquid crystal display devices L3-0, L3-2-L3-7 were fabricated by replacing the polarizer plate P3-1 with polarizer plates P3-0, P3-2-P3-7, respectively.

Example 3-8

<Production of LIQUID CRYSTAL Display LCD (L3-11)>

The in-plane alignment cell was obtained similarly to as in Example 3-7. On the upper and lower glass substrates of the above-described in-plane alignment cell, the polarizer plates (P3-1 and P3-0) fabricated in the above were bonded using a tacky agent. In this case, P3-0 was disposed on the polarizer plate on the back light side, P3-1 was disposed on the observer's side, and were bonded so that the first optically anisotropic layer contained in the polarizer plate P3-1 is brought into contact with the glass substrate on the observer's side, and so that the cellulose acetate film T3-0 contained in the polarizer plate P3-0 is brought into contact with the glass substrate on the back light side. Bonding was performed so that the absorption axis of the polarizer plate P3-1 was parallel to the slow axis of the liquid crystal cell, and the absorption axes of the polarizer plate P3-0 and the polarizer plate P3-1 were normal to each other. The liquid crystal cell bonded with the polarizer plates as described in the above was again assembled into the liquid crystal television set TH-32LX500. A liquid crystal display device L3-11 was fabricated in this way.

Liquid crystal display devices L3-12-L3-16 were fabricated by replacing the polarizer plate P3-1 with polarizer plates P3-2-P3-6, respectively.

(Evaluation of Light Leakage)

The liquid crystal panels bonded with the polarizer plates fabricated in the above were stored in an environment conditioned t at 60° C., 90% RH for 150 hours, and then allowed to stand at 25° C., 60% RH for 24 hours. Then, each of them was illuminated with the back lights, for which light leakage was observed from the direction inclined 60° leftward, and evaluated as follows:

○: light leakage not readily observable
x: apparent light leakage.
Results are shown in Table 3-1.

(Evaluation of Durability)

The liquid crystal panels bonded with the polarizer plates fabricated in the above were stored in an environment conditioned at 60° C., 90% RH for 150 hours, and then allowed to stand at 25° C., 60% RH for 24 hours, illuminated by the back lights, and evaluated as follows:

◎: light leakage at four corners not at all observable
○: light leakage at four corners not readily observable
x: light leakage at four corners observable
xx: peeling-off of the optical compensation film and non-uniform light leakage observable A 20-inch liquid crystal was used for the evaluation. Results are shown in Table 3-1.

It was found that no light leakage was found of each LCD of the invention and its durability was good.

TABLE 3-1

| LCD | PL*1 | Film*2 | Light Leakage | Durability |
|---|---|---|---|---|
| L3-0 | P3-0 | — | X | X |
| L3-1 | P3-1 | F3-1 | ○ | ○ |
| L3-2 | P3-2 | F3-2 | ○ | ◎ |
| L3-3 | P3-3 | F3-3 | ○ | ◎ |
| L3-4 | P3-4 | F3-4 | ○ | ◎ |
| L3-5 | P3-5 | F3-4 | ○ | ◎ |
| L3-6 | P3-6 | F3-6 | ○ | ◎ |
| L3-7 | P3-7 | F3-7 | ○ | XX |
| L3-11 | P3-1 | F3-1 | ○ | ○ |
| L3-12 | P3-2 | F3-2 | ○ | ◎ |
| L3-13 | P3-3 | F3-3 | ○ | ◎ |
| L3-14 | P3-4 | F3-4 | ○ | ◎ |
| L3-15 | P3-5 | F3-4 | ○ | ◎ |
| L3-16 | P3-6 | F3-6 | ○ | ◎ |

*1 Polarizing plate
*2 Optical compensation film

Example 4-1

<Production of Second Optically Anisotropic Layer (T4-1)>

The ingredients shown below were put into a mixing tank, stirred under heating and dissolved in the solvents to prepare a cellulose acetate solution.

| Cellulose Acetate Solution (D1) Formulation | |
|---|---|
| Cellulose acetate with degree of acetylation of 60.9% (degree of polymerization 300, Mn/Mw = 1.5) | 100 parts by mass |
| Triphenylphosphate(plasticizer) | 7.8 parts by mass |
| Biphenyldipehnylphosphate (plasticizer) | 3.9 parts by mass |
| Methylenechloride (first solvent) | 300 parts by mass |
| Methanol (second solvent) | 54 parts by mass |
| 1-butanol (third solvent) | 11 parts by mass |

On the other hand, 16 mass parts of retardation enhancing agent (A), 8 mass parts of retardation enhancing agent (B), 0.28 mass parts of silica dioxide (mean particle size: 0.1 μm), 80 mass parts of methylene chloride and 20 mass parts of methanol were put into another mixing tank, and stirred under heating to prepare a retardation enhancing agent solution (or a fine particle dispersion). After that, 45 mass parts of the retardation enhancing agent solution was mixed with 474 mass parts of the cellulose acetate solution, and stirred sufficiently to prepare a dope.

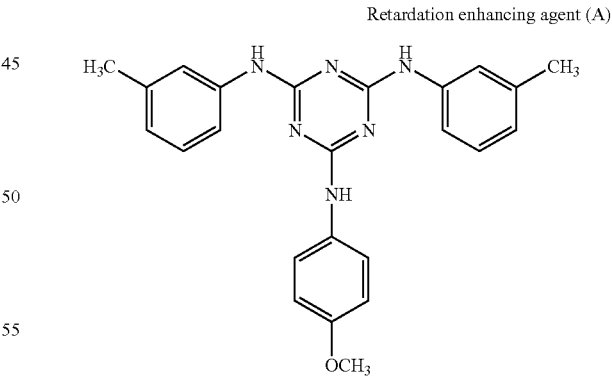

Retardation enhancing agent (A)

Retardation enhancing agent (B)

The dope was cast using a band casting machine provided with a band having a width of 2 m and a length of 65 m. The film having the residual solvent content of 15% by mass was stretched in the longitudinal direction (MD) by a stretching ratio of 20% using a tenter at 130° C., kept at 50° C. for 30 seconds while keeping the width after the stretching unchanged, released from the clips, to thereby form a cellulose acetate film. After stretching, the film was dried so that the residual solvent content of the film was lower than 0.1% by mass. Then, a cellulose acetate film (T4-1) was obtained. The cellulose acylate used herein had a Tg of 140° C.

The obtained cellulose acetate film (C3-1) was 1,340 mm wide and 88 μm thick. The in-plane retardation (Re) was 60 nm, and the thickness-wise retardation (Rth) was 190 nm. Thus, it was found that the obtained cellulose acetate film C3-1 exhibited the optical properties required for a second optically anisotropic layer.

Thus, the film was then allowed to pass through an induction heating rolls kept at 60° C. so as to raise the surface temperature of the film up to 40° C., thereon an alkali solution having the formulation below was coated using a bar coater to an amount of 14 ml/m², allowed to stand for 10 seconds under a steam-type far infrared heater (from Noritake Co., Ltd.) heated to 110° C., and thereon pure water was coated to an amount of 3 ml/m² again using a bar coater. The film temperature herein was kept at 40° C. Next, a cycle of washing with water using a fountain coater and dewatering using an air knife was repeated three times, and the film was then allowed to stand for 2 seconds in a drying zone conditioned at 70° C.

| <Fromulation of Alkali solution> | |
|---|---|
| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$ (surfactant) | 1.0 part by mass |

A cellulose acetate film (T4-1) of 1340 mm width and 88 μm thickness was obtained. Optical characteristic of the cellulose acylate film (T4-1) was measured using an automatic birefringence meter (KOBRA-21ADH from Oji Scientific Instruments). The Re and the Rth measured at 590 nm were respectively 60 nm and 190 nm. The slow axis of the optically anisotropic layer was found to cross normal to the longitudinal direction of the film. The film was named second optically anisotropic layer T4-1.

<Formation of First Optically Anisotropic Layer>

The cellulose acetate film (T4-1) was saponified. A coating fluid having a formulation shown below was continuously applied with a #14 wire bar to a saponified surface of the cellulose acetate film T4-1, and dried with warm air of 60° C. for 60 seconds and further with warm air of 100° C. for 120 seconds to form an alignment layer.

| Formulation of an alignment layer | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

Modified polyvinyl alcohol

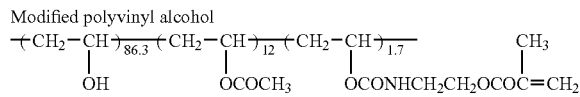

A coating fluid (SI) containing a rod-like liquid crystal compound and having the formulation shown below was continuously applied to a surface of the alignment layer prepared in the above, using a wire bar. Travel speed of the film was set to 20 m/min. The solvent was allowed to dry in the process of continuous heating from room temperature up to 80° C., the coating was then heated in a drying zone at 80° C. for 90 seconds, so as to align the rod-like liquid crystalline molecules. The film was then kept at 60° C., alignment of the liquid crystal molecules was fixed by UV irradiation, to thereby form the first optically anisotropic layer B4-1. Subsequently, the film was immersed into a 1.5 mol/L sodium hydroxide solution at 55° C. for 2 minutes, and then immersed into water so as to thoroughly remove sodium hydroxide. After that, the film was immersed into a 5 mmol/L aqueous sulfuric acid solution at 35° C. for one minute, and then into water so as to thoroughly remove the dilute aqueous sulfuric acid solution. Finally, the sample was fully dried at 120° C. In this way, the optical compensation film F4-1 having the first and second optically anisotropic layers stacked thereon was produced.

| Formulation of Coating fluid Containing Rod-Like Liquid Crystal Compound (S1) | |
|---|---|
| Rod-like liquid crystalline compound (B1) shown below | 100 parts by mass |
| Photo-polymerization initiator (Irgacure 907 from Ciba Geigy) | 3 parts by mass |
| Sensitizer (Kayacure DETX from Nippon Kayaku Co., Ltd.) | 1 part by mass |
| Fluoride-polymer (P1) shown below | 0.4 parts by mass |
| Pyridinium salt shown below | 1 part by mass |
| Methyl ethyl ketone | 172 parts by mass |

Rod-like liquid crystal compound (B1)

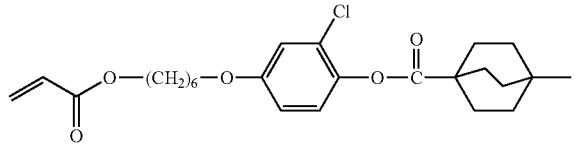

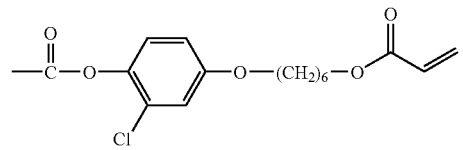

Fluoride polymer (P1)

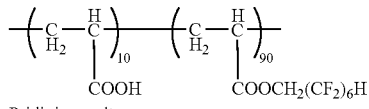

Pridinium salt

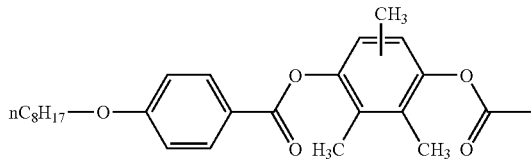

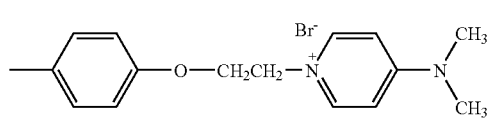

From thus-produced optical compensation film F4-1, only the optically anisotropic layer comprising fixed rod-like liquid crystal compound was peeled off, and optical characteristics thereof were measured using an automatic birefringence meter (KOBRA-21ADH from Oji Scientific Instruments). The optically anisotropic layer alone was found to show an Re value of 0 nm and an Rth value of −260 nm measured at 590 nm. It was also confirmed that the optically anisotoropic layer in which rod-like liquid crystal molecules were aligned substantially homeotropically to the film surface was formed. The $Re(40)_{450}/Re(40)_{550}$ value of the first optically anisotropic layer was shown in Table 4-1.

Example 4-2

A first optically anisotropic layer B4-2 and an optical compensation film F4-2, also comprising a second optically anisotropic layer, was produced in the same manner as Example 4-1, except that a coating fluid S2 having a formulation below was used in the place of the coating fluid S1. The first optically anisotropic layer alone was found to show an Re value of 0 nm and an Rth value of −260 nm measured at 590 nm. It was also confirmed that the optically anisotoropic layer in which rod-like liquid crystal molecules were aligned substantially homeotropically to the film surface was formed. The $Re(40)_{450}/Re(40)_{550}$ value of the first optically anisotropic layer was shown in Table 4-1.

| Formulation of Coating fluid Containing Rod-Like Liquid Crystal Compound (S2) | |
|---|---|
| Rod-like liquid crystalline compound (B2) shown below | 100 parts by mass |
| Photo-polymerization initiator (Irgacure 907 from Ciba Geigy) | 3 parts by mass |
| Sensitizer (Kayacure DETX from Nippon Kayaku Co., Ltd.) | 1 part by mass |
| Fluoride-polymer (P1) shown above | 0.4 parts by mass |
| Pyridinium salt shown below | 1 part by mass |
| Methyl ethyl ketone | 172 parts by mass |

Rod-like liquid crystal compound (B2)

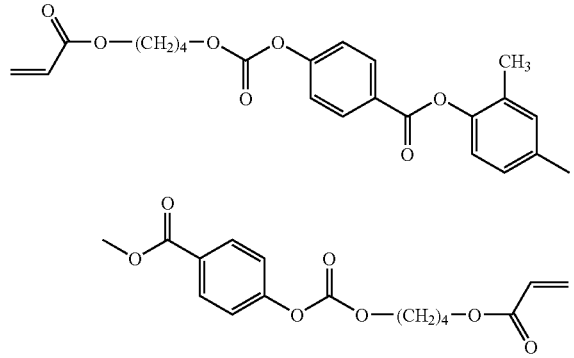

Referential Example

Production of Optical Compensation Film F4-H1)

A first optically anisotropic layer B4-3 and an optical compensation film F4-3, also comprising a second optically anisotropic layer, was produced in the same manner as Example 4-1, except that a coating fluid S3 having a formulation below was used in the place of the coating fluid S1. The first optically anisotropic layer alone was found to show an Re value of 0 nm and an Rth value of −260 nm measured at 590 nm. It was also confirmed that the optically anisotoropic layer in which rod-like liquid crystal molecules were aligned substantially homeotropically to the film surface was formed. The $Re(40)_{450}/Re(40)_{550}$ value of the first optically anisotropic layer was shown in Table 4-1.

| Formulation of Coating fluid Containing Rod-Like Liquid Crystal Compound (S3) | |
|---|---|
| Rod-like liquid crystalline compound (B3) shown below | 100 parts by mass |
| Photo-polymerization initiator (Irgacure 907 from Ciba Geigy) | 3 parts by mass |
| Sensitizer (Kayacure DETX from Nippon Kayaku Co., Ltd.) | 1 part by mass |
| Fluoride-polymer (P1) shown above | 0.4 parts by mass |
| Pyridinium salt shown below | 1 part by mass |
| Methyl ethyl ketone | 172 parts by mass |

Rod-like liquid crystalline compound (B3)

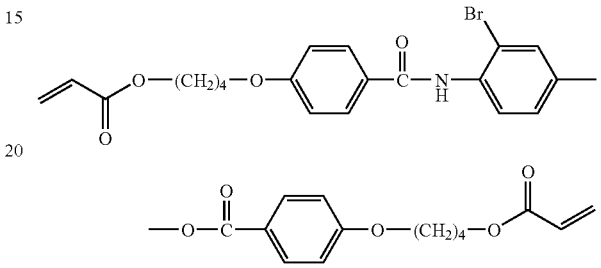

Example 4-3

<Production of Cyclic Polyolefin>

In a reaction tank, 100 parts mass of purified toluene and 100 parts mass of methyl norbornene carbonate were placed. Subsequently, a solution prepared by dissolving 25 mmol % (with respect to monomer mass) of ethylhaxanoate-Ni and 0.225 mol % (with respect to monomer mass) of tri(pentafluorophenyl) boron in toluene, and a solution prepared by dissolving 0.25 mol % (with respect to monomer mass) of triethyl aluminum in toluene were poured into the tank. The mixture was reacted with stirring at room temperature for 18 hours. After the end of the reaction, the reaction mixture was poured into excess ethanol so that polymer was precipitated in ethanol. The precipitation was purified and dried in a vacuum at 65° C. for 24 hours. Then, Polymer J1 was obtained.

<Formation of Second Optically Anisotropic Layer (C4-1)>

The ingredients shown below were put into a mixing tank, stirred and dissolved in the solvent. The obtained solution was filtrated through a paper filter of 34 μm mean pore size and a sintered metal filter of 10 μm mean pore seize.

| Formulation of Cyclic polyolefin solution (D1) | |
|---|---|
| cyclic polyolefin (J1) | 150 mass parts |
| dichloromethane | 414 mass parts |
| methanol | 36 mass parts |

Next, the ingredients including the cyclic polyolefin solution were put into a dispersing machine to give a matting agent dispersion.

| Matting agent dispersion M1 | |
|---|---|
| silica particles of 16 nm mean particle size ("AEROSIL R972" manufactured by Aerosil Co., Ltd.) | 2 mass parts |
| dichloromethane | 81 mass parts |

| Matting agent dispersion M1 | |
| --- | --- |
| methanol | 7 mass parts |
| cyclic polyolefin solution (D1) | 10 mass parts |

Mixed were 100 mass parts of cyclic polyolefin solution D1 and 1.35 mass parts of matting dispersion Ml. Then, a dope for forming films was prepared.

The above-described dope was cast using a band casting machine to a width of 1,400 mm. The film was freed from the band, with the residual solvent content kept at approximately 25% by mass, was then held so as to prevent wrinkling, and stretched by a stretching ratio of 10% using a tenter in the transverse direction (TD), while being blown with a hot air of 140° C. Thereafter the film was transferred from tenter conveyance to roll conveyance, further dried at 120° C. to 140° C., and wound up. The obtained film was subjected to saponification treatment in the same manner as Example 4-1. Then, a cyclic polyolefin film (C4-1) was obtained. The film was found to have an Re of 70 nm and Rth of 210 nm respectively measured at 590 nm.

An alignment layer was produced on the saponified surface of the cyclic polyolefin film (C4-1); and, subsequently, a first optically anisotropic layer (B4-1) made of a coating fluid (S1) was produced in the same manner as Example 4-1. Thus, an optical compensation film (F4-3), comprising laminated a first and second optically anisotropic layer, was produced Example 4-4

<Production of Polarizing Plate>

A rolled polyvinyl alcohol film of 80 μm thick continuously dyed in an aqueous iodine solution was stretched by 5 times in the longitudinal direction (MD), and dried to obtain a long-web polarizer film. The polarizer film was continuously bonded, on one surface thereof, with the surface of each of the above-produced optical compensation films F4-1, F4-2, F4-3 and F4-H1 having no first optically anisotropic layer formed thereon (or, a rear surface of the cellulose acetate film or the cyclic polyolefin film to be used as a second optically anisotropic layer), and on the other surface thereof, with a cellulose triacetate film (Fujitack TD80UL from FUJI-FILM Corporation) having the saponified surface, using a polyvinyl alcohol-base adhesive, to thereby fabricate each of long-web polarizer plates P4-1, P4-2, P4-3 and P4-H1. In each polarizing plate, the absorption axis of the polarizer film was found to cross the slow axis of the second optically anisotropic layer at right angle.

Example 4-5

<Production of Cellulose Acetate Film (T0)>

(Preparation of Cellulose Acetate Solution)

The ingredients below were put into a mixing tank, and stirred and dissolved in the solvent, to thereby prepare a cellulose acetate solution "A".

| Formulation of Cellulose Acetate Solution "A" | |
| --- | --- |
| Cellulose acetate having a degree of acetyl substitution of 2.94 | 100.0 parts by mass |
| Methylenechloride (first solvent) | 402.0 parts by mass |
| Methanol (second solvent) | 60.0 parts by mass |

(Preparation of Matting Agent Solution)

Twenty parts by mass of silica particles having a mean particle size of 16 nm (AEROSIL R972 from Nippon Aerosil Co., Ltd.) and 80 parts by mass of methanol were thoroughly mixed under stirring for 30 minutes, to thereby prepare a silica particle dispersion. The dispersion was then put into a dispersion machine together with the composition shown below, and further stirred for 30 minutes or longer so as to dissolve the individual components, to thereby prepare a matting agent solution.

| Formulation of Matting Agent Solution | |
| --- | --- |
| Dispersion of silica particles having a mean particle size of 16 nm | 10.0 parts by mass |
| Methylene chloride (first solvent) | 76.3 parts by mass |
| Methanol (second solvent) | 3.4 parts by mass |
| Cellulose acetate solution "A" | 10.3 parts by mass |

(Preparation of Additive Solution)

The composition shown below was put into a mixing tank, stirred under heating so as to dissolve the individual components, to thereby prepare a cellulose acetate solution.

| Formulation of Additive Solution | |
| --- | --- |
| Optical anisotropy reducing agent shown below | 49.3 parts by mass |
| Wavelength dispersion adjusting agent | 4.9 parts by mass |
| Methylene chloride (first solvent) | 58.4 parts by mass |
| Methanol (second solvent) | 8.7 parts by mass |
| Cellulose acetate solution "A" | 12.8 parts by mass |

Opticall Anisotropy Reducing Agent

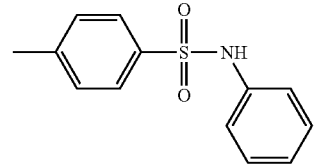

Wavelength Dispersion Adjusting Agent

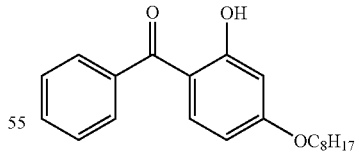

(Production of Cellulose Acetate Film)

Mixed were 94.6 parts by mass of the above-described cellulose acetate solution "A", 1.3 parts by mass of the matting agent solution, and 4.1 parts by mass of the additive solution, each of which having preliminarily been filtered, and the mixture was cast using a band casting machine. In this composition, ratios by mass of the optical anisotropy reducing agent and of the wavelength dispersion adjusting agent relative to the cellulose acetate were 12% and 1.2%, respectively. The film was freed from the band, while keeping a content of residual solvent of 30%, dried at 140° C. for 40 minutes, to thereby fabricate a long-web cellulose acetate film TO of 80 µm thick. The obtained film was found to have an in-plane retardation (Re) of 1 nm (slow axis was normal to the longitudinal direction), and a thickness-wise retardation (Rth) of −1 nm.

<Production of Polarizing Plate (P4-0)>

A rolled polyvinyl alcohol film of 80 µm thick continuously dyed in an aqueous iodine solution was stretched by 5 times in the longitudinal direction (MD), and dried to obtain a long-web polarizer film. The polarizer film was continuously bonded, on one surface thereof, with the saponified surface of the cellulose acetate film TO, and on the other surface thereof, with a cellulose triacetate film (Fujitack TD80UL from FUJIFILM Corporation) having the saponified surface, using a polyvinyl alcohol-base adhesive, to thereby fabricate each of long-web polarizer plates P4-0.

<Production of Polarizing Plate (P4-4)>

An optical compensation film F4-3 was produced in the same manner as Example 4-3. The polarizing plate P4-0 was continuously bonded, on a cellulose acetate film (TO) side surface thereof, with the surface of the optical compensation films F4-3 having no first optically anisotropic layer formed thereon (or, a rear surface of the cyclic polyolefin film to be used as a second optically anisotropic layer), using an isotropic acryl-base adhesive, to thereby fabricate a long-web polarizer plate P4-4. In the polarizing plate, the absorption axis of the polarizer film was found to cross the slow axis of the second optically anisotropic layer at right angle.

Example 4-6

<Formation of First Optically Anisotropic Layer>

A long polyethylene terephthalate film (thickness 100 µm) was prepared as a temporary support, and on the film, an alignment layer and a first optically anisotropic layer made of a coating fluid (S1) were produced in the same manner as Example 4-1.

<Production of Polarizing Plate (P4-5)>

A long-web polarizer film was produced in the same manner as Example 4-4. The polarizer film was continuously bonded, on one surface thereof, with a surface of a cyclic polyolefin film C4-1, which was produced in the same manner as Example 4-3, and on the other surface thereof, with a cellulose triacetate film (Fujitack TD80UL from FUJIFILM Corporation) having the saponified surface, using a polyvinyl alcohol-base adhesive, to thereby fabricate a long-web polarizer plate. The obtained polarizing plate was continuously bonded, on a cyclic polyolefin film C4-1 side surface thereof, with a surface of the first optically anisotropic layer formed on the PET film (a temporary support), using an isotropic acryl-base adhesive, and, subsequently, the PET film was freed from the polarizing plate. Thus, a long-web polarizing plate (P4-5) comprising a polarizer film, a second optically anisotropic layer and a first optically anisotropic layer, which are laminated in this order, were produced. In the polarizing plate, the angle between the absorption axis of the polarizer film and the slow axis of the second optically anisotropic layer was 90°.

Example 4-7

<Production of Second Optically Anisotropic Layer (C4-2)>

A dope comprising a cyclic polyolefin was prepared in the same manner as Example 4-3. The above-described dope was cast using a band casting machine to a width of 1,400 mm. The film was freed from the band, with the residual solvent content kept at approximately 25% by mass, was then held so as to prevent wrinkling, and stretched by a stretching ratio of 5% using a tenter in the transverse direction (TD), while being blown with a hot air of 140° C. Thereafter the film was transferred from tenter conveyance to roll conveyance, further lengthwisely stretched in the feeding direction while being dried at 120° C. to 140° C., and wound up. The obtained film was subjected to saponification treatment by applying an alkali solution to the film surface in the same manner as Example 4-1.

The obtained cyclic polyolefin film was found to have an Re value of 70 nm and an Rth value of 210 nm measured at 590 nm. It was also confirmed that the mean direction of the slow axes of the film was substantially parallel to the long direction of the film. Thus, this film was used as a second optically anisotropic layer C4-2.

<Formation of First Optically Anisotropic Layer>

A first optically anisotropic layer made of a coating fluid S1 was produced on the saponified surface of the long cyclic polyolefin film (C4-2) in the same manner as Example 4-1. The film having the first optically anisotropic layer was subjected to saponification treatment by immersing a solution of sodium hydroxide in the same manner as Example 4-1. Then, an optical compensation film F4-4, comprising first and second optically anisotropic layers, was obtained.

Referential Example 4-2

Production of Optical Compensation Film F4H2

An optical compensation film (F4-H2), comprising first and second optically anisotropic layers, was produced in the same manner as Example 4-1, except that a coating fluid S3 was used in the place of the coating fluid S1. The first optically anisotropic layer was found to have an Re value of 0 nm and an Rth value of −260 nm measured at 590 nm. It was also confirmed that the optically anisotoropic layer in which rod-like liquid crystal molecules were aligned substantially homeotropically to the film surface was formed.

Example 4-8

<Production of Polarizing Plate>

A long-web polarizer film was produced in the same manner as Example 4-4. The polarizer film was continuously bonded, on one surface thereof, with a surface of the first optically anisotropic layer of the optical compensation film F4-4, and on the other surface thereof, with a cellulose triacetate film (Fujitack TD80UL from FUJIFILM Corporation) having the saponified surface, to thereby fabricate a long-web polarizer plate P4-6. Adhesion between the polarizer film and the optical compensation film F4-4 was carried out using an isotropic acryl-base adhesive; and adhesion between the polarizer film and the cellulose triacetate film was carried out using polyvinyl alcohol adhesive.

A polarizing plate P4-5 was produced in the same manner as the polarizing plate P4-6, except that the optical compensation film F4-H2 was used in the place of the optical compensation film P4-6.

In the polarizing plate, the angle between the absorption axis of the polarizer film and the slow axis of the second optically anisotropic layer was 0°.

Example 4-9

<Formation of First Optically Anisotropic Layer>

A long-web cellulose acetate film T0 was produced in the same manner as Example 4-5. In the same manner as Example 4-1, saponification treatment and formation of an alignment layer were carried out, and a first optically anisotropic layer made of a coating fluid S1 was formed on the alignment layer. Then, an optical compensation film F4-5, comprising a substantially isotropic substrate of a cellulose acetate film TO, and a first optically anisotropic layer thereon, was obtained.

<Formation of Second Optically Anisotropic Layer>

A long-web cyclic polyolefin film C4-2 to be used as a second optically anisotropic layer, was produced in the same manner Example 4-7.

<Production of Polarizing Plate (P4-7)>

A long-web polarizer film was produced in the same manner as Example 4-4. The polarizer film was continuously bonded, on one surface thereof, with a rear surface of the cellulose acetate film TO having the first optically anisotropic layer thereon of the optical compensation film F4-5, and on the other surface thereof, with a cellulose triacetate film (Fujitack TD80UL from FUJIFILM Corporation) having the saponified surface, using a polyvinyl alcohol-base adhesive. The cyclic polyolefin film C4-2 was bonded with a surface of the first optically anisotropic layer of the optical compensation film F4-5, using an isotropic acryl-base adhesive. Then, a long-web polarizing plate P4-7, comprising a polarizer film, a second optically anisotropic layer and a first optically anisotropic layer, which are laminated in this order, were produced. In the polarizing plate, the angle between the absorption axis of the polarizer film and the slow axis of the second optically anisotropic layer was 0°.

Example 4-10

<Production of Cyclic Polyolefin Film (C4-3)>

The composition shown below was put into a mixing tank, stirred under heating so as to dissolve the individual components, and filtered through a filter paper having a mean pore size of 34 μm or through a sintered metal filter having a mean pore size of 10 μm.

| Cyclic Polyolefin Solution D3 | |
| --- | --- |
| Cyclic polyolefin: TOPAS5013 | 100 parts by mass |
| Paraffin wax 135 (Nippon Seiro Co., Ltd.) | 15 parts by mass |
| Cyclohexane | 380 parts by mass |
| Dichloromethane | 70 parts by mass |

Next, the composition shown below, containing the cyclic polyolefin solution prepared by the method described in the above, was put into a dispersion machine, to thereby prepare a particle dispersion.

| Fine Particle Dispersion M3 | |
| --- | --- |
| Silica Particles having a primary mean particle size of 16 nm (Aerosil R972 from Nippon Aerosil Co., Ltd.) | 2 parts by mass |
| Cyclohexane | 73 parts by mass |
| Dichloromethane | 10 parts by mass |
| Cyclic polyolefin solution D3 | 10 parts by mass |

One hundred parts by mass of the above-described cyclic polyolefin solution D3 and 1.35 parts by mass of the fine particle matting agent dispersion M3 were mixed to thereby prepare a film forming dope. The above-described dope was cast using a band casting machine. The film was freed from the band, with the residual solvent content kept at approximately 35% by mass, was then held so as to prevent wrinkling, dried at 120° C. to 140° C., and wound up. The Re and the Rth measured at 590 nm were respectively 0.5 nm and 1 nm. In this way, the cyclic polyolefin film C4-3 was fabricated.

<Production of Polarizing Plate (P4-8)>

A long-web polarizer film was produced in the same manner as Example 4-4. The polarizer film was continuously bonded, on one surface thereof, with the obtained cyclic polyolefin film C4-3, and on the other surface thereof, with a cellulose triacetate film (Fujitack TD80UL from FUJIFILM Corporation) having the saponified surface. Adhesion between the polarizer film and the cellulose triacetate film was carried out using polyvinyl alcohol adhesive; and adhesion between the polarizer film and the optical compensation film F4-4 was carried out using an isotropic acryl-base adhesive; and adhesion between the polarizer film and the cyclic polyolefin film C4-3 was carried out as follows.

In water, 10 mass parts of polyester-base urethane ("TAKELAC XW-74-C154" manufactured by Mitsui Takeda Chemicals Inc.) and 1 mass part of isocyanate-base crosslinking agent ("TAKENATE WD-725" manufactured by Mitsui Takeda Chemicals Inc.) were dissolved to form a solution whose solid content was adjusted to 20%. The polarizer film was continuously bonded, on the surface thereof, with the cyclic polyolefin film C4-3, using the obtained solution as an adhesive, hardened in an oven at 40° C. and dried for 72 hours to form a polarizing plate.

<Production of Polarizing Plate (P4-9)>

The obtained polarizing plate (P4-8) was bonded, on a surface of the cyclic polyolefin film C4-3, with a surface of the first optically anisotropic layer of the optical compensation film F4-4, using an isotropic adhesive. Then, a polarizing plate P4-9, comprising a polarizer film, a second optically anisotropic layer and a first optically anisotropic layer, which are laminated in this order, were produced. In the polarizing plate, the angle between the absorption axis of the polarizer film and the slow axis of the second optically anisotropic layer was 0°.

Example 4-11

<Production of Liquid Crystal Cell (L4-11)>

A liquid crystal cell was taken from a liquid crystal television set TH-32LX500 (from Matsushita Electric Industrial Co., Ltd.), and the polarizer plate and the optical film bonded to the observer's side and the back light side were freed. The liquid crystal cell was found that the liquid crystal molecules are aligned substantially in plane between the glass substrates under no applied voltage and in the black state, and was found to have the slow axis in a horizontal direction with respect to the screen.

On the upper and lower glass substrates of the above-described in-plane alignment cell, the polarizer plates (P4-1 and P4-0) fabricated in the above were bonded using a tacky agent. In this case, P4-1 was disposed on the polarizer plate on the back light side, P4-0 was disposed on the observer's side, and were bonded so that the first optically anisotropic layer contained in the polarizer plate P4-1 is brought into contact with the glass substrate on the back light side, and so that the cellulose acetate film T0 contained in the polarizer plate P4-0 is brought into contact with the glass substrate on the observer's side. Boning was performed so that the absorption axis of the polarizer plate P4-1 was normal to the slow axis of the liquid crystal cell, and the absorption axes of the polarizer plate P4-1 and the polarizer plate P4-0 were normal to each other. The liquid crystal cell bonded with the polarizer plates as described in the above was again assembled into the liquid crystal television set TH-32LX500. A liquid crystal display device L4-11 was fabricated in this way.

Example 4-12

<Production of Liquid Crystal Display (L4-21)>

The in-plane alignment cell was obtained similarly to as in Example 4-11. On the upper and lower glass substrates of the above-described in-plane alignment cell, the polarizer plates (P4-1 and P4-0) fabricated in the above were bonded using a tacky agent. In this case, P4-0 was disposed on the polarizer plate on the back light side, P4-1 was disposed on the observer's side, and were bonded so that the first optically anisotropic layer contained in the polarizer plate P4-1 is brought into contact with the glass substrate on the observer's side, and so that the cellulose acetate film T0 contained in the polarizer plate P4-0 is brought into contact with the glass substrate on the back light side. Bonding was performed so that the absorption axis of the polarizer plate P4-1 was parallel to the slow axis of the liquid crystal cell, and the absorption axes of the polarizer plate P4-0 and the polarizer plate P4-1 were normal to each other. The liquid crystal cell bonded with the polarizer plates as described in the above was again assembled into the liquid crystal television set TH-32LX500. A liquid crystal display device L4-21 was fabricated in this way.

Example 4-13

Liquid crystal display devices L4-12, L4-13, L4-14, L4-15, L4-16, L4-17, L4-19, L4-H11 and L4-H12 were fabricated in the same manner as the LCD 4-11, except that the polarizing plates P4-2, P4-3, P4-4, P4-5, P4-6, P4-7, P4-9, P4-H1 and P4-H2, were respectively used in the place of the polarizing plate P4-1.

It is noted that, in each of LCDs L4-12-L4-15 and L4-H11, the liquid crystal cell, the first optically anisotropic layer, the second optically anisotropic layer and the polarizer film were disposed in this order; and the slow axis of the second optically anisotropic layer and the mean direction of long axes of liquid crystal molecules in the black state were substantially parallel to each other.

It is also noted that, in each of LCDs L4-16, L4-17, L4-19 and L4-H12, the liquid crystal cell, the second optically anisotropic layer, the first optically anisotropic layer and the polarizer film were disposed in this order; and the slow axis of the second optically anisotropic layer and the mean direction of long axes of liquid crystal molecules in the black state were substantially orthogonal to each other.

Example 4-14

Liquid crystal display devices L4-22, L4-23, L4-24, L4-25, L4-26, L4-27, L4-29, L4-H21 and L4-H22 were fabricated in the same manner as the LCD 4-11, except that the polarizing plates P4-2, P4-3, P4-4, P4-5, P4-6, P4-7, P4-9, P4-H1 and P4-H2, were respectively used in the place of the polarizing plate P4-1.

It is noted that, in each of LCDs L4-22-L4-25 and L4-H21, the liquid crystal cell, the first optically anisotropic layer, the second optically anisotropic layer and the polarizer film were disposed in this order; and the slow axis of the second optically anisotropic layer and the mean direction of long axes of liquid crystal molecules in the black state were substantially parallel to each other.

It is also noted that, in each of LCDs L4-26, L4-27, L4-29 and L4-H22, the liquid crystal cell, the second optically anisotropic layer, the first optically anisotropic layer and the polarizer film were disposed in this order; and the slow axis of the second optically anisotropic layer and the mean direction of long axes of liquid crystal molecules in the black state were substantially orthogonal to each other.

The viewing angle properties in the black state of LCDs produced above were evaluated respectively. The results were shown in Table 4-2.

TABLE 4-1

| Polarizing Plate | First optically anisotropic layer | |
|---|---|---|
| | Rod-like LC Compound | $Re(40)_{450}/Re(40)_{550}$ |
| P4-1 | B4-1 | 1.02 |
| P4-2 | B4-2 | 1.04 |
| P4-3 | B4-1 | 1.02 |
| P4-4 | B4-1 | 1.02 |
| P4-5 | B4-1 | 1.02 |
| P4-6 | B4-1 | 1.02 |
| P4-7 | B4-1 | 1.02 |
| P4-9 | B4-1 | 1.02 |
| P4-H1 | B4-3 | 1.09 |
| P4-H2 | B4-3 | 1.09 |

TABLE 4-2

| LCD | First*1 OA Layer | Second OA Layer | Colaration*3 at an oblique angle |
|---|---|---|---|
| L4-11 | B4-1 | T4-1 | ◎ |
| L4-12 | B4-2 | T4-1 | ○ |
| L4-13 | B4-1 | C4-1 | ◎ |
| L4-14 | B4-1 | C4-1 | ◎ |
| L4-15 | B4-1 | C4-1 | ◎ |
| L4-16 | B4-1 | C4-2 | ◎ |
| L4-17 | B4-1 | C4-2 | ◎ |
| L4-19 | B4-1 | C4-2 | ◎ |
| L4-21 | B4-1 | T4-1 | ◎ |
| L4-22 | B4-2 | T4-1 | ○ |
| L4-23 | B4-1 | C4-1 | ◎ |
| L4-24 | B4-1 | C4-1 | ◎ |
| L4-25 | B4-1 | C4-1 | ◎ |
| L4-26 | B4-1 | C4-2 | ◎ |
| L4-27 | B4-1 | C4-2 | ◎ |
| L4-29 | B4-1 | C4-2 | ◎ |
| L4-H11 | B4-3 | T4-1 | X |

TABLE 4-2-continued

| LCD | First*1 OA Layer | Second OA Layer | Coloration*3 at an oblique angle |
|---|---|---|---|
| L4-H12 | B4-3 | C4-2 | X |
| L4-H21 | B4-3 | T4-1 | X |
| L4-H22 | B4-3 | C4-2 | X |

*1First optically anisotropic layer
*2 Second optically anisotropic layer
*3Coloration ovserbed at a viewing angle of 60° relative to a normal direction and 45° relative to a horizontal direction in the black state; the symbol "⊚" means that any coloration was not observed at all; the smbol "○" means that any colaration was not ovserved; and the symbol "X" means that colaration was observed.

CROSS-REFERENCE TO RELATED APPLICATIONS

This application claims benefit of priorities under 35 USC 119 to Japanese Patent Application Nos. 2005-348975 filed Dec. 2, 2005, 2005-366291 filed Dec. 20, 2005, 2005-376503 filed Dec. 27, 2005, and 2006-021147 filed Jan. 30, 2006.

The invention claimed is:

1. An optical compensation film comprising at least a first optically anisotropic layer and a second optically anisotropic layer, the first optically anisotropic layer having an in-plane retardation of 0 to 10 nm and an in-thickness direction retardation of −400 to −80 nm, the second optically anisotropic layer having an in-plane retardation of 20 to 150 nm and an in-thickness direction retardation of 100 to 300 nm, and at least either one of the first and second optically anisotropic layer being a polymer film; and
   wherein the first optically anisotropic layer comprises rod-like liquid crystal molecules fixed in a homeotropic alignment state, and a retardation of the first optically anisotropic layer measured in a direction rotated by 40° from a normal line of the layer plane satisfies a relationship below:

$$1 \leq Re(40)_{450}/Re(40)_{550} \leq 1.07$$

Where, $Re(40)_{450}$ and $Re(40)_{550}$ represent retardation values measured in a direction 40° rotated from the normal line, at 450 nm and 550 nm, respectively.

2. The optical compensation film of claim 1, wherein the second optically anisotropic layer is a cellulose acylate film comprising at least one cellulose acylate, wherein the cellulose acylate is a mixed fatty acid ester of cellulose obtained by substituting hydroxyl groups of cellulose with acetyl groups and with acyl groups having 3 or more carbon atoms; and the degree of substitution A by acetyl group and the degree of substitution B by acyl group having 3 or more carbon atoms satisfy the formulae (I) and (II) below:

$$2.0 \leq A+B \leq 3.0 \quad \text{Formula(I)}$$

$$0 < B. \quad \text{Formula (II)}$$

3. The optical compensation film of claim 2, wherein the acyl group having 3 or more carbon atoms is a butanoyl group or a propionyl group.

4. The optical compensation film of claim 2, wherein the cellulose acylate film has a degree of substitution B by acyl group having 3 or more carbon atoms of 0.6 to 1.0.

5. The optical compensation film of claim 2, wherein the cellulose acylate film is a monoaxial or biaxial film stretched by transverse monoaxial stretching, longitudinal monoaxial stretching, simultaneous biaxial stretching or sequential biaxial stretching.

6. The optical compensation film of claim 2, wherein either one of, or both of surfaces of the cellulose acylate film are saponified.

7. The optical compensation film of claim 1, wherein the second optically anisotropic layer is a cyclic polyolefin film.

8. The optical compensation film of claim 7, wherein the cyclic polyolefin film is a monoaxial or biaxial film stretched by transverse monoaxial stretching, longitudinal monoaxial stretching, simultaneous biaxial stretching or sequential biaxial stretching.

9. The optical compensation film of claim 7, wherein the cyclic polyolefin film comprises at least one addition polymer comprising at least one repeating unit represented by formula (V) below, or at least one ring-opening polymer comprising at least one repeating unit represented by formula (VI) below:

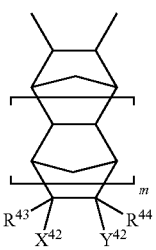

Formula(V)

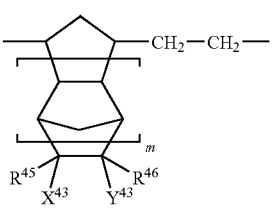

Formula (VI)

where, m is an integer of 0 to 4; $R^{43}$ to $R^{46}$ independently represents a hydrogen atom or $C_{1-10}$ hydrocarbon group; $X^{42}$, $X^{43}$, $Y^{42}$ and $Y^{43}$ independently represent a hydrogen atom, $C_{1-10}$ hydrocarbon group, halogen atom, halogen-substituted $C_{1-10}$ hydrocarbon group, —$(CH_2)_n$COOR$^{51}$, —$(CH_2)_n$OCOR$^{52}$, —$(CH_2)_n$NCO, —$(CH_2)_n$NO$_2$, —$(CH_2)_n$CN, —$(CH_2)_n$CONR$^{53}$R$^{54}$, —$(CH_2)_n$NR$^{53}$R$^{54}$, —$(CH_2)_n$OZ$^{51}$, —$(CH_2)_n$W$^{51}$, or (—CO)$_2$O or (—CO)$_2$ONR$^{55}$ composed of $X^{42}$ and $Y^{42}$, or of $X^{43}$ and $Y^{43}$; $R^{51}$, $R^{52}$, $R^{53}$, $R^{54}$ and $R^{55}$ independently represent a hydrogen atom or $C_{1-20}$ hydrocarbon group; $Z^{51}$ represents a hydrocarbon group or halogen-substituted hydrocarbon group; $W^{51}$ represents SiR$^{56}_p$D$^{51}_{3-p}$(R$^{56}$ represents a $C_{1-10}$ hydrocarbon group, D$^{51}$ represents a halogen atom-OCOR$^{56}$ or OR$^{56}$, and p is an integer of 0 to 3); and n is an integer of 0 to 10.

10. The optical compensation film of claim 7, wherein the cyclic polyolefin film comprises at least one cyclic polyolefin having an ester group in side chains thereof, obtained by polymerizing a polymerizable composition comprising at least one cyclic olefin monomer having an ester group.

11. The optical compensation film of claim 10, wherein either one of, or both of surfaces of the cyclic polyolefin film are saponified.

12. The optical compensation film of claim 1, wherein at least one adhesive layer is disposed between the first and second optically anisotropic layers.

13. A polarizing plate comprising a polarizer film and an optical compensation film as set forth in claim 1.

14. The polarizing plate of claim 13, wherein only an optically substantially isotropic adhesive layer and/or substantially optically isotropic protective film is disposed between the optical compensation film and the polarizer film.

15. The polarizing plate of claim 14, wherein the transparent protective film is a film comprising cellulose acylate or cyclic polyolefin, and has an in-plane retardation of 0 to 10 nm, and an in-thickness direction retardation of −20 to 20 nm.

16. The polarizing plate of claim 13, comprising the first optically anisotropic layer, the second optically anisotropic layer, and the polarizer film stacked therein in this order, the direction of the slow axis of the second optically anisotropic layer being substantially normal to the direction of absorption axis of the polarizer film.

17. A liquid crystal display device comprising:
a liquid crystal cell comprising a pair of substrates, and, between the pair of substrates, a liquid crystal layer in which liquid crystal molecules are aligned substantially parallel to surfaces of the substrates in the black state;
a polarizing plate as set forth in claim 16, the polarizing plate being disposed on an outer side of one substrate of the pair of substrates so that the first optically anisotropic layer, the second optically anisotropic layer and the polarizer film are arranged in this order as viewed from the one substrate of the pair of substrates, and so that the slow axis of the second optically anisotropic layer is substantially parallel to a mean direction of longitudinal axes of liquid crystal molecules in the black state; and
a second polarizer film disposed on an outer side of the other substrate of the pair of substrates so that the absorption axes of the polarizer films are orthogonal to each other.

18. The polarizing plate of claim 13, comprising the second optically anisotropic layer, the first optically anisotropic layer, and the polarizer film stacked therein in this order, the direction of the slow axis of the second optically anisotropic layer being substantially parallel to the direction of absorption axis of the polarizer film.

19. A liquid crystal display device comprising:
a liquid crystal cell comprising a pair of substrates, and, between the pair of substrates, a liquid crystal layer in which liquid crystal molecules are aligned substantially parallel to surfaces of the substrates in the black state;
a polarizing plate as set forth in claim 18, the polarizing plate being disposed on an outer side of one substrate of the pair of substrates so that the second optically anisotropic layer, the first optically anisotropic layer and the polarizer film are arranged in this order as viewed from the one substrate of the pair of substrates, and so that the slow axis of the second optically anisotropic layer is substantially orthogonal to a mean direction of longitudinal axes of liquid crystal molecules in the black state; and
a second polarizer film disposed on an outer side of the other substrate of the pair of substrates so that the absorption axes of the polarizer films are orthogonal to each other.

* * * * *